United States Patent
Hyon et al.

(10) Patent No.: US 12,480,667 B2
(45) Date of Patent: Nov. 25, 2025

(54) AIR-CONDITIONING SYSTEM

(71) Applicant: LG ELECTRONICS INC., Seoul (KR)

(72) Inventors: Chinsoo Hyon, Seoul (KR); Sehwan Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 709 days.

(21) Appl. No.: 17/742,650

(22) Filed: May 12, 2022

(65) Prior Publication Data

US 2022/0373197 A1 Nov. 24, 2022

(30) Foreign Application Priority Data

May 24, 2021 (KR) .................. 10-2021-0065988
Dec. 7, 2021 (KR) .................. 10-2021-0174215

(51) Int. Cl.
*F24F 1/0073* (2019.01)
*B01D 46/00* (2022.01)
(Continued)

(52) U.S. Cl.
CPC ........ *F24F 1/0073* (2019.02); *B01D 46/0004* (2013.01); *B01D 46/0049* (2013.01);
(Continued)

(58) Field of Classification Search
CPC ...... F24F 1/0014; F24F 1/0047; F24F 1/0071; F24F 1/0073; F24F 1/0025; F24F 1/0063;
(Continued)

(56) References Cited

U.S. PATENT DOCUMENTS 3,618,659 A * 11/1971 Rawal .................. F24F 3/044
165/104.34
4,203,566 A 5/1980 Lord
(Continued)

FOREIGN PATENT DOCUMENTS

CN 1707169 12/2005
CN 101048621 10/2007
(Continued)

OTHER PUBLICATIONS

Korean Office Action dated Jul. 6, 2022 issued in Application No. 10-2021-0065983.
(Continued)

*Primary Examiner* — Duane Smith
(74) *Attorney, Agent, or Firm* — KED & ASSOCIATES

(57) ABSTRACT

An air-conditioning system is provided that may include a first air-processing apparatus, which includes a first inlet formed in a first surface thereof that extends perpendicular to a floor or a ceiling and a first outlet formed in a second surface thereof perpendicular to the first inlet and induces air introduced into the first inlet to exchange heat with refrigerant and to be discharged through the first outlet, and a second air-processing apparatus, which includes a second outlet formed therein so as to be open in a same direction as the first outlet and a second inlet formed therein so as to be open in a same direction as the first inlet. The air-conditioning system may be driven in a combined operation mode in which the first and second air-processing apparatuses operate simultaneously or an independent operation mode in which one of the first air-processing apparatus or the second air-processing apparatus operates.

16 Claims, 104 Drawing Sheets

(51) Int. Cl.
| | |
|---|---|
| *B01D 46/42* | (2006.01) |
| *B01D 46/44* | (2006.01) |
| *B01D 46/46* | (2006.01) |
| *B01D 46/58* | (2022.01) |
| *B01D 46/681* | (2022.01) |
| *F24F 1/0014* | (2019.01) |
| *F24F 1/0025* | (2019.01) |
| *F24F 1/0047* | (2019.01) |
| *F24F 11/56* | (2018.01) |
| *F24F 110/10* | (2018.01) |
| *F24F 110/50* | (2018.01) |

(52) U.S. Cl.
CPC ..... *B01D 46/0086* (2013.01); *B01D 46/4245* (2013.01); *B01D 46/448* (2013.01); *B01D 46/46* (2013.01); *B01D 46/58* (2022.01); *B01D 46/681* (2022.01); *F24F 1/0014* (2013.01); *F24F 1/0025* (2013.01); *F24F 1/0047* (2019.02); *F24F 11/56* (2018.01); *B01D 2279/50* (2013.01); *F24F 2110/10* (2018.01); *F24F 2110/50* (2018.01); *F24F 2221/22* (2013.01)

(58) Field of Classification Search
CPC ...... F24F 13/1426; F24F 13/222; F24F 13/20; F24F 8/108; F24F 2221/22; F24F 1/035; F24F 3/16; F24F 8/10; F24F 8/80; F24F 8/90; F24F 13/085; F24F 13/28; B01D 46/681; B01D 46/68; B01D 2279/50
USPC ... 55/385.1, 385.2, 284, 288, 289, 282, 295, 55/296, 297, 299, 300, 304; 454/230, 454/334; 95/278; 62/284, 303, 331
See application file for complete search history.

(56) References Cited

U.S. PATENT DOCUMENTS

| | | | |
|---|---|---|---|
| 4,610,196 A | 9/1986 | Kern | |
| 5,564,626 A * | 10/1996 | Kettler | F24F 8/10 55/471 |
| 5,595,068 A | 1/1997 | Amr | |
| 5,674,124 A | 10/1997 | Davis | |
| 5,697,841 A | 12/1997 | Di Giovine | |
| 6,652,375 B2 | 11/2003 | Donnelly | |
| 6,729,154 B2 * | 5/2004 | Takashima | B01D 46/103 55/284 |
| 6,974,377 B2 | 12/2005 | Gehring | |
| 7,544,223 B2 * | 6/2009 | Oda | F24F 1/0073 55/296 |
| 7,862,636 B2 * | 1/2011 | Mun | F24F 1/0047 55/296 |
| 8,007,553 B2 * | 8/2011 | Cho | F24F 8/90 55/296 |
| 8,038,517 B2 * | 10/2011 | Shibuya | F24F 13/28 454/251 |
| 8,118,899 B2 * | 2/2012 | Zhang | B01D 46/681 55/296 |
| 8,241,376 B2 * | 8/2012 | Zhang | F24F 8/90 55/296 |
| 8,252,078 B2 * | 8/2012 | Mun | F24F 8/90 55/296 |
| 8,282,695 B2 * | 10/2012 | Shibuya | B01D 46/681 55/296 |
| 8,343,244 B2 * | 1/2013 | Sakashita | B08B 9/035 55/296 |
| 8,631,664 B2 * | 1/2014 | Shibuya | F24F 1/0057 62/317 |
| 8,813,518 B2 * | 8/2014 | Sugiyama | B01D 46/681 55/282 |
| 8,944,397 B2 | 2/2015 | Brown et al. | |
| 10,989,429 B2 * | 4/2021 | Okamoto | F24F 11/64 |
| 12,134,058 B2 * | 11/2024 | Hyon | B01D 46/04 |
| 2002/0189274 A1 * | 12/2002 | Lee | F24F 1/0083 62/262 |
| 2004/0000160 A1 * | 1/2004 | Takashima | B01D 46/681 62/262 |
| 2005/0287946 A1 | 12/2005 | Kim et al. | |
| 2006/0032260 A1 | 2/2006 | Kang | |
| 2006/0070358 A1 * | 4/2006 | Oda | F24F 1/0073 55/471 |
| 2006/0096459 A1 * | 5/2006 | Iwano | F24F 1/0073 55/296 |
| 2007/0060036 A1 * | 3/2007 | Shibuya | F24F 1/0073 454/187 |
| 2009/0183471 A1 * | 7/2009 | Shibuya | F24F 1/0057 55/282.2 |
| 2010/0040457 A1 * | 2/2010 | Tsen | F04D 29/526 415/121.3 |
| 2010/0107575 A1 * | 5/2010 | Zhang | B01D 46/681 55/289 |
| 2010/0116463 A1 * | 5/2010 | Zhang | F24F 8/108 165/95 |
| 2010/0236268 A1 * | 9/2010 | Sugiyama | F24F 1/0057 62/303 |
| 2011/0143899 A1 | 6/2011 | Wirth et al. | |
| 2012/0137876 A1 * | 6/2012 | Miller | B01D 46/0043 55/471 |
| 2012/0151885 A1 | 6/2012 | Nishihata et al. | |
| 2014/0026525 A1 * | 1/2014 | Miller | B01D 46/64 55/385.2 |
| 2014/0131026 A1 | 5/2014 | Hurd | |
| 2015/0202559 A1 * | 7/2015 | Oh | F24F 13/28 55/289 |
| 2015/0276257 A1 * | 10/2015 | Iwano | F24F 13/28 96/60 |
| 2016/0227916 A1 * | 8/2016 | Kang | B08B 1/54 |
| 2017/0157547 A1 * | 6/2017 | Payne | F24F 13/28 |
| 2017/0191677 A1 * | 7/2017 | Jeong | F24F 1/0047 |
| 2018/0008926 A1 * | 1/2018 | Oishi | F24F 13/20 |
| 2018/0017282 A1 * | 1/2018 | Liu | F24F 1/0057 |
| 2018/0017284 A1 * | 1/2018 | Oishi | B01D 46/4227 |
| 2018/0051895 A1 * | 2/2018 | Morioka | B03C 3/04 |
| 2018/0051905 A1 * | 2/2018 | Morioka | B03C 3/47 |
| 2019/0041083 A1 | 2/2019 | Kojima et al. | |
| 2019/0049137 A1 | 2/2019 | Kojima et al. | |
| 2019/0056120 A1 | 2/2019 | Cho | |
| 2019/0199960 A1 | 6/2019 | Miyazaki | |
| 2019/0219277 A1 | 7/2019 | Kim | |
| 2019/0275455 A1 | 9/2019 | Choi et al. | |
| 2021/0205742 A1 * | 7/2021 | Chamarthi | B01D 46/0086 |
| 2021/0356168 A1 * | 11/2021 | Lu | B01D 46/44 |
| 2022/0099334 A1 * | 3/2022 | Lu | F24F 13/20 |
| 2022/0370942 A1 * | 11/2022 | Hyon | B01D 46/04 |
| 2022/0373196 A1 * | 11/2022 | Hyon | F24F 13/1426 |
| 2022/0373197 A1 * | 11/2022 | Hyon | F24F 1/0073 |
| 2022/0373220 A1 * | 11/2022 | Hyon | F24F 13/1413 |
| 2023/0067989 A1 * | 3/2023 | Yang | A61L 9/18 |

FOREIGN PATENT DOCUMENTS

| | | |
|---|---|---|
| CN | 101370676 | 2/2009 |
| CN | 102460031 | 5/2012 |
| CN | 202747532 | 2/2013 |
| CN | 206682042 | 11/2017 |
| CN | 108180547 | 6/2018 |
| CN | 108387133 | 8/2018 |
| CN | 109790998 | 5/2019 |
| CN | 110243021 | 9/2019 |
| CN | 110332611 | 10/2019 |
| CN | 209763287 | 12/2019 |
| CN | 210050921 | 2/2020 |
| CN | 107250683 | 4/2020 |
| CN | 210463497 | 5/2020 |
| CN | 111637508 | 9/2020 |
| CN | 211977205 | 11/2020 |
| DE | 20 2007 001 644 | 7/2007 |
| DE | 10 2018 219 702 | 5/2020 |
| EP | 1 271 065 | 1/2003 |
| EP | 1621823 A2 | 2/2006 |

(56) References Cited

FOREIGN PATENT DOCUMENTS

| | | |
|---|---|---|
| EP | 1788317 A2 | 5/2007 |
| EP | 1621823 A3 | 11/2007 |
| EP | 2 058 602 | 5/2009 |
| EP | 2 381 182 | 10/2011 |
| EP | 2 426 429 | 3/2012 |
| EP | 1788317 A3 | 3/2012 |
| EP | 2725306 | 4/2014 |
| EP | 2 881 273 | 6/2015 |
| EP | 3 406 980 | 11/2018 |
| EP | 3 690 328 | 8/2020 |
| JP | H06-106967 | 4/1994 |
| JP | 06-147531 | 5/1994 |
| JP | H07-225046 | 8/1995 |
| JP | 08-05091 | 1/1996 |
| JP | H08-226668 | 9/1996 |
| JP | 08-270978 | 10/1996 |
| JP | 3054570 | 12/1998 |
| JP | 2001-263788 | 9/2001 |
| JP | 2003-148763 | 5/2003 |
| JP | 2004-101094 | 4/2004 |
| JP | 2005-172261 | 6/2005 |
| JP | 2005-214429 | 8/2005 |
| JP | 2006-145192 | 6/2006 |
| JP | 2006-162217 | 6/2006 |
| JP | 2007-024345 | 2/2007 |
| JP | 2008-039293 | 2/2008 |
| JP | 2008-069985 | 3/2008 |
| JP | 2008-122055 | 5/2008 |
| JP | 2008-133973 | 6/2008 |
| JP | 2008-164190 | 7/2008 |
| JP | 2008-224133 | 9/2008 |
| JP | 2008-241054 | 10/2008 |
| JP | 2008-267795 | 11/2008 |
| JP | 2009-002602 | 1/2009 |
| JP | 2009-186077 | 8/2009 |
| JP | 2012-013392 | 1/2012 |
| JP | 2014-077599 | 5/2014 |
| JP | 2014-129954 | 7/2014 |
| JP | 2017-524119 | 8/2017 |
| JP | 2019-170863 | 10/2019 |
| KR | 10-1999-0068938 | 9/1999 |
| KR | 20-0164654 | 2/2000 |
| KR | 20-0184583 | 6/2000 |
| KR | 10-2003-0053864 | 7/2003 |
| KR | 10-2004-0056151 | 6/2004 |
| KR | 20-0380530 | 3/2005 |
| KR | 10-0487474 | 5/2005 |
| KR | 10-2005-0122523 | 12/2005 |
| KR | 10-2006-0119068 | 11/2006 |
| KR | 10-0787501 | 12/2007 |
| KR | 10-2008-0026287 | 3/2008 |
| KR | 10-2008-0058732 | 6/2008 |
| KR | 10-2008-0078199 | 8/2008 |
| KR | 10-2009-0017290 | 2/2009 |
| KR | 10-2009-0052609 | 5/2009 |
| KR | 10-2009-0081607 | 7/2009 |
| KR | 10-0921921 | 10/2009 |
| KR | 10-2010-0036919 | 4/2010 |
| KR | 10-2012-0034446 | 4/2012 |
| KR | 10-2013-0108749 | 10/2013 |
| KR | 10-2014-0056465 | 5/2014 |
| KR | 10-2015-0018201 | 2/2015 |
| KR | 10-2015-0086092 | 7/2015 |
| KR | 10-2017-0080102 | 7/2017 |
| KR | 10-2018-0066546 | 6/2018 |
| KR | 10-2018-0126217 | 11/2018 |
| KR | 10-2019-0106608 | 9/2019 |
| KR | 10-2019-0106684 | 9/2019 |
| KR | 10-2019-0107784 | 9/2019 |
| KR | 10-2111216 | 5/2020 |
| KR | 10-2020-0106401 | 9/2020 |
| KR | 10-2020-0144534 | 12/2020 |
| KR | 10-2021-0005979 | 1/2021 |
| KR | 10-2021-0005980 | 1/2021 |
| KR | 10-2021-0007010 | 1/2021 |
| RU | 2 347 149 | 12/2007 |
| WO | WO 2004/070283 | 8/2004 |
| WO | WO 2004/079271 | 9/2004 |
| WO | WO 2006/043430 | 4/2006 |
| WO | WO 2010/047443 | 4/2010 |
| WO | WO 2011/043123 | 4/2011 |
| WO | WO 2016/121071 | 8/2016 |
| WO | WO 2019/167313 | 9/2019 |
| WO | WO 2021/053985 | 3/2021 |

OTHER PUBLICATIONS

U.S. Office Action issued in U.S. Appl. No. 17/742,706 dated Jan. 9, 2024.
India Office Action dated Dec. 9, 2022 issued in IN Application No. 202214012610.
Korean Office Action issued in Application No. 10-2021-0174217 dated Mar. 10, 2023.
Korean Office Action issued in Application No. 10-2021-0174215 dated Mar. 10, 2023.
Korean Office Action issued in Application No. 10-2021-0174218 dated Mar. 20, 2023.
Japanese Office Action issued in Application No. 2022-082832 dated May 30, 2023.
Korean Notice of Allowance issued in Application No. 10-2021-0174215 dated Jul. 27, 2023.
European Search Report dated Oct. 14, 2022 issued in EP Application No. 22173504.6.
Korean Office Action dated Oct. 18, 2022 issued in KR Application No. 10-2021-0065984.
Korean Office Action dated Oct. 18, 2022 issued in KR Application No. 10-2021-0065986.
European Search Report dated Oct. 21, 2022 issued in EP Application No. 22173436.1.
European Search Report dated Oct. 19, 2022 issued in EP Application No. 22173409.8.
European Search Report dated Oct. 28, 2022 issued in EP Application No. 22173423.9.
European Search Report dated Nov. 7, 2022 issued in EP Application No. 22173506.1.
India Office Action dated Nov. 29, 2022 issued in IN Application No. 202214012895.
India Office Action dated Dec. 1, 2022 issued in IN Application No. 202214012883.
India Office Action dated Dec. 6, 2022 issued in IN Application No. 202214012894.
Korean Office Action dated Jan. 9, 2023 issued in KR Application No. 10-2021-0065987.
U.S. Office Action dated Oct. 31, 2024 issued in U.S. Appl. No. 17/742,758.
Korean Office Action dated Apr. 14, 2023 issued in Application No. 10-2021-0065985.
Chinese Office Action issued in Application No. 202210557584.7 dated Jun. 3, 2024.
India Office Action dated Nov. 29, 2022 issued in IN Application No. 202214012882.
Japanese Office Action dated Jul. 4, 2023, issued in Application No. 2022-081386.
Japanese Office Action issued in Application No. 2022-083486 dated Jun. 20, 2023.
Japanese Office Action issued in Application No. 2022-082791 dated Jun. 6, 2023.
Korean Notice of Allowance issued in Application No. 10-2021-0174218 dated Jul. 27, 2023.
European Search Report dated Oct. 13, 2022 issued in EP Application No. 22173411.4.
India Office Action dated Jan. 3, 2023 issued in IN Application No. 202214012884.
Korean Office Action dated Jan. 9, 2023 issued in KR Application No. 10-2021-0065989.
U.S. Office Action issued in U.S. Appl. No. 17/742,785 dated Jan. 31, 2025.

(56) References Cited

OTHER PUBLICATIONS

European Notice of Allowance issued in Application No. 22173506.1 dated Feb. 28, 2025.
Chinese Office Action issued in Application No. 202210555881.8 dated Mar. 19, 2025.
U.S. Notice of Allowance issued in U.S. Appl. No. 17/743,088 dated Feb. 5, 2025.
U.S. Office Action dated Jan. 10, 2025, issued in U.S. Appl. No. 17/742,564.

* cited by examiner

AIR-CONDITIONING SYSTEM

CROSS-REFERENCE TO RELATED APPLICATION(S)

This application claims the priority benefit of Korean Patent Application No. 10-2021-0065988, filed in Korean on May 24, 2021 in the Korean Intellectual Property Office, Korean Patent Application No. 10-2021-0174215, filed in Korea on Dec. 7, 2021 in the Korean Intellectual Property Office, the disclosure of which is incorporated herein by reference.

BACKGROUND

1. Field

An air-conditioning system, and more particularly, an air-conditioning system including a plurality of air-processing apparatuses and a method for operating an air-conditioning system are disclosed herein.

2. Background

Various air-conditioning apparatuses are being developed in order to create a comfortable indoor environment. For example, an air conditioner is configured to control room temperature by discharging cool or warm air to the interior of a room, thereby providing a more comfortable indoor environment to a user. In general, an air conditioner includes a compressor, a condenser, an expansion device, and an evaporator in order to form a cooling cycle in which compression, condensation, expansion, and evaporation of refrigerant are performed, thereby cooling or heating an indoor space. In such an air conditioner, an indoor unit, such as a standing-type indoor unit, a wall-mounted indoor unit, or a ceiling-mounted indoor unit, is mounted in an indoor space in order to discharge heat-exchanged air to the indoor space, thereby adjusting a temperature of the indoor space.

An air purifier is an apparatus that suctions contaminated air and discharges air purified by a filter to an indoor space. An air purifier is generally configured to be movable, and is disposed on the floor of an indoor space in order to purify contaminated air in the indoor space.

Various research is underway with the goal of effectively conditioning indoor air by creating an air-conditioning system composed of a plurality of air-conditioning apparatuses and controlling the apparatuses in the air-conditioning system in an interlocking manner.

Korean Patent Laid-Open Publication No. 10-2019-0106608 (hereinafter, "Related Art Document 1"), published on Sep. 18, 2019 and which is hereby incorporated by reference, discloses an indoor integrated air-conditioning control system that is capable of creating an optimal indoor air environment by operating various air-conditioning apparatuses.

Korean Patent Laid-Open Publication No. 10-2005-0122523 (hereinafter, "Related Art Document 2"), published on Dec. 29, 2005 and which is hereby incorporated by reference, discloses an air-conditioning system that is capable of integrally managing an air conditioner, a ventilator, and an air purifier and controlling these apparatuses in an interlocking manner.

However, the air conditioner and the air purifier disclosed in the above related art documents are physically separated from each other and are located so as to be spaced apart from each other. Therefore, air-conditioning efficiency may be deteriorated depending on a physical arrangement of the air conditioner and the air purifier.

Further, when a certain apparatus, such as an air purifier, is moved to another position or the position thereof is not recognized accurately, interlocking control may not be reliably performed, or operation efficiency may be deteriorated. Furthermore, a region in which the air conditioner discharges heat-exchanged air and a region in which the air purifier discharges filtered air may differ from each other. In order to address this problem, a filter may be disposed in an inlet region of the air conditioner. However, when a high-efficiency particulate air (HEPA) filter for use in an air purifier is mounted in the air conditioner, the HEPA filter acts as resistance to a flow of air to a heat exchanger, thus leading to deteriorated operation efficiency. Also, because the air conditioner and the air purifier disclosed in the above related art documents are provided separately from each other, it is inconvenient for a user to separately manage filters, for example.

BRIEF DESCRIPTION OF THE DRAWINGS

Embodiments will be described in detail with reference to the following drawings in which like reference numerals refer to like elements, and wherein.

DETAILED DESCRIPTION

Figure 1:
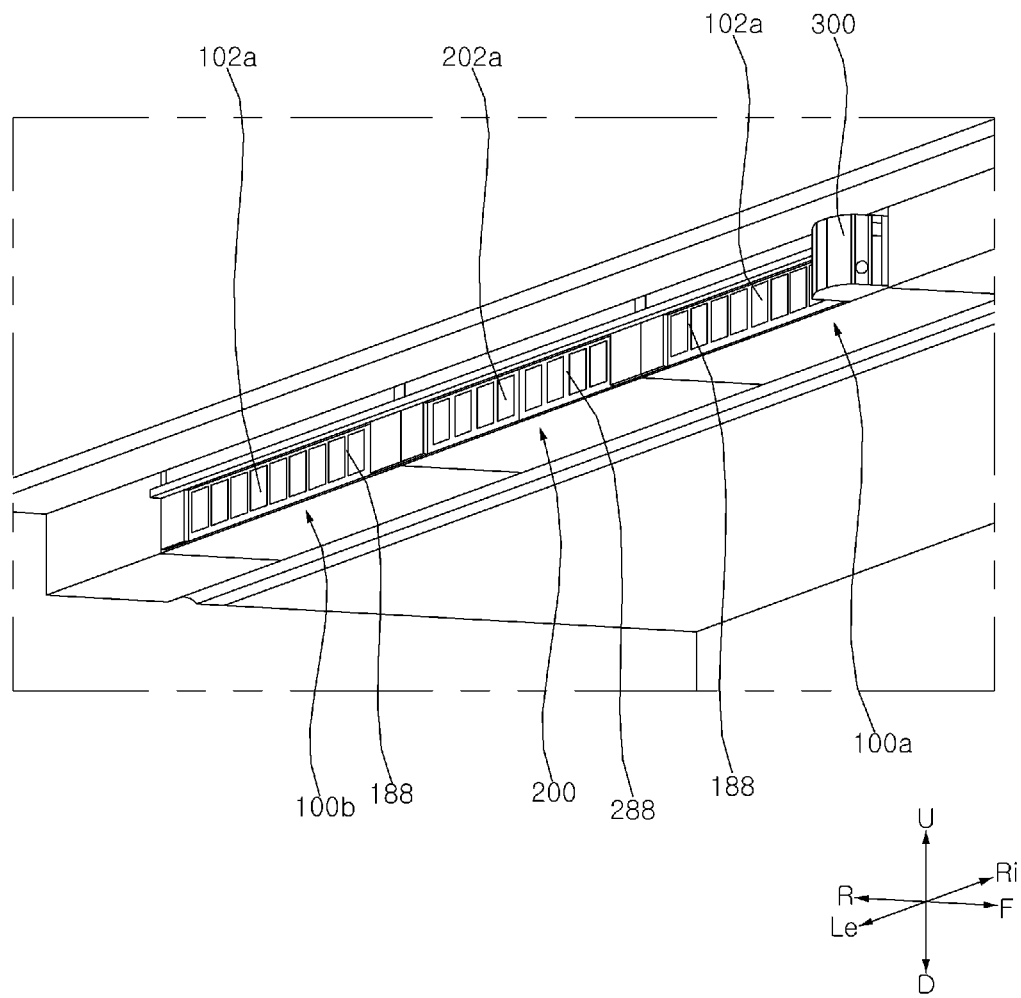
FIG. 1 is a perspective view showing a state in which a first air-processing apparatus, a second air-processing apparatus, and a filter cleaner according to an embodiment are disposed in an indoor space.

Advantages and features embodiments and methods for achieving them will be made clear from embodiments described below with reference to the accompanying drawings. The embodiments may, however, be embodied in many different forms, and should not be construed as being limited to the embodiments set forth herein. Rather, these embodiments are provided so that this disclosure will be thorough and complete, and will fully convey the scope of the disclosure to those skilled in the art. The embodiments are defined only by the scope of the claims. Throughout the specification, the same reference numerals represent the same components.

The terms "U", "D", "Le", "Ri", "F", and "R" shown in figures indicate an upward direction, a downward direction, a leftward direction, a rightward direction, a forward direction, and a rearward direction, respectively. The aforementioned directions are used only for convenience of description, and are not intended to limit the scope of the disclosure. Thus, the aforementioned directions may be set differently according to some reference.

Hereinafter, an air-conditioning system according to an embodiment will be described with reference to the accompanying drawings.

An air-conditioning system according to embodiments may include a first air-processing apparatus 100, which adjusts a temperature of air through heat exchange between the air and a refrigerant, and a second air-processing apparatus 200, which is disposed on or at one side of the first air-processing apparatus in order to remove foreign substances from the air. The air-conditioning system according to embodiments may include a plurality of air-processing apparatuses 100a, 100b, and 200. The air-conditioning system according to embodiments may include one or two or more first air-processing apparatuses 100a and 100b and one or two or more second air-processing apparatuses 200.

The air-conditioning system may include a filter cleaner 300, which moves along a surface in which inlets 102a and 202a of the plurality of air-processing apparatuses 100a, 100b, and 200 are formed in order to clean pre-filters 188 and 288 disposed in the inlets 102a and 202a.

Referring to FIG. 1, the air-conditioning system may include one second air-processing apparatus 200 and two first air-processing apparatuses 100 disposed on both sides of the second air-processing apparatus 200. However, this is merely illustrative, and the numbers and arrangement of first and second air-processing apparatuses 100 and 200 may be set differently.

Figure 2:
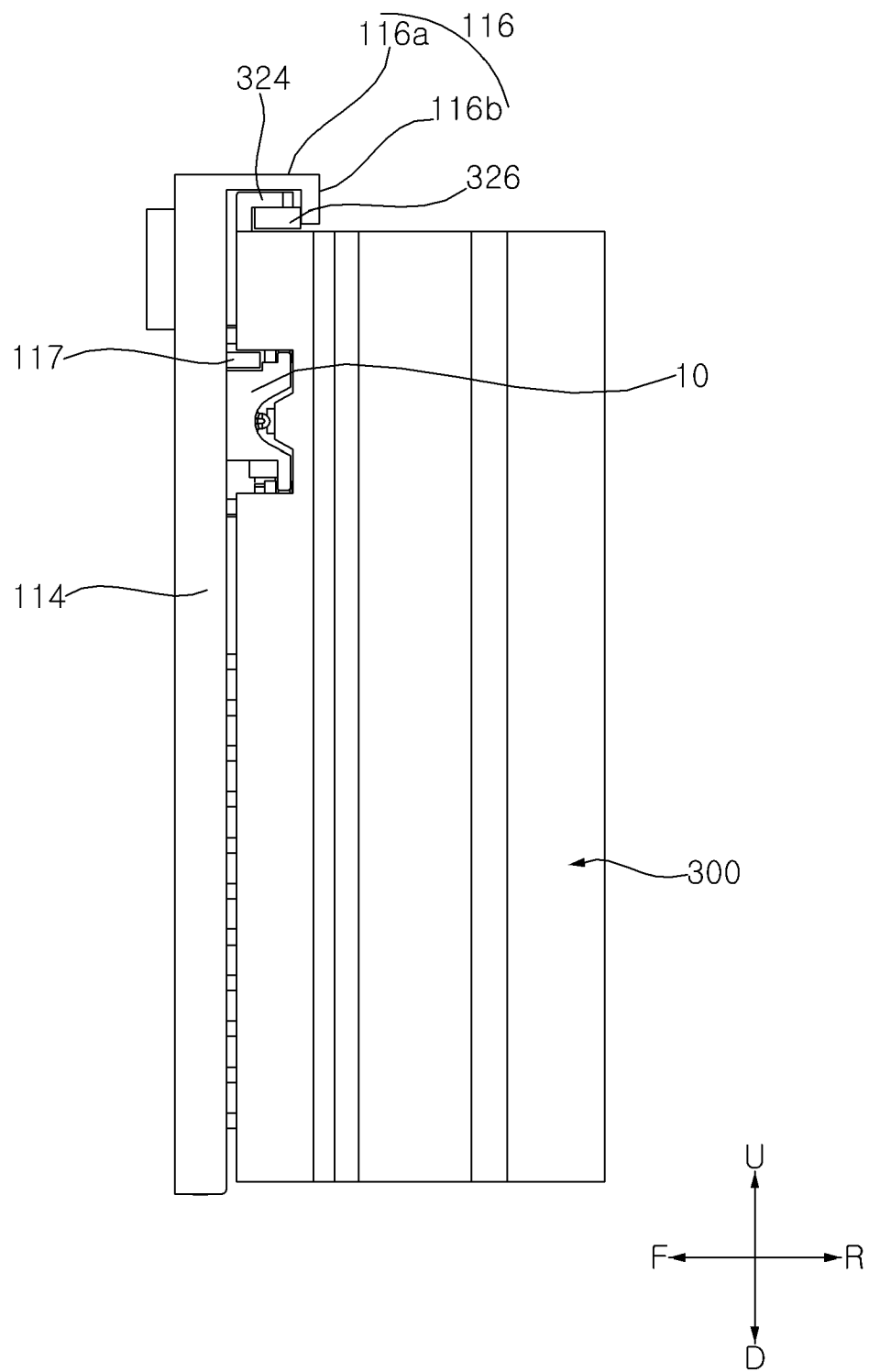
FIG. 2 is a side view showing a filter cleaner disposed behind a first air-processing apparatus or a second air-processing apparatus according to an embodiment.

Referring to FIG. 2, the air-conditioning system may include a guide rail 10, which is disposed at rear sides of the first air-processing apparatuses 100 and the second air-processing apparatus 200 in order to guide movement of the filter cleaner 300. Support rails 116 and 244 that support movement of the filter cleaner 300 may be disposed at upper ends of rear surfaces of the first air-processing apparatuses 100 and the second air-processing apparatus 200. The support rails 116 and 244 may include first support rails 116 disposed at the first air-processing apparatuses 100 and second support rail 244 disposed at the second air-processing apparatus 200.

Figure 8:
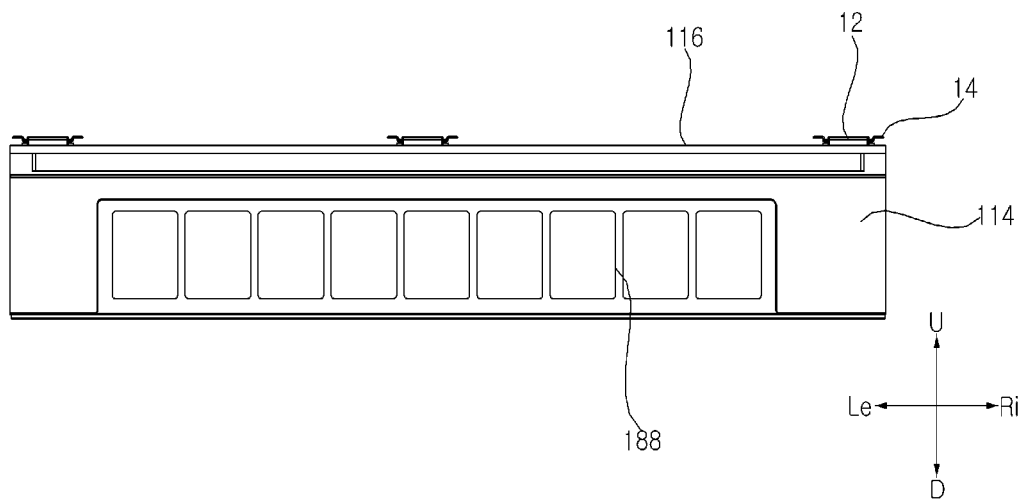
FIG. 8 is a rear view of the first air-processing apparatus of FIG. 5.

The first support rails 116 may be formed integrally with first rear covers 114 (refer to FIG. 8) of the first air-processing apparatuses 100, which will be described hereinafter. The second support rail 244 may be formed integrally with a second rear cover 242 (refer to FIG. 20) of the second air-processing apparatus 200, which will be described hereinafter.

The guide rail 10 may be disposed on rear sides of the first rear covers 114 and the second rear cover 242. The guide rail 10 may be disposed above the first inlets 102a and the second inlet 202a. The guide rail 10 may extend in a lateral or leftward-rightward direction on the rear sides of the first rear covers 114 and the second rear cover 242. The guide rail 10 may be fixedly disposed below first rail-fixing protrusions 117 of the first rear covers 114 and a second rail-fixing protrusion 245 of the second rear cover 242.

The guide rail 10 may include a gear rail 20, which has threads to be engaged with a moving gear (not shown) of the filter cleaner 300, and a roller rail 22, which is in contact with a guide roller (not shown) of the filter cleaner 300. The roller rail 22 may be disposed behind the gear rail 20. The roller rail 22 may be disposed at each of an upper side and a lower side of the guide rail 10. The gear rail 20 may be disposed in front of the roller rail 22. The gear rail 20 may be formed on the lower surface of the guide rail 10. The gear rail 20 may have a shape of a rack gear. When viewed from the rear, the guide rail 10 may have a structure in which the gear rail 20 is shielded by the roller rail 22.

A rail groove 24 may be formed in a rear surface of the guide rail 10. The rail groove 24 may be recessed in a forward direction and extend in the lateral direction. An object to be sensed 26 may be disposed in the rail groove 24. A plurality of the object to be sensed 26 may be provided, and the plurality of objects to be sensed 26 may be spaced apart from each other in the lateral direction. A sensor (not shown) may be disposed at the filter cleaner 300, and when the sensor senses the object to be sensed 26, a position of the filter cleaner 300 may be detected.

The object to be sensed 26 may correspond to the sensor. For example, when the sensor is a switch sensor, the object to be sensed 26 may have a shape of a protrusion that protrudes rearwards. Alternatively, when the sensor is a Hall sensor, the object to be sensed 26 may be implemented as a magnet.

An end plate 28 configured to limit movement of the filter cleaner 300 in one direction may be disposed at a left or first end or a right or second end of the guide rail 10. The end plate 28 may extend in a direction perpendicular to a direction in which the guide rail 10 extends. The end plate 28 may protrude rearwards from the rear cover 114.

The end plate 28 may be provided with a charging terminal 30, with which a connection terminal 320 of the filter cleaner 300 may be brought into contact. The charging terminal 30 may protrude from the end plate 28 in the direction in which the guide rail 10 extends. Accordingly, when the filter cleaner 300 reaches the end plate 28, the connection terminal 320 of the filter cleaner 300 may be brought into contact with and connected to the charging terminal 30.

Hereinafter, a first air-processing apparatus according to an embodiment will be described with reference to FIGS. 5 to 17C.

Figure 5:
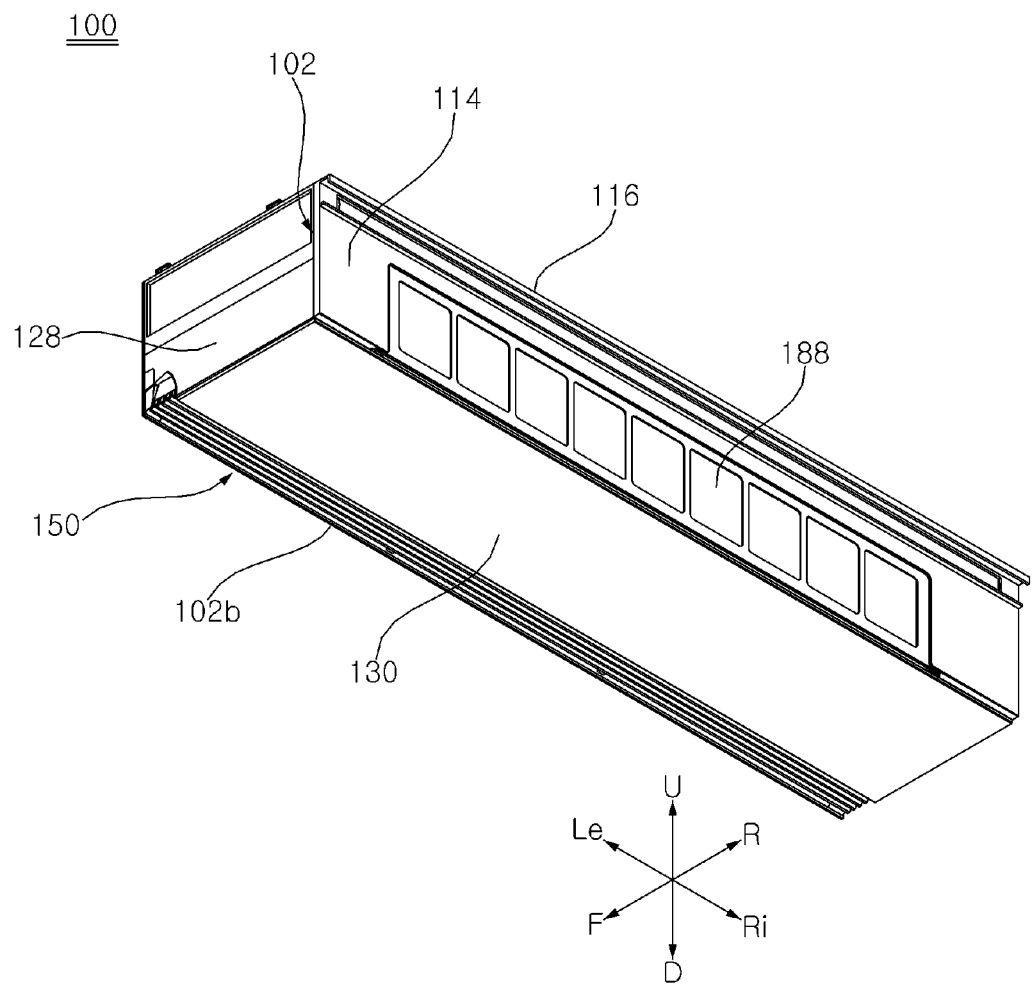
FIG. 5 is a perspective view of a first air-processing apparatus according to an embodiment.

The first air-processing apparatus 100 induces air to exchange heat with a refrigerant and discharges the heat-exchanged air to the outside. The first air-processing apparatus 100 may include first inlet 102*a* formed in one or a first side thereof in order to suction air thereinto and a first outlet 102*b* formed in another or a second side thereof perpendicular to the first inlet 102*a* in order to discharge air therefrom. Referring to FIG. 5, the first inlet 102*a* may extend perpendicular to a surface of a floor or ceiling. The first outlet 102*b* may be open downwards. The first outlet 102*b* may extend perpendicular to the first inlet 102*a*.

Figure 6:
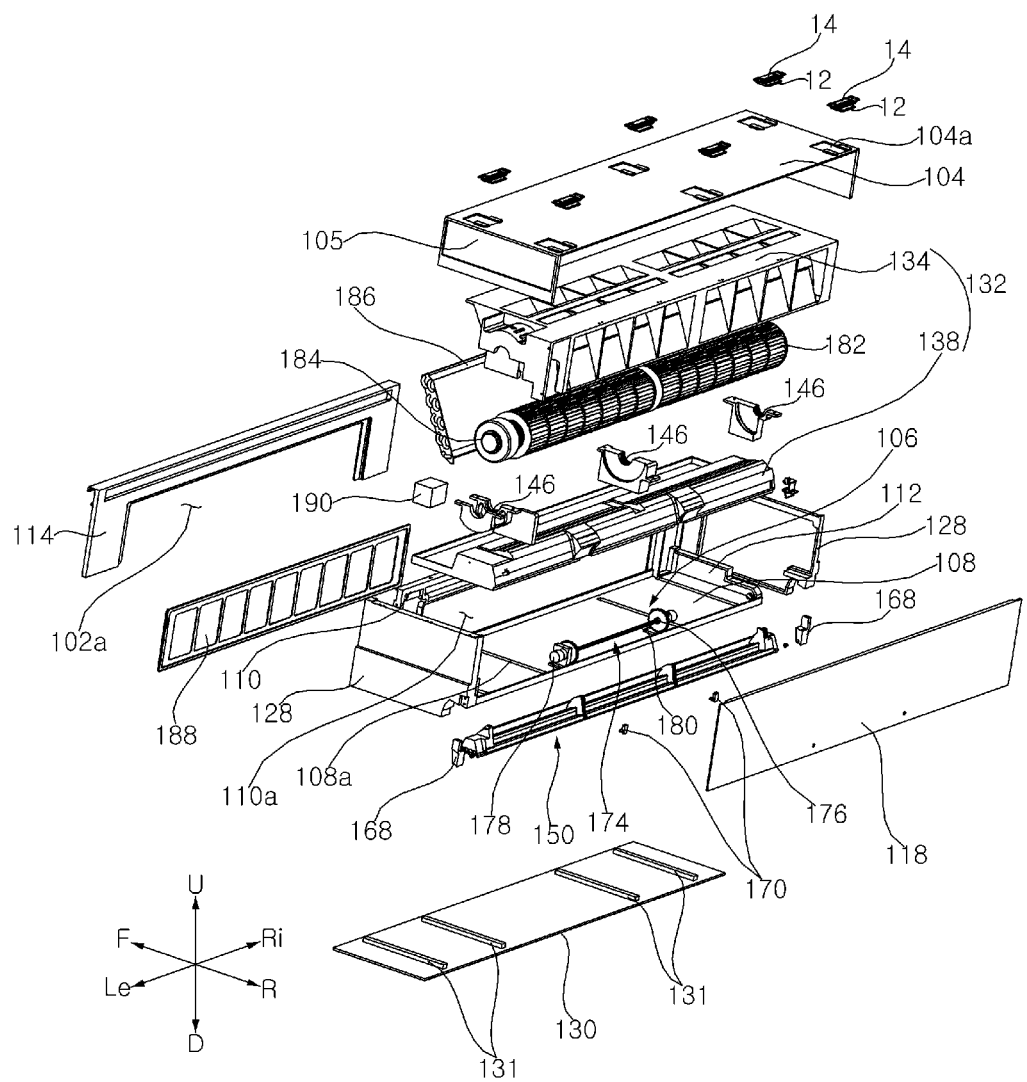
FIG. 6 is an exploded perspective view of the first air-processing apparatus of FIG. 5.
Figure 7:
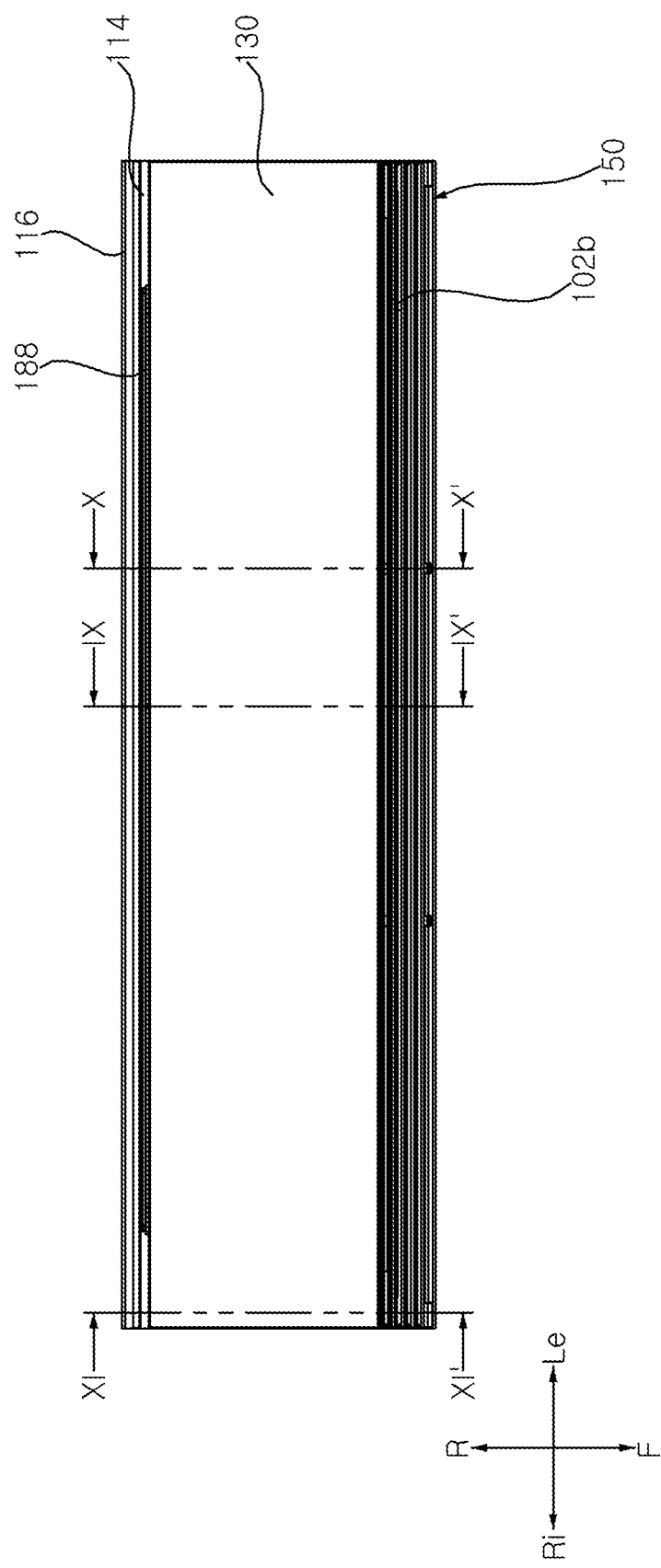
FIG. 7 is a bottom view of the first air-processing apparatus of FIG. 5.

Referring to FIG. 6, the first air-processing apparatus 100 may include a first fan 182, which causes air to flow, a first fan motor 184, which rotates the first fan 182, and a heat exchanger 186, through which a refrigerant flows to exchange heat with air. The first air-processing apparatus 100 may further include a first case 102, which forms an external appearance of the first air-processing apparatus 100, and a first housing 132, which is disposed inside of the first case 102 and which forms a flow path through which air flows. The first air-processing apparatus 100 may furthermore include a first louver 150, which is rotatably disposed in the first case 102 in order to adjust a direction of air that is discharged from the first outlet 102*b*, and a first louver-drive device 174, which changes an orientation of the first louver 150. The first air-processing apparatus 100 may include a first control box 190 that controls operation of the first fan motor 184 or operation of the first louver-drive device 174.

Referring to FIG. 6, the first case 102 may include a first upper cover 104, which is configured to be secured to a ceiling, a first lower cover 106, which is disposed below the first upper cover 104, a first rear cover 114, in which is formed therein the first inlet 102*a* and to which first pre-filter 188 is mounted, a first front cover 118, which is spaced forwards apart from the first rear cover 114, and two first side covers 128, which are disposed at both side ends of the first lower cover 106. Referring to FIG. 6, the first case 102 may further include a first bottom cover 130, which is disposed below the first lower cover 106.

Referring to FIG. 6, the first inlet 102*a* may be formed in the first rear cover 114. The guide rail 10 may be mounted on an outer surface of the first rear cover 114. The first inlet 102*a* may be formed in a lower portion of the first rear cover 114. The first pre-filter 188 may be mounted in the first inlet 102*a* formed in the first rear cover 114. The guide rail 10 and the first support rail 116 that guides movement of the filter cleaner 300 may be mounted on the first rear cover 114.

Referring to FIG. 2, the guide rail 10 may be disposed above the first inlet 102*a*. The first support rail 116 may be disposed at an upper end of the first rear cover 114. The guide rail 10 may be provided separately from the first rear cover 114. The first support rail 116 may be formed integrally with the first rear cover 114.

Figure 9:
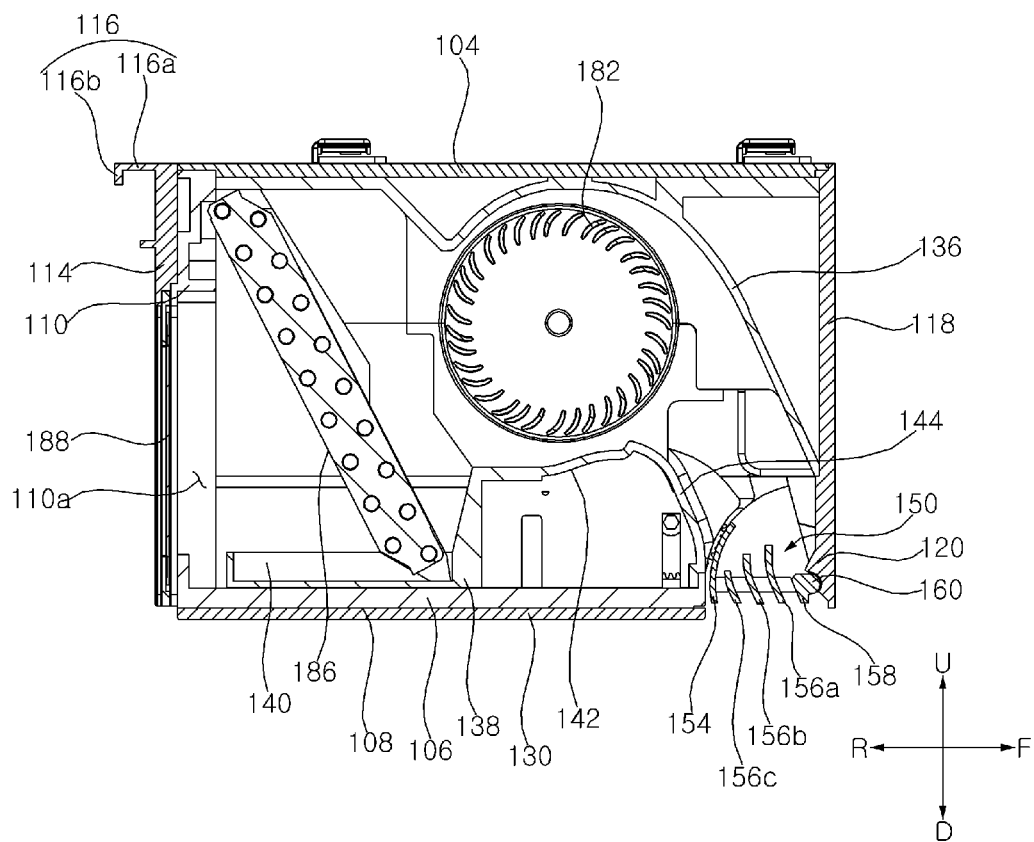
FIG. 9 is a cross-sectional view, taken along line IX-IX' in FIG. 7.

Referring to FIG. 9, the first support rail 116 may include a first top plate 116*a*, which protrudes rearwards from the upper end of the first rear cover 114, and a first bent portion 116*b*, which is bent and extends downwards from a rear end of the first top plate 116*a*. A top roller 326 (refer to FIG. 2) of the filter cleaner 300 may be in contact with the first bent portion 116*b*.

Referring to FIG. 9, the first rear cover 114 may be disposed behind a first vertical plate 110 of the first lower cover 106, which will be described hereinafter. The first rear cover 114 may be fixedly disposed behind the first vertical plate 110.

Referring to FIG. 6, the first upper cover 104 may include a first fixing recess 104*a* formed in an upper surface thereof, into which a fixing member 12 that fixes the first case 102 to the ceiling may be inserted. Referring to FIG. 6, a plurality of first fixing recesses 104*a* may be formed in the upper surface of the first upper cover 104. The fixing member 12 may be inserted into and fixed to each of the plurality of first fixing recesses 104*a*. The fixing member 12 may have a substantial "[" shape when viewed from the side. The fixing member 12 may be connected to a mounting member 14 that is fixed to the ceiling, thereby fixing the first case 102 to the ceiling.

The first upper cover 104 may include two side plates 105, which are bent and extend downwards from both side ends thereof. Each of the two side plates 105 may be connected to a respective one of the two first side covers 128.

Referring to FIG. 6, the first lower cover 106 may be disposed below the first housing 132. The first louver-drive device 174 may be disposed on the first lower cover 106. The first lower cover 106 may include a first horizontal plate 108, which is disposed above the first bottom cover 130, first vertical plate 110, which is disposed at a rear side of the first horizontal plate 108 so as to be perpendicular thereto and in which a first inner suction hole 110*a* may be formed, and two first side walls 112, which are bent and extend upwards from both side ends of the first horizontal plate 108.

The first louver-drive device 174 may be disposed on the first horizontal plate 108. The first horizontal plate 108 may include a connection slit 108*a* formed therein to allow a vertical protrusion 131 of the first bottom cover 130 to be inserted thereinto.

Referring to FIG. 6, each of the two first side covers 128 may be connected at a lower portion thereof to the first lower cover 106, and connected at an upper portion thereof to the first upper cover 104. A first rotational support rod 168 that supports rotation of the first louver 150 may be disposed on each of the two first side covers 128. The first rotational support rod 168 may be connected to each of both ends of the first louver 150, thereby supporting rotation of the first louver 150.

Referring to FIG. 9, the first front cover 118 may be disposed in front of the first housing 132. Referring to FIG. 9, a lower end of the first front cover 118 may be spaced a predetermined gap apart from a front end portion 106*a* of the first lower cover 106. The first outlet 102*b* may be formed between the first front cover 118 and the first lower cover 106. A first louver protrusion 120, in which a first louver groove 122 configured to receive a louver rotational shaft 160 is formed, may be formed on the first front cover 118 in order to limit a range within which the first louver 150 may rotate.

The first louver protrusion 120 may extend lengthwise in the lateral direction, in which the first front cover 118 is formed. Referring to FIG. 14B, the first louver protrusion 120 has the first louver groove 122 formed therein to allow the louver rotational shaft 160 of the first louver 150 to be disposed therein. The first louver groove 122 may be also extend lengthwise in the lateral direction, in which the first louver protrusion 120 extends.

Figure 14A:
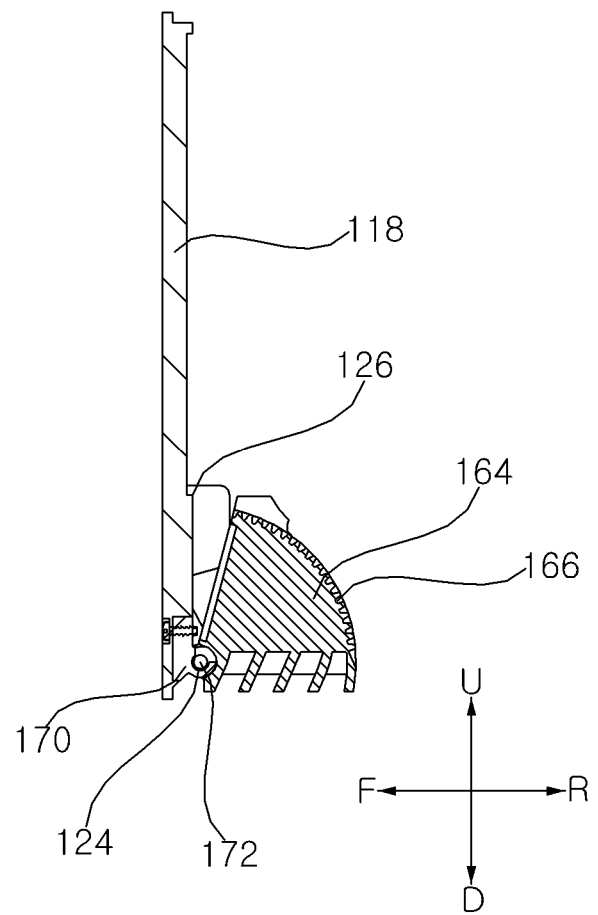
FIG. 14A is a cross-sectional view, taken along line XIVA-XIVA' in FIG. 13.
Figure 14B:
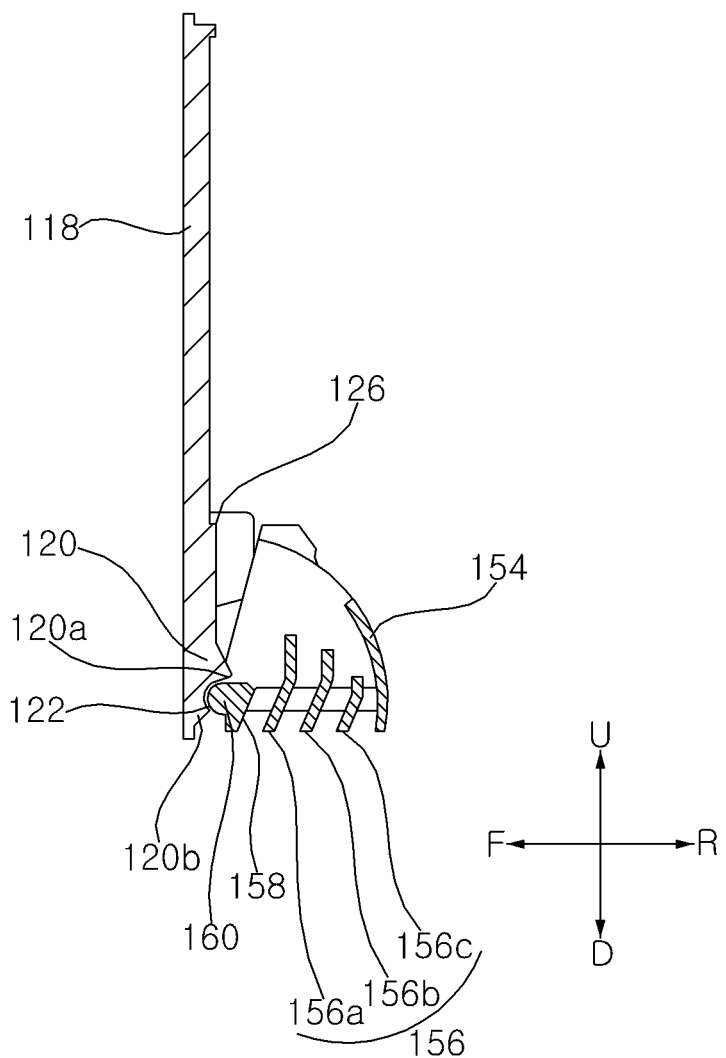
FIG. 14B is a cross-sectional view, taken along line XIVB-XIVB' in FIG. 13.
Figure 15:
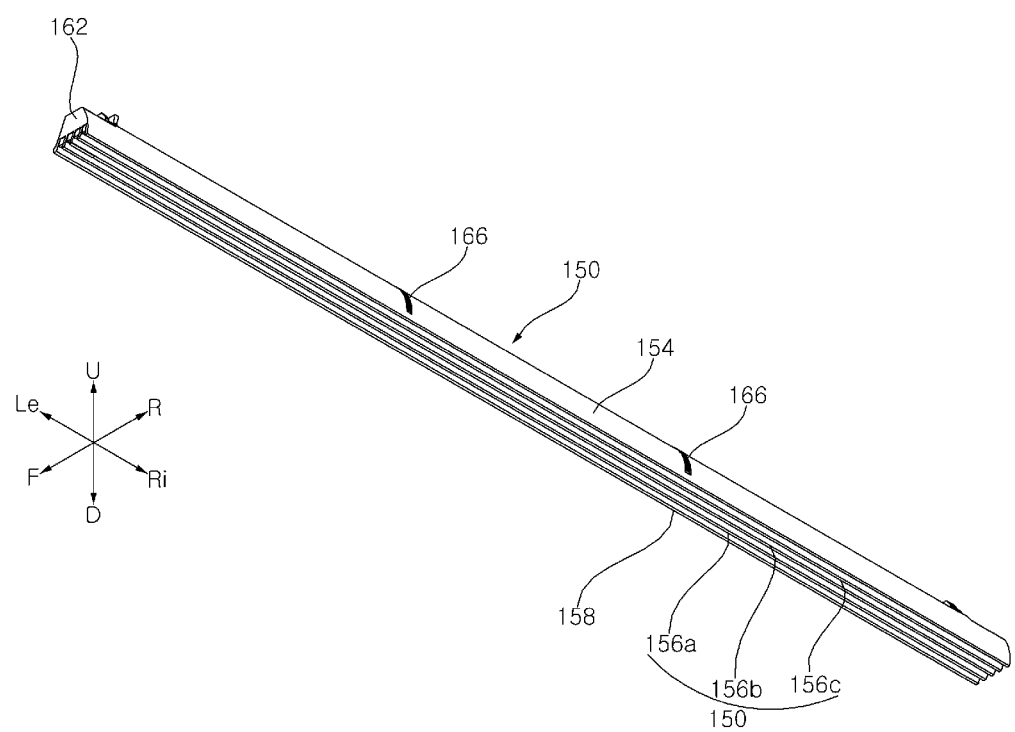
FIG. 15 is a perspective view of a louver according to an embodiment.

Referring to FIG. 14A, a first support-rod recess 124 in which a first auxiliary support rod 170 is disposed may be formed between a left or first end and a right or second end of the first louver protrusion 120. The first auxiliary support rod 170 may be fixedly disposed on the first front cover 118, and may support rotation of the first louver 150. The first auxiliary support rod 170 may be disposed between two first rotational support rods 168, which will be described hereinafter. The first auxiliary support rod 170 may be connected to the first louver 150 via a first auxiliary rotational shaft 172.

Referring to FIG. 14B, the first louver protrusion 120 may include an upper protruding portion 120a, which forms a surface that is inclined from an upper end of the first louver groove 122 in a rearward-upward direction, and a lower protruding portion 120b, which forms a surface that is inclined from a lower end of the first louver groove 122 in a forward-downward direction. When an upper surface of the louver rotational shaft 160 of the first louver 150, which will be described hereinafter, comes into contact with the upper protruding portion 120a, rotation of the first louver 150 in one direction is limited by the upper protruding portion 120a. When an axial vane 158 of the first louver 150, which will be described hereinafter, comes into contact with the lower protruding portion 120b, rotation of the first louver 150 in the opposite direction is limited by the lower protruding portion 120b.

Referring to FIG. 14B, a first stepped portion or step 126, which interferes with an end portion or end of a first upper housing 134 described hereinafter, may be formed in the first front cover 118.

Referring to FIG. 9, the first housing 132 may be disposed inside of the first case 102, and form therein a space through which air flows. The first fan 182 and the heat exchanger 186 may be disposed inside of the first housing 132. Referring to FIG. 9, the heat exchanger 186 may be disposed in a region adjacent to the first inlet 102a. The heat exchanger 186 may be disposed so as to be inclined toward the first fan 182 to thereby increase a heat-exchange area and minimize resistance to air flow.

The first fan motor 184 that rotates the first fan 182 may be disposed inside of the first housing 132. The first fan motor 184 may be disposed on a rotational shaft of the first fan 182 in order to rotate the first fan 182. The first fan 182 may be implemented as, for example, a cross-flow fan, which is configured to suction air into one side thereof in a radial direction and to discharge air from another side thereof in the radial direction. Referring to FIG. 6, a fan support bracket 146 may be disposed inside of the first housing 132 in order to support rotation of the first fan motor 184 or to support placement of the first fan motor 184. The first housing 132 may include first upper housing 134, which is disposed above the first fan 182, and a first lower housing 138, which is disposed below the first fan 182.

Referring to FIG. 9, the first upper housing 134 and the first lower housing 138 may form discharge guides 136 and 144, along which air flows from the first fan 182 to the first outlet 102b. The first upper housing 134 may be mounted to the first upper cover 104. A lower end of the first upper housing 134 may be disposed at an upper side of the first stepped portion 126 of the first front cover 118. Referring to FIG. 9, the first upper housing 134 may include an upper guide 136, along which air flowing out of the first fan 182 moves to the first outlet 102b. The upper guide 136 induces air flowing along the first fan 182 to move downwards. The upper guide 136 induces air flowing out of the first fan 182 to move toward the first front cover 118.

The first lower housing 138 may be disposed above the first lower cover 106. Referring to FIG. 9, the first lower housing 138 may include a drain pan 140, which is disposed below the heat exchanger 186 in order to collect therein condensation dropping from the heat exchanger 186. The drain pan 140 may be disposed below the heat exchanger 186 in a region in which the heat exchanger 186 is disposed.

Figure 10:
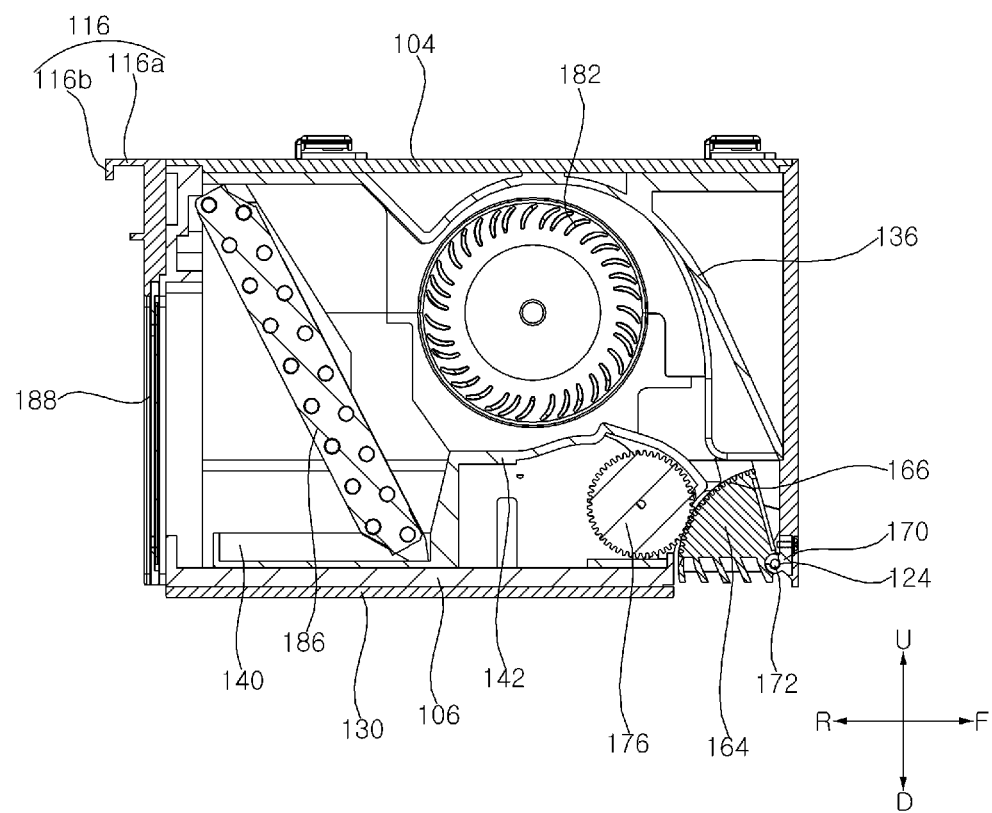
FIG. 10 is a cross-sectional view, taken along line X-X' in FIG. 7.

Referring to FIG. 10, the first lower housing 138 may include a drive device cover 142, which may be disposed in front of the drain pan 140 and protrude upwards from the first lower cover 106. The drive device cover 142 forms a space thereunder in which the first louver-drive device 174 may be disposed. The drive device cover 142 may protrude at an incline further upwards from a region in which the drain pan 140 is disposed to the region in which a first fan 182 is disposed. The drive device cover 142 may induce air passing through the heat exchanger 186 to flow to the region in which the first fan 182 is disposed.

The drive device cover 142 may include a lower guide 144 that induces air passing through the first fan 182 to flow to the first outlet 102b. The lower guide 144 may be spaced apart from the upper guide 136 so as to form a discharge flow path 132a. The lower guide 144 may include a first gear hole 142a formed in a portion thereof corresponding to a region in which the first louver gear 176 of the first louver-drive device 174 is disposed. Referring to FIG. 9, a portion of the first louver gear 176 may protrude outside of the first gear hole 142a and may be in contact with the first louver 150.

Figure 17:
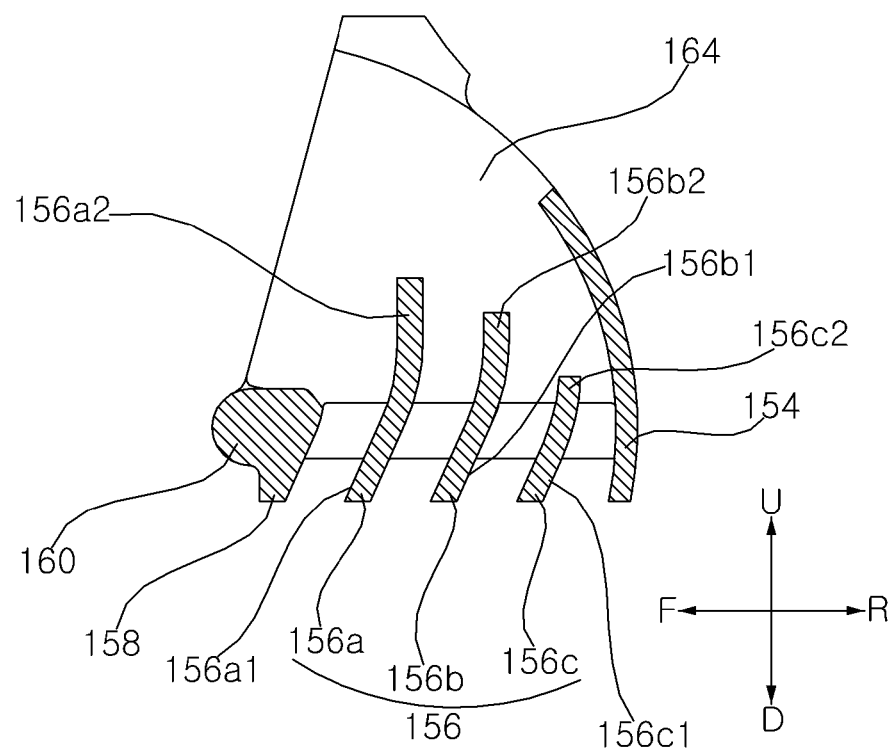
FIG. 17 is a cross-sectional view, taken along line XVII-XVII' in FIG. 16.

Referring to FIG. 6, the first air-processing apparatus 100 may include first louver 150, which is rotatably disposed in the first outlet 102b in order to adjust a direction of air blown out through the first outlet 102b, and first louver-drive device 174 that adjusts the orientation of the first louver 150. Referring to FIG. 17, the first louver 150 may include a plurality of vanes 154, 156, and 158, which are spaced apart from each other in the radial direction based on a rotational shaft.

Referring to FIG. 17, the first louver 150 may include a louver rotational shaft 160, which extends along a rotational center of the first louver 150, outer vane 154, which is spaced outwards apart from the louver rotational shaft 160 in the radial direction, a plurality of inner vanes 156, which is spaced apart from each other in the radial direction between the louver rotational shaft 160 and the outer vane 154, and a vane gear 166, which is formed on the outer surface of the outer vane 154 in the circumferential direction. The plurality of vanes 154, 156, and 158 may include the outer vane 154 and the plurality of inner vanes 156.

Referring to FIG. 14B, the louver rotational shaft 160 may be disposed so as to be in contact with the first front cover 118. The louver rotational shaft 160 may be disposed in the first louver groove 122 in the first front cover 118. When the louver rotational shaft 160 rotates, the orientation of the plurality of vanes 154, 156, and 158, which are spaced apart from each other in the radial direction based on the louver rotational shaft 160, may be changed.

The louver rotational shaft 160 may include axial vane 158, which extends from the louver rotational shaft 160 in a direction parallel to the inner vanes 156. The axial vane 158 may extend in a direction parallel to lower portions of the inner vanes 156.

Figure 16:
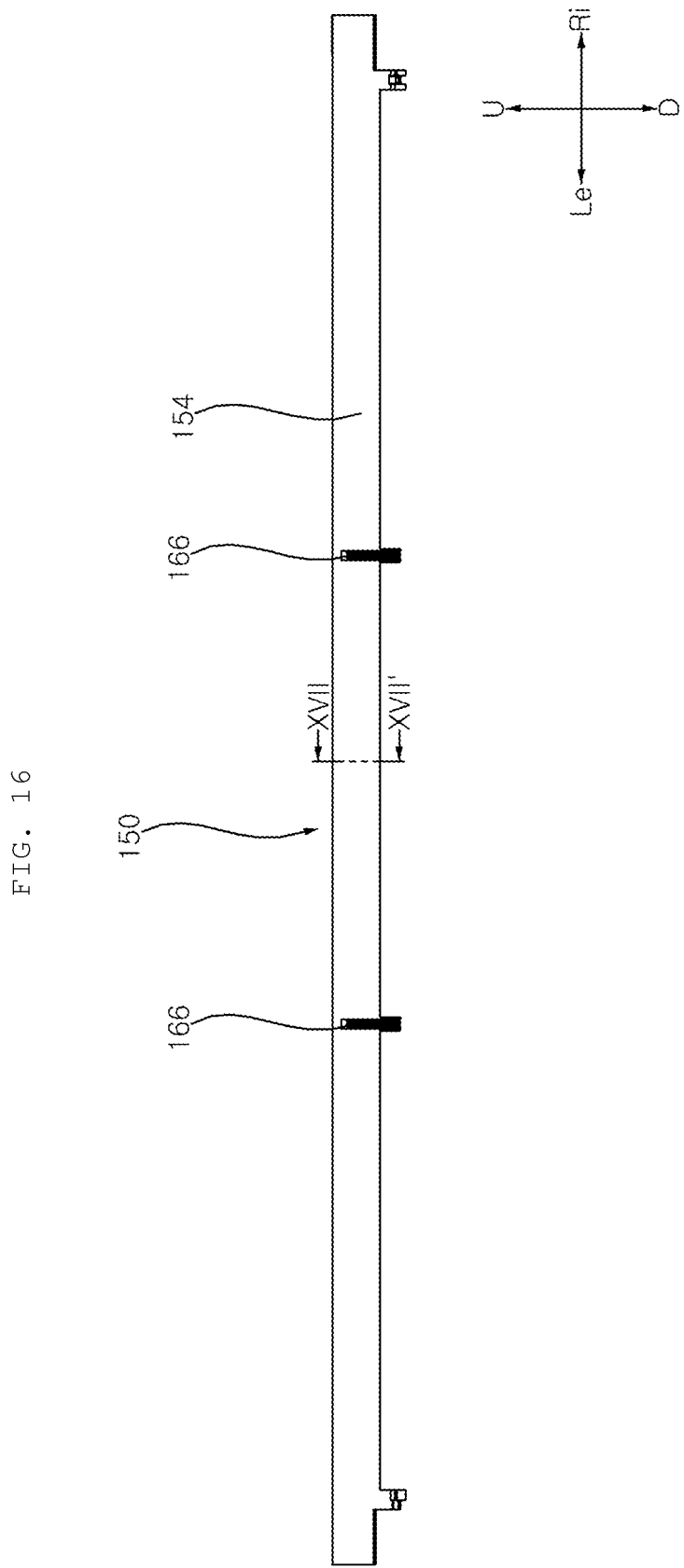
FIG. 16 is a rear view of the louver of FIG. 15.

Referring to FIG. 17, the outer vane 154 may be disposed farther from the louver rotational shaft 160 than the inner vanes 156. The outer vane 154 may be longer than the inner vanes 156 in the circumferential direction. Referring to FIG. 16, the outer vane 154 may be formed in the circumferential direction based on the louver rotational shaft 160.

The inner vanes 156 may be disposed between the louver rotational shaft 160 and the outer vane 154 so as to be spaced apart from each other. The inner vanes 156 may be shorter than the outer vane 154. The inner vanes 156 may be longer than the axial vane 158.

The inner vanes 156 have different lengths, respectively. The lengths of the inner vanes 156 may gradually increase in a direction approaching the louver rotational shaft 160. The lengths of the inner vanes 156 may gradually decrease in a direction approaching the outer vane 154.

Referring to FIG. 17, the inner vanes 156 may include lower inner vane portions 156a1, 156b1, and 156c1, which may be inclined so as to be gradually closer to the louver rotational shaft 160 in the downward direction, and upper inner vane portions 156a2, 156b2, and 156c2, which may be bent and extend upwards from upper ends of the lower inner vane portions 156a1, 156b1, and 156c1. The axial vane 158 may extend in a direction parallel to the lower inner vane portions 156a1, 156b1, and 156c1. The inner vanes 156 may include first inner vane 156a, which is disposed closest to the louver rotational shaft 160, second inner vane 156b, which is disposed farther from the louver rotational shaft 160 than the first inner vane 156a, and third inner vane 156c, which is disposed farther from the louver rotational shaft 160 than the second inner vane 156b.

Figure 12:
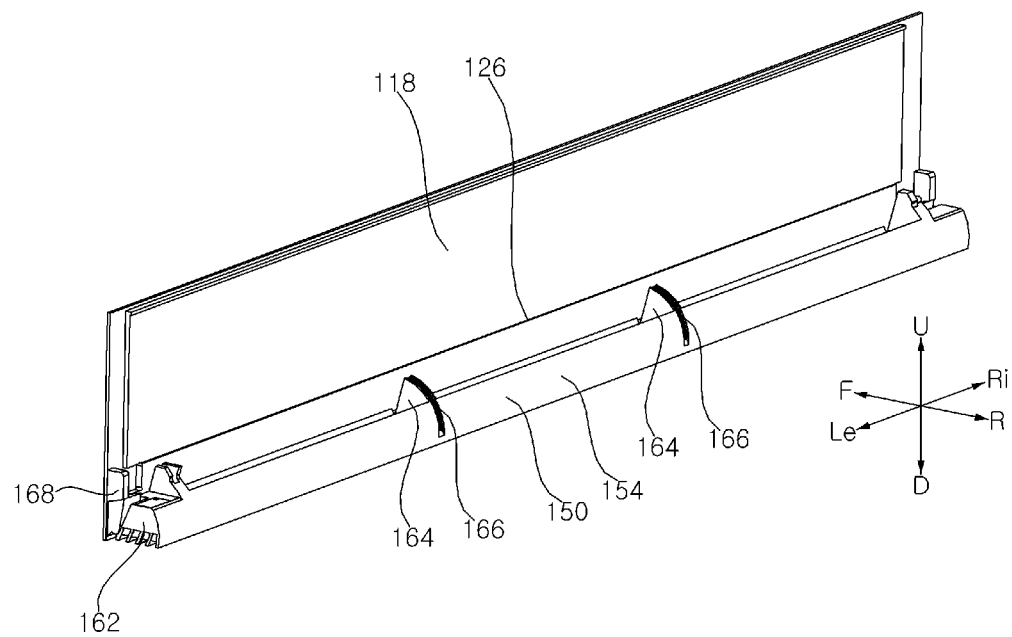
FIG. 12 is a perspective view showing a coupled state of a front cover and a louver according to an embodiment.
Figure 13:
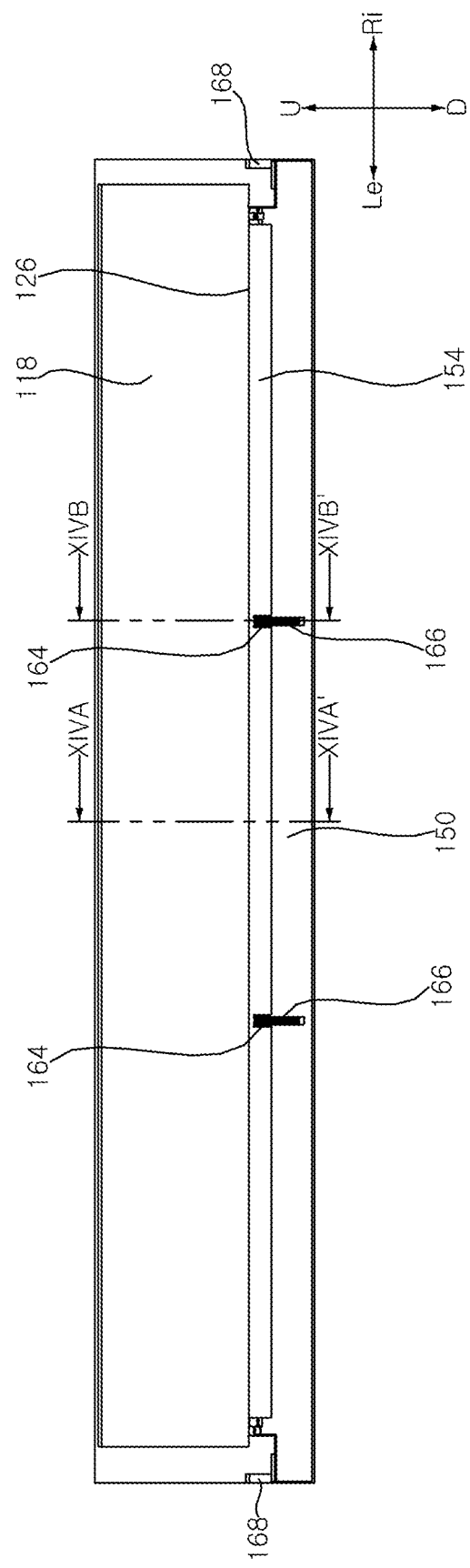
FIG. 13 is a rear view of the coupled state of FIG. 12.

Referring to FIG. 12, the first louver 150 may include end panels 162, which are disposed at both ends of the vanes 154, 156, and 158 in a direction perpendicular to the vanes 154, 156, and 158, and a support panel 164, which is disposed between the end panels 162. The vane gear 166 may be disposed on one side of the support panel 164. The end panels 162, which may be disposed at both ends of the vanes 154, 156, and 158, may prevent the air flowing through the first louver 150 from being discharged in the lateral direction.

The support panel 164, which is disposed between the end panels 162, may support the vanes 154, 156, and 158. The vanes 154, 156, and 158 may extend lengthwise in a longitudinal direction, in which the louver rotational shaft 160 is formed. Accordingly, the support panel 164 may stably maintain the arrangement of the vanes 154, 156, and 158.

Referring to FIG. 14A, the support panel 164 may be formed in a fan shape. The vane gear 166 may be disposed on an outer circumferential end of the support panel 164. The vane gear 166 may form threads on the outer circumferential end of the support panel 164 in the circumferential direction.

Referring to FIG. 14A, the support panel 164 may be connected to the first auxiliary support rod 170. The support panel 164 may form a space in which the first auxiliary support rod 170 is disposed in a portion in which the louver rotational shaft 160 is formed. The first auxiliary rotational shaft 172 may be disposed inside of the first auxiliary support rod 170, and the first auxiliary support rod 170 may be connected to the louver rotational shaft 160 via the first auxiliary rotational shaft 172.

The vanes 154, 156, and 158 may protrude downwards further than the end panels 162 and the support panel 164.

The first louver 150 may include an output interface 191 that displays an operational state of the first air-processing apparatus 100. The output interface 191 may provide visual or auditory information about the operational state of the first air-processing apparatus 100 to a user.

Figure 11:
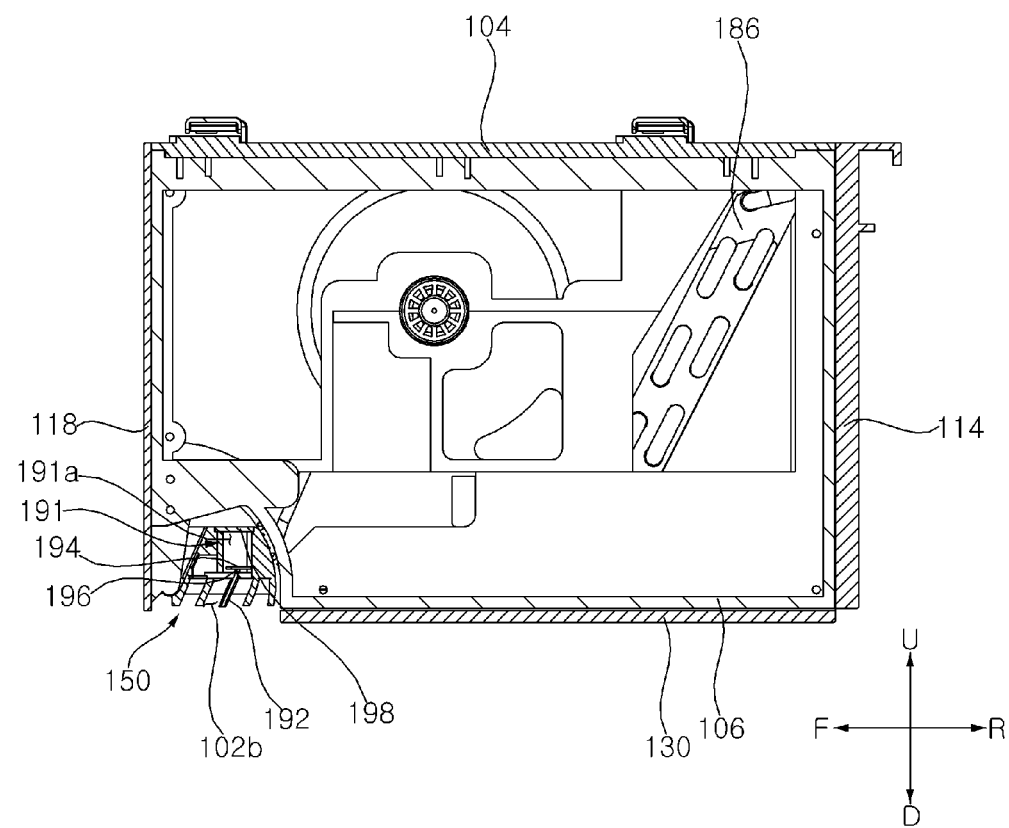
FIG. 11 is a cross-sectional view, taken along line XI-XI' in FIG. 7.

Referring to FIG. 11, the output interface 191 may visually display information about the operational state of the first air-processing apparatus 100. Also, the output interface 191 may output information about operational errors of the first air-processing apparatus 100.

The output interface 191 may include a lamp 196, a printed circuit board 194 that controls operation of the lamp 196, and a transparent panel 192 that transmits light radiated from the lamp 196 to the outside. The transparent panel 192 may be disposed on one of the vanes 154, 156, and 158. Referring to FIG. 11, the transparent panel 192 may be mounted on the inner vane 156.

The first louver 150 may have formed therein a space 191a in which the lamp 196 and the printed circuit board 194 may be disposed. The space 191a may be above the transparent panel 192. A wiring hole 198, through which a wire connected to the printed circuit board 194 may pass, may be formed in an upper side of the space 191a.

The first louver-drive device 174 may be spaced apart from the louver rotational shaft 160 of the first louver 150 in a centrifugal direction. The first louver-drive device 174 may be spaced apart from the louver rotational shaft 160, and is disposed so as to be in contact with an outer circumferential surface of the first louver 150.

Referring to FIG. 6, the first louver-drive device 174 may include first louver gear 176, which is in contact with the first louver 150 in order to rotate the first louver 150, and a first louver motor 178 that rotates the first louver gear 176. According to one embodiment, two first louver gears 176 may be provided so as to be spaced apart from each other, and the first louver-drive device 174 may further include a first gear rotational shaft 180 that interconnects the two first louver gears 176. The two first louver gears 176, which may be connected to each other via the first gear rotational shaft 180, may rotate in a same direction.

Figure 18A:
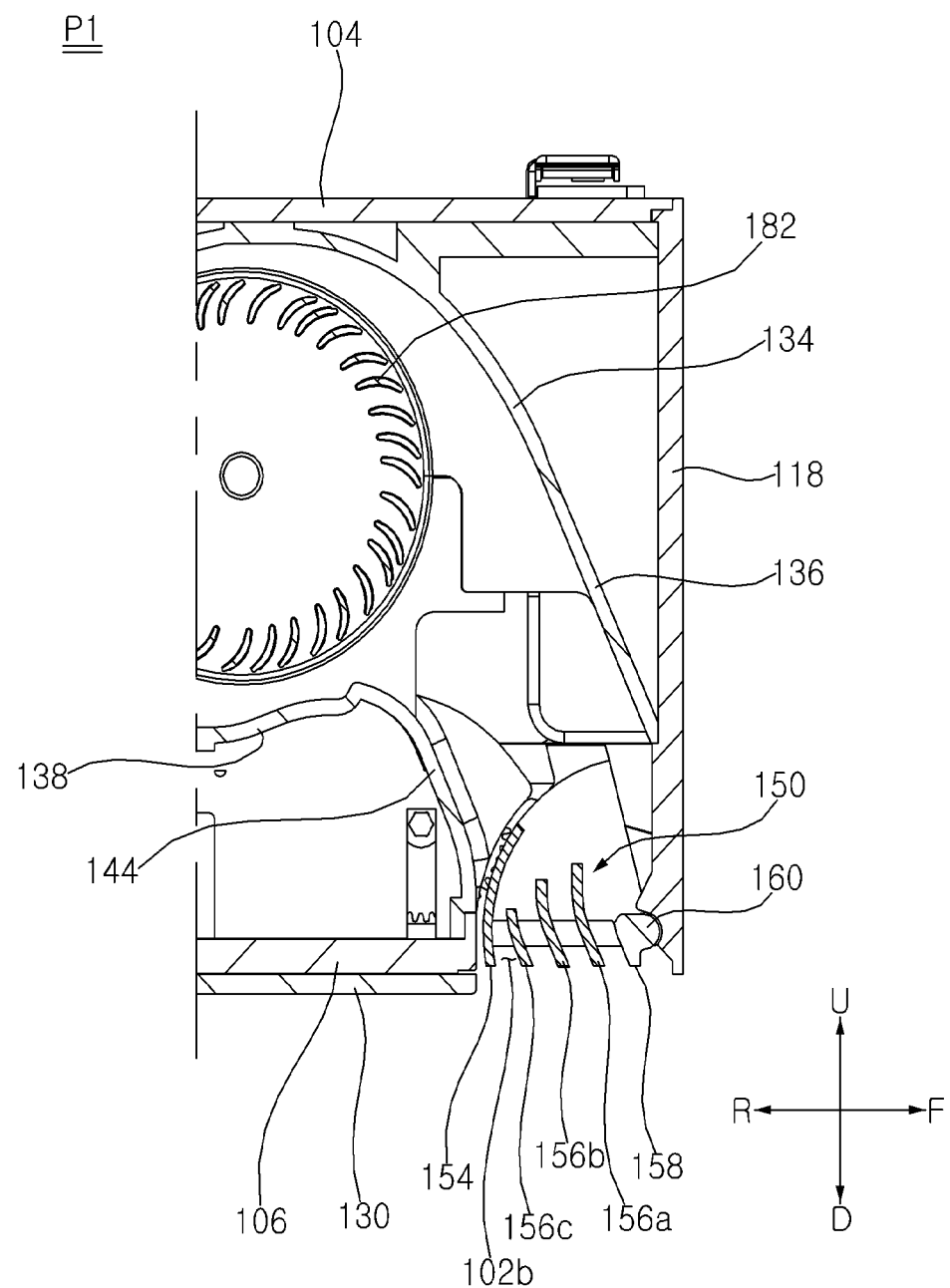
FIG. 18A is a cross-sectional view for explaining an orientation of a first louver in a first mode.
Figure 18B:
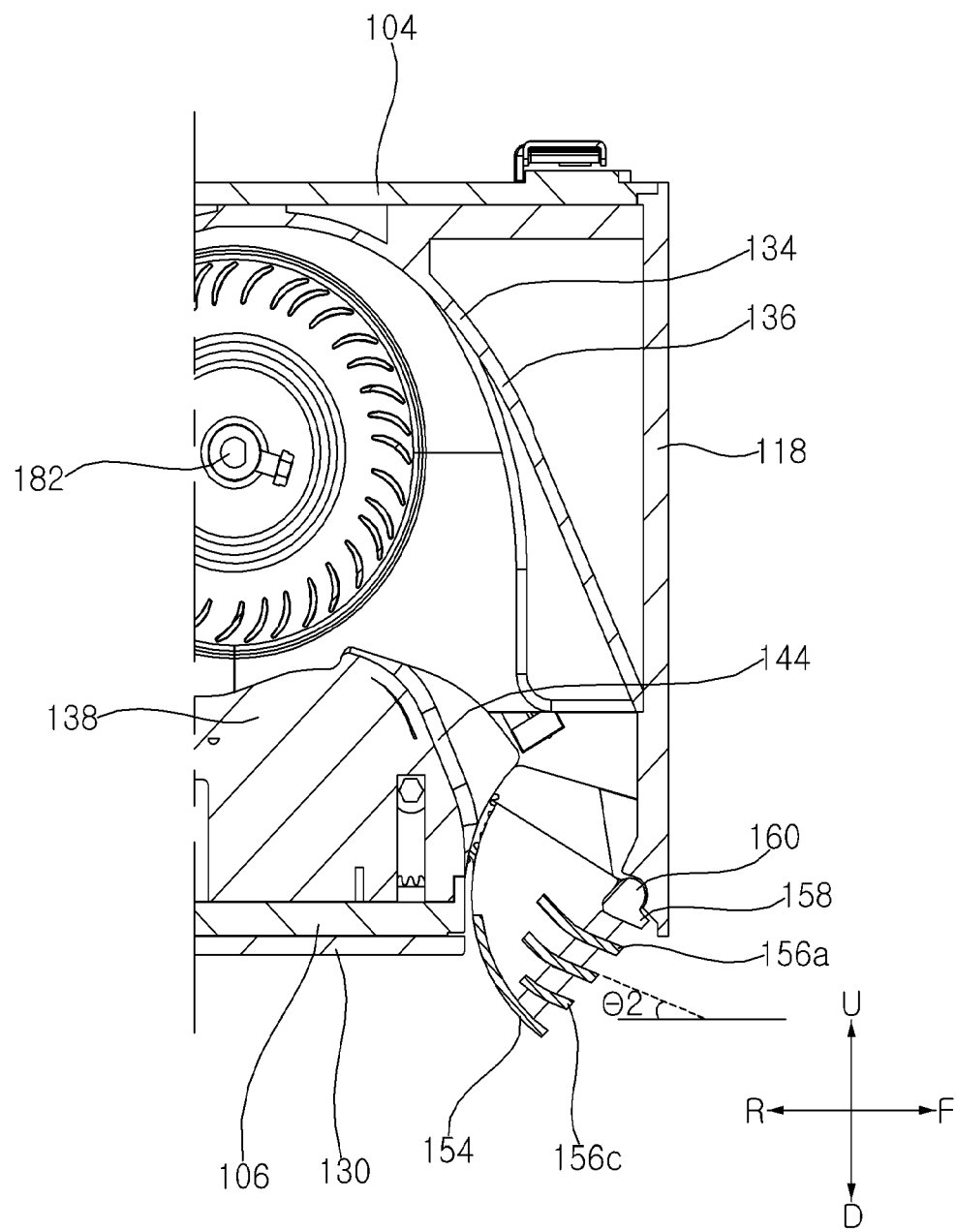
FIG. 18B is a cross-sectional view for explaining an orientation of the first louver in a second mode.
Figure 18C:
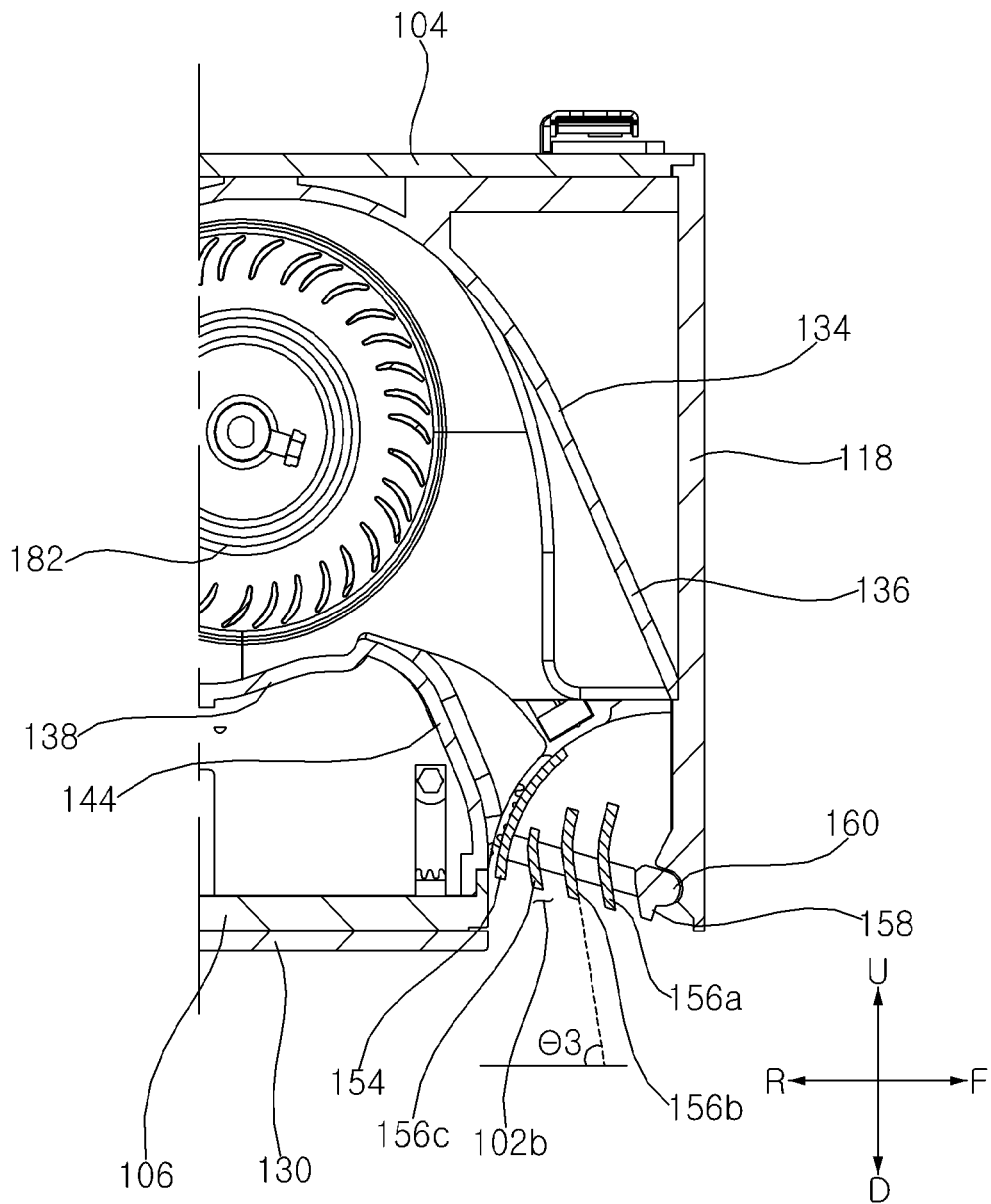
FIG. 18C is a cross-sectional view for explaining an orientation of the first louver in a third mode.

Referring to FIGS. 18A to 18C, the first louver 150 may be switched to a first mode P1 for forming an oblique air current in a forward direction, a second mode P2 for forming a horizontal air current in the forward direction, and a third mode P3 for forming a vertical air current toward the floor. The first louver 150 may be disposed above the first bottom cover 130 in the first mode P1. In the first mode P1, a lower end of each of the vanes 154, 156, and 158 of the first louver 150 may be disposed above the first bottom cover 130 in a vertical direction. In the first mode P1, the lower end of the outer vane 154 may be oriented in a direction perpendicular to the floor, and the lower end of each of the inner vanes 156a, 156b, and 156c may be inclined in the forward direction.

Referring to FIG. 18B, a portion of the first louver 150 may be disposed below the first bottom cover 130 in the second mode P2. In the second mode P2, the lower end of the outer vane 154 and a lower end of each of the inner vanes 156a, 156b, and 156c may be disposed below the first bottom cover 130 in the vertical direction. In the second mode P2, the inclination angle $\theta 2$ formed by the lower inner vane portion 156*a*1, 156*b*1, 156*c*1 of each of the inner vanes 156*a*, 156*b*, and 156*c* and the floor may be set to 30 degrees or less. Accordingly, in the second mode P2, the air flowing through the first louver 150 may be discharged in a direction substantially parallel to the floor.

Referring to FIG. 18C, the first louver 150 may be disposed above the first bottom cover 130 in the third mode P3. In the third mode P3, the lower end of the outer vane 154 and the lower end of each of the inner vanes 156*a*, 156*b*, and 156*c* may be disposed above the first bottom cover 130 in the vertical direction. In the third mode P3, an inclination angle 83 formed by the lower inner vane portion 156*a*1, 156*b*1, 156*c*1 of each of the inner vanes 156*a*, 156*b*, and 156*c* and the floor may be set to a range from 60 degrees to 90 degrees. Accordingly, in the third mode P3, the air flowing through the first louver 150 may be discharged in a direction substantially perpendicular to the floor.

Hereinafter, a second air-processing apparatus according to an embodiment will be described with reference to FIGS. 19 to 35C.

Figure 19:
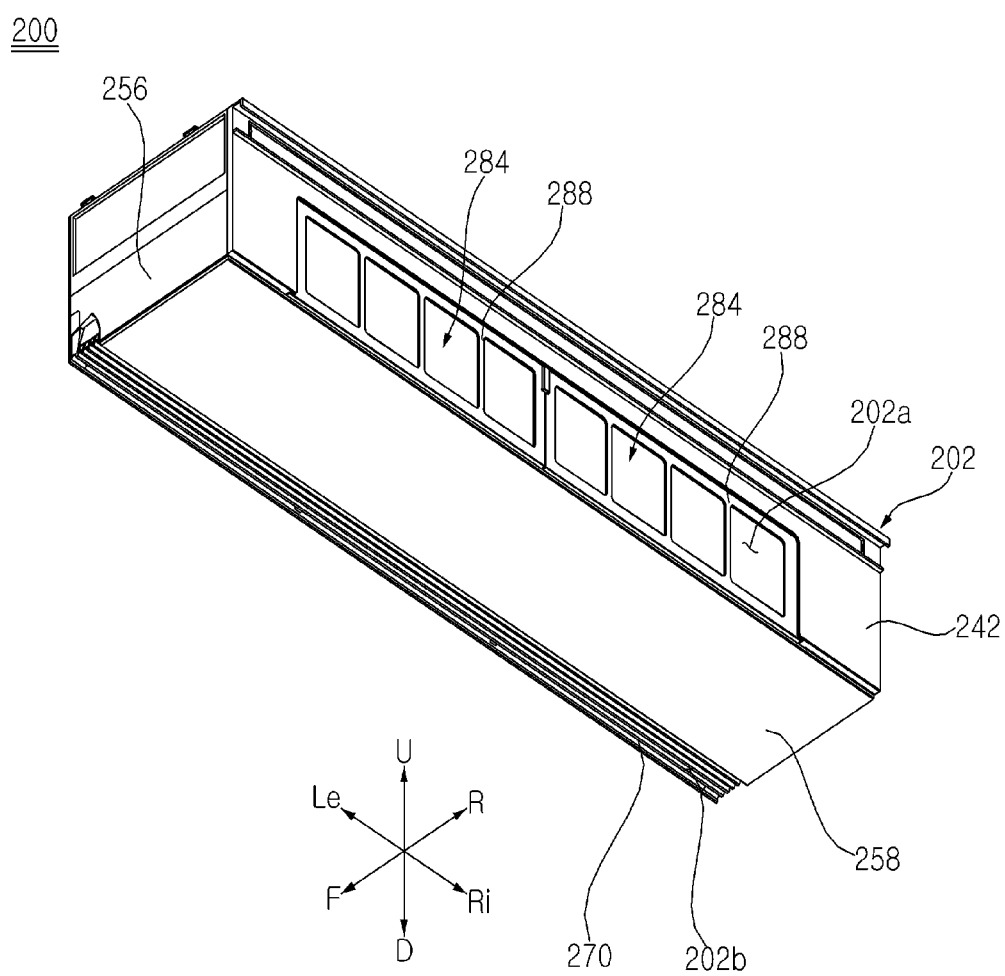
FIG. 19 is a perspective view of a second air-processing apparatus according to an embodiment.

The second air-processing apparatus 200 induces air to flow through a filter device 284 and discharges the air to the outside. The second air-processing apparatus 200 may have second inlet 202*a* formed in one or a first side thereof in order to suction air thereinto and second outlet 202*b* formed in another or a second side thereof perpendicular to the second inlet 202*a* in order to discharge air therefrom. Referring to FIG. 19, the second inlet 202*a* may be formed so as to extend perpendicular to a surface of a floor or ceiling. The second outlet 202*b* may be open downwards. The second outlet 202*b* may extend perpendicular to the second inlet 202*a*.

Figure 20:
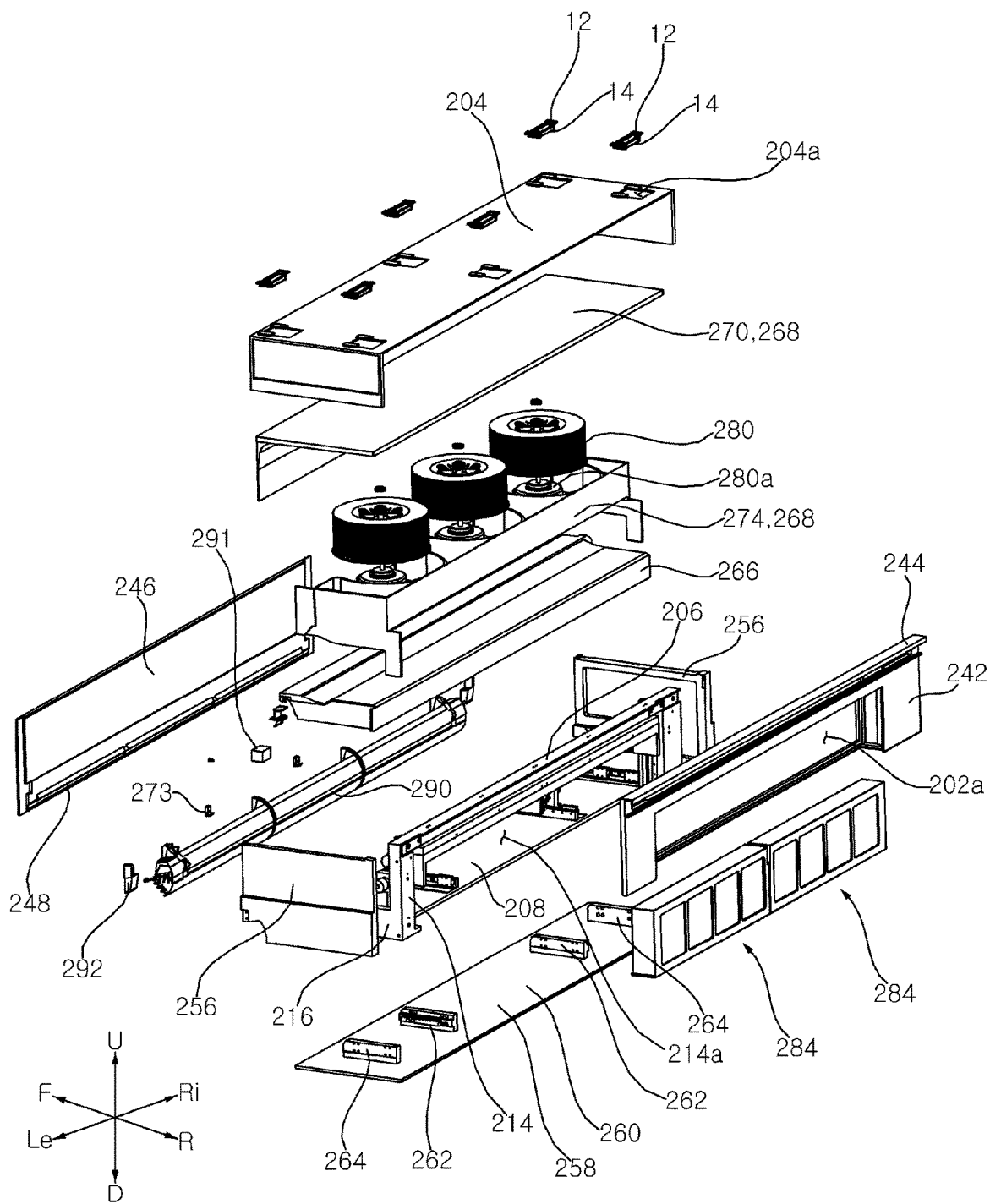
FIG. 20 is an exploded perspective view of the second air-processing apparatus of FIG. 19.
Figure 21:
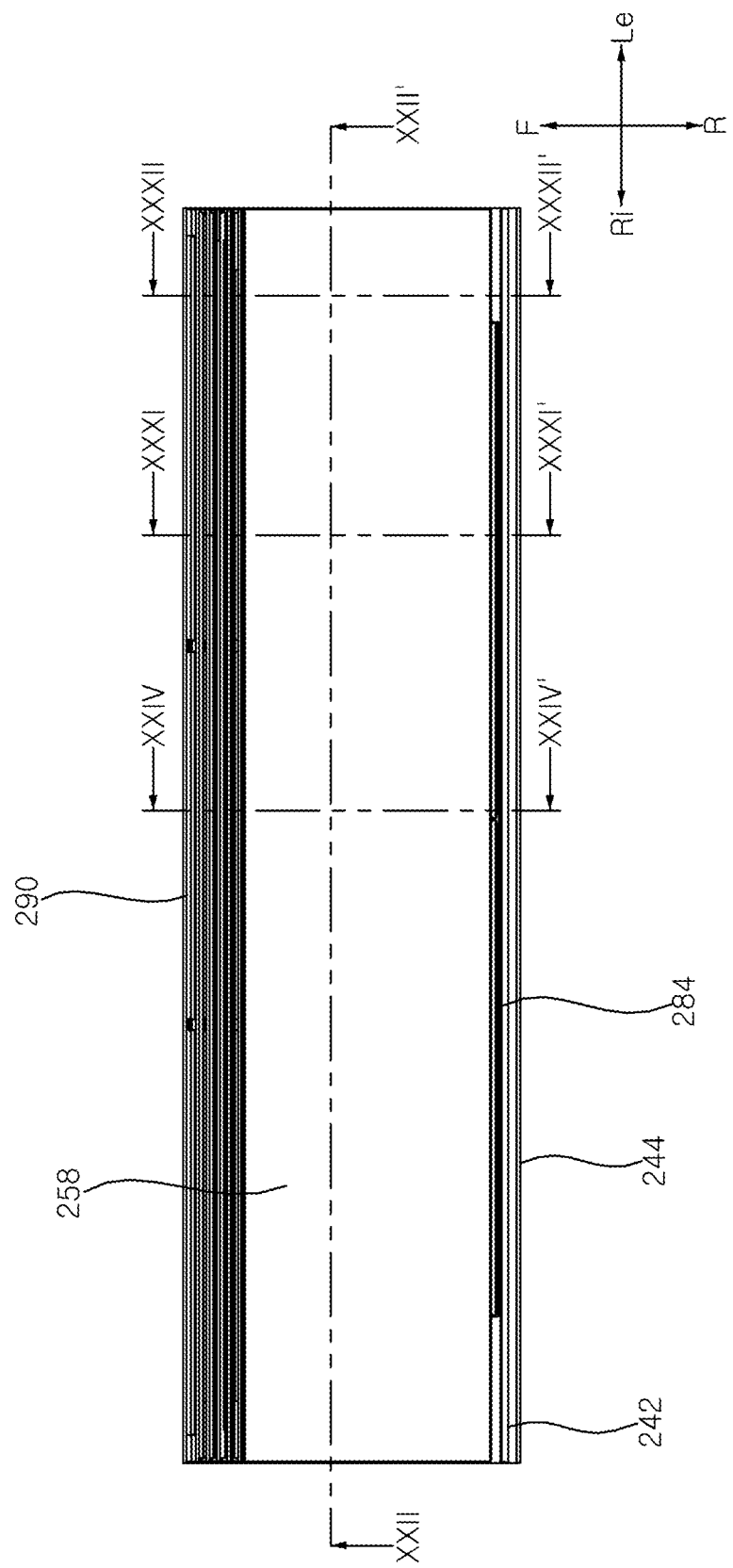
FIG. 21 is a bottom view of FIG. 19.
Figure 22:
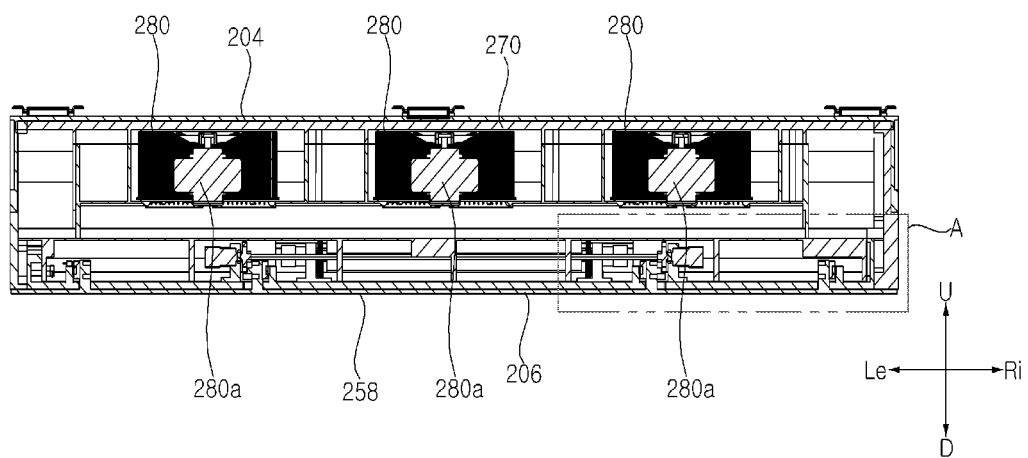
FIG. 22 is a cross-sectional view, taken along line XXII-XXII' in FIG. 21.

Referring to FIG. 20, the second air-processing apparatus 200 may include a second fan 280, which causes air to flow, and a second fan motor 280*a*, which rotates the second fan 280. According to an embodiment, a plurality of second fans 280 may be provided, and a plurality of second fan motors 280*a* may be provided such that each of the second fan motors 280*a* is connected to a respective one of the plurality of second fans 280.

The second air-processing apparatus 200 may include a second case 202, which forms an external appearance of the second air-processing apparatus 200, and a second housing 268, which is disposed inside of the second case 202 and which forms a flow path through which air flows. The second air-processing apparatus 200 may further include a second louver 290, which is rotatably disposed in the second case 202 in order to adjust a direction of air that is discharged from the second outlet 202*b*, and a second louver-drive device 294, which changes an orientation of the second louver 290.

The second louver 290 and the second louver-drive device 294 disposed in the second air-processing apparatus 200 may have a same structure and perform the same functions as the first louver 150 and the first louver-drive device 174 of the first air-processing apparatus 100 described above with reference to FIGS. 12 to 17, and thus, repetitive description has been omitted.

The second air-processing apparatus 200 may include a second control box 290 that controls operation of the second fan motor 280*a* or operation of the second louver-drive device 294.

Referring to FIG. 20, the second case 202 may include a second upper cover 204, which may be secured to a ceiling, a second lower cover 206, which is disposed below the second upper cover 204, second rear cover 242, which forms therein the second inlet 202*a* and to which the filter device 284 may be mounted, a second front cover 246, which is disposed so as to be spaced forwards apart from the second rear cover 242, and two second side covers 256, which are disposed at both side ends of the second lower cover 206. The second case 202 may further include a second bottom cover 258, which may be disposed below the second lower cover 206 so as to be movable in the forward-rearward direction.

Referring to FIG. 20, the second inlet 202*a* may be formed in the second rear cover 242. The guide rail 10 (refer to FIG. 3) may be mounted on an outer surface of the second rear cover 242. The second inlet 202*a*, in which the filter device 284 may be mounted, may be formed in the lower portion of the second rear cover 242. The guide rail 10 and the second support rail 244 that guides movement of the filter cleaner 300 may be mounted on the second rear cover 242.

Figure 24:
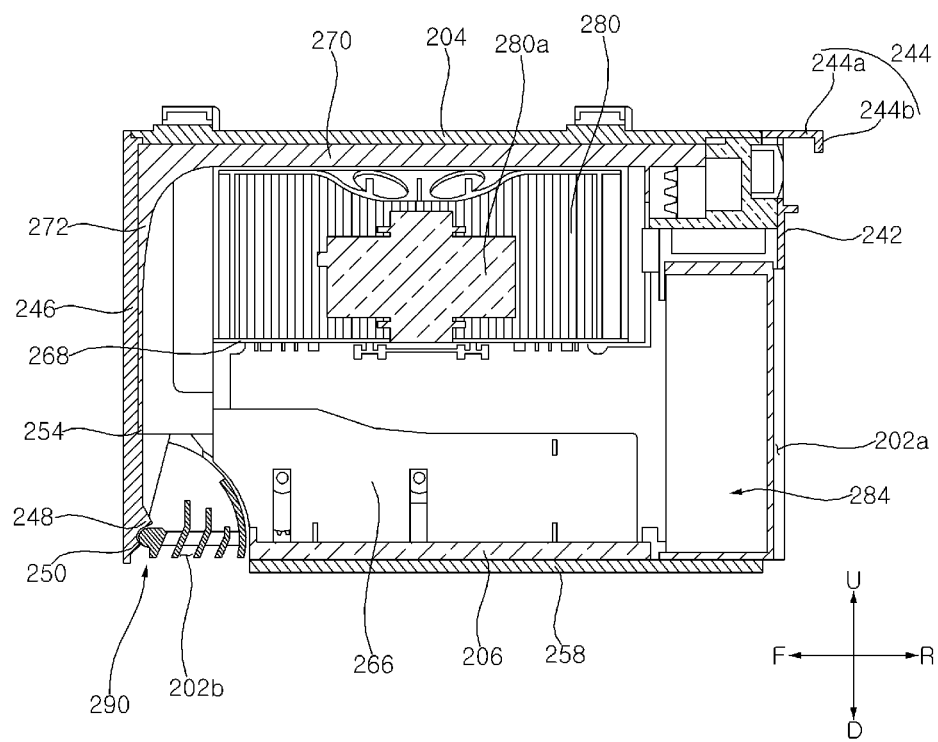
FIG. 24 is a cross-sectional view, taken along line XXIV-XXIV in FIG. 21.

The guide rail 10 may be disposed above the second inlet 202*a*. Referring to FIG. 24, the second support rail 244 may be disposed at an upper end of the second rear cover 242.

The second support rail 244 may include a second top plate 244*a*, which protrudes rearwards from the upper end of the second rear cover 242, and a second bent portion 244*b*, which may be bent and extend downwards from a rear end of the second top plate 244*a*. A top roller 326 of the filter cleaner 300 may be in contact with the second bent portion 244*b*.

The second rear cover 242 may be disposed behind a second vertical plate 214 of the second lower cover 206, which will be described hereinafter. The second rear cover 242 may be fixedly disposed behind the second vertical plate 214.

A filter-mounting part or portion or filter-mount 234 (refer to FIG. 31) that moves the filter device 284 in the upward-downward direction may be disposed in the second inlet 202*a* in the second rear cover 242. The filter-mount 234 may be moved in the upward-downward direction by a filter-drive device 228, which will be described hereinafter.

Referring to FIG. 20, the second upper cover 204 may include a second fixing recess 204*a* formed in an upper surface thereof, into which fixing member 12 that fixes the second case 202 to the ceiling may be inserted. The second fixing recess 204*a* formed in the second upper cover 204 may have a same shape as the first fixing recess 104*a* formed in the first upper cover 104. Accordingly, the second upper cover 204 may be fixed to mounting member 14 mounted to the ceiling by the fixing member 12 disposed at an upper side of the first upper cover 104.

Referring to FIG. 20, the second upper cover 204 may include two side plates 266*d*, which may be bent and extend downward from both side ends thereof. Each of the two side plates 266*d* may be connected to a respective one of the two second side covers 256.

Figure 23:
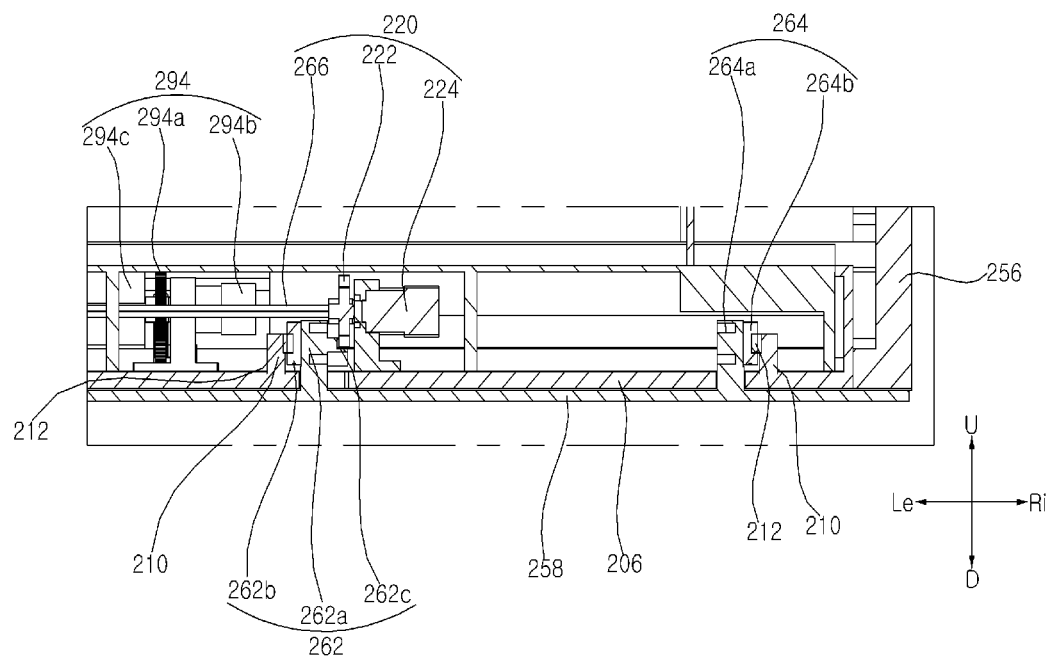
FIG. 23 is an enlarged view of portion A in FIG. 22.

Referring to FIG. 23, the second lower cover 206 may be disposed below the second housing 268. The second louver-drive device 294 may be disposed on the second lower cover 206. A cover-drive device 220 that moves the second bottom cover 258 in the forward-rearward direction is disposed on the second lower cover 206. The filter-drive device 228 that moves the filter device 284 and the filter-mount 234 in the upward-downward direction may be disposed on the second lower cover 206.

The second lower cover 206 may include a second horizontal plate 208, which may be disposed above the second bottom cover 258, a second vertical plate 214, which may be disposed at a rear side of the second horizontal plate 208 so as to be perpendicular thereto and in which a second inner suction hole 214a may be formed, and two second side walls 216, which may be bent and extend upwards from both side ends of the second horizontal plate 208.

Figure 33A:
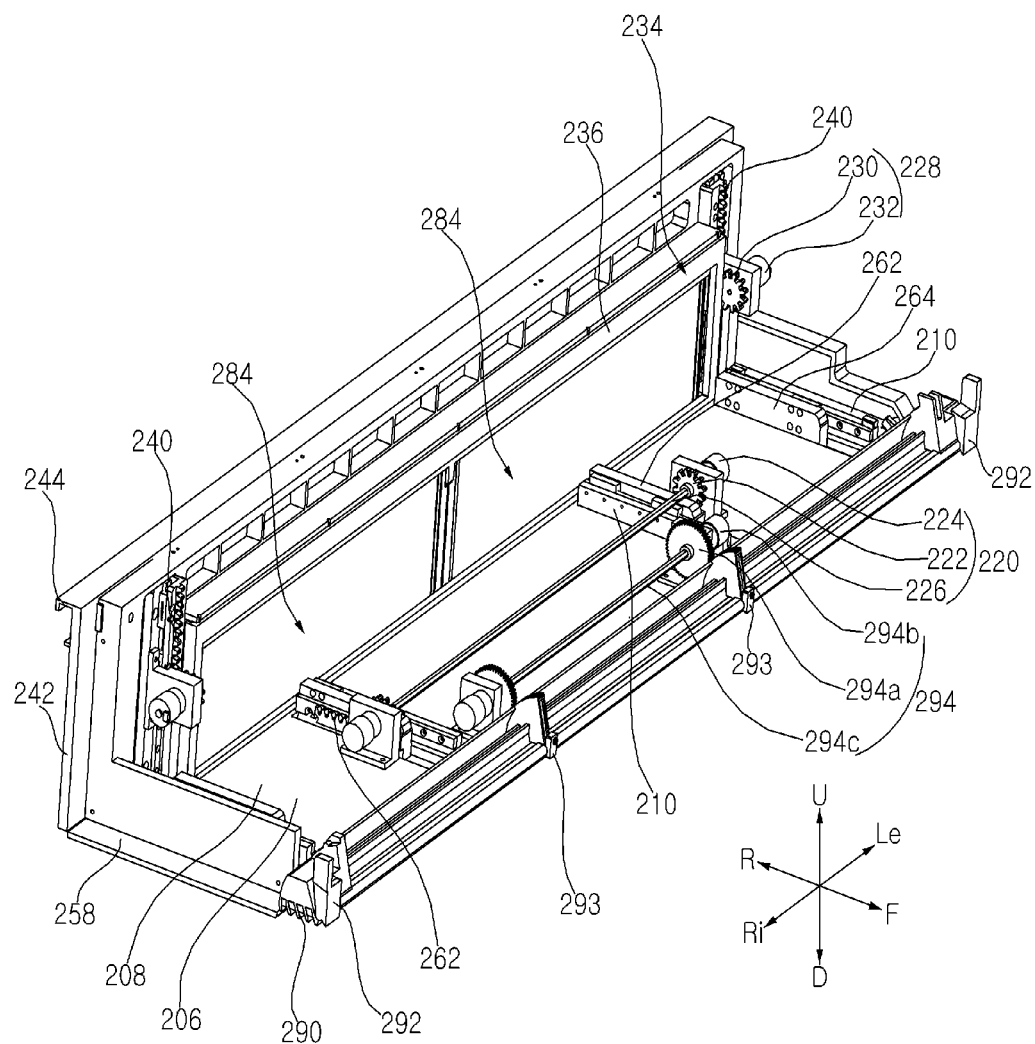
FIG. 33A is a perspective view for explaining an arrangement of a second bottom cover, the filter-mount, and the filter device in a state in which the second bottom cover is located at a rear position.

Referring to FIG. 33A, the second louver-drive device 294 may be disposed on the second horizontal plate 208. The cover-drive device 220 may be disposed above the second horizontal plate 208. The second horizontal plate 208 may have guide grooves 208a formed therein to allow cover guides 262 and 264 of the second bottom cover 258 to be inserted thereinto.

Figure 31:
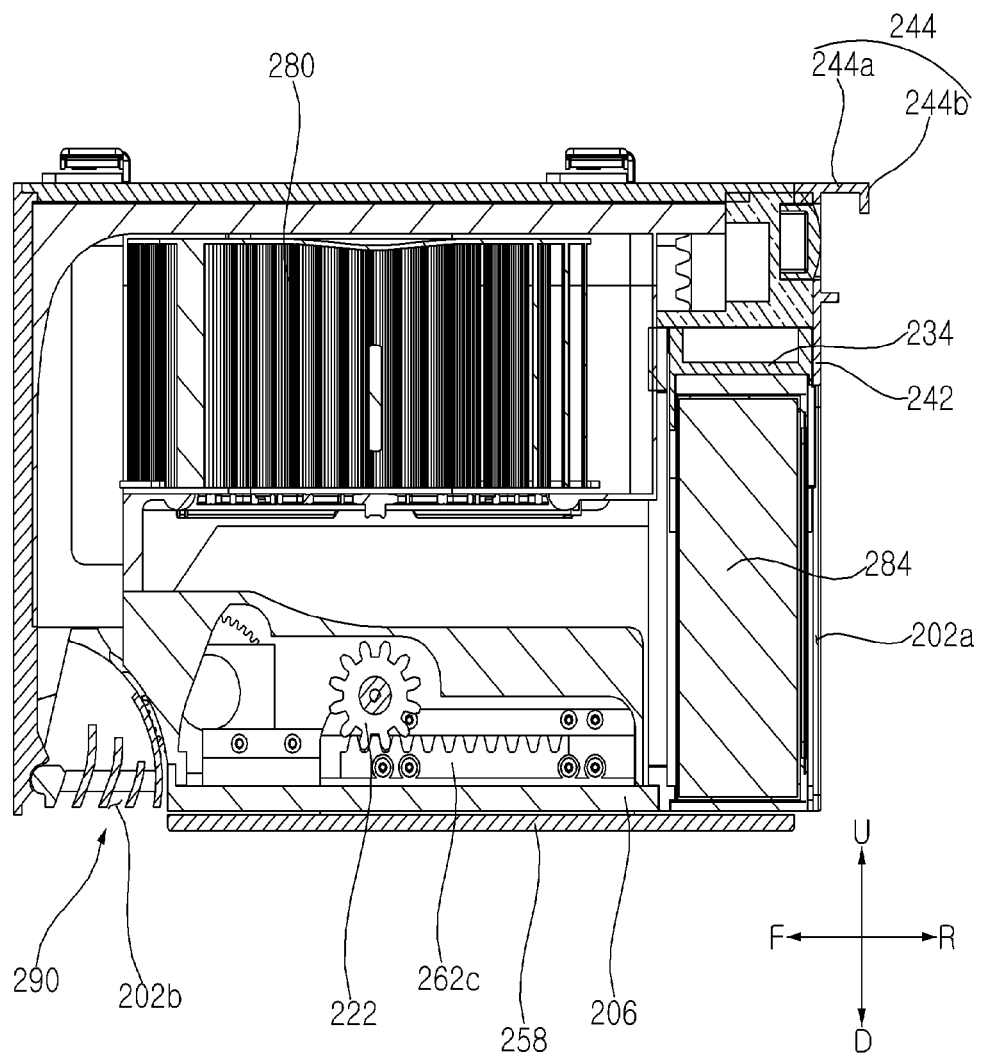
FIG. 31 is a cross-sectional view, taken along line XXXI-XXXI' in FIG. 21.

Referring to FIGS. 31 and 33A, the cover-drive device 220 may include a cover-drive gear 222, which meshes with a guide gear 262c of the first cover guide 262, which will be described hereinafter, so as to rotate together therewith, and a cover-drive motor 224 that rotates the cover-drive gear 222.

According to an embodiment, two cover-drive gears 222 may be provided so as to be spaced apart from each other in the lateral direction. The cover-drive device 220 may include a cover-drive shaft 226 that interconnects the two cover-drive gears 222 spaced apart from each other. Accordingly, the two cover-drive gears 222 connected to both ends of the cover-drive shaft 226 may rotate identically.

Referring to FIG. 33A, the second horizontal plate 208 may be provided with fixing guides 210, which may be connected to the cover guides 262 and 264 of the second bottom cover 258 in order to prevent the second bottom cover 258 from moving in the upward-downward direction. The fixing guides 210 may protrude upwards from the second horizontal plate 208, and extend in the forward-rearward direction.

Referring to FIG. 33A, the fixing guides 210 may be disposed so as to be in contact with the first cover guide 262 or the second cover guide 264, which will be described hereinafter. The fixing guides 210 support movement of the second bottom cover 258 in the forward-rearward direction. The fixing guides 210 may also prevent the second bottom cover 258 from moving in the upward-downward direction.

Referring to FIG. 23, the fixing guides 210 may have fixing protrusions 212, which may protrude toward the cover guides 262 and 264. The fixing protrusions 212 may extend in the forward-rearward direction. The fixing protrusions 212 may be disposed so as to be in contact with a first guide protrusion 262b of the first cover guide 262 or a second guide protrusion 264b of the second cover guide 264. The fixing protrusions 212 may have a structure corresponding to the first guide protrusion 262b of the first cover guide 262 or the second guide protrusion 264b of the second cover guide 264, thereby preventing the second bottom cover 258 from moving in the upward-downward direction.

Referring to FIG. 20, the second vertical plate 214 may have a second inner suction hole 214a formed therein. The second inner suction hole 214a may have a size corresponding to the second inlet 202a. The filter-drive device 228 may be disposed on the second vertical plate 214.

Each of the two second side covers 256 may be connected at a lower portion thereof to the second lower cover 206, and may be connected at an upper portion thereof to the second upper cover 204. A second rotational support rod 292 that supports rotation of the second louver 290 may be disposed on each of the two second side covers 256. The second rotational support rod 292, which is connected to each of the second side covers 256, may have a same shape as the first rotational support rod 168 connected to each of the first side covers 128.

The second front cover 246 may be disposed in front of the second housing 268. The second front cover 246 may have a same shape as the first front cover 118. Also, the second front cover 246 may be disposed in a same manner as the first front cover 118. Therefore, a lower end of the second front cover 246 may be spaced a predetermined gap apart from a front end portion of the second lower cover 206, thereby forming the second outlet 202b.

In addition, a second louver protrusion 248, in which a second louver groove 250 that receives a second louver rotational shaft 270a of the second louver 290 may be formed, may be formed on the second front cover 246 in order to limit a range within which the second louver 290 can rotate. A second support-rod recess 252, in which a second auxiliary support rod 293 may be disposed, may be formed between a left or first end and a right or second end of the second louver protrusion 248.

Referring to FIG. 24, a second stepped portion or step 254, which interferes with an end portion or end of a second upper housing 270 to be described hereinafter, may be formed in the second front cover 246.

Figure 33B:
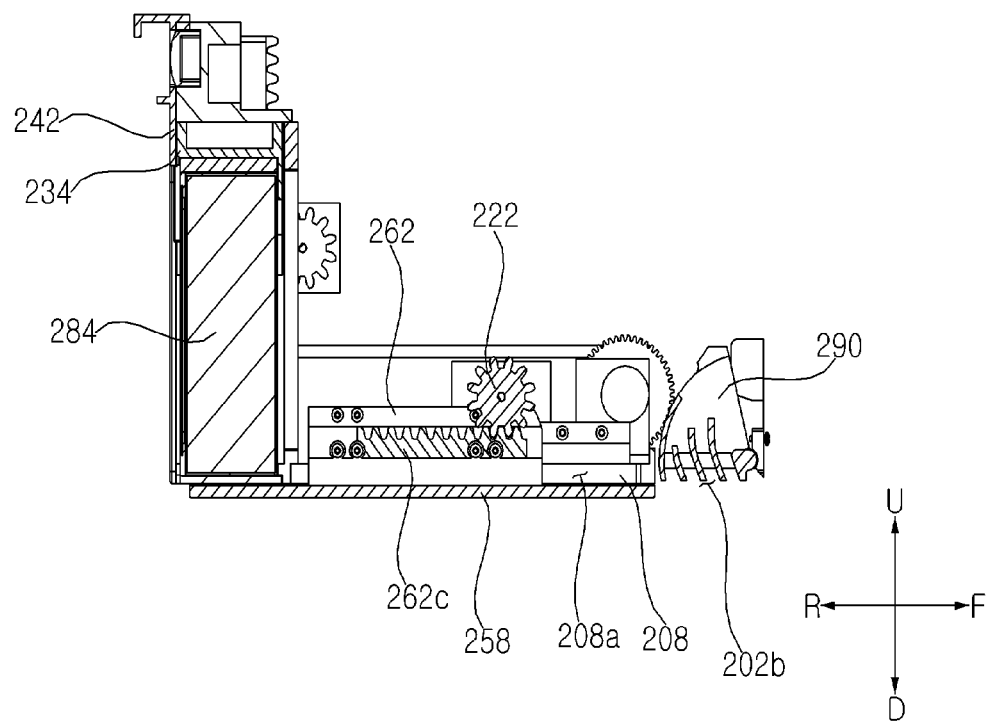
FIG. 33B is a cross-sectional view of the arrangement of FIG. 33A.

The second bottom cover 258 may be disposed at the second lower cover 206 so as to be movable in the forward-rearward direction. Referring to FIG. 33B, when the second bottom cover 258 is disposed at a rear position adjacent to the second rear cover 242, the second bottom cover 258 may cover a lower side of the filter device 284. Referring to FIG. 34B, when the second bottom cover 258 is disposed at a front position adjacent to the second front cover 246, the second bottom cover 258 may block the second outlet 202b. Referring to FIG. 34B, when the second bottom cover 258 is disposed at a front position adjacent to the second front cover 246, the second bottom cover 258 may open the lower side of the filter device 284.

Referring to FIG. 20, the second bottom cover 258 may include a bottom plate 260, which may be disposed below the second lower cover 206, and cover guides 262 and 264, which protrude upwards from the bottom plate 260 and which move the bottom plate 260 in the forward-rearward direction. Referring to FIG. 23, the cover guides 262 and 264 may include first cover guide 262, which may be connected to the cover-drive device 220 to move the bottom plate 260, and a second cover guide 264, which prevents the bottom plate 260 from vibrating in the upward-downward direction.

Referring to FIG. 23, the first cover guide 262 may include a first guide wall 262a, which protrudes upwards from the bottom plate 260 and extends in the forward-rearward direction, a guide gear 262c, which is disposed on one or a first side of the first guide wall 262a and is screwed to the cover-drive device 220, and a first guide protrusion 262b, which is disposed on the opposite or a second side of the first guide wall 262a and guides movement of the second bottom cover 258 in the forward-rearward direction. A recess 262b1, into which the fixing protrusion 212 may be inserted, may be formed in the first guide protrusion 262b.

Referring to FIG. 23, the second cover guide 264 may include a second guide wall 264a, which protrudes upwards from the bottom plate 260 and extends in the forward-rearward direction, and a second guide protrusion 264b, which is disposed on one side of the second guide wall 264a and guides movement of the second bottom cover 258 in the forward-rearward direction. A recess 264b1, into which the fixing protrusion 212 may be inserted, may be formed in the second guide protrusion 264b.

Referring to FIG. 20, the second air-processing apparatus 200 may include an inner cover 266, which may be disposed above the second lower cover 206 and cover upper sides of the second louver-drive device 294 and the cover-drive device 220. Referring to FIG. 24, the inner cover 266 may guide a flow of air flowing inside of the second case 202, and may prevent the air from flowing to the second louver-drive device 294. The inner cover 266 may be coupled to the second lower cover 206 to form a space in which the second louver-drive device 294 and the cover-drive device 220 are disposed.

Figure 25A:
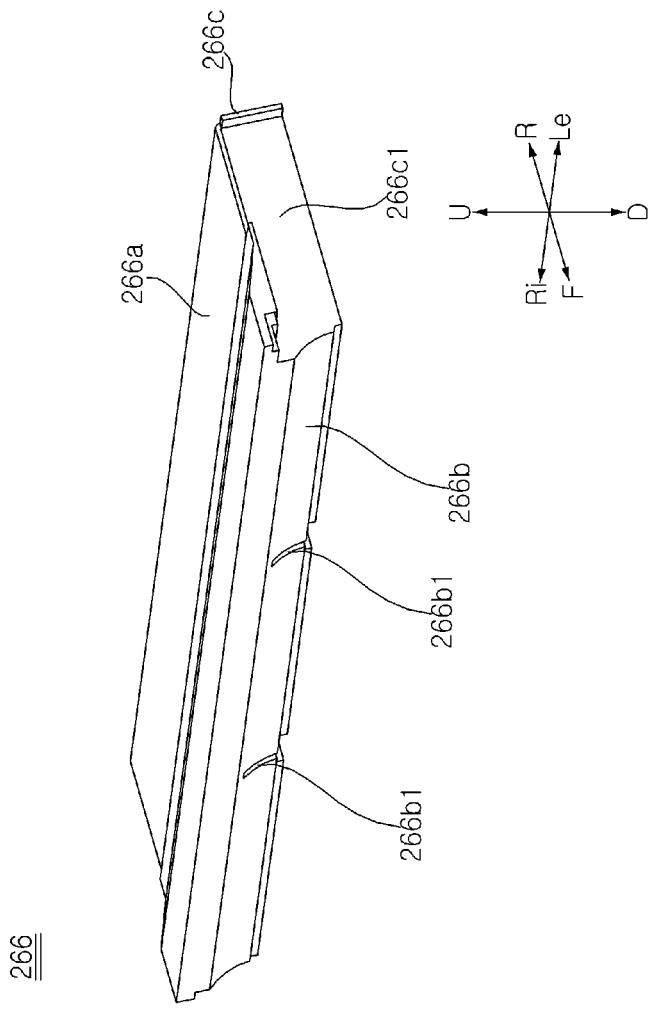
FIG. 25A is a perspective view of an inner cover according to an embodiment.
Figure 25B:
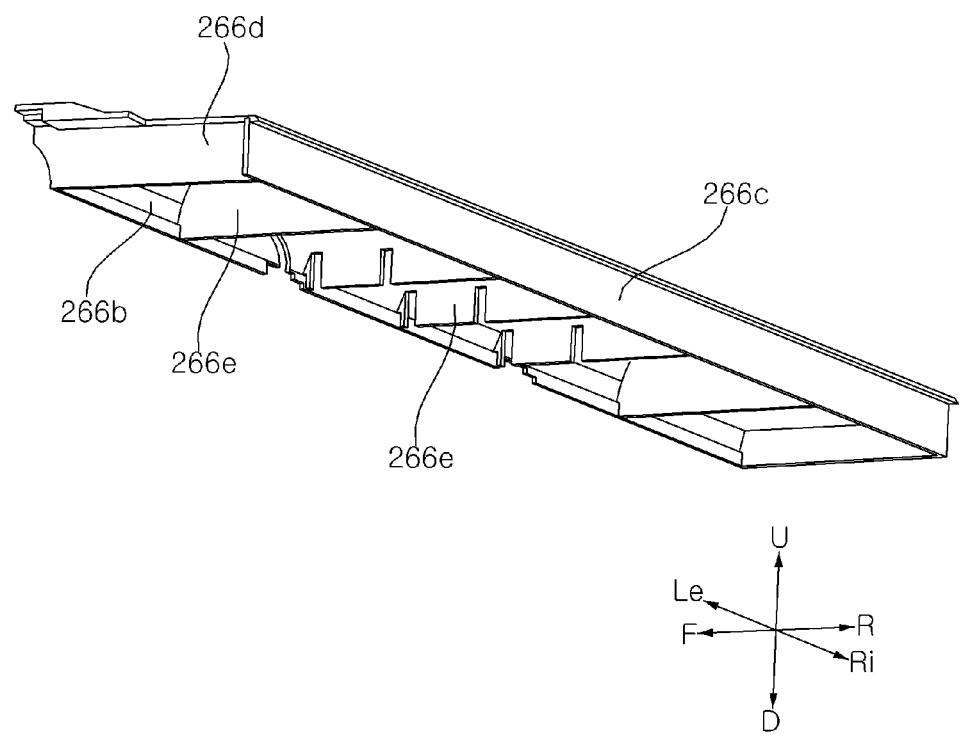
FIG. 25B is a perspective view of the inner cover when viewed from a direction different from that of FIG. 25A.

Referring to FIGS. 25A and 25B, the inner cover 266 may include an upper plate 266a, which may be disposed above the second louver-drive device 294, a front plate 266b, which covers a front side of the second louver-drive device 294, a rear plate 266c, which covers a rear side of the second louver-drive device 294, and side plates 266d, which cover the lateral sides of the second louver-drive device 294.

The rear plate 266c may prevent the air flowing through the filter device 284 from flowing to the space under the inner cover 266. The upper plate 266a may guide the air flowing through the filter device 284 to the space in which the second fan 280 is disposed. The front plate 266b may guide the air flowing through the second fan 280 toward the second outlet 202b. The front plate 266b may have a second gear hole 266b1 formed in a region in which a second louver gear 294a of the second louver-drive device 294 is disposed. A portion of the second louver gear 294a may protrude outside of the second gear hole 266b1 (refer to FIG. 25A), and may be in contact with the second louver 290.

Referring to FIG. 25B, the inner cover 266 may include a plurality of partition walls 266e, which vertically extend downwards from the upper plate 266a. The plurality of partition walls 266e may be spaced apart from each other in the lateral direction, and may increase a rigidity of the inner cover 266.

Referring to FIG. 24, the second housing 268 may be disposed inside of the second case 202 to form a space in which air flows. A second fan 280 and a second fan motor 280a that rotates the second fan 280 may be disposed inside of the second housing 268.

The second fan 280 may be implemented as, for example, a centrifugal fan, which suctions air in a direction parallel to a rotational axis and discharges air in a centrifugal direction. Accordingly, referring to FIG. 24, the second fan motor 280a may be disposed inside of the second fan 280 to rotate the second fan 280.

The second fan motor 280a may be fixed to second upper housing 270, which will be described hereinafter. Referring to FIG. 24, the second housing 268 may include a second upper housing 270, which is disposed above the second fan 280, and a second lower housing 274, which is disposed below the second fan 280.

Figure 26A:
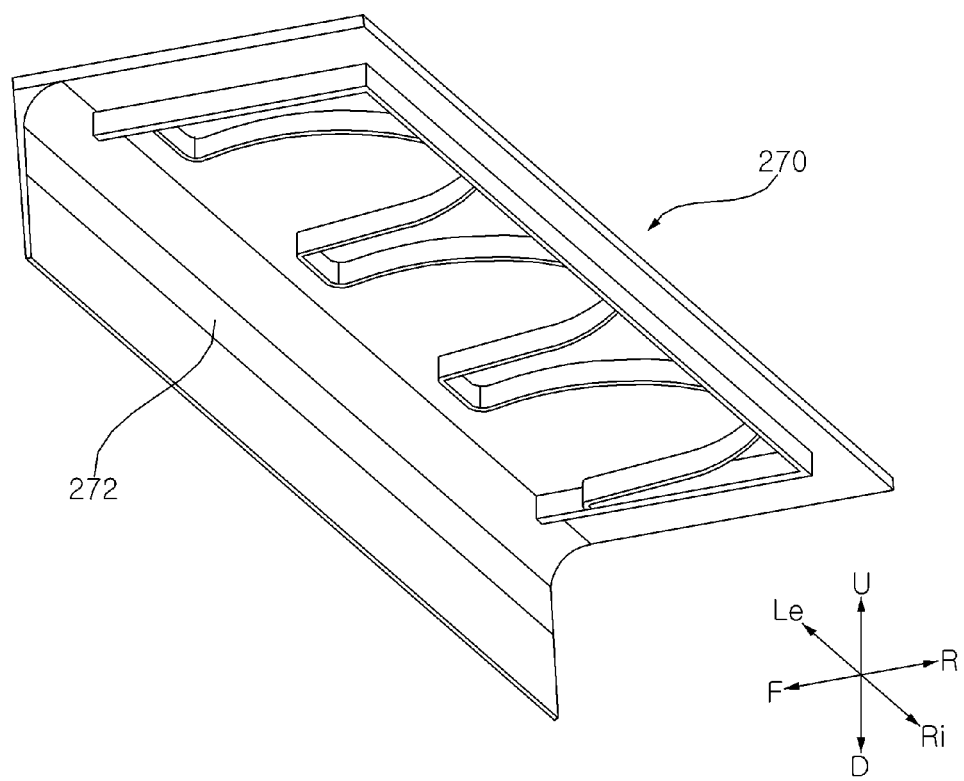
FIG. 26A is a perspective view of a second upper housing according to an embodiment.
Figure 26B:
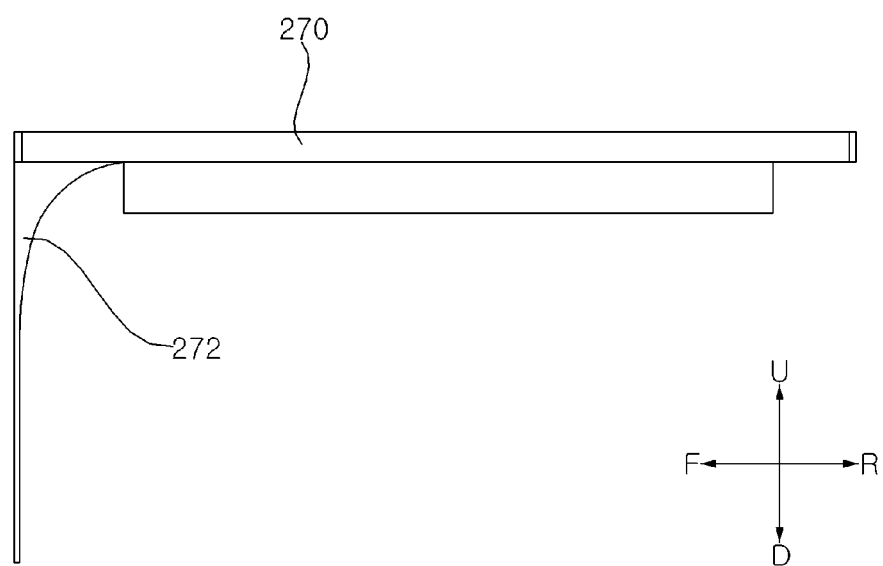
FIG. 26B is a side view of the second upper housing of FIG. 26A.

Referring to FIGS. 26A and 26B, the second upper housing 270 may be mounted to the second upper cover 204. A lower end of the second upper housing 270 may be disposed on the second stepped portion 254 of the second front cover 246. The second upper housing 270 may include a front guide 272 that guides the air flowing through the second fan 280 to the second outlet 202b. The front guide 272 may extend downwards from a front end of the second upper housing 270.

Referring to FIG. 24, the front guide 272 causes the air flowing along the second fan 280 to flow downwards. The front guide 272 guides the air flowing through the second fan 280 to the second outlet 202b.

The front guide 272 may be disposed so as to be smoothly connected to the second front cover 246. Accordingly, the air flowing along the front guide 272 may flow to the second outlet 202b via the second front cover 246.

Figure 27:
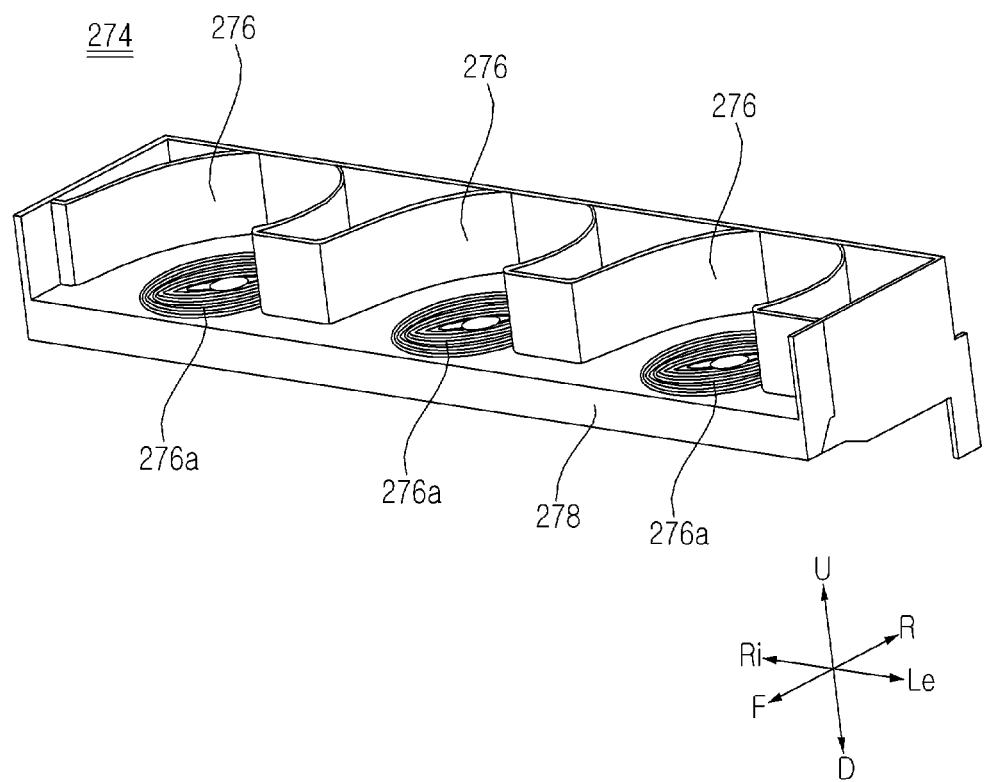
FIG. 27 is a perspective view of a second lower housing according to an embodiment.

Referring to FIG. 24, the second fan motor 280a may be mounted in the second upper housing 270. Referring to FIG. 24, the second lower housing 274 may be disposed above the inner cover 266. Referring to FIG. 27, the second lower housing 274 may include a plurality of fan housings 276 that forms spaces in which a plurality of second fans 280 may be disposed. Each of the fan housings 276 may be spaced apart from an outer circumferential surface of the second fan 280 in the radial direction. Each of the fan housings 276 may have an open front portion. Accordingly, the air flowing in the radial direction of the second fan 280 may be discharged to the open front portion of each of the fan housings 276. A fan inlet 276a, through which air is introduced into the second fan 280, may be formed below each of the fan housings 276.

The second lower housing 274 may be spaced upwards apart from the inner cover 266. Accordingly, a suction flow path 268a, through which the air passing through the filter device 284 flows, may be formed between the second lower housing 274 and the inner cover 266.

The second lower housing 274 may be spaced rearwards apart from the front guide 272 of the second upper housing 270. The second lower housing 274 may include a rear guide 278, which may be spaced apart from the front guide 272 and extends downwards. The second lower housing 274 may be spaced upwards apart from the inner cover 266 by the rear guide 278. The rear guide 278 forms a second discharge flow path 268b in the upward-downward direction together with the front guide 272. The front guide 272 and the rear guide 278 may guide the air flowing from the second fan 180 to the second outlet 202b.

The filter device 284 may be mounted to the filter-mount 234. The filter-mount 234 may be movably disposed in the second case 202. The filter device 284 and the filter-mount 234 may be coupled to each other by means of a first magnet 287 disposed in the filter device 284 and a second magnet 238 disposed in the filter-mount 234. Accordingly, a position of the filter device 284 may be changed in the upward-downward direction according to movement of the filter-mount 234. Also, a user may easily separate the filter device 284 from the filter-mount 234.

Figure 28:
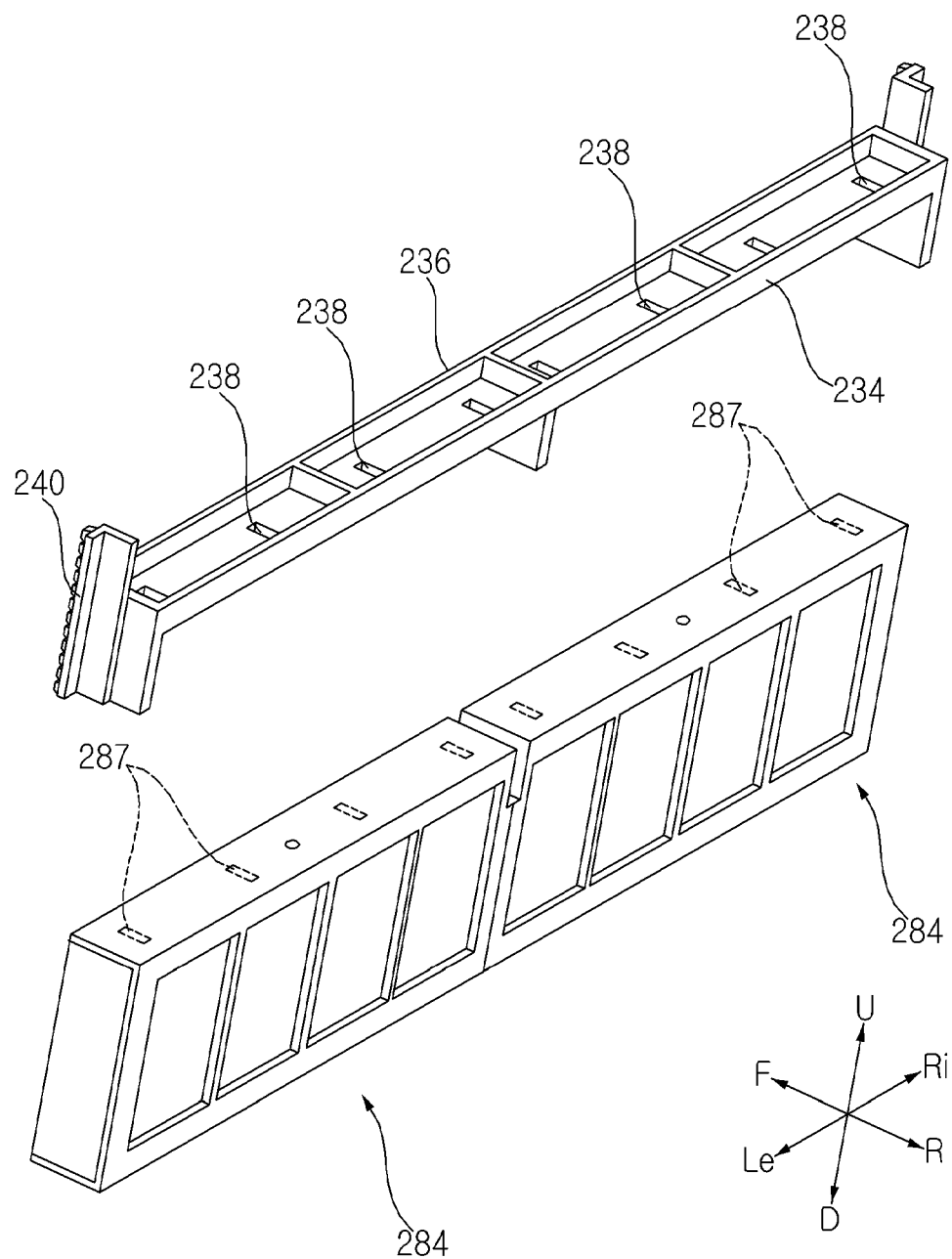
FIG. 28 is an exploded perspective view of a filter-mount and a filter device according to an embodiment.
Figure 29:
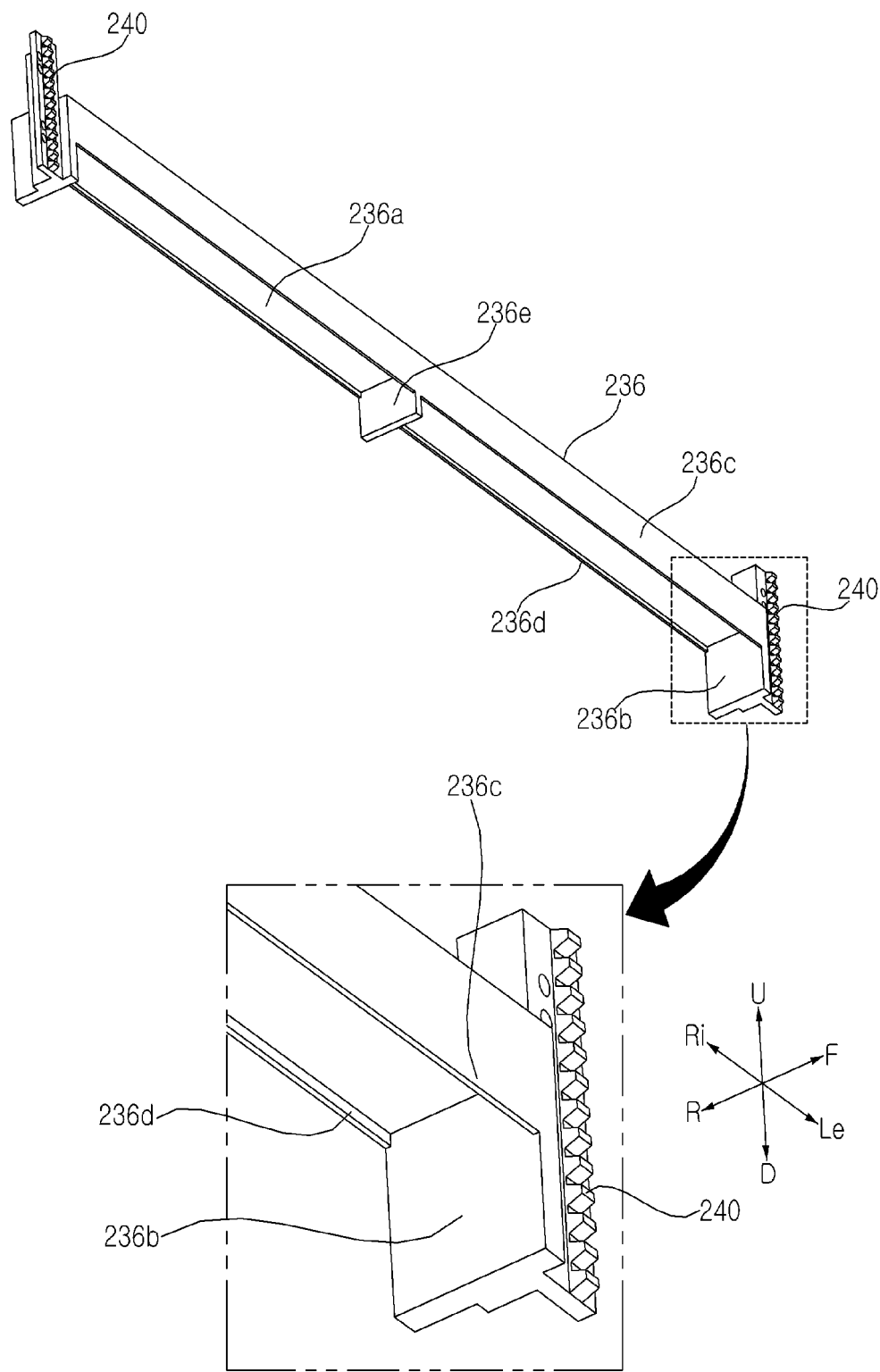
FIG. 29 is a bottom perspective view of a filter-mount according to an embodiment.

Referring to FIGS. 28 and 29, the filter-mount 234 may include a mounting body 236, to which the filter device 284 may be mounted, and a body gear 240 that adjusts a position of the mounting body 236.

Referring to FIGS. 28 and 29, the mounting body 236 may include an upper body 236a, which is disposed above the filter device 284, side bodies 236b, which extend downwards from both ends of the upper body 236a, a front body 236c, which extends downwards from the front end of the upper body 236a, and a rear body 236d, which extends downwards from the rear end of the upper body 236a. The side bodies 236b may extend downwards to be longer than the front body 236c or the rear body 236d. Two side bodies 236 may be provided at respective ends of the upper body 236a. A partition body 236e that isolates a plurality of filter devices 284 from each other may be disposed between the two side bodies 236b. A length that the front body 236c extends downwards from the upper body 236a may be longer than a length that the rear body 236d extends downwards from the upper body 236a. The front body 236c, the rear body 236d, and the side bodies 236b may guide mounting of the filter device 284 to the filter-mount 234.

A body gear 240 may be disposed outside of the side body 236b. The body gear 240 may be a rack gear in which threads protruding forwards extend in the upward-downward direction.

A plurality of second magnets 238 may be disposed above the upper body 236a.

Figure 30:
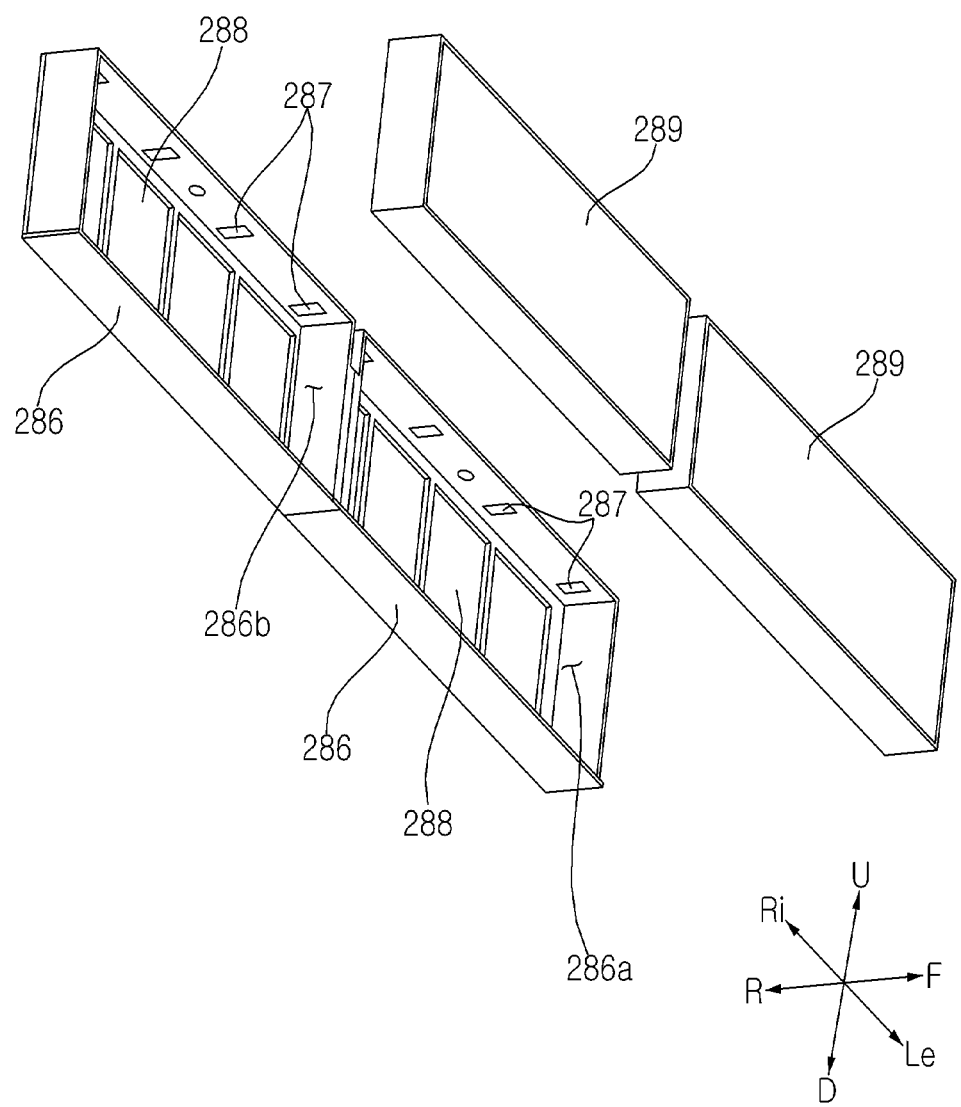
FIG. 30 is an exploded perspective view of a filter device according to an embodiment.

Referring to FIG. 30, the filter device 284 may include a filter case 286, which supports a second pre-filter 288 disposed in one side thereof and has an open opposite side, and a HEPA filter 289, which is disposed so as to be inserted into or withdrawn out of the filter case 286 and functions to remove fine dust. The filter case 286 may have a size capable of accommodating the HEPA filter 289. The second pre-filter 288 that primarily removes foreign substances from the air introduced into the second inlet 202a may be disposed in one side of the filter case 286. The filter case 286 may have an opening 286a formed in a surface thereof opposite the second pre-filter 288. The HEPA filter 289 may be inserted into or withdrawn out of the filter case 286 through the opening 286a.

The first magnet 287 may be disposed on an upper wall of the filter case 286. The first magnet 287 may be disposed at a position corresponding to the second magnet 238 when the filter device 284 is mounted to the filter-mount 234.

Referring to FIG. 33A, the filter-drive device 228 may be disposed on the second lower cover 206, and move the filter-mount 234 in the upward-downward direction. The filter-drive device 228 may be disposed on the second vertical plate 214. The filter-drive device 228 may be disposed at each of both side ends of the second vertical plate 214.

Figure 32:
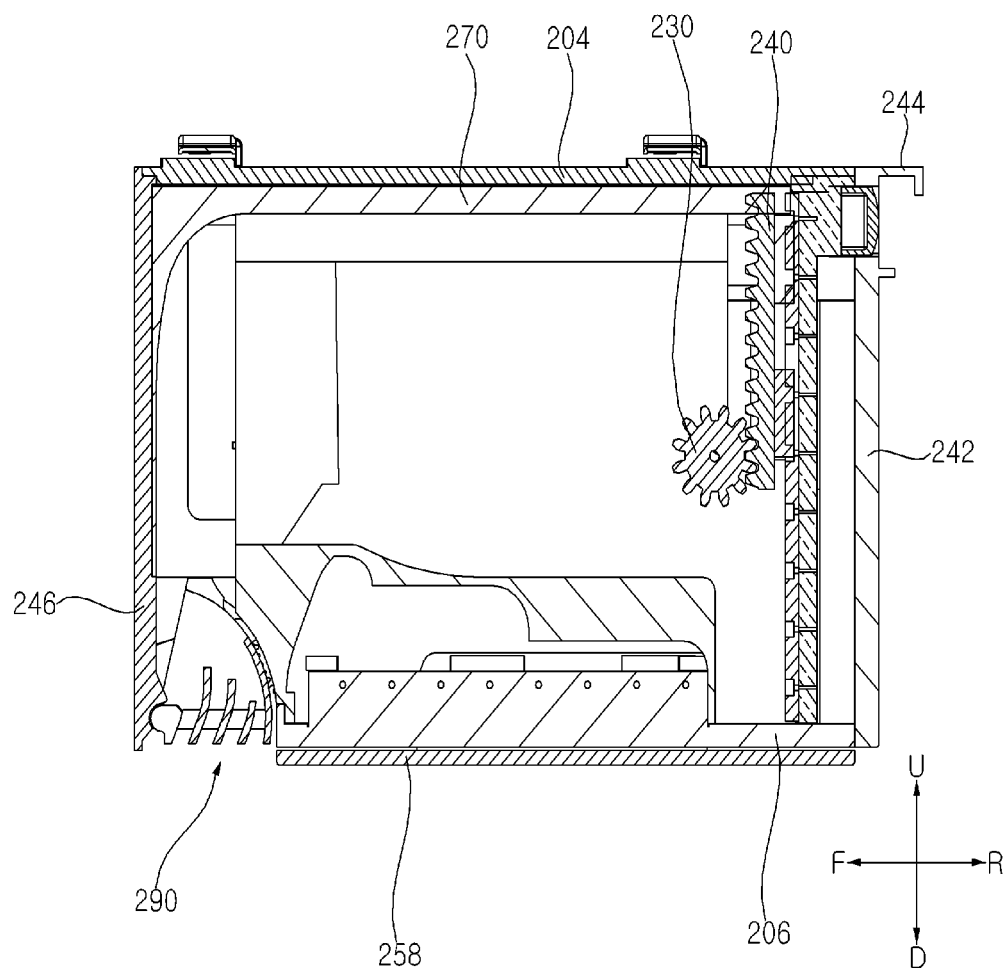
FIG. 32 is a cross-sectional view taken along line XXXII-XXXII' in FIG. 21.

Referring to FIGS. 32 and 33A, the filter-drive device 228 may include a filter-drive gear 230, which meshes with the body gear 240 and rotates together therewith, and a filter-drive motor 232, which rotates the filter-drive gear 230. The filter-drive gear 230 may be implemented as, for example, a spur gear. The filter-drive gear 230 and the filter-drive motor 232 may be fixedly disposed on the second vertical plate 214.

The second air-processing apparatus 200 may include second louver 250, which is rotatably disposed in the second outlet 202b in order to adjust a direction of air that is discharged from the second outlet 202b, and a second louver-drive device 294, which adjusts an orientation of the second louver 290.

The second louver 290 and the second louver-drive device 294 may have the same structures and perform the same functions as the first louver 150 and the first louver actuator 174 of the first air-processing apparatus 100 described above. Therefore, the description of the first louver 150 and the first louver actuator 174 of the first air-processing apparatus 100 may apply to the second louver 290 and the second louver-drive device 294.

Hereinafter, movement of the second bottom cover 258, the filter-mount 234, and the filter device 284 will be described with reference to FIGS. 33A to 35C.

Referring to FIGS. 33A and 33B, the second bottom cover 258 is disposed below the filter device 284. Accordingly, a lower side of the second louver 270 may be opened, and thus, the orientation of the second louver 270 may be changed. The filter device 284 and the filter-mount 234 that moves the filter device 284 are disposed above the second bottom cover 258.

Figure 34A:
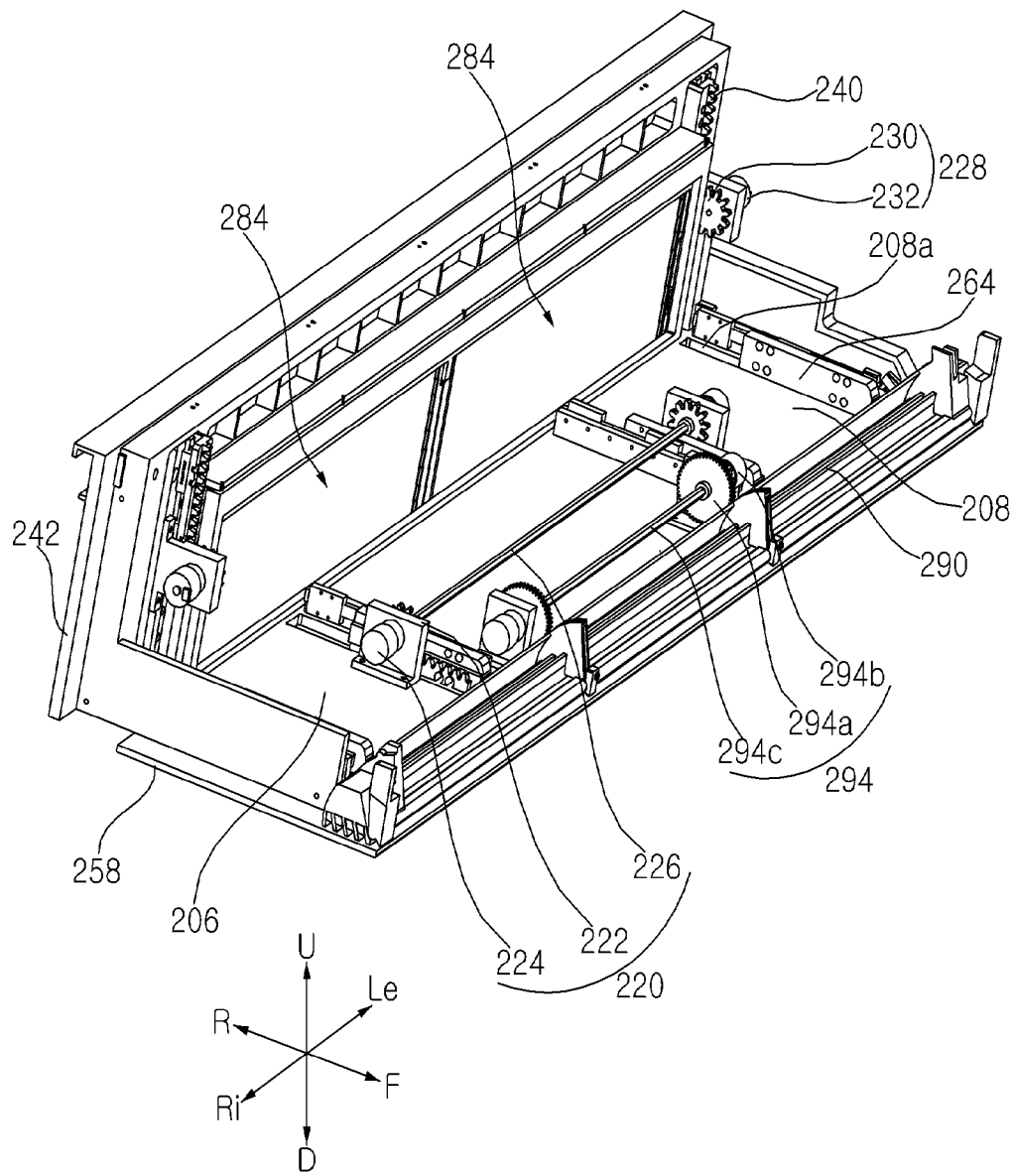
FIG. 34A is a perspective view for explaining an arrangement of the second bottom cover, the filter-mount, and the filter device in the state in which the second bottom cover is located at a front position.
Figure 34B:
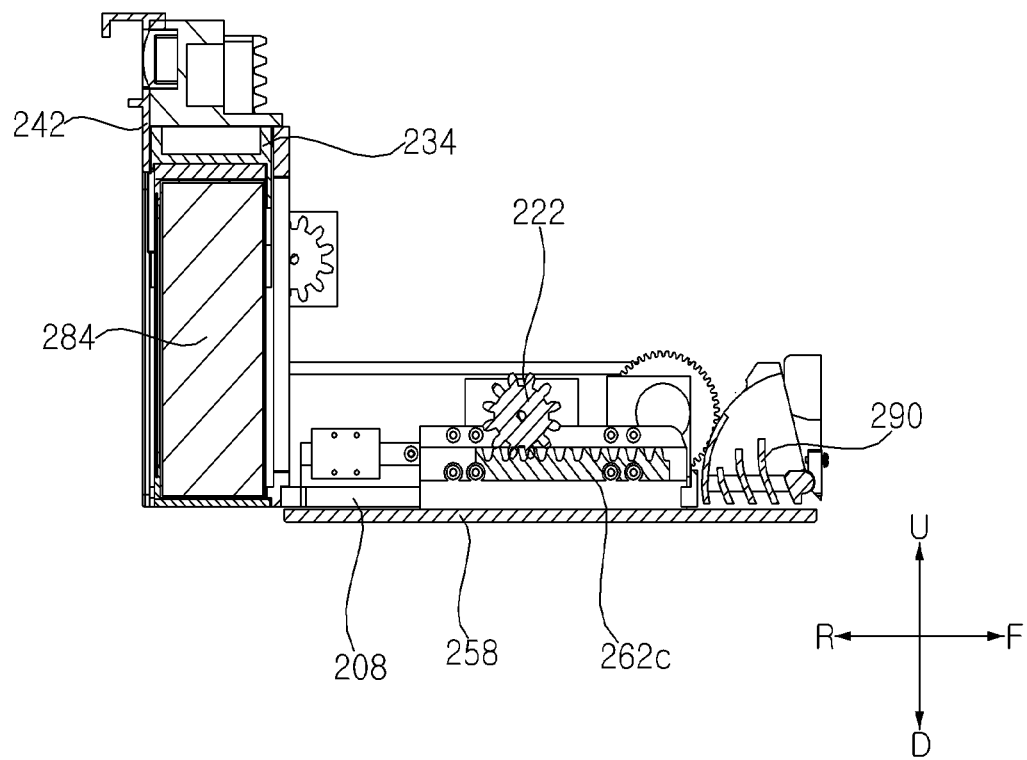
FIG. 34B is a cross-sectional view of the arrangement of FIG. 34A.

Referring to FIGS. 34A and 34B, the second bottom cover 258 may be moved forwards, and may be disposed below the second outlet 202b. The second bottom cover 258 may be moved forwards by the operation of the cover-drive device 220.

Referring to FIG. 34B, when the second bottom cover 258 is moved forwards, a region below the filter device 284 is opened. Referring to FIG. 34B, when the second bottom cover 258 is moved forwards, a lower side of the second outlet 202b is blocked. Accordingly, rotation of the second louver 270 is restricted.

Figure 35A:
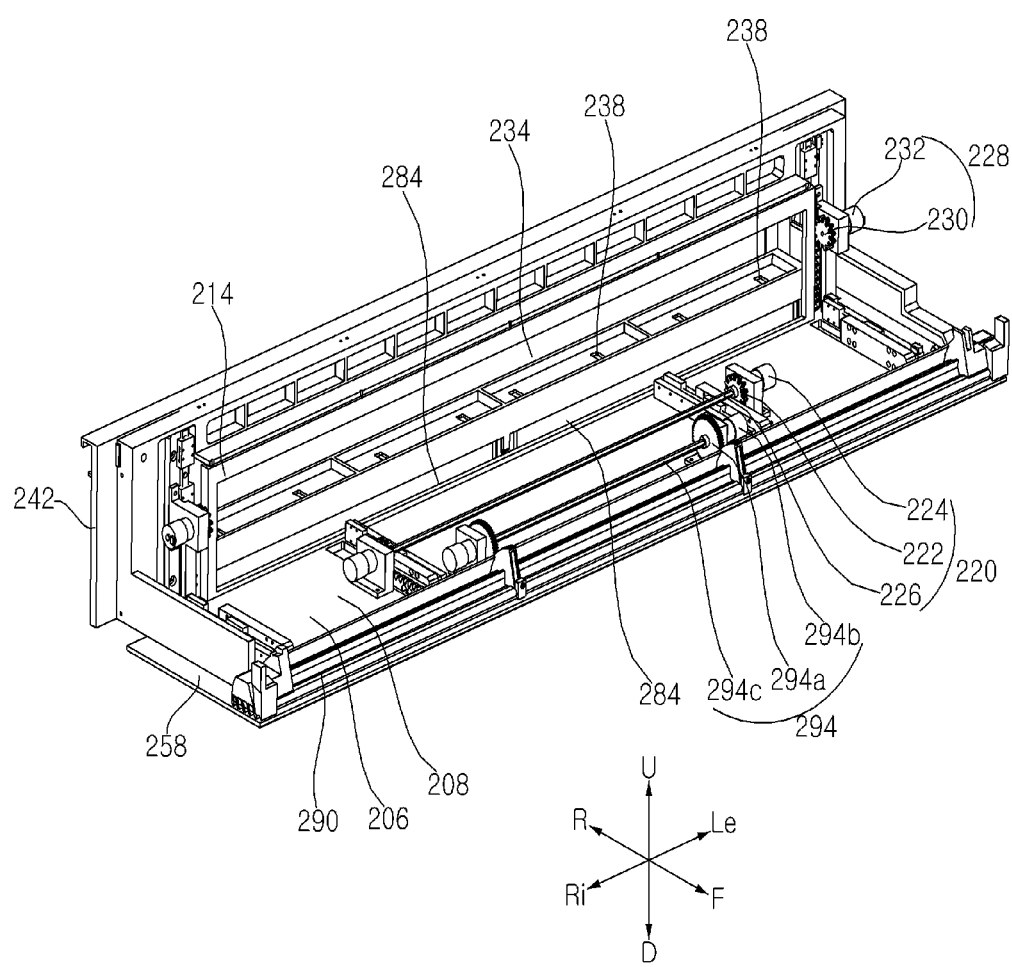
FIG. 35A is a perspective view for explaining an arrangement of the second bottom cover, the filter-mount, and the filter device in the state in which the second bottom cover is located at a front position and the filter-mount is moved downwards.
Figure 35B:
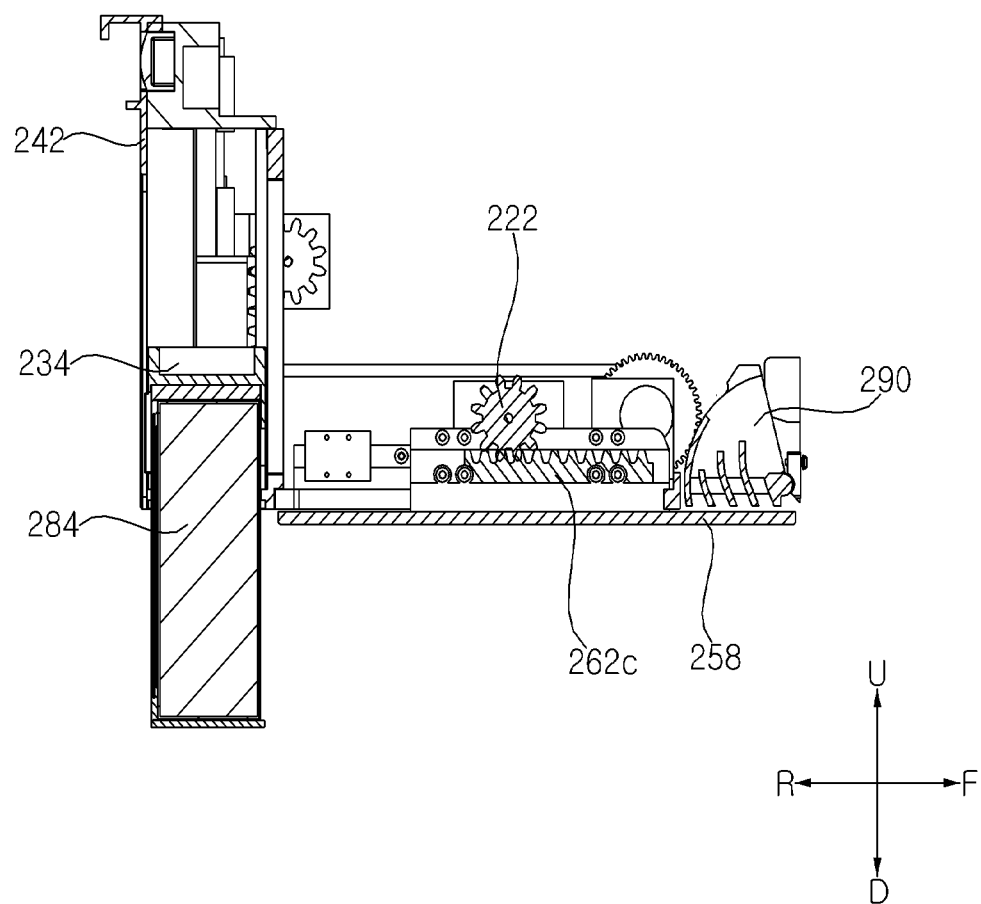
FIG. 35B is a cross-sectional view of the arrangement of FIG. 35A.
Figure 35C:
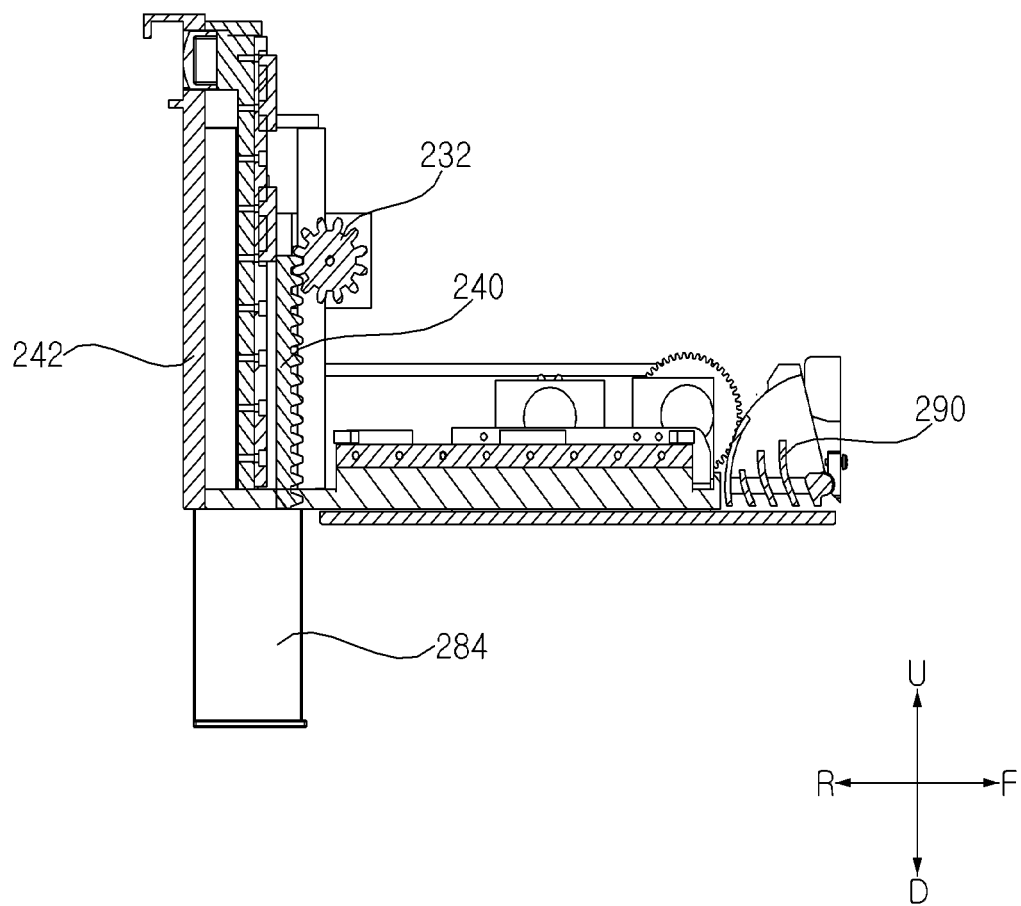
FIG. 35C is a cross-sectional view of the arrangement of FIG. 35A when viewed from a direction different from that of FIG. 35A.

Referring to FIGS. 35A to 35C, in a state in which the second bottom cover 258 is moved forwards, the filter device 284 and the filter-mount 234 may be moved downwards. The filter-mount 234 may be moved downwards by the filter-drive device 228.

The coupled state of the filter-mount 234 and the filter device 284 may be maintained by the first magnet 287 and the second magnet 238. Accordingly, when the filter-mount 234 is moved downwards, the filter device 284 is also moved downwards. When the filter device 284 is moved downwards by the filter-mount 234, a user may easily separate the filter device 284 from the filter-mount 234.

Filter cleaner 300 according to embodiments may clean pre-filter 188 disposed in a case of an air-processing apparatus that adjusts a temperature of air or an air-processing apparatus that purifies air. The air-processing apparatus may include first air-processing apparatus 100 that adjusts a temperature of air to be discharged and second air-processing apparatus 200 that removes foreign substances from the air to be discharged. Hereinafter, embodiments will be described with reference to first air-processing apparatus 100 (hereinafter referred to as an "air-processing apparatus"). The following description of the air-processing apparatus 100 may also apply to the second air-processing apparatus.

Figure 3:
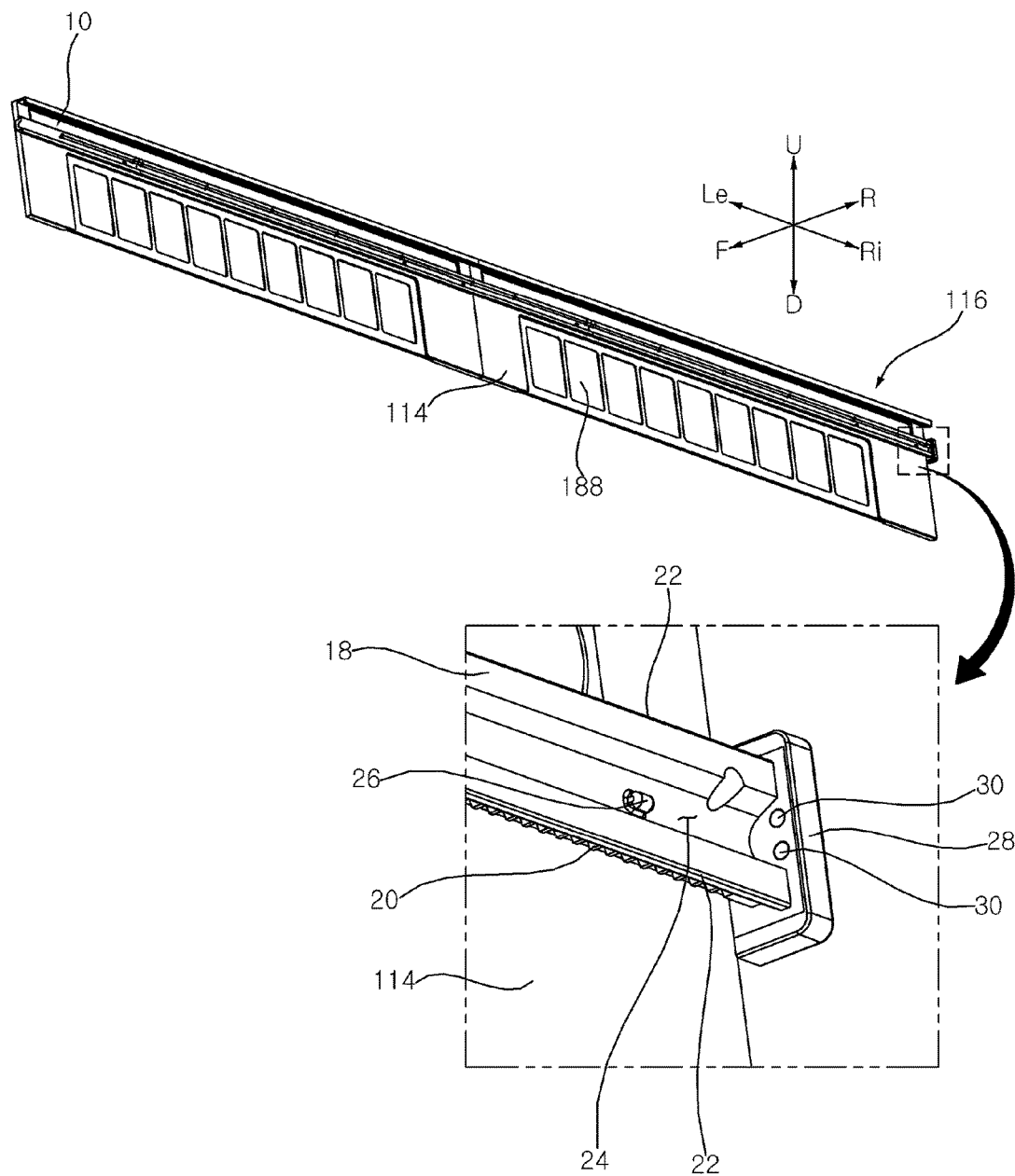
FIG. 3 is a perspective view showing a first air-processing apparatus, a second air-processing apparatus, and a guide rail disposed behind these apparatuses according to an embodiment.
Figure 4:
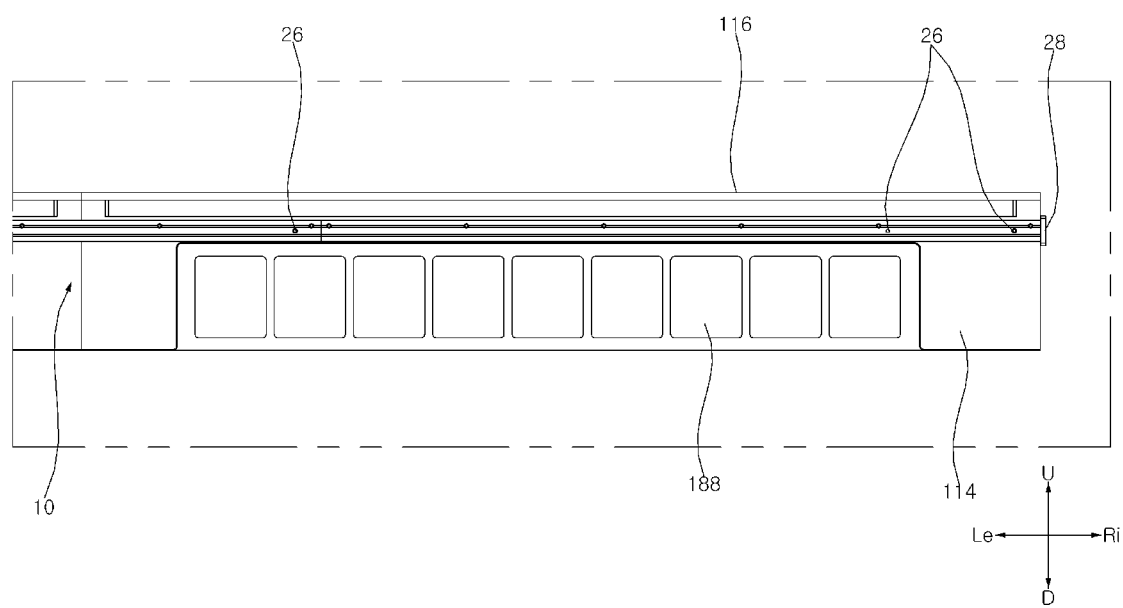
FIG. 4 is a rear view of the first air-processing apparatus, the second air-processing apparatus, and the guide rail of FIG. 3.
Figure 36:
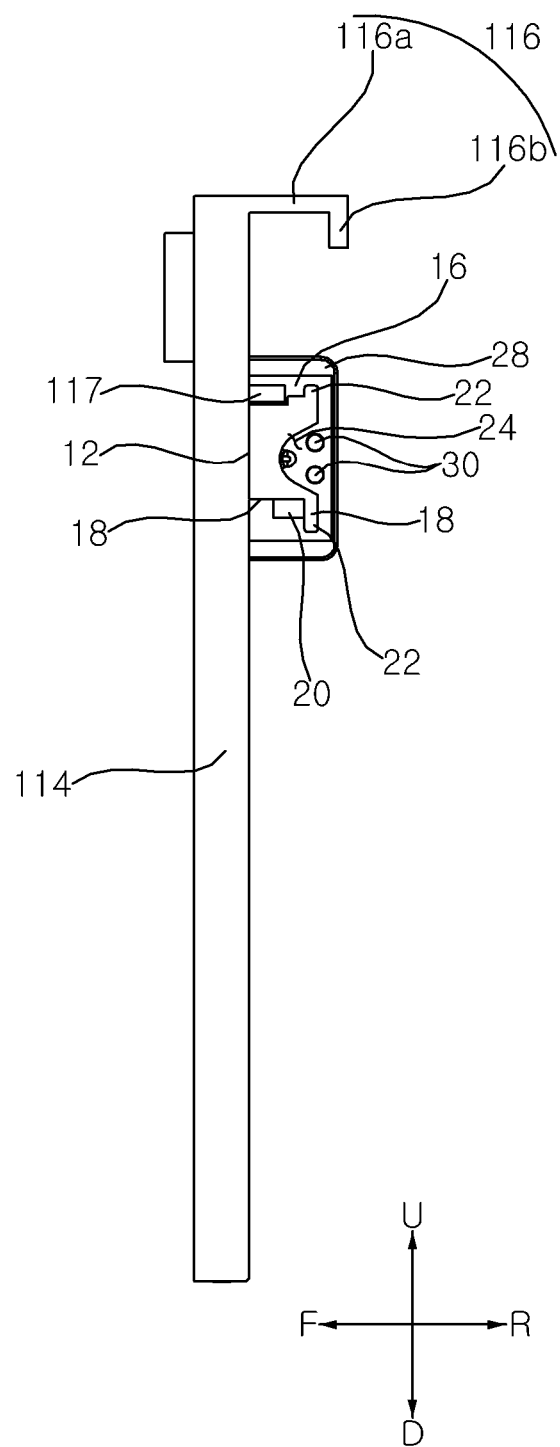
FIG. 36 is a side view of the first air-processing apparatus, the second air-processing apparatus, and the guide rail of FIG. 4.

Referring to FIGS. 36, 3, and 4, the guide rail 10 may include gear rail 20, which has threads to be engaged with a moving gear 358 of the filter cleaner 300, and roller rail 22, which is in contact with guide rollers 308a and 308b of the filter cleaner 300. Referring to FIG. 36, the roller rail 22 is disposed at each of the upper and lower ends of a rear surface 18 of the guide rail 10. The roller rail 22 may be disposed behind the gear rail 20. The roller rail 22 may be disposed at each of an upper side and a lower side of the guide rail 10. The roller rail 22 may have a rib structure that protrudes from the rear end of the guide rail 10 in the upward-downward direction. The roller rail 22 may protrude downwards further than the threads of the gear rail 20.

The gear rail 20 may be disposed in front of the roller rail 22. The gear rail 20 may be formed on a lower surface of the guide rail 10. The gear rail 20 may have the shape of a rack gear. In addition, the moving gear 358, which is engaged with the gear rail 20, may have a shape of a pinion gear. When viewed from the rear, the guide rail 10 may have a structure in which the gear rail 20 is shielded by the roller rail 22.

Referring to FIG. 36, front surface 12 of the guide rail 10, which faces the rear cover 114, and upper surface 16 of the guide rail 10, which faces the rail-fixing protrusion 117, may be in contact with the rear cover 114. The rail groove 24 may be formed in the rear surface 18 of the guide rail 10.

The rail groove 24 may have a shape that is recessed in the forward direction, and extends in the lateral direction. The object to be sensed 26 may be disposed in the rail groove 24. Referring to FIG. 6, a plurality of the object to be sensed may be provided, and the plurality of objects to be sensed 26 may be disposed so as to be spaced apart from each other in the lateral direction. A position detection sensor 322 may be disposed at the filter cleaner 300, and when the position detection sensor 322 senses the object to be sensed 26, a position of the filter cleaner 300 may be detected.

The object to be sensed 26 may correspond the position detection sensor 322. For example, when the position detection sensor 322 is a switch sensor, the object to be sensed 26 may have the shape of a protrusion that protrudes rearwards. Alternatively, when the position detection sensor 322 is a Hall sensor, the object to be sensed 26 may be implemented as a magnet.

Referring to FIGS. 4 to 6, the end plate 28 configured to limit movement of the filter cleaner 300 in one direction may be disposed at the left end or the right end of the guide rail 10. The end plate 28 is disposed in the direction perpendicular to the direction in which the guide rail 10 extends. The end plate 28 may protrude rearwards from the rear cover 114.

The end plate 28 may be provided with the charging terminal 30, with which the connection terminal 320 of the filter cleaner 300 is brought into contact. The charging terminal 30 may protrude from the end plate 28 in the direction in which the guide rail 10 extends. Accordingly, when the filter cleaner 300 reaches the end plate 28, the connection terminal 320 of the filter cleaner 300 may be brought into contact with and connected to the charging terminal 30.

The filter cleaner 300 may be disposed at a rear side of the air-processing apparatus 100 so as to be movable in the lateral direction. The filter cleaner 300 may move in the lateral direction along the guide rail 10 disposed on the rear cover 114. The filter cleaner 300 may remove foreign substances adhered to the pre-filter 188.

Figure 41:
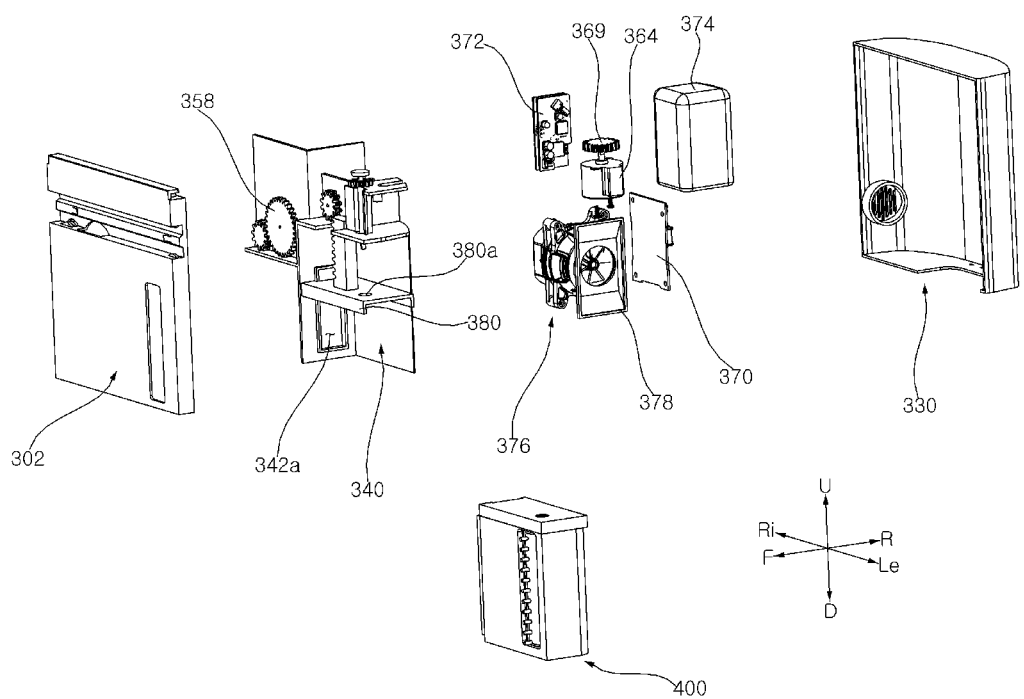
FIG. 41 is an exploded perspective view of the filter cleaner of FIG. 37.
Figure 42:
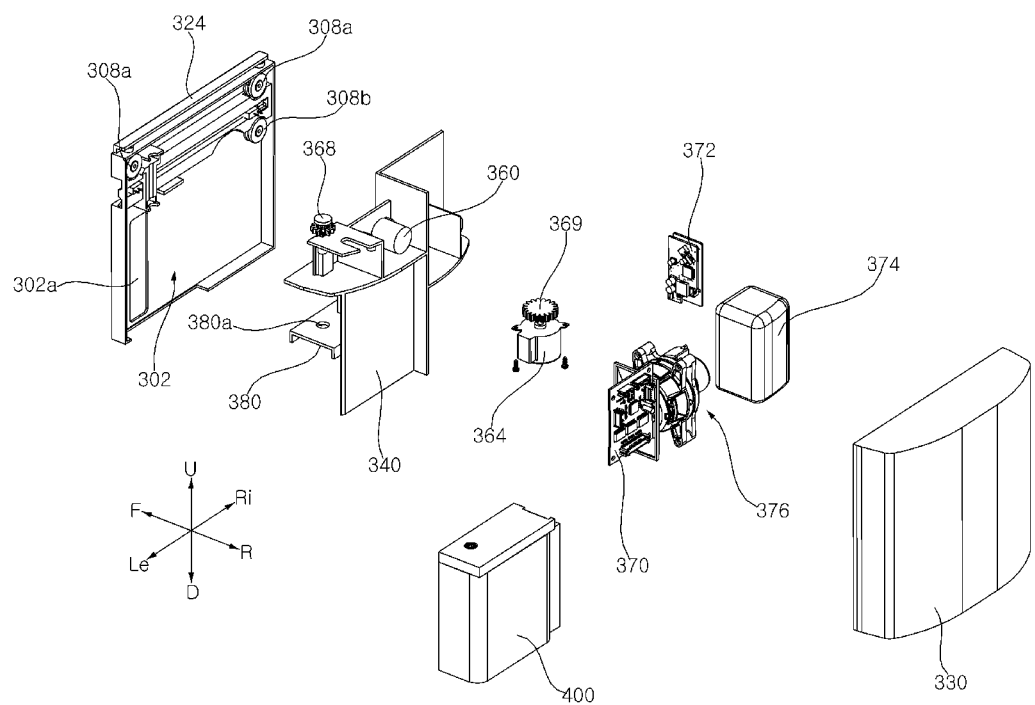
FIG. 42 is an exploded perspective view of the filter cleaner of FIG. 37 when viewed from a direction different from that of FIG. 41.

Referring to FIGS. 41 and 42, the filter cleaner 300 may include housings 302 and 330, which define an external appearance of the filter cleaner 300, moving gear 358, which may be rotatably disposed inside of the housings 302 and 330 in order to move the housings 302 and 330, a gear motor 356, which may be disposed inside of the housings 302 and 330 in order to rotate the moving gear 358, guide rollers 308a and 308b, which may be rotatably disposed inside the housings 302 and 330 in order to guide movement of the housings 302 and 330, a dust container device 400, which receives foreign substances removed from the pre-filter 188, and a suction device 376, which forms the flow of air to the dust container device 400.

The dust container device 400 may include a dust container housing 402 and an agitator 420 (refer to FIG. 49), which removes foreign substances from the pre-filter 188 by contacting the same. The dust container device 400 will be described hereinafter.

Referring to FIGS. 41 and 42, the filter cleaner 300 may include a partition wall 340, which is disposed inside of the housings 302 and 330 in order to partition an inner space in the housings 302 and 330, and a dust container guide 380, which is movably disposed on the partition wall 340 in order to displace the dust container device 400.

Referring to FIGS. 41 and 42, the housings 302 and 330 define the external appearance of the filter cleaner 300. The housings 302 and 330 may include a first housing 302, which may be disposed so as to face the rear cover 114 when the filter cleaner 300 is mounted to the guide rail 10, and second housing 330, which may be disposed at a rear side of the first housing 302 in order to cover the same.

Figure 37:
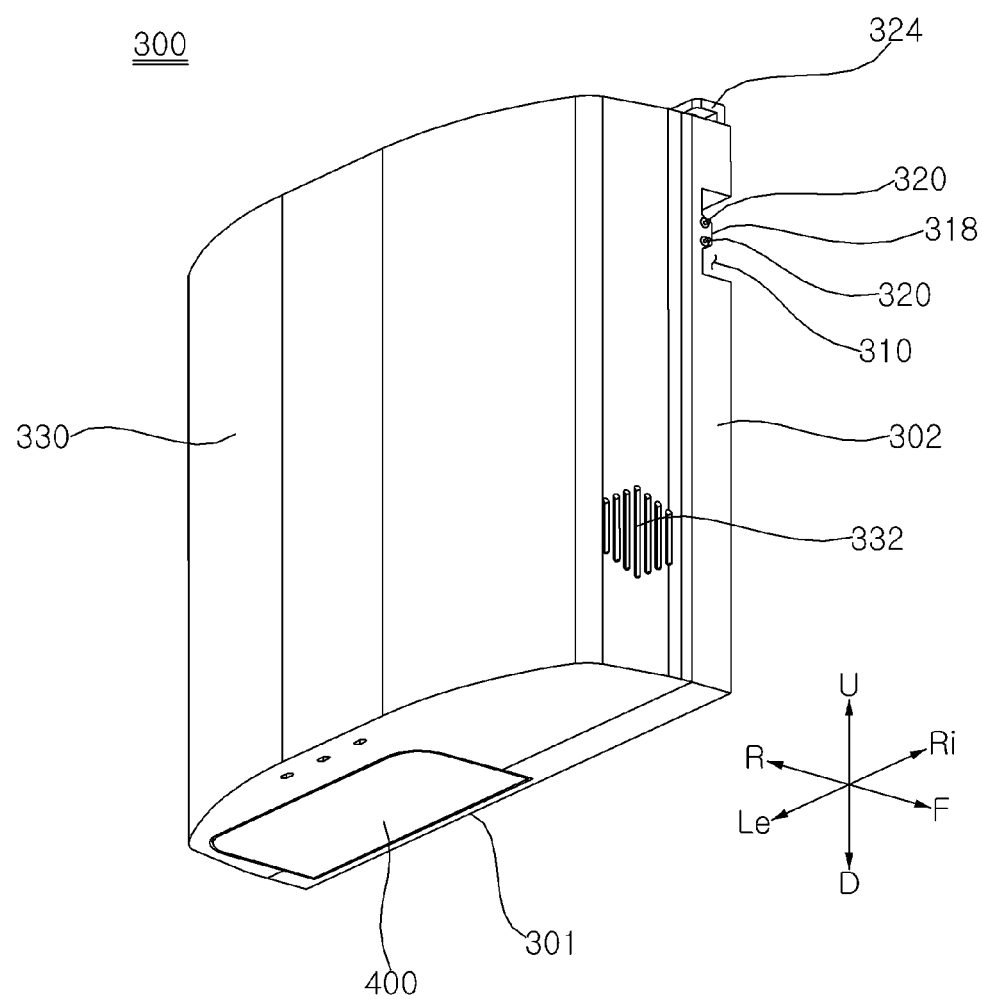
FIG. 37 is a perspective view of a filter cleaner according to an embodiment.

Referring to FIG. 37, the housings 302 and 330 have a dust container hole 301 formed in lower surfaces thereof to allow the dust container device 400 to be withdrawn therefrom or inserted thereinto. The first housing 302 may have a shape of a plate that extends parallel to the pre-filter 188. When the filter cleaner 300 moves in a region behind the pre-filter 188, the first housing 302 may be maintained at a constant interval behind the pre-filter 188.

Figure 43:
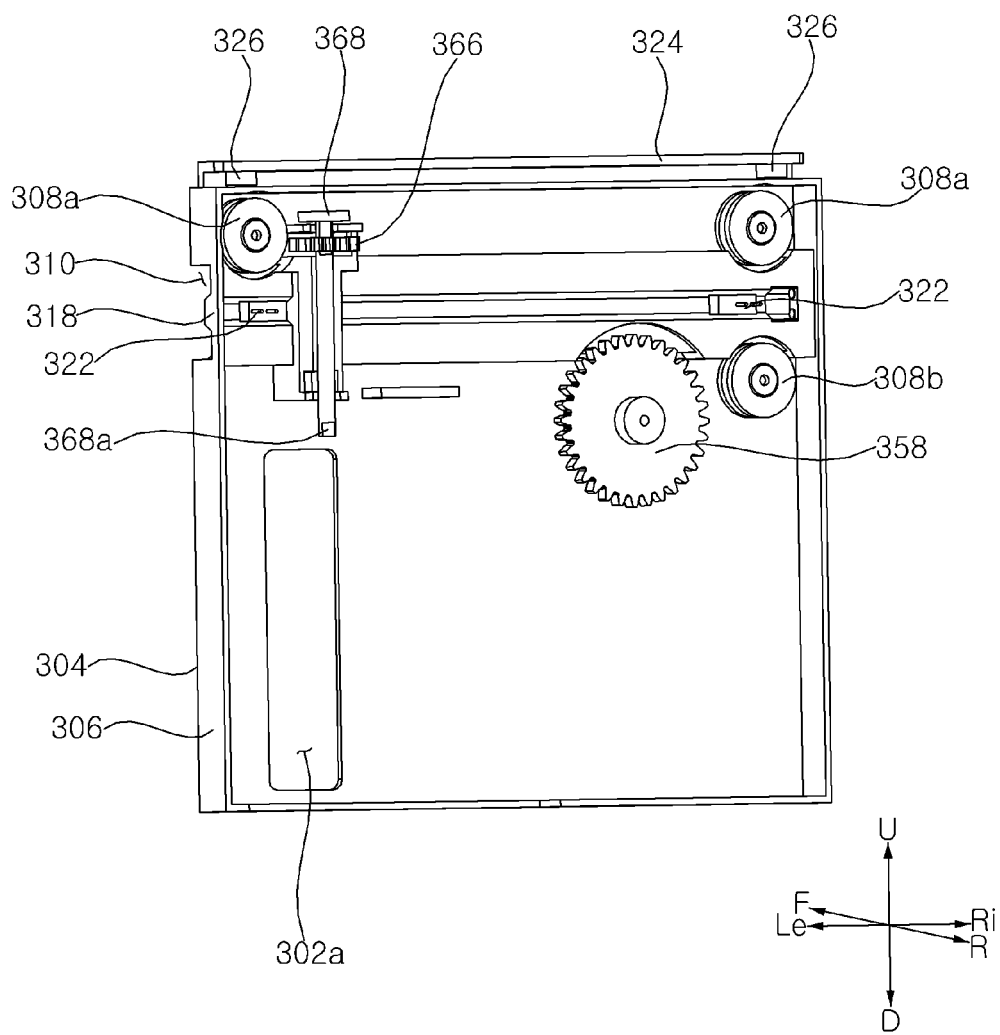
FIG. 43 is a perspective view of a first housing and components disposed inside of the first housing according to an embodiment.
Figure 44:
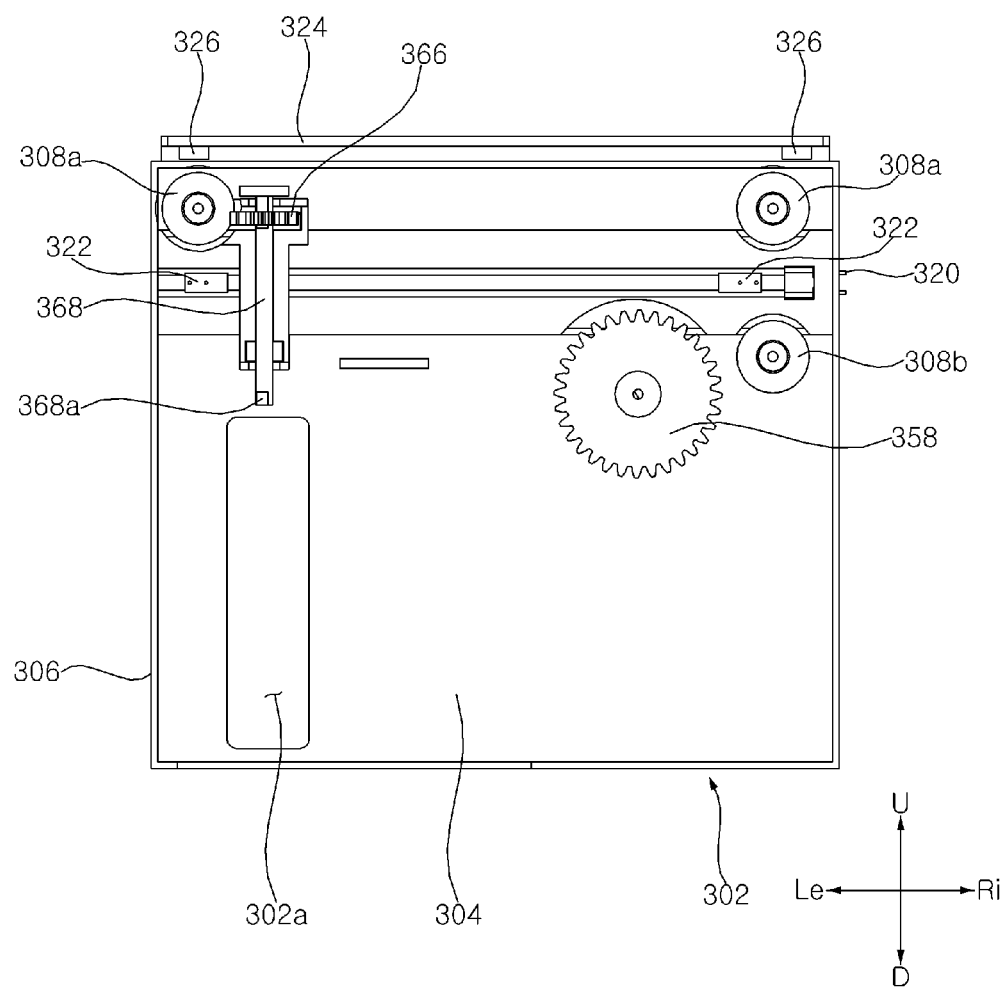
FIG. 44 is a rear view of the first housing of FIG. 43.

Referring to FIG. 43, the first housing 302 may include a base plate 304, which has a shape of a plate that may be parallel to the pre-filter 188, and a guide groove 310, which is formed in the base plate 304 so as to be recessed rearwards in order to provide a space in which the guide rail 10 may be disposed.

Referring to FIG. 43, the base plate 304 may include a suction hole 302a formed therein to introduce foreign substances into the dust container device 400 therethrough. The agitator 420 may be disposed at a position corresponding to the suction hole 302a. The suction hole 302a may have a size corresponding to a size of the pre-filter 188 disposed on the rear cover 114. That is, a height of the suction hole 302a in the upward-downward direction may correspond to a height of the pre-filter 188 in the upward-downward direction.

Figure 45:
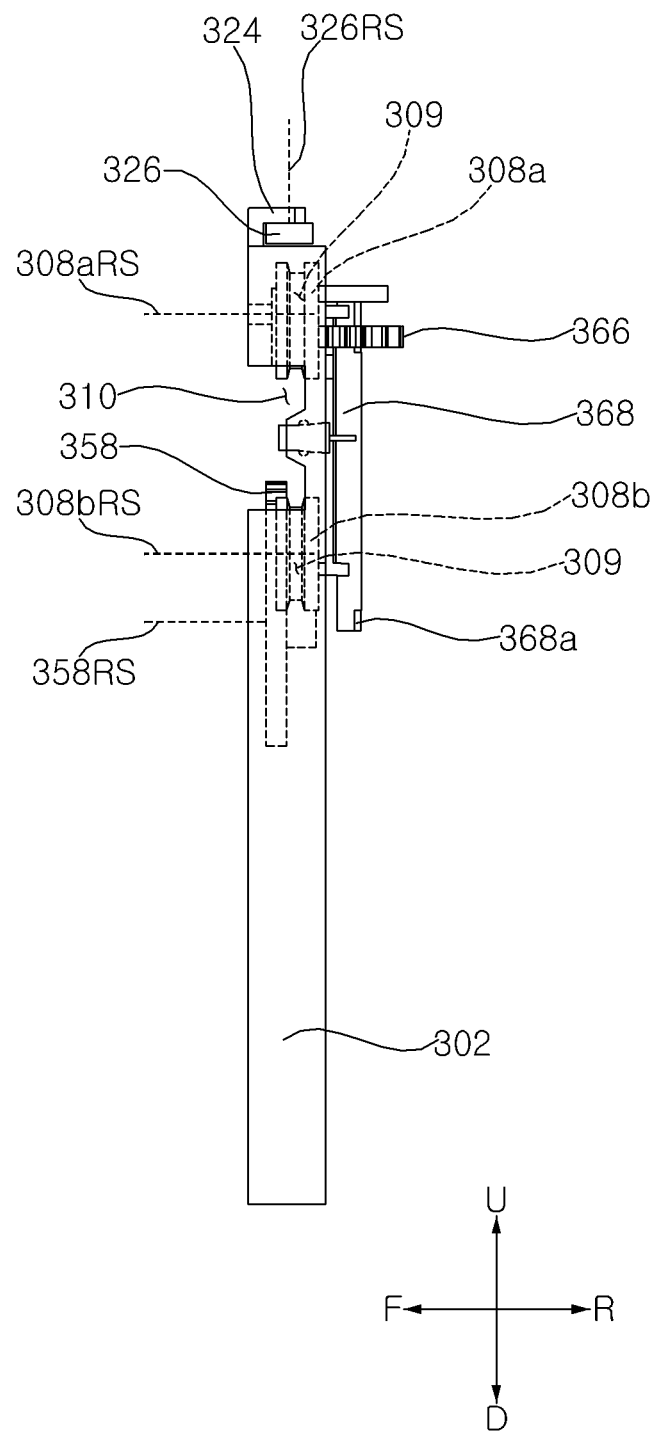
FIG. 45 is a side view of the first housing of FIG. 43.

Referring to FIG. 45, the first housing 302 may include a peripheral wall 306, which extends rearwards from a periphery of the base plate 304, and a top wall 324, which is bent and extends rearwards from an upper end of the base plate 304. The top wall 324 may be spaced upwards apart from the peripheral wall 306. The support (top) roller 326, which is in contact with the support rail 116 of the rear cover 114, may be disposed on the top wall 324.

Referring to FIG. 45, the support roller 326 may rotate about a rotational axis 326RS that extends in the upward-downward direction. The rotational axis 326RS of the support roller 326 may extend perpendicular to the rotational axes 308aRS and 308bRS of the guide rollers 308a and 308b. The rotational axis 326RS of the support roller 326 may extend perpendicular to the rotational axis 358RS of the moving gear 358. The support roller 326 may be in contact with the bent portion 116b of the support rail 116, thereby supporting displacement of the filter cleaner 300.

Figure 39:
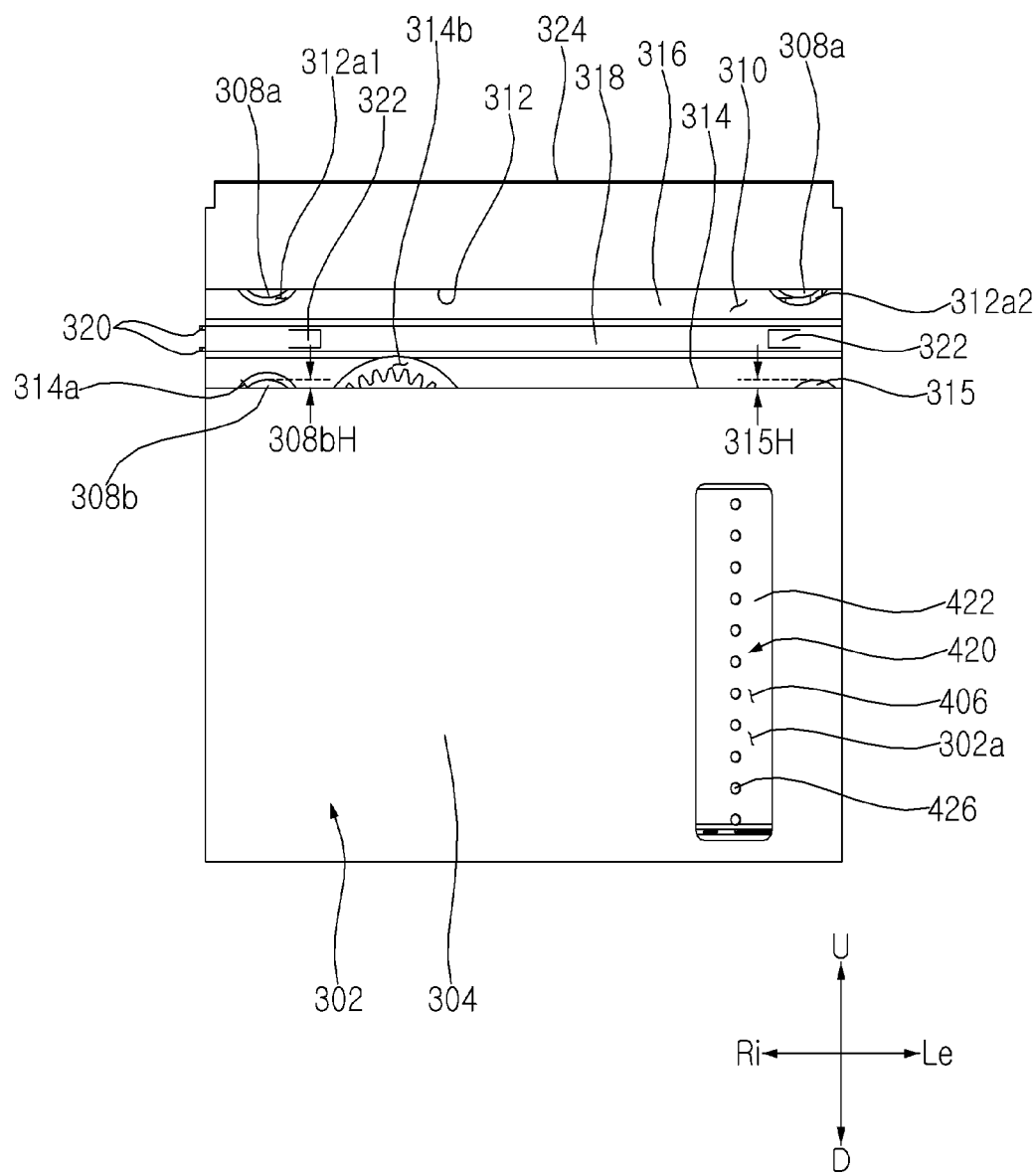
FIG. 39 is a front view of the filter cleaner of FIG. 37.
Figure 40:
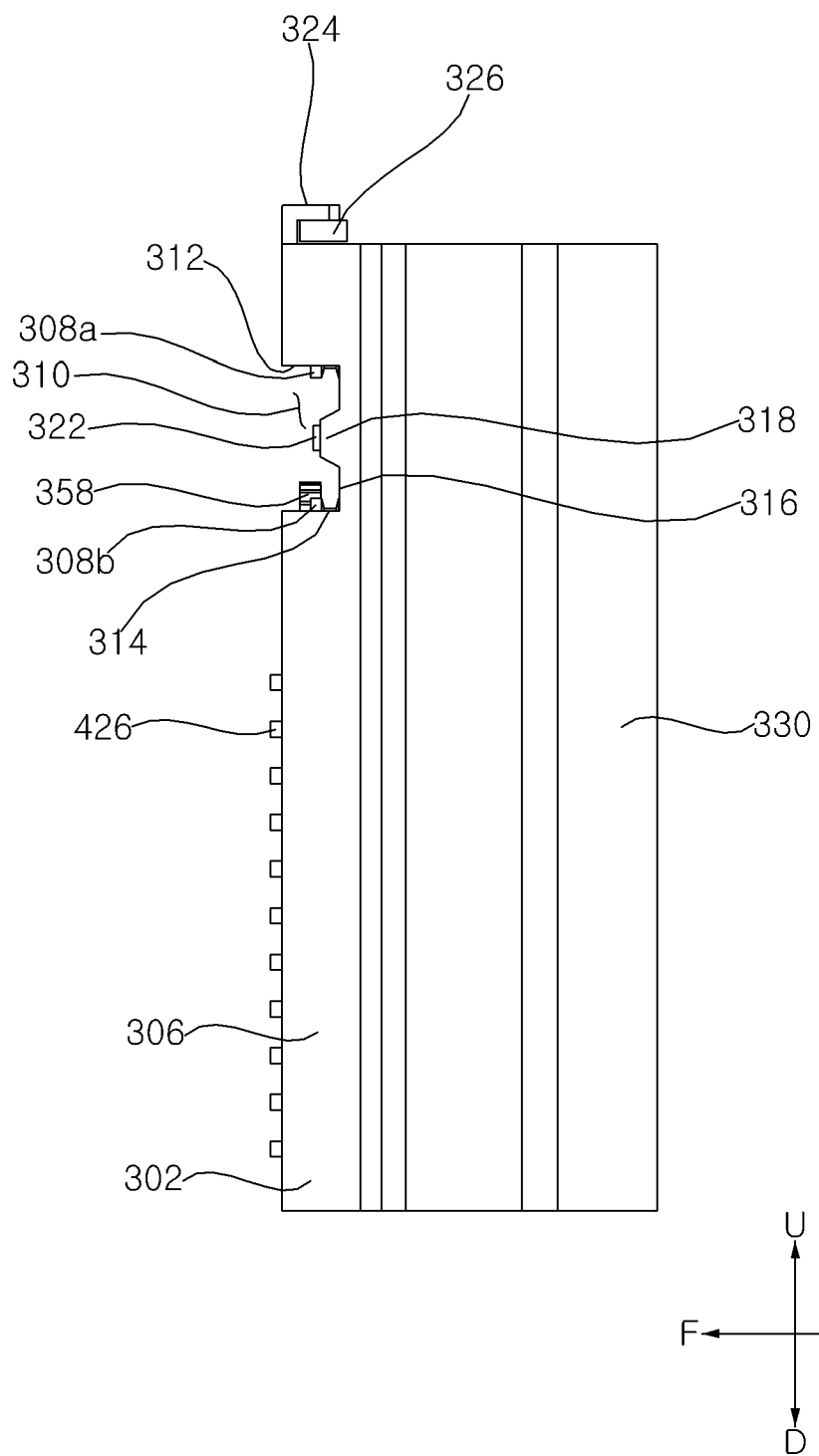
FIG. 40 is a side view of the filter cleaner of FIG. 37.

Referring to FIGS. 39 and 40, the guide groove 310 may be defined by an upper wall 312, a lower wall 314, and an inner wall 316. The upper wall 312 may cover an upper portion of the guide groove 310. The upper wall 312 may include therein upper roller holes 312a1 and 312a2, through which portions of the guide rollers 308a may pass. According to one embodiment, two upper roller holes 312a1 and 312a2 may be disposed in the upper wall 312 so as to be spaced apart from each other in the lateral direction.

The upper roller holes 312a1 and 312a2 may include first upper roller hole 312a1, and second upper roller hole 312a2, which is spaced apart from the first upper roller hole 312a1 in the lateral direction. Referring to FIG. 39, the first upper roller hole 312a1 may be disposed above a lower roller hole 314a, and the second upper roller hole 312a2 may be disposed above a support protrusion 315.

The lower wall 314 may cover a lower portion of the guide groove 310. The lower wall 314 may include therein a lower roller hole 314a, through which a portion of the guide roller 308b passes, and a gear hole 314b, through which a portion of the moving gear 358 passes. The lower wall 314 may be provided with a support protrusion 315 that protrudes upwards toward the guide rail 10.

Referring to FIG. 39, the support protrusion 315 may be spaced apart from the lower roller hole 314a in the lateral direction. The support protrusion 315 may be disposed above the dust container device 400. The gear hole 314b may be formed between the support protrusion 315 and the lower roller hole 314a. Referring to FIG. 39, a height 315H by which the support protrusion 315 protrudes upwards from the lower wall 314 may be lower than a height 308bH by which the guide roller 308b protrudes from the lower wall 314.

The inner wall 316 may interconnect a rear end of the lower wall 314 and a rear end of the upper wall 312.

Referring to FIG. 40, the inner wall 316 may be provided with a protruding portion 318 protruding forwards. The protruding portion 318 may extend in the lateral direction along the inner wall 316. The position detection sensor 322 may be disposed on the protruding portion 318 in order to detect the position of the filter cleaner 300. The position detection sensor 322 may be implemented as a switch sensor or a Hall sensor. The position detection sensor 322 may react with the object to be sensed 26 disposed on the guide rail 10, thereby detecting the position of the filter cleaner 300.

Figure 38:
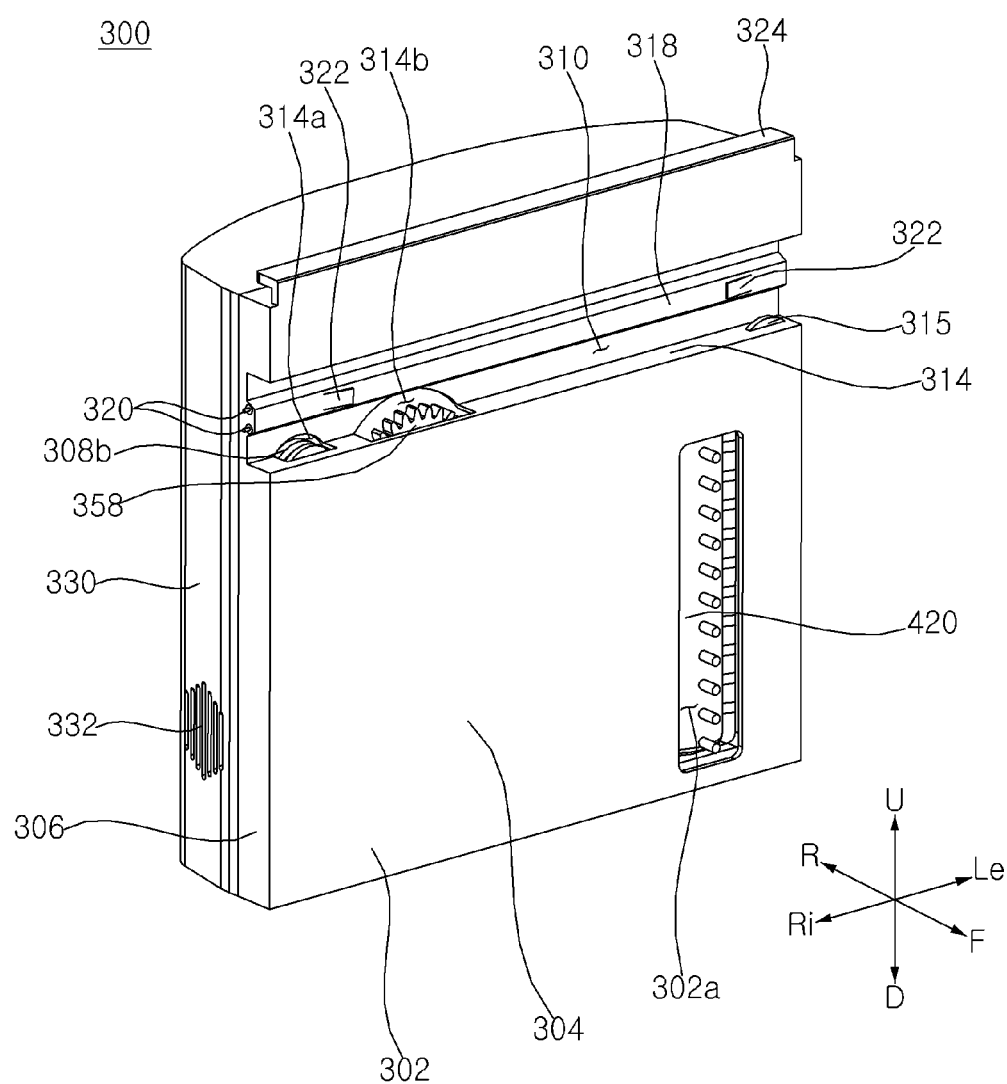
FIG. 38 is a perspective view of the filter cleaner when viewed from a direction different from that of FIG. 37.

Referring to FIG. 38, the connection terminal 320 may protrude from one lateral end of the protruding portion 318. The connection terminal 320 may protrude toward the end plate 28. When the connection terminal 320 is brought into contact with the charging terminal 30 of the end plate 28, power may be supplied to a battery 374 disposed inside of the housings 302 and 330.

Referring to FIG. 39, the guide rollers 308a and 308b may be disposed in the first housing 302 so as to rotate in contact with the roller rail 22 of the guide rail 10 and to guide the movement of the filter cleaner 300. The guide rollers 308a and 308b may be disposed in the guide groove 310 in the upward-downward direction. The guide rollers 308a and 308b may be disposed such that portions thereof protrude into the guide groove 310. The guide rollers 308a and 308b may be disposed inside of the first housing 302.

The guide rollers 308a and 308b may include upper rollers 308a disposed at an upper side of the guide groove 310 and a lower roller 308b disposed at a lower side of the guide groove 310. Referring to FIG. 45, each of the guide rollers 308a and 308b may include a groove 309 formed concavely in the circumferential surface thereof in the circumferential direction. The roller rail 22 of the guide rail 10 may be inserted into the groove 309 formed in each of the guide rollers 308a and 308b. As the roller rail 22 is inserted into the guide rollers 308a and 308b, the filter cleaner 300 may move stably.

Referring to FIG. 39, the filter cleaner 300 may include two upper rollers 308a and one lower roller 308b. The two upper rollers 308a may be spaced apart from each other in the lateral direction. One of the two upper rollers 308a may be disposed above the lower roller 308b. The support protrusion 315 may be disposed below the other one of the two upper rollers 308a. Referring to FIG. 45, the rotational axes 308aRS and 308bRS of the guide rollers 308a and 308b may extend perpendicular to the rotational axis 326RS of the support roller 326.

The moving gear 358 may be rotatably disposed at the lower side of the guide groove 310. A portion of the moving gear 358 may be disposed in the guide groove 310 through the gear hole 314b formed in the lower wall 314. The moving gear 358 may be rotatably mounted in the first housing 302 or to the partition wall 340 described hereinafter.

Referring to FIG. 45, the moving gear 358 may be disposed at a position further forward than the guide rollers 308a and 308b. The rotational axis of the moving gear 358 may extend parallel to the rotational axes of the guide rollers 308a and 308b.

A space in which an agitator gear 366 and an agitator connection shaft 368, which will be described hereinafter, are rotatably disposed may be formed in the inner surface of the first housing 302.

The partition wall 340 is disposed between the first housing 302 and the second housing 330. The partition wall 340 may include a plurality of partition plates to partition an interior of the housings 302 and 330. The partition wall 340 may be disposed inside of the housings 302 and 330 to increase a rigidity of the housings 302 and 330.

Figure 46:
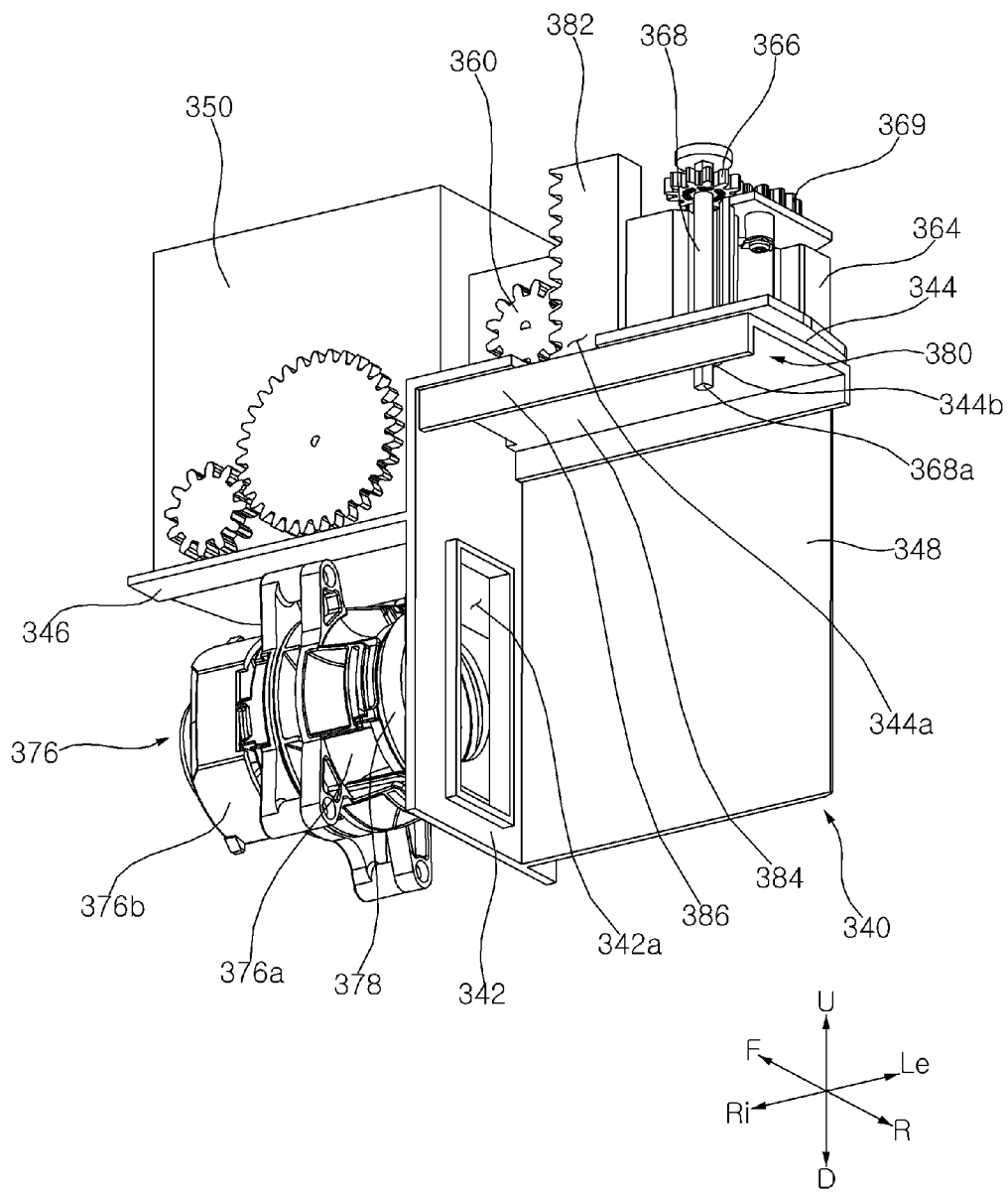
FIG. 46 is a perspective view of partition plates and components disposed on the partition plates according to an embodiment.

Referring to FIG. 46, the partition wall 340 forms a space in which the dust container device 400 may be disposed. The dust container guide 380 that guides movement of the dust container device 400 may be disposed on the partition wall 340. The dust container guide 380 may be displaced in the upward-downward direction by a dust container gear 362 and a dust container motor 360, which may be disposed on the partition wall 340.

The partition wall 340 may isolate the space in which the dust container device 400 is disposed from the space in which the suction device 376 is disposed. The partition wall 340 may isolate the space in which the dust container device 400 is disposed from the space in which the dust container gear 362 that displaces the dust container device 400 is disposed. The partition wall 340 may isolate the space in which the dust container device 400 is disposed from the space in which a first printed circuit board 370 is disposed. The partition wall 340 may isolate the space in which the battery 374 is disposed from the space in which the suction device 376 is disposed. The partition wall 340 may isolate the space in which the battery 374 is disposed from the space in which the moving gear 358 is disposed. The partition wall 340 may isolate the space in which the dust container motor 360 is disposed from the space in which the agitator motor 364 is disposed.

That is, the partition wall 340 may partition the inner space in the housings 302 and 330 into a plurality of regions using a plurality of plates arranged perpendicular to or parallel to each other. More specifically, the partition wall 340 may include a vertical partition 342, which partitions the interior of the housings 302 and 330 in the lateral direction, horizontal partitions 344 and 346, which partition the interior of the housings 302 and 330 in the upward-downward direction, and forward-rearward partitions 348 and 350, which partition the interior of the housings 302 and 330 in the forward-rearward direction.

Referring to FIG. 46, the vertical partition 342 isolates the space in which the suction device 376 is disposed from the space in which the dust container device 400 is disposed. The vertical partition 342 extends in the upward-downward direction inside of the housings 302 and 330. The vertical partition 342 isolates the space in which the battery 374 is disposed from the space in which the dust container device 400 is disposed. The vertical partition 342 isolates the space in which the battery 374 is disposed from the space in which the dust container gear 362 and the agitator gear 366 are disposed. The battery 374 is disposed above the suction device 376. The vertical partition 342 may include therein a communication hole 342a formed at a portion corresponding to the suction device 376, through which the suction device 376 and the dust container device 400 communicate with each other.

Referring to FIG. 46, the horizontal partitions 344 and 346 include a first horizontal partition 344, which may isolate the space in which the dust container device 400 is disposed from the space in which the dust container gear 362 and the agitator gear 366 are disposed, and a second horizontal partition 346, which may isolate the space in which the suction device 376 is disposed from the space in which the battery 374 is disposed. The first horizontal partition 344 may include a shaft hole 344b formed therein to allow the agitator connection shaft 368 to pass therethrough. The first horizontal partition 344 may include a guide hole 344a formed therein to allow some components of the dust container guide 380 to pass therethrough.

Figure 47:
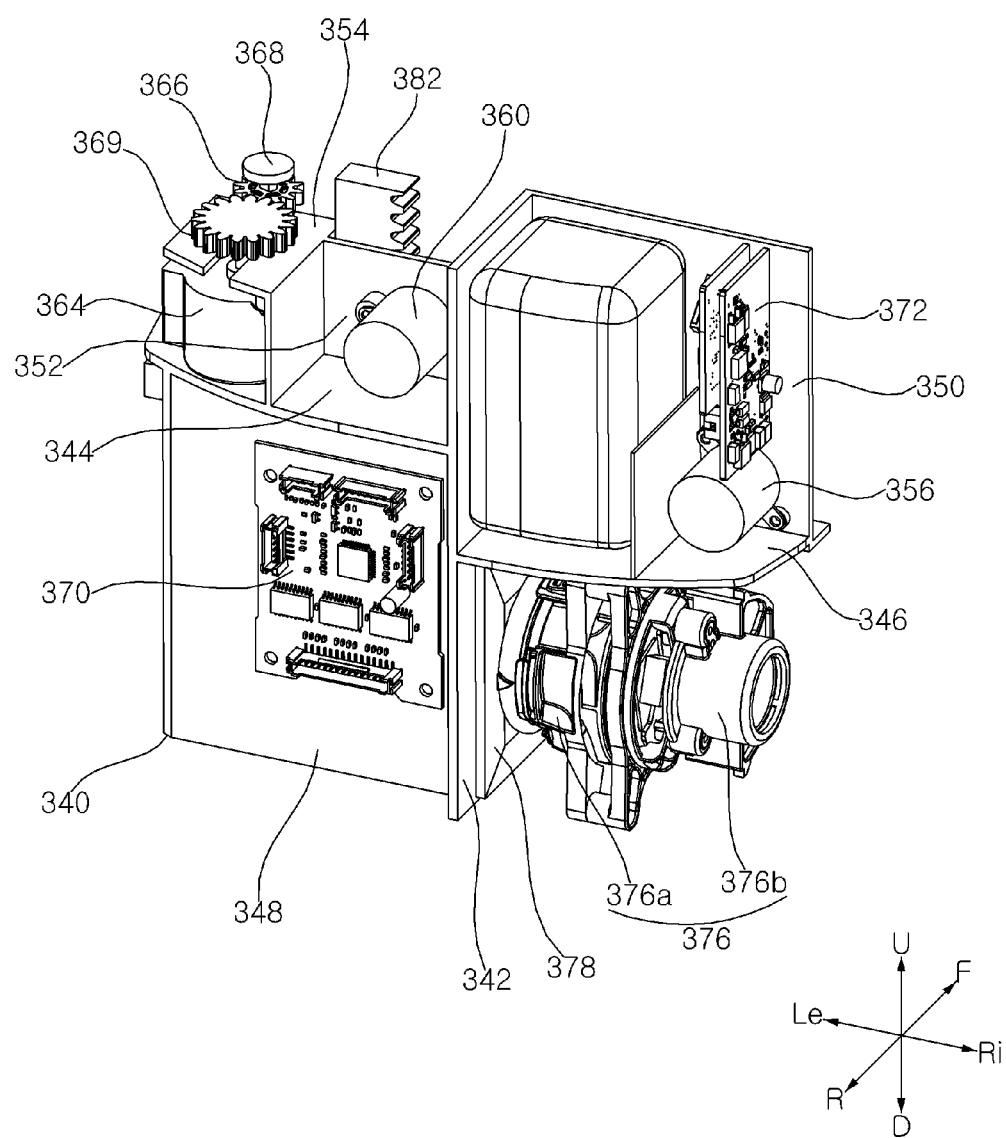
FIG. 47 is a perspective view of the partition plates and components disposed on the partition plates when viewed from a direction different from that of FIG. 46.

Referring to FIGS. 46 and 47, the forward-rearward partitions 348 and 350 include a first forward-rearward partition 348, which may isolate the space in which the dust container device 400 is disposed from the space in which the first printed circuit board 370 is disposed, and a second forward-rearward partition 350, which may isolate the space in which the battery 374 is disposed from the space in which the moving gear 358 is disposed.

Referring to FIG. 47, the partition wall 340 may include a first support plate 352, which may be disposed on the first horizontal partition 344 to support placement of the dust container motor 360, and a second support plate 354, which may be disposed above the first horizontal partition 344 to support placement of the agitator gear 366 and the agitator connection shaft 368.

The dust container device 400 may be disposed below the first horizontal partition 344. The dust container device 400 may be disposed on or at one side of the vertical partition 342.

The dust container guide 380 may be disposed above the dust container device 400. The dust container guide 380 may be connected to the dust container gear 362 to displace the dust container device 400.

Figure 48:
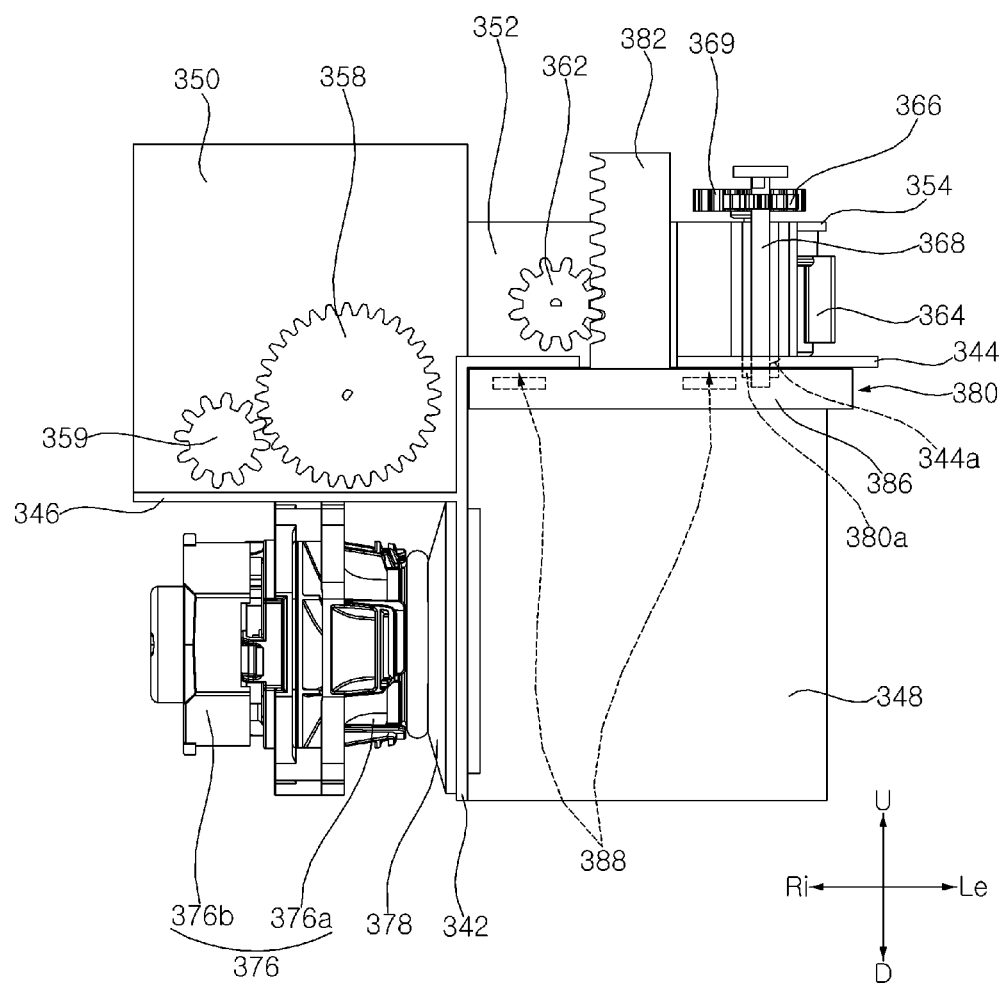
FIG. 48 is a rear view of the partition plates of FIG. 46.

Referring to FIG. 48, the dust container guide 380 may include a guide plate 384, which may be disposed above the dust container device 400, and a guide gear 382, which may extend upwards from the guide plate 384 and be engaged with the dust container gear 362. The guide plate 384 may be disposed below the first horizontal partition 344. A magnet 388 may be disposed on the guide plate 384. Accordingly, when the dust container device 400 is brought into contact with the magnet 388, the dust container device 400 may be secured to the dust container guide 380 by the magnet 388.

Referring to FIG. 46, the dust container guide 380 may include mounting guides 386, which may be bent and extend downwards from a front end and a rear end of the guide plate 384. When the dust container device 400 moves to the guide plate 384, the mounting guides 386 may guide the dust container device 400 to move to a correct position on the guide plate 384.

Referring to FIG. 48, the guide plate 384 may include a connection hole 380a formed therein to allow the agitator connection shaft 368 to pass therethrough. The connection hole 380a may be formed at a position corresponding to the shaft hole 344b formed in the first horizontal partition 344. When the dust container device 400 is mounted in the housings, the shaft hole 344b and the connection hole 380a may be located so as to be aligned with each other.

The guide gear 382 may be disposed through the guide hole 344a formed in the first horizontal partition 344. The guide gear 382 may be implemented as a rack gear. The guide gear 382 meshes with the dust container gear 362. The guide gear 382 may move in the upward-downward direction in response to rotation of the dust container gear 362. Accordingly, when the dust container motor 360 operates, the dust container guide 380 may move in the upward-downward direction. The dust container motor 360 may be disposed above the first horizontal partition 344, and be mounted to the first support plate 352.

The first printed circuit board 370 may be disposed on a rear surface of the first forward-rearward partition 348.

Referring to FIG. 48, the suction device 376 may be disposed below the second horizontal partition 346. The suction device 376 may be disposed on an opposite side of the vertical partition 342. The suction device 376 may include a fan 376a, which causes air to flow, and a fan motor 376b, which rotates the fan 376a. A connection pipe 378 that connects the suction device 376 to the vertical partition 342 may be disposed at one side of the suction device 376. The connection pipe 378 may be fixed to a portion of the vertical partition 342 in which the communication hole 342a is formed, thereby inducing air to flow from the dust container device 400 to the suction device 376.

Referring to FIG. 47, the battery 374 may be disposed above the second horizontal partition 346. The battery 374 may be disposed above the suction device 376. A second printed circuit board 372 and a gear motor 356 that rotates the moving gear 358 may be disposed in the space in which the battery 374 is disposed. The second printed circuit board 372 and the moving gear 358 may be mounted to the second forward-rearward partition 350.

The moving gear 358 and a connection gear 359, which meshes with the moving gear 358 and which is connected to the gear motor 356, may be disposed in front of the second forward-rearward partition 350. The moving gear 358 may have a larger radius than the connection gear 359.

Referring to FIG. 47, the agitator motor 364 and the agitator gear 366 may be disposed above the first horizontal partition 344. The second support plate 354 may be spaced upwards apart from the first horizontal partition 344. The second support plate 354 may be disposed parallel to the first horizontal partition 344. The agitator motor 364 may be disposed below the second support plate 354. The agitator gear 366 and an auxiliary gear 369, which is connected to the agitator motor 364 and meshes with the agitator gear 366, may be disposed above the second support plate 354.

The agitator gear 366 may be fixedly disposed on a circumference of the agitator connection shaft 368. Accordingly, when the agitator gear 366 rotates, the agitator connection shaft 368 also rotates together therewith. The agitator connection shaft 368 may penetrate the second horizontal partition 346. The agitator connection shaft 368 may have a circular-shaped section. However, a lower end of the agitator connection shaft 368 may have an elliptical-shaped or polygonal-shaped section in order to transmit a rotational force to the agitator 420.

Figure 52:
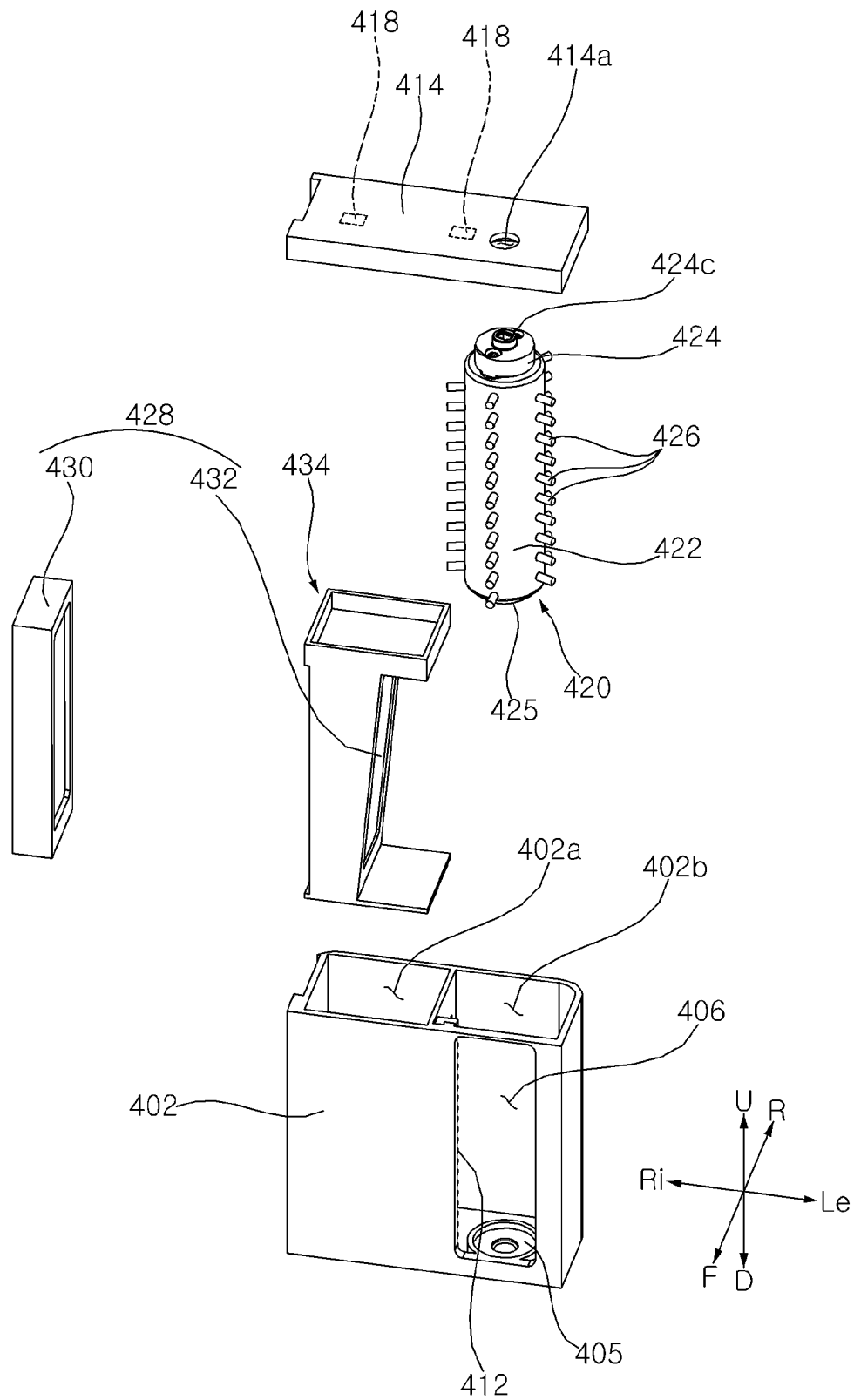
FIG. 52 is an exploded perspective view of the dust container device of FIG. 49.

Referring to FIG. 52, the dust container device 400 may include a storage space 402a, in which foreign substances removed from the pre-filter 188 are stored, the dust container housing 402, which forms an agitator space 402b in which the agitator 420 may be disposed, a dust container cover 414, which covers an open side of the dust container housing 402, the agitator 420, which is rotatably disposed inside of the dust container housing 402, and a dust container filter 428, which is disposed at one side of the dust container housing 402 in order to remove foreign substances from the air discharged from the dust container housing 402. Referring to FIG. 52, the agitator space 402b, in which the agitator 420 is disposed and the storage space 402a in which dust is stored, are formed inside of the dust container housing 402. The dust container housing 402 may have an open upper portion. Accordingly, the agitator 420 or the dust container filter 428 may be withdrawn out of the dust container housing 402 through the open upper portion of the dust container housing 402.

The dust container housing 402 may include an agitator hole 406 formed therein to allow the agitator space 402b to communicate with the outside. A portion of the agitator 420 may be exposed to the outside of the dust container housing 402 through the agitator hole 406. The agitator hole 406 may be formed to have a size corresponding to a size of the suction hole 302a in the first housing 302.

Figure 49:
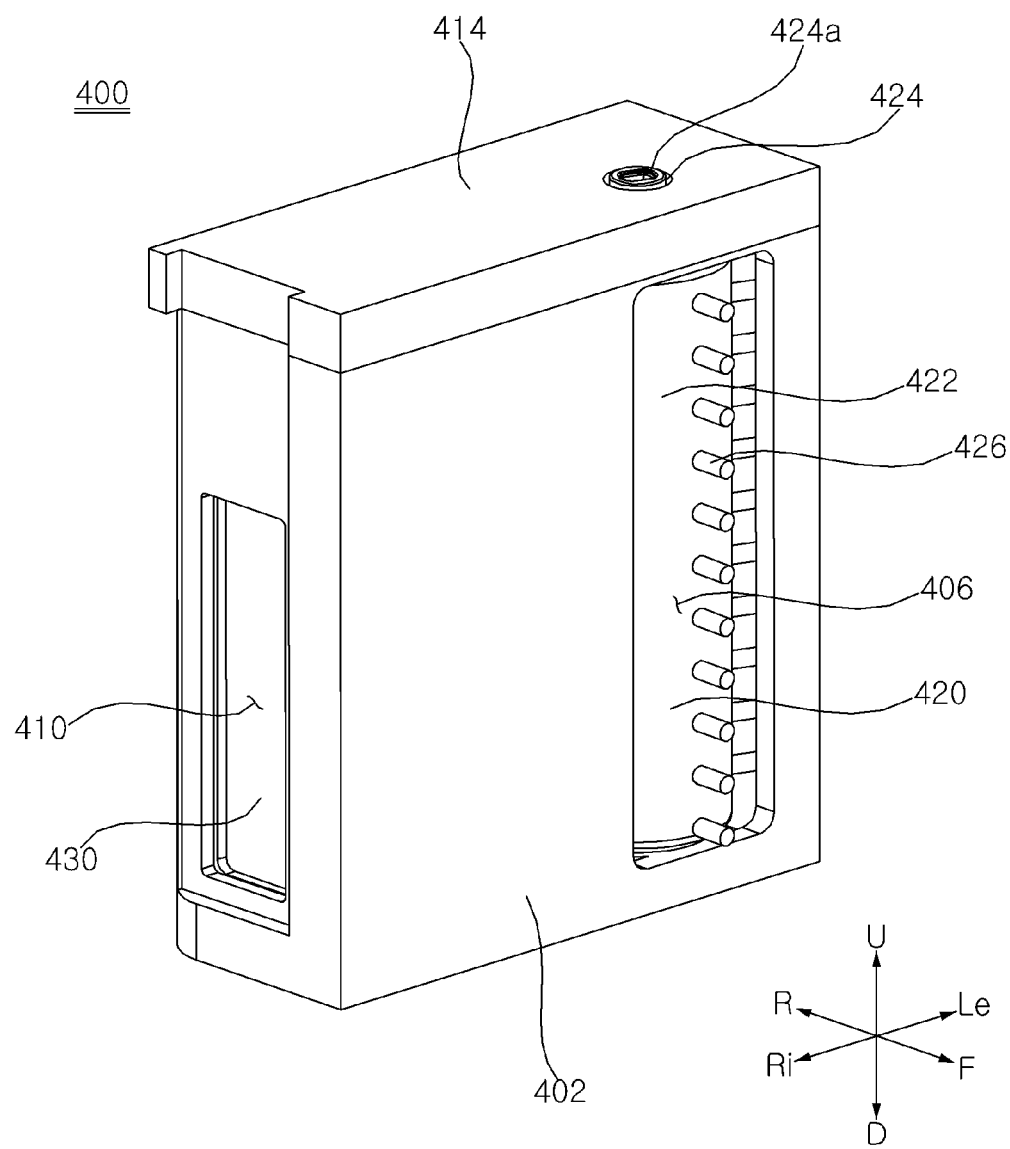
FIG. 49 is a perspective view of a dust container device according to an embodiment.
Figure 50:
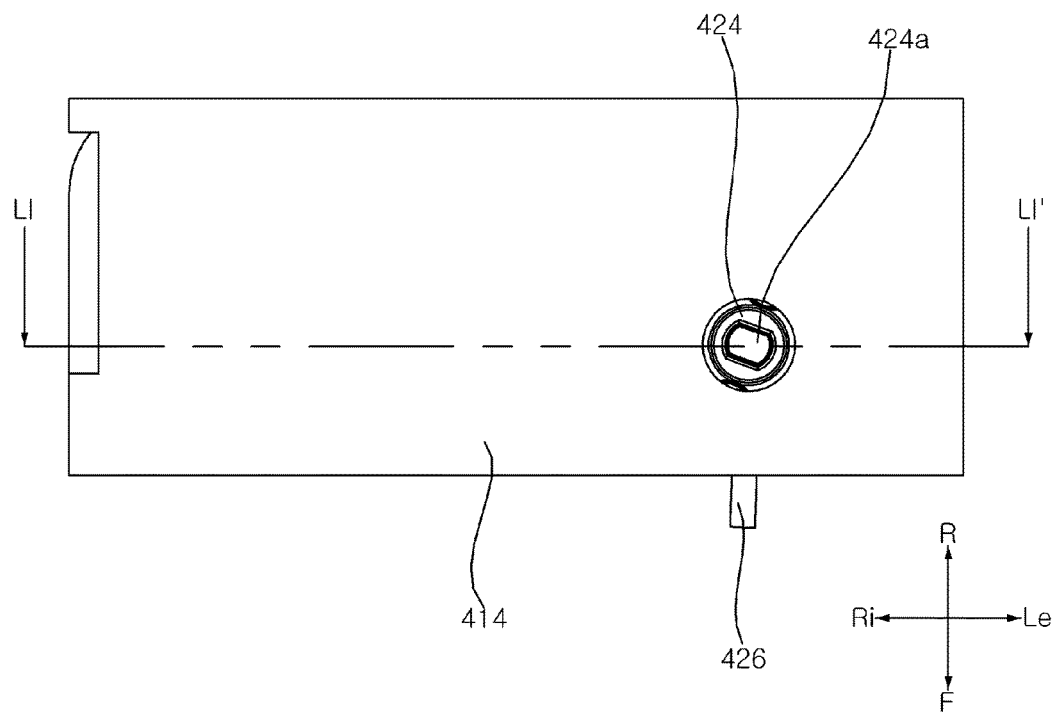
FIG. 50 is a plan view of the dust container device of FIG. 49.

Referring to FIG. 49, the dust container housing 402 may include a flow hole 410 formed therein to allow the air in the storage space 402a to flow to the outside of the dust container housing 402. The flow hole 410 may be formed in a lateral surface of the dust container housing 402. The flow hole 410 may have a size corresponding to a size of the communication hole 342a in the vertical partition 342. When the dust container housing 402 is disposed inside of the housings 302 and 330, the flow hole 410 may be disposed at a position corresponding to the communication hole 342a.

Figure 51:
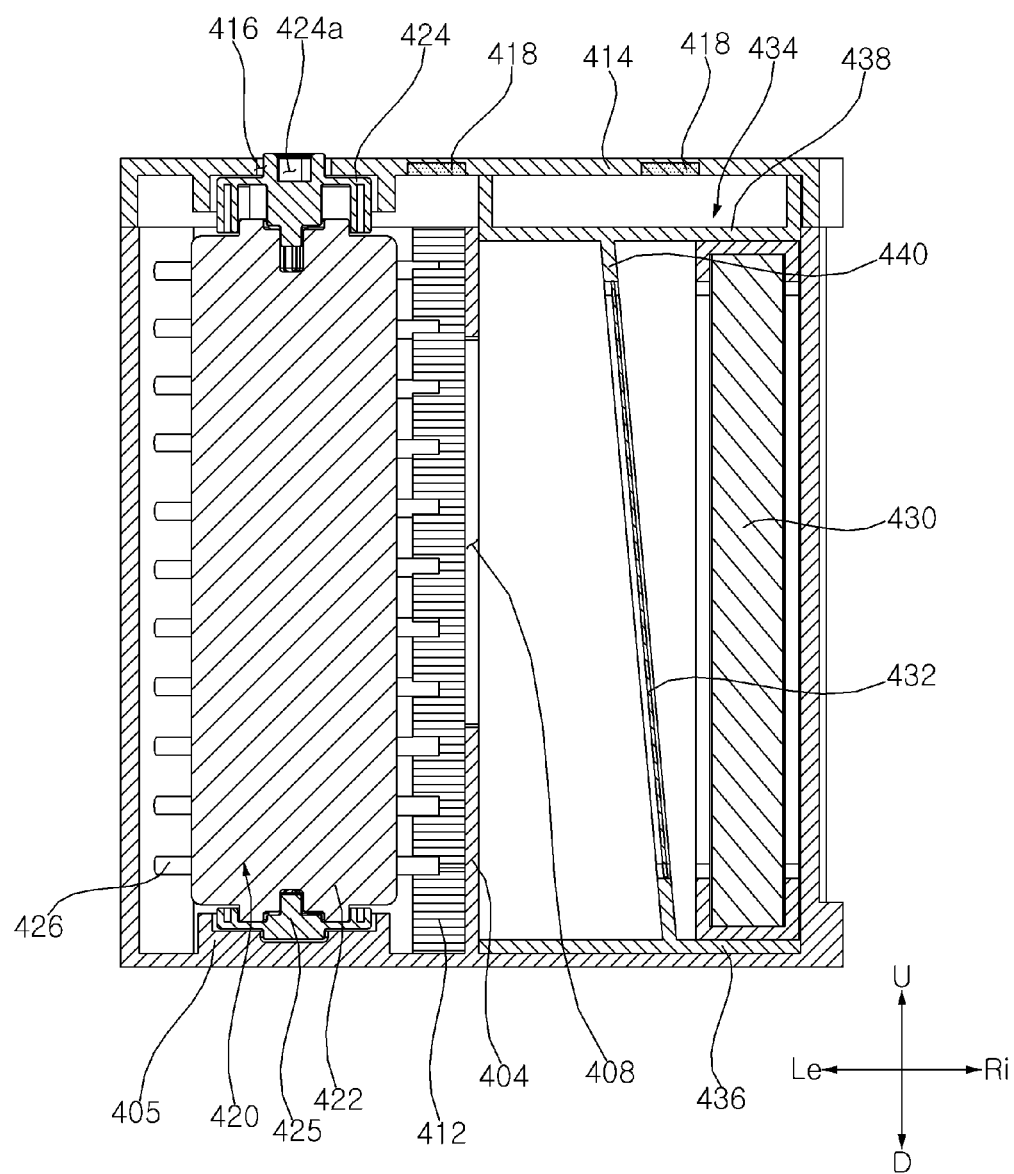
FIG. 51 is a cross-sectional view, taken along line LI-LI' in FIG. 50.

Referring to FIG. 51, an inner partition 404 that isolates the storage space 402a and the agitator space 402b from each other may be provided in the dust container housing 402. The inner partition 404 may extend in the upward-downward direction. The inner partition 404 may include an inner hole 408 formed therein to allow the storage space 402a and the agitator space 402b to communicate with each other.

Referring to FIG. 51, a duster 412 may be disposed in the agitator space 402b so as to be in contact with an end portion of the agitator 420. The duster 412 may remove foreign substances from a blade 426 of the agitator 420, which will be described hereinafter. The duster 412 may be disposed so as to rub the blade 426 when the agitator 420 rotates. The duster 412 may be disposed so as to protrude toward the agitator 420. The duster 412 may have a sawtooth shape, and be disposed on or at one side of the inner hole 408.

The duster 412 may protrude so as to contact the blade 426. Accordingly, when the agitator 420 operates, the duster 412 may remove foreign substances from the blade 426 of the agitator 420. Also, when the dust container device 400 is removed from the filter cleaner 300, the duster 412 may prevent the foreign substances stored in the storage space 402a from escaping to the outside through the agitator space 402b.

Referring to FIG. 51, an agitator-mounting part or portion or agitator-mount 405, to which the agitator 420 may be mounted, may be disposed in the dust container housing 402. The agitator-mount 405 may be disposed at a lower portion of the agitator space 402b, and the lower end portion of the agitator 420 may be seated on the agitator-mount 405.

Referring to FIG. 52, the dust container cover 414 may cover the open upper portion of the dust container housing 402. The dust container cover 414 may include a through-hole 416, through which the lower portion of the agitator connection shaft 368 may pass. The through-hole 416 may be formed at a position corresponding to the connection hole 380a formed in the guide plate 384 of the dust container guide 380. Accordingly, when the dust container device 400 is mounted to the dust container guide 380, the connection hole 380a and the through-hole 416 may be located so as to be aligned with each other.

Referring to FIG. 52, a counterpart member or counterpart 418, which responds to the magnet 388 disposed on the guide plate 384, may be disposed on the dust container cover 414. The counterpart member 418 may be made of a material that is attracted to the magnet 388. Accordingly, when the dust container device 400 is brought close to the dust container guide 380, the dust container device 400 may be secured to the dust container guide 380 due to the magnet 388 and the counterpart member 418.

The agitator 420 may be rotatably mounted to the dust container housing 402. The agitator 420 may rotate about a rotational axis that extends in the upward-downward direction. The agitator 420 may be disposed so as to be in contact with an outer side of the pre-filter 188. The agitator 420 may shake foreign substances off the pre-filter 188.

Referring to FIG. 52, the agitator 420 may include a rotating body 422, which rotates about a rotational axis that extends in the upward-downward direction, a plurality of blades 426, which protrude from an outer circumferential surface of the rotating body 422 in the radial direction, and a connection body 424, which is disposed at one end of the rotating body 422 and which is connected to the agitator connection shaft 368.

The agitator 420 may further include a mounting body 425, which is rotatably connected to the rotating body 422. The mounting body 425 may be mounted to the agitator-mount 405 of the dust container housing 402 in order to fix the agitator 420 in place. As the mounting body 425 is rotatably connected to the rotating body 422, the agitator 420 may rotate stably in a state of being fixed to the agitator-mount 405.

The connection body 424 may be disposed at an upper side of the rotating body 422. The connection body 424 may include a connection recess 424a formed in an upper surface thereof to allow a lower end of the agitator connection shaft 368 to be inserted thereinto. The connection recess 424a may have a shape corresponding to a shape of the lower end of the agitator connection shaft 368. Accordingly, when the agitator connection shaft 368 is inserted into the connection recess 424a in the connection body 424, the agitator connection shaft 368 and the agitator 420 may rotate together.

Referring to FIG. 51, the dust container filter 428 may be disposed in the storage space 402a in the dust container housing 402. The dust container filter 428 may include a first filter 430, which may be disposed on one side of the flow hole 410 in the dust container housing 402 to remove fine foreign substances from the air flowing to the flow hole 410, a second filter 432, which is disposed in the storage space 402a while being spaced apart from the first filter 430, and a mounting body 434, which fixes the second filter 432 in place.

Referring to FIG. 51, the mounting body 434 has a structure that is capable of being mounted in the storage space 402a. The mounting body 434 may include a lower plate 436, which may be disposed in the lower side of the storage space 402a, an upper plate 438, which is spaced upwards apart from the lower plate 436, and a connection plate 440, which interconnects the lower plate 436 and the upper plate 438 and supports the second filter 432, which is disposed on one side thereof. The lower plate 436 may be fixed to the lower portion of the storage space 402a. The upper plate 438 may be fixed to the upper portion of the storage space 402a. Accordingly, when the dust container filter 428 is disposed in the storage space 402a, a position of the dust container filter 428 inside of the storage space 402a may be maintained. The second filter 432 may be fixedly disposed on the mounting body 434. That is, the second filter 432 may be formed integrally with the connection plate 440.

Referring to FIG. 51, the connection plate 440 may be disposed so as to be inclined relative to the first filter 430. The second filter 432 may be spaced apart from the first filter 430, and may be inclined relative to the first filter 430.

The first filter 430 may be implemented as a high-efficiency particulate air (HEPA) filter to remove fine foreign substances. The second filter 432 may implemented as a filter that removes foreign substances having a size larger than the size of foreign substances removed by the first filter 430. The second filter 432 may be implemented as a filter that is capable of being washed for reuse.

The first filter 430 may be mounted in the mounting body 434. The first filter 430 may be disposed between the upper plate 438 and the lower plate 436 of the mounting body 434.

Hereinafter, a process of separating the dust container device 400 from the filter cleaner 300 will be described with reference to FIGS. 53 and 54.

The filter cleaner 300 is maintained in a state in which the same is mounted on the guide rail 10. Therefore, it may be difficult for a user to reach the filter cleaner 300 mounted in the ceiling-mounted air-processing apparatus 100. However, according to an embodiment, as the dust container device 400 is capable of being moved downwards by the dust container guide 380, the user may easily reach the same.

The dust container device 400 may be moved in the upward-downward direction by the dust container guide 380. The dust container guide 380 may be moved in the upward-downward direction by operation of the dust container gear 362.

The dust container device 400 may be securely disposed on the dust container guide 380 by the magnet 388 of the dust container guide 380. The magnet 388 of the dust container guide 380 attracts the counterpart member 418 of the dust container device 400, so the dust container device 400 may be secured to the dust container guide 380.

The dust container device 400 may be located at a first position P1, at which the same is located inside of the housings 302 and 330, or a second position P2, at which a portion of the dust container device 400 is located outside of the housings 302 and 330. When the dust container device 400 is located at the first position P1, the agitator 420 is connected to the agitator connection shaft 368. Accordingly, when the dust container device 400 is located at the first position P1, the agitator 420 may be rotated by the operation of the agitator motor 364.

Figure 53:
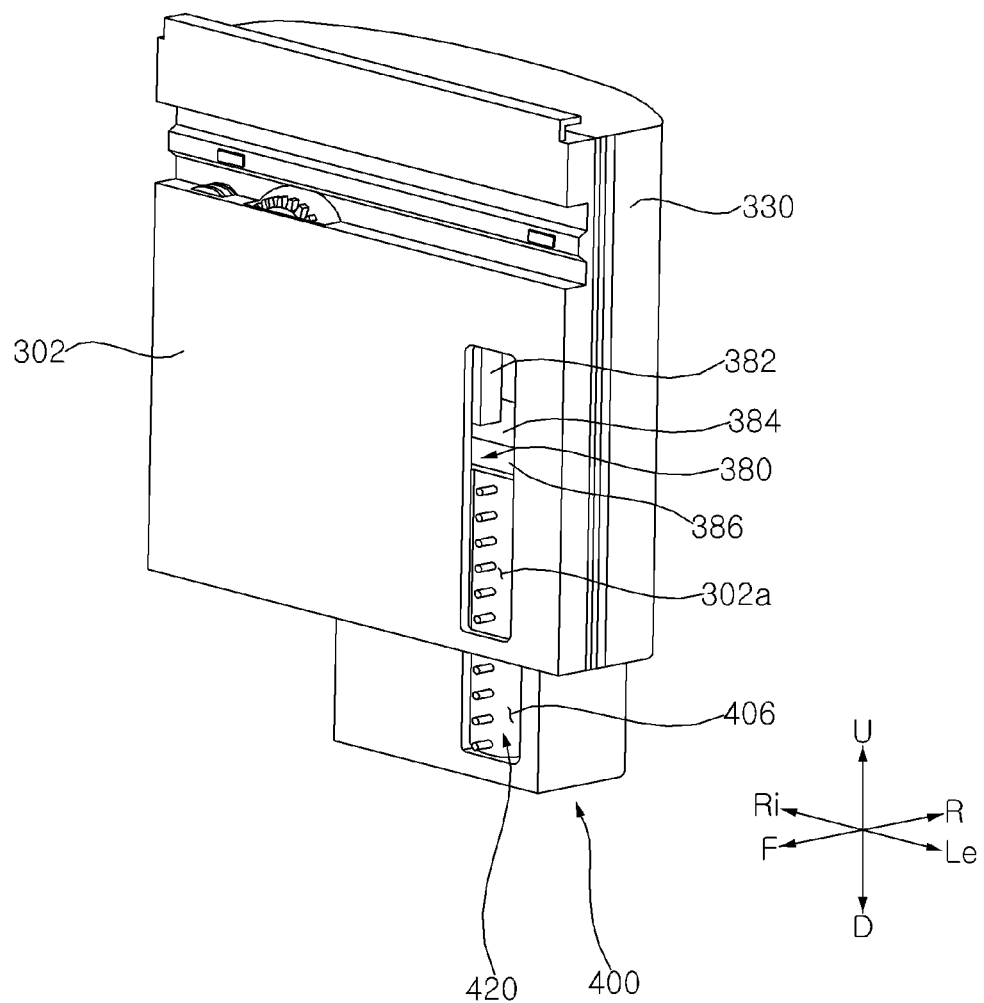
FIG. 53 is a perspective view showing a state in which a dust container device and a dust-container-mount are moved downwards in the filter cleaner.
Figure 54:
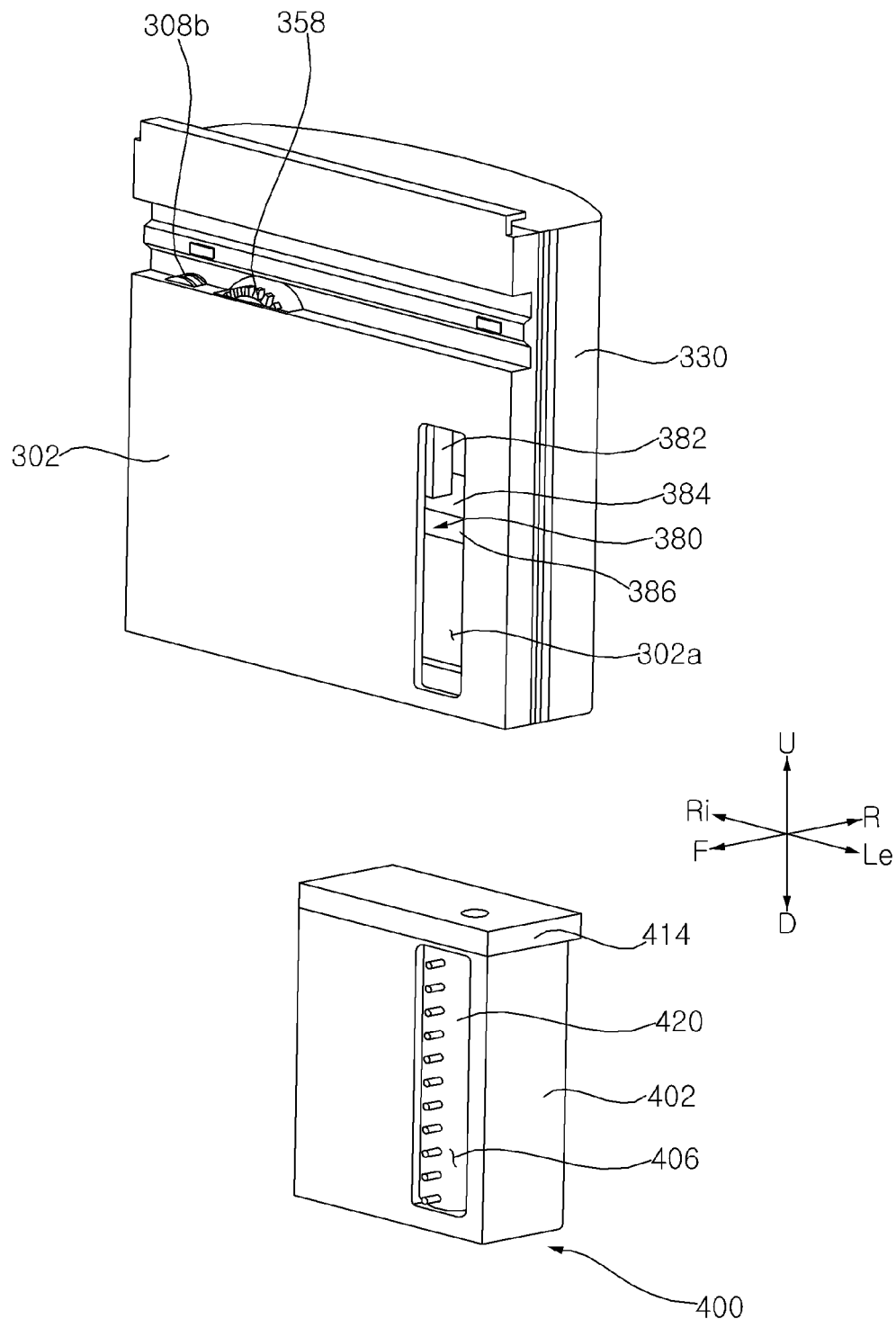
FIG. 54 is a perspective view showing a state in which the dust container device is separated from the filter cleaner shown in FIG. 53.

As shown in FIG. 53, when the dust container device 400 is located at the second position P2, the agitator 420 is separated from the agitator connection shaft 368. Accordingly, when the dust container device 400 is located at the second position P2, the agitator 420 is not rotated even when the agitator motor 364 operates. Thereafter, the user is capable of separating the dust container device 400 from the filter cleaner 300, as shown in FIG. 54.

The air-conditioning system according to an embodiment has been described with reference to FIGS. 1 to 54. Hereinafter, an air-conditioning system and a method for operating an air-conditioning system according to embodiments will be described with reference to FIGS. 55 to 91B. Hereinafter, repetitive description of the same components as those described with reference to FIGS. 1 to 54 has been omitted. Therefore, it will be apparent that embodiments described below may be implemented in combination with the components, structure, and operation of the embodiments described with reference to FIGS. 1 to 54 even when there is no description thereof.

Figure 55:
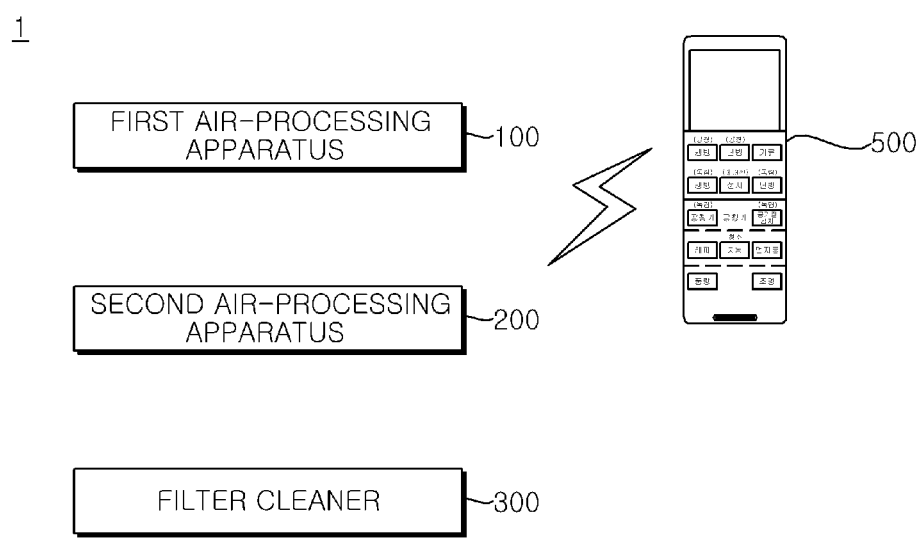
FIG. 55 is a diagram of an air-conditioning system according to an embodiment.

FIG. 55 is a diagram of an air-conditioning system according to an embodiment. Referring to FIG. 55, air-conditioning system 1 according to an embodiment may include first air-processing apparatus 100, which includes first inlet 102a formed in one surface thereof, which is perpendicular to a floor or ceiling, and first outlet 102b formed in another surface thereof, which is perpendicular to the first inlet 102a, and induces the air introduced into the first inlet 102a to exchange heat with refrigerant and to be delivered to the first outlet 102b, and second air-processing apparatus 200, which includes second outlet 202b formed therein so as to be open in a same direction as the first outlet 102b and second inlet 202a formed therein so as to be open in the same direction as the first inlet 102a. The first air-processing apparatus 100 and the second air-processing apparatus 200 may be different types of air-processing apparatuses. The first air-processing apparatus 100 may include a heat exchanger, which induces the air introduced into the first inlet 102a to exchange heat with refrigerant. The first air-processing apparatus 100 may adjust a temperature of an indoor space by performing a cooling operation or a heating operation. The second air-processing apparatus 200 may include filter device 284, which removes foreign substances from the air introduced into the second inlet 202a. The second air-processing apparatus 200 may purify indoor air by performing an air purification operation in which air flowing therein passes through the filter device 284 and is then discharged to the outside.

The air-conditioning system 1 according to an embodiment may include one or more first air-processing apparatuses 100 and one or more second air-processing apparatuses 200. The inlets 102a and 202a may be formed in surfaces of the first and second air-processing apparatuses 100 and 200 which extend perpendicular to the floor. Alternatively, the inlets 102a and 202a may be formed in surfaces of the first and second air-processing apparatuses 100 and 200 which extend perpendicular to the ceiling. In many cases, the ceiling and the floor are parallel to each other, so the inlets 102a and 202a may be formed perpendicular to the ceiling and the floor. The outlets 102b and 202b, which are open toward the floor, may be formed perpendicular to the inlets 102a and 202a. In addition, the air-conditioning system 1 according to an embodiment may be driven in a combined operation mode in which the first air-processing apparatus 100 and the second air-processing apparatus 200 operate simultaneously.

Also, the air-conditioning system 1 according to an embodiment may be driven in an independent operation mode in which only one of the air-processing apparatuses 100 and 200 provided therein operates. That is, in the independent operation mode, the first air-processing apparatus 100 or the second air-processing apparatus 200 may operate. For example, the first air-processing apparatus 100 may independently perform a cooling operation or a heating operation. Alternatively, the second air-processing apparatus 200 may independently perform an air purification operation. In addition, the air-conditioning system 1 according to an embodiment is capable of driving some of predetermined types of air-processing apparatuses.

The air-conditioning system 1 according to an embodiment may automatically operate in the combined operation mode or the independent operation mode based on a state of the air in the indoor space. In addition, the air-conditioning system 1 may operate based on other information about the indoor space as well as the state of the air. For example, the air-conditioning system 1 may operate based on information about whether there is an occupant in the indoor space, and/or information about the number of occupants present in the indoor space, for example.

As described above with reference to FIGS. 1 to 54, the first air-processing apparatus 100 may include first pre-filter 188, which is disposed in the first inlet 102a, and the second air-processing apparatus 200 may include second pre-filter 288, which is disposed in the second inlet 202a. The first air-processing apparatus 100 and the second air-processing apparatus 200 may be disposed adjacent to each other. In addition, the first inlet 102a and the second inlet 202a may be disposed in a line.

The air-conditioning system 1 according to an embodiment may further include filter cleaner 300 that cleans at least one of the first pre-filter 188 or the second pre-filter 288.

Guide rail 10 may be disposed on one side of the first air-processing apparatus 100 and on one side of the second air-processing apparatus 200. The guide rail 10 may be disposed above the first inlet 102*a* and the second inlet 202*a*.

The filter cleaner 300 may clean the first pre-filter 188 and the second pre-filter 288 while moving along the guide rail 10. According to an embodiment, as the pre-filters 188 and 288 disposed in the first air-processing apparatus 100 and the second air-processing apparatus 200 are cleaned by a single filter cleaner 300, it is possible to efficiently manage the pre-filters 188 and 288.

According to embodiments, the first air-processing apparatus 100 or the second air-processing apparatus 200 may be independently or selectively driven. In this case, the filter cleaner 300 may clean all of the pre-filters while moving an entire movement section, or may selectively clean the pre-filter of an apparatus that has been operated. For example, when the operation of the first air-processing apparatus 100 or the second air-processing apparatus 200 is stopped, the filter cleaner 300 may automatically move along the guide rail 10 to clean at least one of the first pre-filter 188 or the second pre-filter 288.

The air-conditioning system 1 according to an embodiment may further include a remote control device 500. The remote control device 500 may input a user's control command to the first air-processing apparatus 100 or the second air-processing apparatus 200. Accordingly, it is possible to control all of the air-processing apparatuses 100 and 200 included in the air-conditioning system 1 using a single remote control device 500. In addition, it is possible to drive the air-processing apparatuses 100 and 200 in a combined operation mode or an independent operation mode using the remote control device 500.

For example, the remote control device 500 may transmit a control command to the air-processing apparatuses 100 and 200 using an infrared radiation (IR) method or a radio frequency (RF) method. The remote control device 500 may include an IR-type or RF-type transmitter, and at least one of the air-processing apparatuses 100 and 200 may include an IR-type or RF-type receiver depending on a transmission method of the remote control device 500. In some embodiments, the remote control device 500 may employ Bluetooth, Ultra Wideband (UWB), ZigBee, a Nearfield Communication (NFC), for example. The remote control device 500 may receive and display information about states of the first air-processing apparatus 100 and the second air-processing apparatus 200.

Also, the remote control device 500 may include a display 501 (refer to FIG. 60) in order to display various pieces of information. For example, the remote control device 500 may display, through the display 501, information for guiding the user to replace the filter device 284, and/or information for guiding the user to empty the dust container device 400, for example.

The remote control device 500 may be connected to the first air-processing apparatus 100 and the second air-processing apparatus 200 in order to enable input of a user's control command thereto and to receive and display information about the states of the first air-processing apparatus 100 and the second air-processing apparatus 200. In this case, the remote control device 500 may communicate with the air-processing apparatuses 100 and 200 in a wired or wireless manner depending on the type of connection therewith.

The remote control device 500 may communicate with one of the air-processing apparatuses 100 and 200 included in the air-conditioning system 1, and the air-processing apparatus that communicates with the remote control device 500 may transmit a control command to the remaining air-processing apparatuses. Accordingly, each of the plurality of air-processing apparatuses may include only a wired communication module or a short-range wireless communication module in order to communicate with other air-processing apparatuses disposed nearby, thereby reducing manufacturing costs.

In some embodiments, the first air-processing apparatus 100 and the second air-processing apparatus 200 may be the same type of air-processing apparatus. It is possible to easily add one or more air-processing apparatuses and to conveniently expand an air-conditioning area by arranging multiple air-processing apparatuses in a line.

Figure 56A:
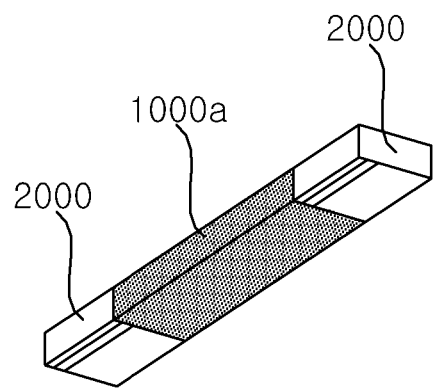
FIGS. 56A-56C are views for explaining module extension of an air-conditioning system according to an embodiment.
Figure 56B:
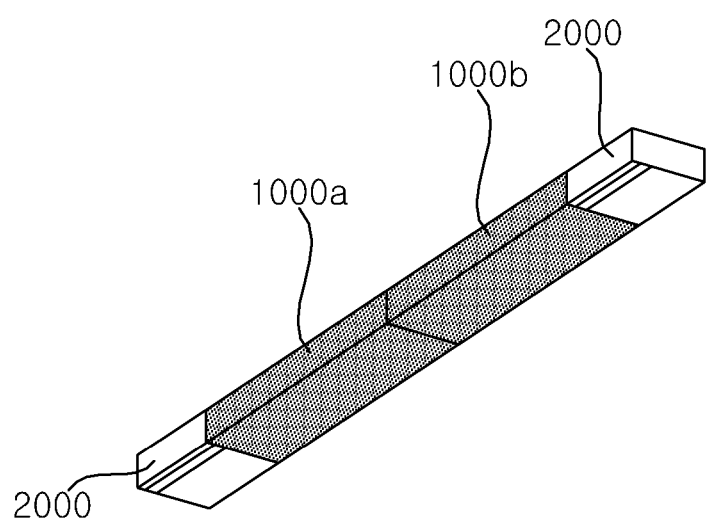
Figure 56C:
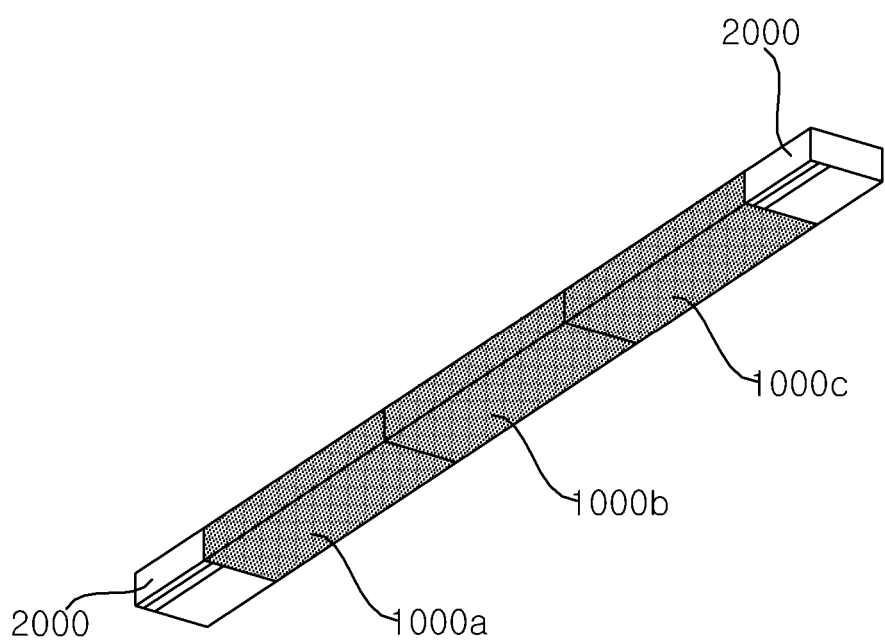

FIGS. 56A-56C are views for explaining module extension of the air-conditioning system according to an embodiment. Referring to FIGS. 56A-56C, the air-processing apparatuses 100 and 200 may have a standardized common external appearance, and may be combined with each other in a modular structure in order to expand the performance and functions thereof according to the purpose thereof. Each of the air-processing apparatuses 100 and 200 may be referred to as an air-processing module.

Referring to FIG. 56A, only one independent air-processing module 1000*a* may be installed. The air-processing module 1000*a*, which is disposed between left and right or lateral finishing materials 2000, may be the first air-processing apparatus 100 or the second air-processing apparatus 200.

Referring to FIG. 56B, two air-processing modules 1000*a* and 1000*b* may be combined with each other. If the two air-processing modules 1000*a* and 1000*b* are of the same type and are arranged in a line, the air-processing modules 1000*a* and 1000*b* may be extended in the longitudinal direction thereof.

The air-conditioning system 1 according to an embodiment may include two different types of air-processing modules 1000*a* and 1000*b*, which are combined with each other so as to extend in the longitudinal direction thereof in order to perform multiple functions. For example, one first air-processing apparatus 100, which functions as an air conditioner, and one second air-processing apparatus 200, which functions as an air purifier, may be combined with each other.

Also, referring to FIG. 56C, three air-processing modules 1000*a*, 1000*b*, and 1000*c* may be combined with each other. In this case, the first air-processing apparatus 100, which functions as an air conditioner, and the second air-processing apparatus 200, which functions as an air purifier, may be combined with each other. For example, two first air-processing apparatuses 100 and one second air-processing apparatus 200 may be combined with each other.

Alternatively, a plurality of each of the first air-processing apparatus 100 and the second air-processing apparatus 200 may be provided. When a plurality of any one of the first air-processing apparatus 100 or the second air-processing apparatus 200 is provided, the plurality of modules and the remaining module may be alternatively arranged. For example, in the case illustrated in FIG. 56C, the air-processing module 1000*b* disposed in the middle may be the first air-processing apparatus 100, and the air-processing modules 1000*a* and 1000*c* disposed on the left and right may be the second air-processing apparatuses 200. Alternatively, the air-processing module 1000*b* disposed in the middle may be the second air-processing apparatus 200, and the air-processing modules 1000*a* and 1000*c* disposed on the left and right may be the first air-processing apparatuses 100. Accordingly, different types of air-processing apparatuses 100 and 200 may be disposed in a line so as to be adjacent to each other, and may be driven to perform multiple different functions.

Figure 57:
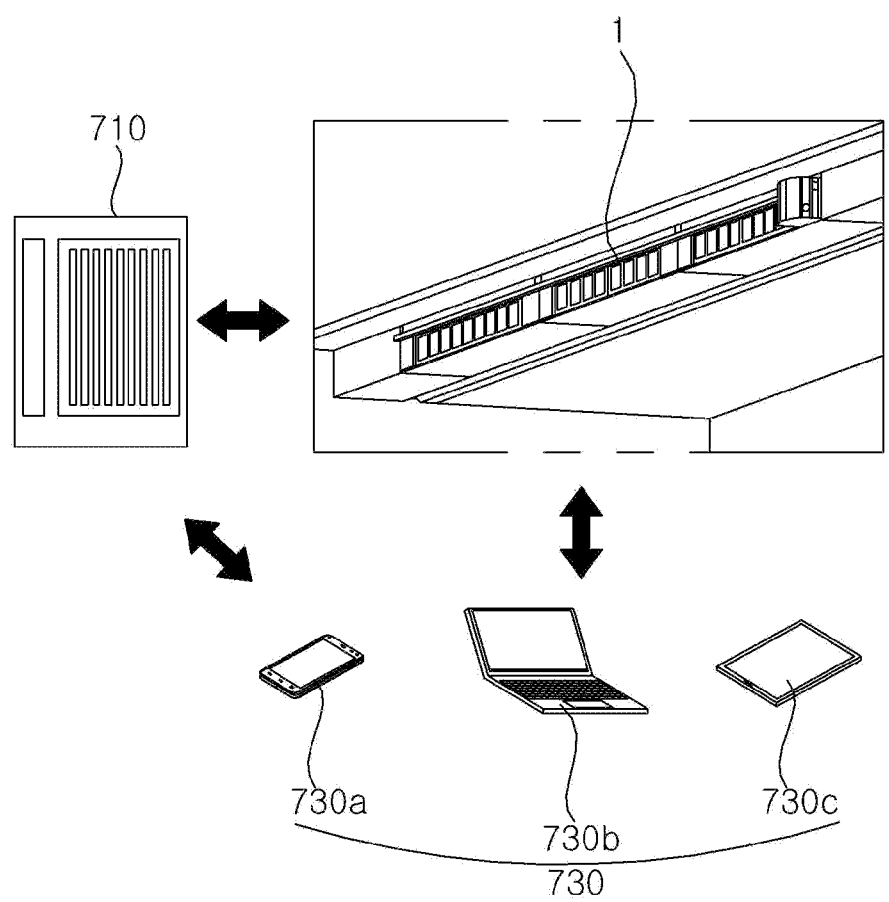
FIG. 57 is a diagram of an air-conditioning system according to an embodiment.

FIG. 57 is a diagram of an air-conditioning system according to an embodiment. Referring to FIG. 57, air-conditioning system 1 according to an embodiment may communicate with a server 710, or may be connected to a network.

At least one of the air-processing apparatuses 100 and 200 may be provided with a Wi-Fi communication module. Alternatively, at least one of the air-processing apparatuses 100 and 200 may be provided with different types of communication modules or a plurality of communication modules. For example, at least one of the air-processing apparatuses 100 and 200 may include a Bluetooth communication module, or a ZigBee communication module, for example. At least one of the air-processing apparatuses 100 and 200 may be connected to a predetermined server 710 via a Wi-Fi communication module, for example, and may support smart functions, such as remote monitoring and remote control.

An air-conditioning control system according to an embodiment of the present disclosure may include a mobile terminal 730, such as a smartphone 730*a*, a laptop computer 730*b*, or a tablet computer 730*c*. The user may check information about the air-processing apparatuses 100 and 200 in the air-conditioning system 1, or may control the air-processing apparatuses 100 and 200 using the mobile terminal 730.

The air-conditioning system 1 according to an embodiment may include sensors (not shown) that acquires various data related to indoor air and outdoor air. The sensors may serve to sense temperature, humidity, and quality of indoor air. The sensors may include a temperature sensor, a humidity sensor, and a sensor that senses one or more aspects of air quality, such as dust and carbon dioxide ($CO_2$) content. For example, the dust sensor may sense a concentration of dust for each size of dust particle. The dust sensor may separately sense the concentration of dust particles having various sizes, for example, PM 1.0, PM 2.5, and PM 10.0. A plurality of each of the aforementioned sensors may be provided in a plural number.

At least some of the sensors may be provided in the apparatuses 100, 200, 300, and 500 in the air-conditioning system 1. In addition, the air-conditioning system 1 may combine data sensed by the sensors provided in the apparatuses 100, 200, 300, and 500 in order to manage data for each location and to improve the accuracy of the sensed data.

In addition, the sensors may include sensors disposed outdoors. The sensors disposed outdoors may be, for example, a temperature sensor and a dust sensor.

Alternatively, the air-conditioning system 1 may receive and use data sensed by an external sensor. At least one apparatus in the air-conditioning system 1 may directly receive data sensed by an external sensor, or may receive sensed data via the server 710 or the mobile terminal 730.

Figure 58:
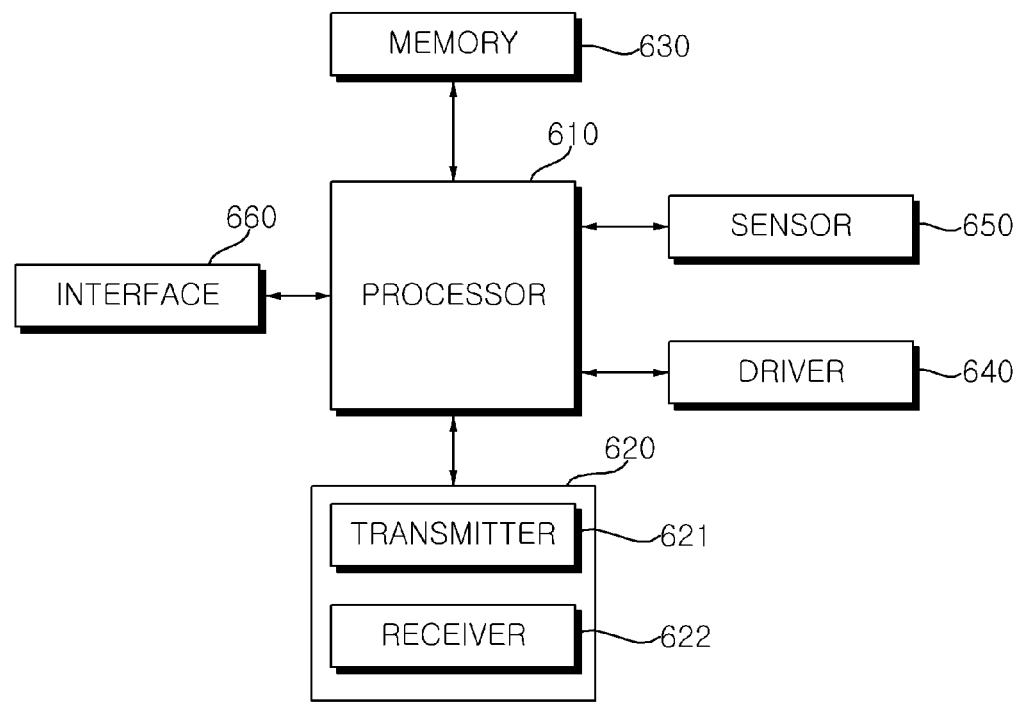
FIG. 58 is a block diagram schematically illustrating internal structure of an air-processing apparatus according to an embodiment.

FIG. 58 is a block diagram schematically illustrating internal structure of each of the air-processing apparatuses 100 and 200 according to an embodiment.

Referring to FIG. 58, each of the air-processing apparatuses 100 and 200 may include a driver 640, a sensor 650, an interface 660, a memory 630, a communication module 620, and a processor 610 that controls an overall operation thereof. These components are commonly included in the air-processing apparatuses 100 and 200. However, depending on characteristics of the apparatuses 100 and 200, the detailed configuration thereof may vary, or an additional component may be added thereto. For example, the driver 640 of the first air-processing apparatus 100 may include first louver-drive device 174, and the driver 640 of the second air-processing apparatus 200 may include cover-drive device 220, a filter-drive device 228, and second louver-drive device 294.

Types, number, and mounting positions of sensors included in the sensor 650 may be set differently depending on the types of air-processing apparatuses 100 and 200. For example, the second air-processing apparatus 200 may include a sensor capable of sensing one or more aspects of air quality, such as dust and $CO_2$ content. The sensor 650 may include a sensor capable that senses the operational states of the air-processing apparatuses 100 and 200 and a sensor that acquires various data, for example, temperature, humidity, and air quality, related to indoor air. In addition, in some embodiments, each of the air-processing apparatuses 100 and 200 may further include a sensor that senses an occupant in the indoor space.

The memory 630 may store control data for controlling the operation of the air-processing apparatuses 100 and 200 and operation data generated or sensed during operation of the air-processing apparatuses 100 and 200. The memory 630 may store an executable program for each function of the unit, data used for operation control, and transmitted and received data.

The interface 660 may include a component that receives a user's control command. For example, the interface 660 may include a receiver that receives a control command transmitted from the remote control device 500. In some embodiments, the interface 660 may include at least one input means, such as a button, a switch, or a touch input means, for example. When a user command or predetermined data is input thereto in response to operation of the input means, the interface 660 applies the input data to the processor 610.

The processor 610 may control the air-processing apparatuses 100 and 200 in response to a user command, for example. For example, the processor 610 may control the louver-drive devices 174 and 294 to adjust the direction of air that is discharged from the air-processing apparatuses.

The interface 660 may include at least one of a lamp, which is controlled so as to be turned on or off, a speaker, which outputs a predetermined sound, or a display in order to output information about the operational states of the air-processing apparatuses 100 and 200, for example. The lamp may indicate whether the unit is operating by changing between an on state and an off state, changing the color of light emitted therefrom, or operating in a flashing or constant manner. The speaker indicates the operational state of the unit by outputting a predetermined warning sound or sound effects.

Each of the air-processing apparatuses 100 and 200 may communicate with other apparatuses, and the mobile terminal 730, for example, via the communication module 620. The communication module 620 of at least one of the air-processing apparatuses 100 and 200 may include a wireless communication module in order to wirelessly communicate with the mobile terminal 730, for example.

Each of the air-processing apparatuses 100 and 200 may include a transmitter 621, which transmits predetermined data to other apparatuses. In addition, each of the air-processing apparatuses 100 and 200 may include a receiver 622, which receives predetermined data from other apparatuses. The transmitter 621 and the receiver 622 may be integrated in the form of a transceiver.

Figure 59:
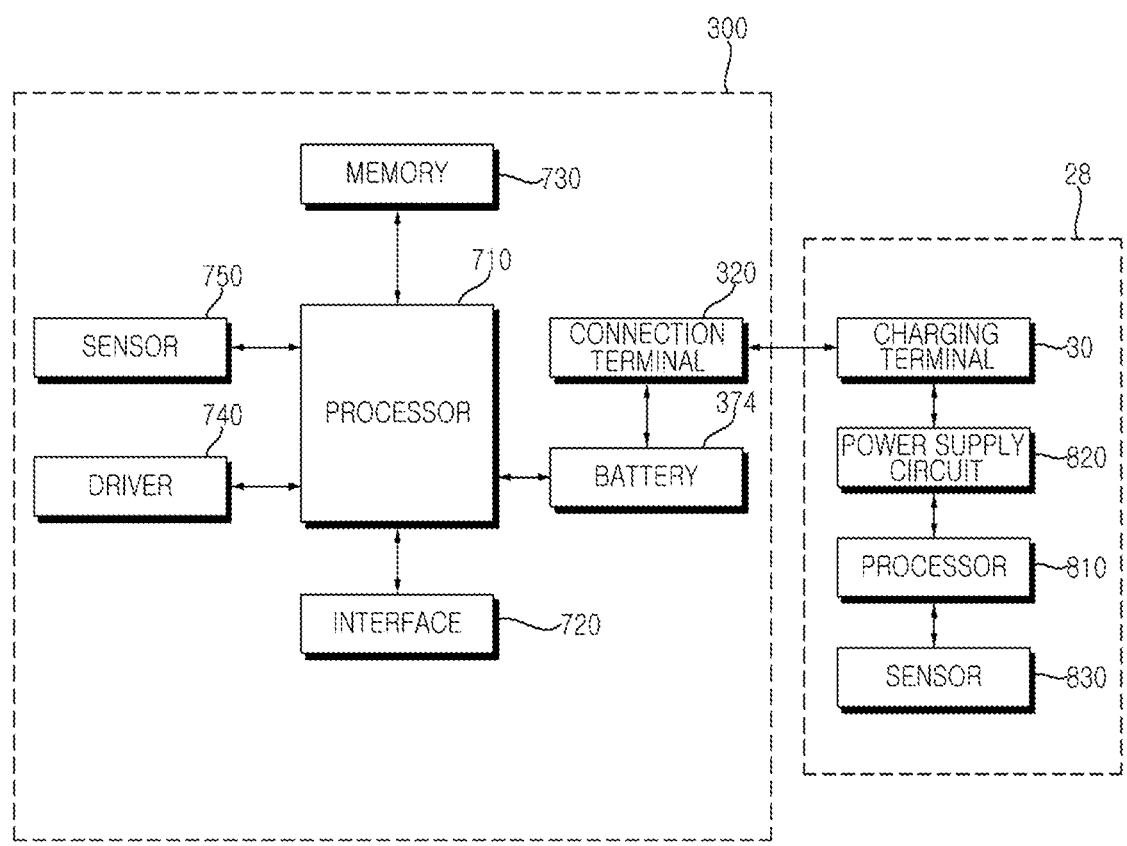
FIG. 59 is a block diagram schematically illustrating internal structure of the filter cleaner and a charging system according to an embodiment.

FIG. 59 is a block diagram schematically illustrating internal structure of the filter cleaner and a charging system according to an embodiment.

Referring to FIG. 59, the filter cleaner 300 may include an interface 720, a driver 740, a sensor 750, memory 730, and processor 710 that controls the overall operation thereof. The driver 740 may drive gear motor 356, agitator motor 364, and suction device 376.

The processor 710 controls the overall operation of the filter cleaner 300. The processor 710 may control the driver 740 to move the filter cleaner 300. Also, the processor 710 may control the driver 740 to perform an operation of cleaning the pre-filters 188 and 288.

The memory 730 may store control data for controlling the operation of the filter cleaner 300 and operation data generated or sensed during operation of the filter cleaner 300. The interface 720 may include a component that receives a user's control command. For example, the interface 720 may include a receiver that receives a control command transmitted from the remote control device 500.

The interface 720 may include at least one of a lamp, which is controlled so as to be turned on or off, a speaker, which outputs a predetermined sound, or a display in order to output information about the operational state of the filter cleaner 300, for example. The lamp may indicate whether the unit is operating by changing between an on state and an off state, changing the color of light emitted therefrom, or operating in a flashing or constant manner, for example. The speaker may indicate the operational state of the unit by outputting a predetermined warning sound or sound effects, for example.

The filter cleaner 300 may include battery 374, and may operate using power stored in the battery 374. The filter cleaner 300 may be provided on one side thereof with connection terminal 320 to which power for charging the battery 374 is supplied.

The charging system for supplying power to the battery 374 may be provided inside of the end plate 28 described above. The charging terminal 30 may be provided on one side of the end plate 28. The charging terminal 30 and the connection terminal 320 may be disposed at a same height.

When the charging terminal 30 and the connection terminal 320 are connected to each other, a power supply circuit 820 may supply power to the connection terminal 320. The power supplied by the power supply circuit 820 charges the battery 374 via the connection terminal 320 and the charging terminal 30.

A sensor 830 may sense voltage and/or current of the power supply circuit 820, and a processor 810 may perform overall charging operation control.

The sensor 750 may include a sensor that senses the operational state of the filter cleaner 300 and position detection sensor 322 that detects the position of the filter cleaner 300. The sensor 750 may include a dust container sensor (not shown) for detecting the amount of dust collected in the dust container device 400 and a battery sensor (not shown) that detects a state of charge of the battery 374.

Figure 60:
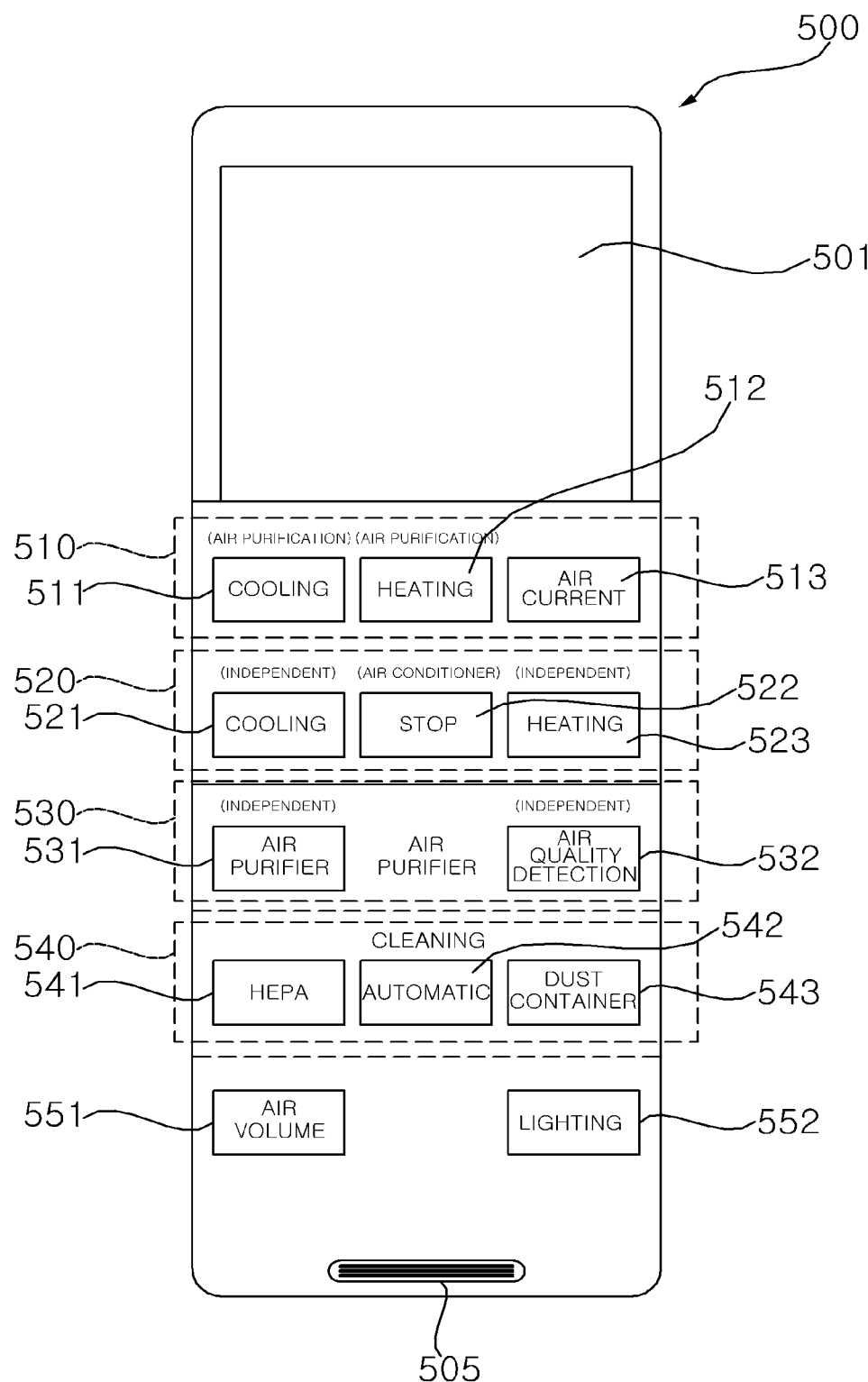
FIG. 60 is a front view of a remote control device of the air-conditioning system according to an embodiment.
Figure 61:
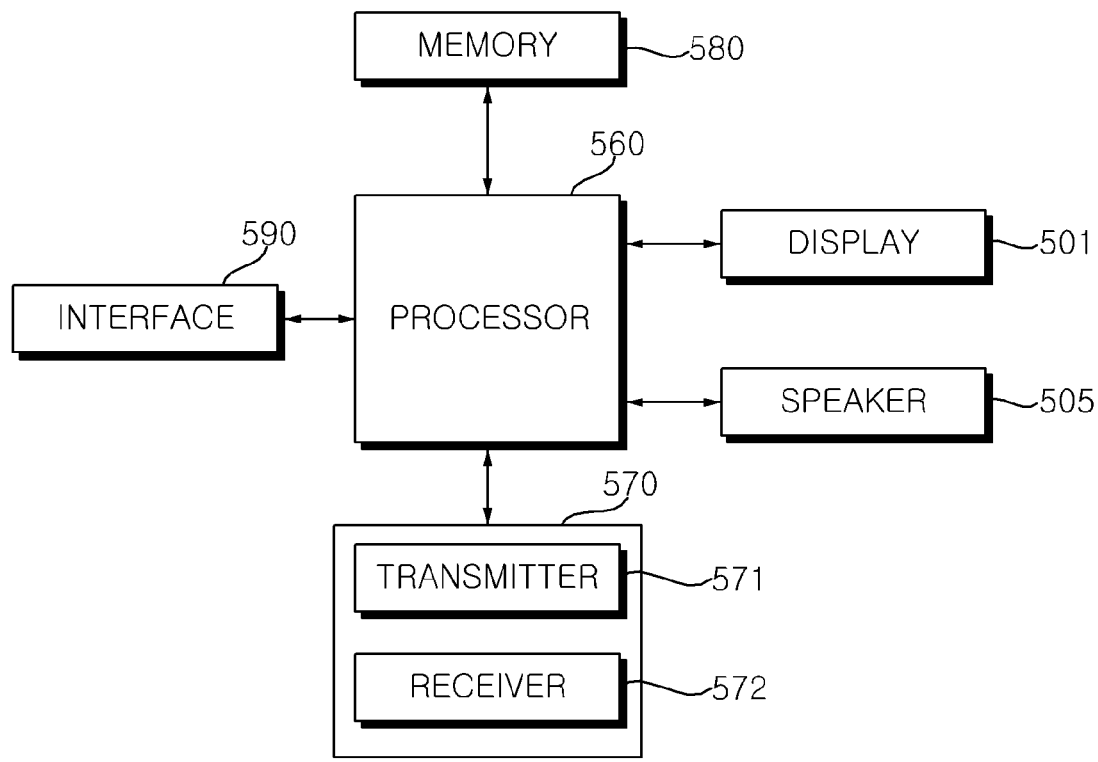
FIG. 61 is a block diagram schematically illustrating internal structure of the remote control device according to an embodiment.

FIG. 60 is a front view of a remote control device of the air-conditioning system according to an embodiment. FIG. 61 is a block diagram schematically illustrating internal structure of the remote control device according to an embodiment.

Referring to FIGS. 60 and 61, the remote control device 500 may include an input interface 590, which includes a plurality of buttons, and a display 501, which displays predetermined information. In addition, the remote control device 500 may include a speaker 505, which outputs a predetermined sound.

The display 501 and the speaker 505 may visually and audibly output various pieces of information related to the air-conditioning system 1. For example, the display 501 and the speaker 505 may output information about the state of the air-conditioning system 1, and/or data sensed by the sensors, guidance information indicating specific operation and functions, for example.

In some embodiments, the display 501 may be implemented as a touch screen, and thus, may also function as an input means. When the display 501 is a touch screen, at least some of the hard buttons included in the input interface 590 may be omitted.

FIG. 60 illustrates hard buttons disposed on a front surface of the remote control device 500. Referring to FIG. 60, buttons 511, 512, and 513 for a combined operation may be disposed in a first region 510. When the user presses a cooling button 511 in the first region 510, a combined cooling operation may be performed such that the first air-processing apparatus 100 performs a cooling operation and such that the second air-processing apparatus 200 performs an air purification operation. When the user presses a heating button 512 in the first region 510, a combined heating operation may be performed such that the first air-processing apparatus 100 performs a heating operation and such that the second air-processing apparatus 200 performs an air purification operation. In this case, the display 501 and the speaker 505 may output a guidance message indicating commencement of cooling/heating and air purification.

The user may manipulate an air current button 513 to set an automatic air current control function or to select the type of air current, such as a vertical air current mode, a horizontal air current mode, or a repeated rotation mode. If the automatic air current control function is set, the air-conditioning system 1 may automatically control the air current based on at least one of whether a combined operation is being performed, whether a cooling or heating operation is being performed, information about the quality of air, or information about occupants in the indoor space. The vertical air current mode is a mode in which the ceiling-mounted air-processing apparatuses 100 and 200 discharge air toward the region of the floor that is the closest thereto, thereby forming an air current that is perpendicular to the surface of the ceiling or the floor (within a predetermined angular range with respect to a vertical line). The vertical air current mode may be used for a heating operation, or an air-curtain function, for example. The horizontal air current mode is a mode in which the ceiling-mounted air-processing apparatuses 100 and 200 discharge air toward an uppermost region in the indoor space. The horizontal air current mode may be used for a cooling operation, an air purification operation, or a situation requiring rapid diffusion of air current, for example. A repeated rotation mode is a mode of repeatedly rotating louvers 150 and 290 within a predetermined angular range. The display 501 and the speaker 505 may output a guidance message related to air current control.

Buttons 521, 522, and 523 corresponding to independent operation of the first air-processing apparatus 100 may be disposed in a second region 520. When the user manipulates a cooling button 521 or a heating button 523, the first air-processing apparatus 100 may perform a cooling operation or a heating operation.

When the user presses a stop button 522, the first air-processing apparatus 100 may stop operating. Alternatively, the stop button 522 may be a button for stopping all of the modules of the air-conditioning system 1.

Buttons 531 and 532 corresponding to independent operation of the second air-processing apparatus 200 may be disposed in a third region 530. When the user manipulates an air purification button 531, the second air-processing apparatus 200 may perform an air purification operation. When the user manipulates an air quality detection mode button 532, the second air-processing apparatus 200 may automatically operate based on air quality data. For example, the second air-processing apparatus 200 may perform an air purification operation or may increase a rotational speed of the fan until the acquired air quality data corresponds to a "good state". During the independent operation, the display 501 and the speaker 505 may also output a guidance message related to the state of the independent operation.

Buttons 541 and 543 related to the filters may be disposed in a fourth region 540. For example, a HEPA button 541 may be a button for enabling the user to input a command for replacing the consumable filter device 284 including the HEPA filter 289. When the user presses the HEPA button 541, the filter device 284 may descend in order to improve convenience of replacement. The user may manipulate an automatic cleaning button 542 to set an automatic cleaning function using the filter cleaner 300. A dust container emptying button 543 may be a button for enabling the user to input a command for emptying the dust container device 400. When the user presses the dust container emptying button 543, the dust container device 400 may descend in order to facilitate removal of the dust container device 400.

The remote control device 500 may further include other buttons 551 and 552. For example, the remote control device 500 may include an air volume control button 551 for changing a volume of air current and a lighting button 552 for operating a light source provided in the air-conditioning system 1.

The buttons illustrated in FIG. 60 are given by way of example, and embodiments are not limited thereto.

The remote control device 500 may include a processor 560 that controls the overall operation thereof and a memory 580 that stores various data. The memory 580 may store control data for controlling the operation of the remote control device 500 and operation data generated or sensed during operation of the remote control device 500.

In addition, the remote control device 500 may include a communication module 570 in order to communicate with other devices. The remote control device 500 may include a transmitter 571, which transmits a control command to the air-processing apparatuses 100 and 200. In some embodiments, the remote control device 500 may further include a receiver 572, which receives predetermined data. The transmitter 571 and the receiver 572 may be integrated in the form of a transceiver. The air-conditioning system 1 according to an embodiment may communicate with the mobile terminal 730 and the server 710, and the user may remotely monitor and control the air-conditioning system 1 using the mobile terminal 730 or other devices that communicate with the server 710.

Figure 62A:
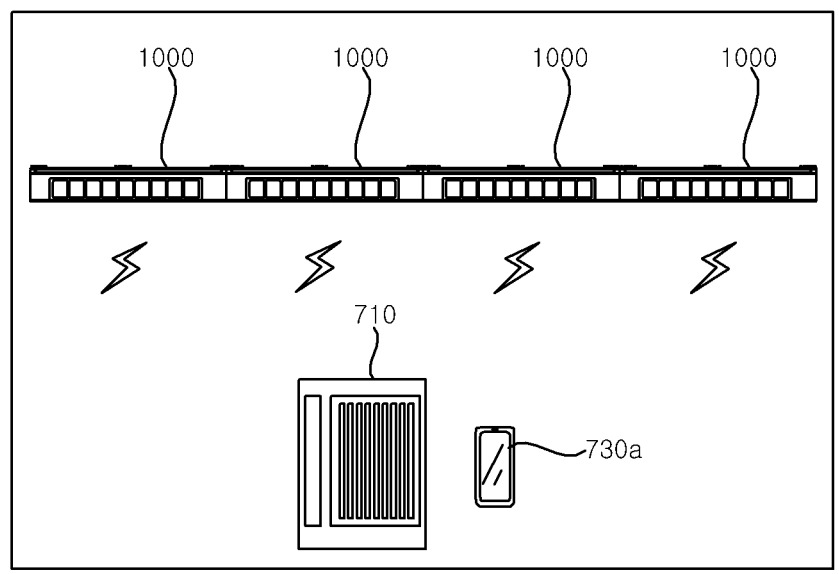
FIGS. 62A-62C and 63A-63B are views for explaining a communication structure and remote control of the air-conditioning system according to an embodiment.
Figure 62B:
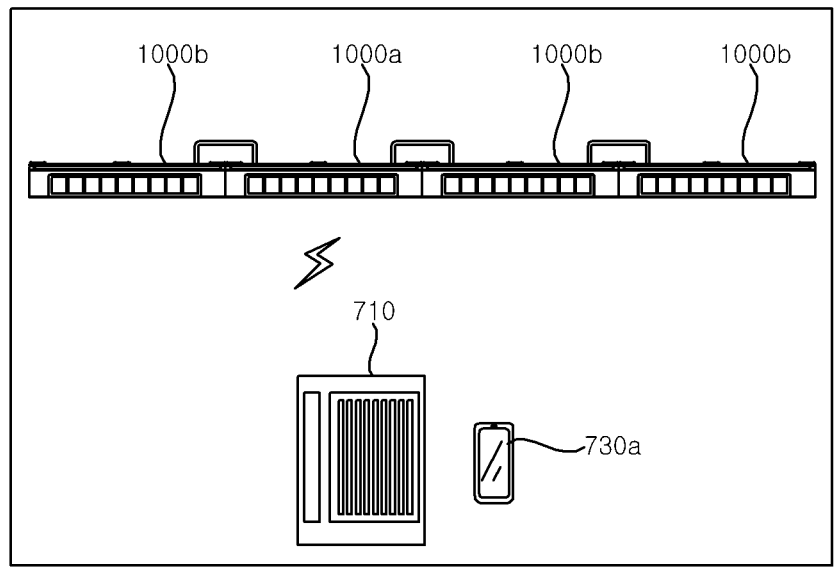
Figure 62C:
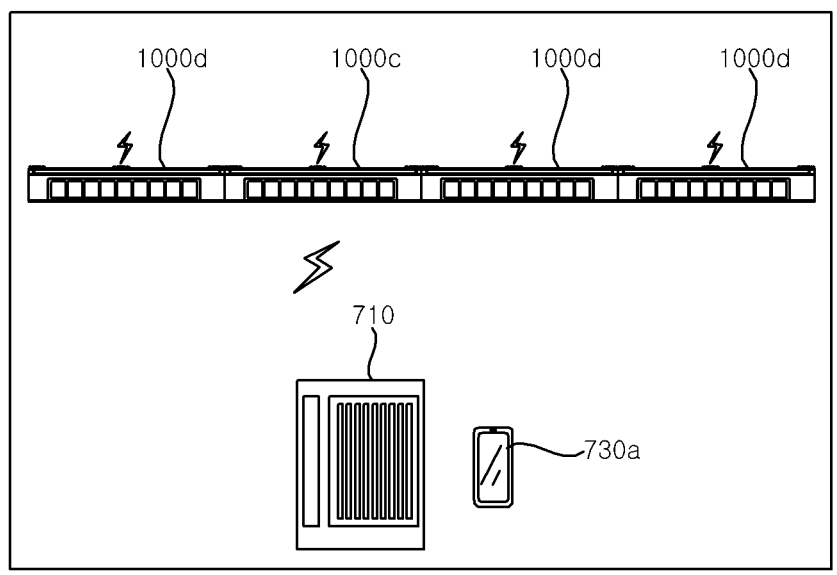
Figure 63A:
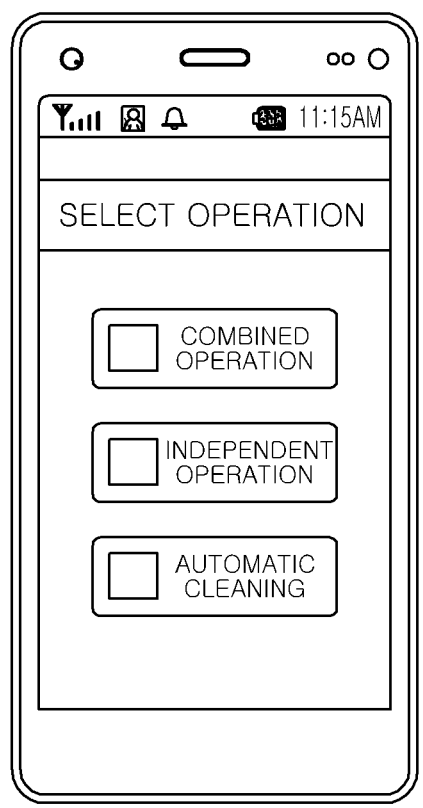
Figure 63B:
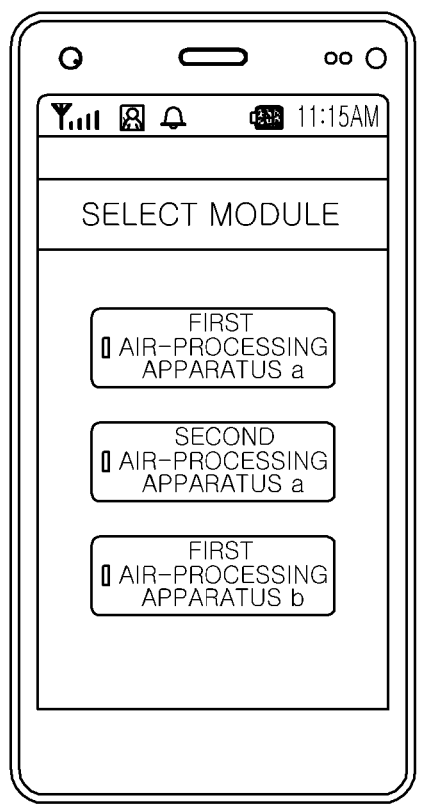

FIGS. 62A-62C and 63A-63B are views for explaining a communication structure and remote control of the air-conditioning system according to an embodiment. FIGS. 62A-62C illustrate various examples of the communication structure, and FIGS. 63A-63B illustrate a screen of a user interface that is provided through the mobile terminal.

Referring to FIG. 62A, the server 710 and the smartphone 730a may wirelessly communicate with each air-processing module 1000, which is the first air-processing apparatus 100 or the second air-processing apparatus 200, to transmit a user's control command to each air-processing module 1000 and to receive and display information about the state of each air-processing module 1000. For example, each air-processing module 1000 may include a Wi-Fi communication module in order to communicate with the server 710 and the smartphone 730a. According to an embodiment, the server 710 and the smartphone 730a may communicate with one of the plurality of air-processing modules 1000 included in the air-conditioning system 1, and the air-processing module 1000 that communicates with the remote control device 500 may transmit a control command to the remaining air-processing modules.

Referring to FIG. 62B, the air-processing modules 1000a and 1000b may be wiredly connected to each other to communicate with each other in a wired manner. The server 710 and the smartphone 730a may wirelessly communicate with the air-processing module 1000a, which includes a wireless communication module, for example, a Wi-Fi communication module, to transmit a user's control command to the air-processing module 1000a and to receive and display information about the states of the air-processing modules 1000a and 1000b. The air-processing module 1000a may transmit the received control command to the remaining air-processing modules 1000b. In addition, the air-processing module 1000a may transmit the data received from the remaining air-processing modules 1000b to the server 710 and the smartphone 730a.

Referring to FIG. 62C, the air-processing modules 1000c and 1000d may communicate with each other in a short-range wireless communication manner, for example, Bluetooth. The server 710 and the smartphone 730a may wirelessly communicate with the air-processing module 1000c, which includes a wireless communication module, for example, a Wi-Fi communication module, to transmit a user's control command to the air-processing module 1000c and to receive and display information about the states of the air-processing modules 1000c and 1000d. The air-processing module 1000c may transmit the received control command to the remaining air-processing modules 1000d. In addition, the air-processing module 1000c may transmit the data received from the remaining air-processing modules 1000d to the server 710 and the smartphone 730a. Accordingly, each of the plurality of air-processing modules 1000b and 1000d may include only a wired communication module or a short-range wireless communication module in order to communicate with other air-processing apparatuses disposed nearby, thereby reducing manufacturing costs.

The user may remotely monitor and control the air-conditioning system 1 by executing an application or accessing a predetermined website via the smartphone 730a. Referring to FIG. 63A, the user may first select an upper-level operation menu, such as a combined operation, an independent operation, or automatic cleaning, and thereafter may select detailed control. If selecting an independent operation, the user may select and control a control target module in a module selection screen shown in FIG. 63B.

Figure 64:
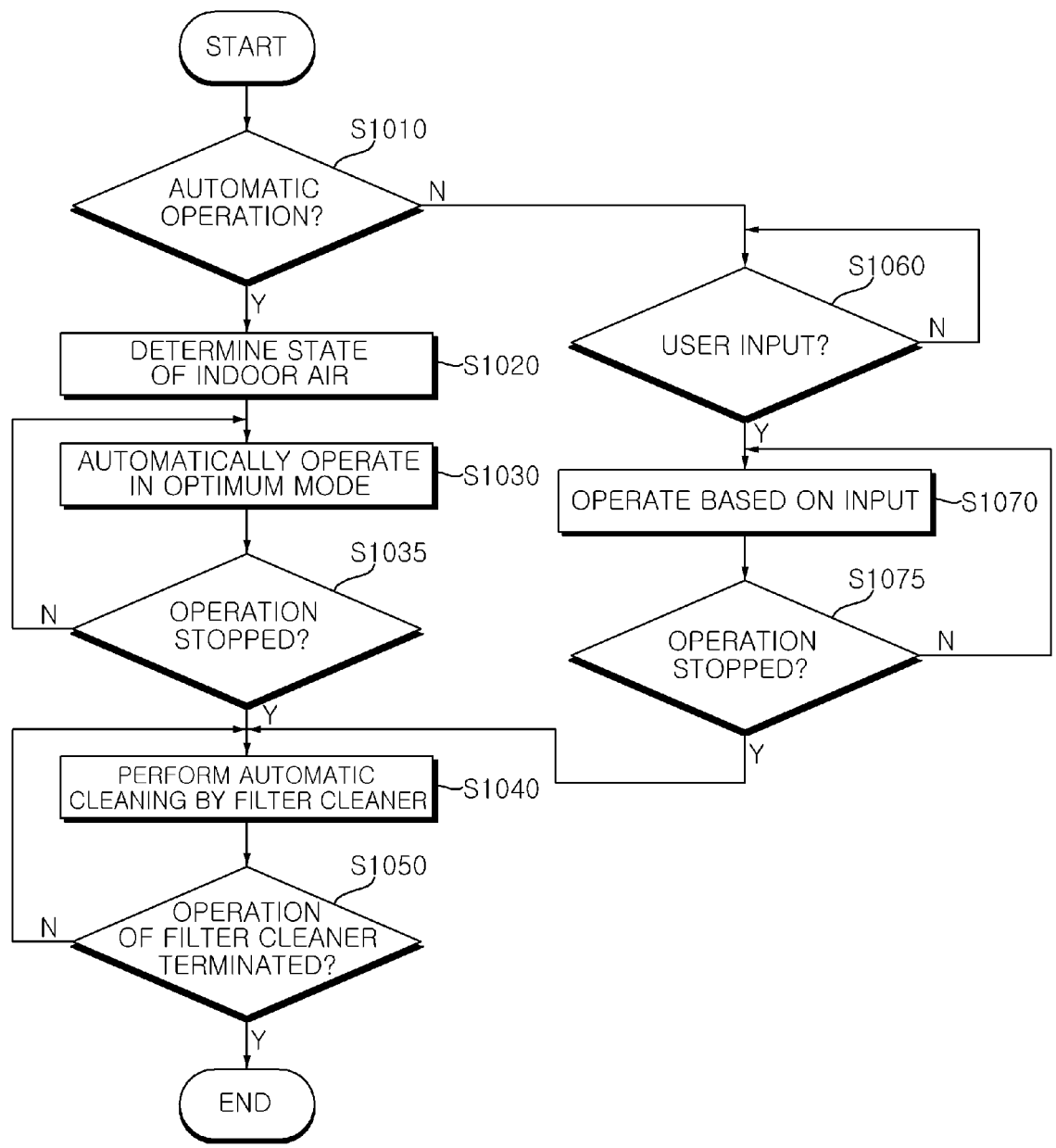
FIG. 64 is a flowchart of a method for operating an air-conditioning system according to an embodiment.

FIG. 64 is a flowchart of a method for operating an air-conditioning system according to an embodiment. The air-conditioning system 1 according to an embodiment may include first air-processing apparatus 100, which includes first inlet 102a formed in one surface thereof, which extends perpendicular to a floor or ceiling, and first outlet 102b formed in another surface thereof, which extends perpendicular to the first inlet 102a, and induces the air introduced into the first inlet 102a to exchange heat with refrigerant and to be delivered to the first outlet 102b. The first air-processing apparatus 100 may include heat exchanger 186, which induces the air introduced into the first inlet 102a to exchange heat with refrigerant.

In addition, the air-conditioning system 1 according to an embodiment may include second air-processing apparatus 200, which includes second inlet 202a formed therein so as to be open in the same direction as the first inlet 102a and second outlet 202b formed therein so as to be open in the same direction as the first outlet 102b. The second air-processing apparatus 200 may include filter device 284, which removes foreign substances from the air introduced into the second inlet 202a.

The air-conditioning system 1 according to an embodiment may be driven in a combined operation mode in which the first air-processing apparatus 100 and the second air-processing apparatus 200 operate together. Also, the air-conditioning system 1 according to an embodiment may be driven in an independent operation mode in which only one of the air-processing apparatuses 100 and 200 provided therein operates.

When automatic operation is set (S1010), the air-conditioning system 1 according to an embodiment may automatically select an optimum mode from among the combined operation mode and the independent operation mode, and may operate in the optimum mode (S1030). When automatic operation is not set (S1010), the air-conditioning system 1 according to an embodiment may receive user input from the remote control device 500 and the mobile terminal 700 (S1060), and may perform operation based on the received user input (S1070). Also, the air-conditioning system 1 according to an embodiment may stop operating based on the user input (S1075).

The air-conditioning system 1 may automatically operate in the combined operation mode or the independent operation mode based on the state of the air in the indoor space (S1030). The air-conditioning system 1 may determine the state of the air in the indoor space based on information acquired by the sensors provided in the apparatuses included in the system and information received from the server 710, the mobile terminal 730, and other external sensors (S1020). Also, the air-conditioning system 1 may automatically operate in the optimum mode suitable for the determined state of the air in the indoor space (S1030).

Figure 65:
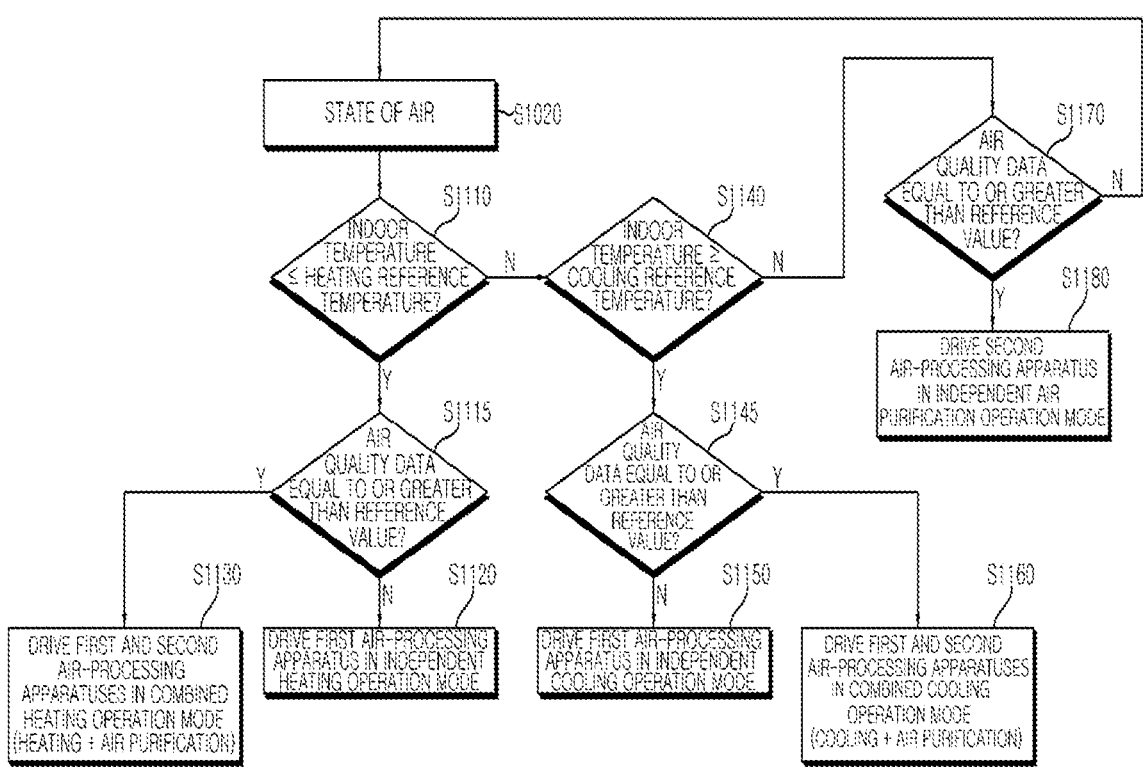
FIG. 65 is a flowchart of a method for operating an air-conditioning system according to an embodiment.

FIG. 65 is a flowchart of a method for operating an air-conditioning system according to an embodiment. FIG. 65 shows a process of automatically operating in the optimum mode (S1030) based on the state of the air in the indoor space (S1020).

Referring to FIG. 65, when the indoor temperature is equal to or lower than a heating reference temperature (S1110) and the air quality data is equal to or greater than a reference value (S1115), the first air-processing apparatus 100 may perform a heating operation, and the second air-processing apparatus 200 may perform an air purification operation in which the air introduced into the second inlet 202a is filtered and the filtered air is delivered to the second outlet (S1130). That is, the air-conditioning system 1 may perform a combined heating operation (S1130).

When the indoor temperature is equal to or lower than the heating reference temperature (S1110) and the air quality data is less than the reference value (S1115), only the first air-processing apparatus 100 may perform a heating operation. That is, the air-conditioning system 1 may perform an independent heating operation (S1120).

When the indoor temperature is equal to or higher than a cooling reference temperature (S1140) and the air quality data is equal to or greater than the reference value (S1145), the first air-processing apparatus 100 may perform a cooling operation, and the second air-processing apparatus may perform an air purification operation (S1160). That is, the air-conditioning system 1 may perform a combined cooling operation (S1160).

When the indoor temperature is equal to or higher than the cooling reference temperature (S1140) and the air quality data is less than the reference value (S1145), only the first air-processing apparatus 100 may perform a cooling operation (S1150). That is, the air-conditioning system 1 may perform an independent cooling operation (S1150).

When the indoor temperature is higher than the heating reference temperature (S1110) but lower than the cooling reference temperature (S1140) and the air quality data is equal to or greater than the reference value (S1170), only the second air-processing apparatus 200 may perform an air purification operation (S1180). That is, the air-conditioning system 1 may perform an independent air purification operation (S1180).

According to embodiments disclosed herein, it is possible to effectively manage indoor air and to rapidly circulate heat-exchanged air and filtered air in the indoor space using a plurality of air-processing apparatuses in which outlets are formed in a line. In addition, it is possible to efficiently manage an air-conditioning operation by controlling a plurality of air-processing apparatuses in an automatically interlocking manner.

The first air-processing apparatus 100 according to an embodiment includes inlet 102a formed in one surface thereof, which extends perpendicular to a floor or the ceiling, and pre-filter 188 disposed in the inlet 102a, and the second air-processing apparatus 200 according to an embodiment includes inlet 202a formed in one surface thereof, which extends perpendicular to the floor or the ceiling, and pre-filter 288 disposed in the inlet 202a. When the operation of at least one of the air-processing apparatuses 100 and 200 is stopped (S1035), the filter cleaner 300 may automatically move to clean at least one of the pre-filters 188 and 288 provided in the air-processing apparatuses 100 and 200 (S1040).

When the cleaning operation by the filter cleaner 300 is finished (S1050), operation of the air-conditioning system 1 may be terminated. That is, according to an embodiment, the pre-filters 188 and 288 may automatically perform cleaning when a predetermined operation is finished, thereby always maintaining the pre-filters 188 and 288 and the inlets 102a and 202a clean. Accordingly, it is possible to prevent deterioration in suction performance, thus ensuring improved air-conditioning efficiency. As the pre-filters 188 and 288 respectively disposed in the first air-processing apparatus 100 and the second air-processing apparatus 200 are cleaned by a single filter cleaner 300, it is possible to efficiently manage the pre-filters 188 and 288.

FIGS. 66A-66D are views for explaining movement of, and cleaning performed by, the filter cleaner according to an embodiment.

Figure 66A:
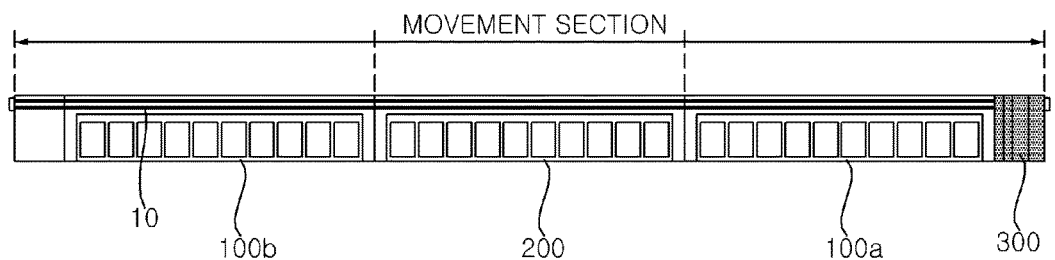
FIGS. 66A-66D are views for explaining movement of, and cleaning performed by, the filter cleaner according to an embodiment.

Referring to FIG. 66A, the air-processing apparatuses 100a, 200, and 100b may be disposed adjacent to each other in the lateral direction. The filter cleaner 300 may clean at least one of the pre-filters 188 and 288 included in the air-processing apparatuses 100a, 200, and 100b while moving in the lateral direction.

Guide rail 10 that guides the movement of the filter cleaner 300 is disposed on one side of each of the air-processing apparatuses 100a, 200, and 100b. The guide rail 10 may be disposed above the pre-filters 188 and 288 of the air-processing apparatuses 100a, 200, and 100b so as to extend in the lateral direction.

The filter cleaner 300 may move in the lateral direction along the guide rail 10. The filter cleaner 300 is configured to be movable between a start point and an end point of a movement section. The filter cleaner 300 may stand by at the start point of the movement section, and may start to move toward the end point of the movement section when a predetermined event, such as stoppage of operation, occurs or when a user's cleaning command is received, for example. The end plate 28 may be disposed on the guide rail 10 in order to restrict the movement of the filter cleaner 300 and to define a range of the movement section.

Figure 66B:
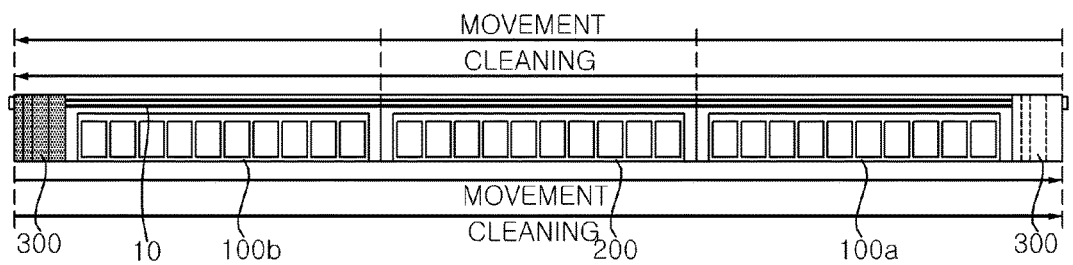

Referring to FIG. 66B, the filter cleaner 300 may clean all of the pre-filters 188 and 288 included in the air-processing apparatuses 100a, 200, and 100b while moving. The filter cleaner 300 may move from the start point to the end point. Also, when the filter cleaner 300 arrives at the end point, the direction that the filter cleaner 300 moves may change. The filter cleaner 300 may return from the end point to the start point.

According to embodiments, some of the pre-filters 188 and 288 may be cleaned. In particular, in a case in which some of the air-processing apparatuses 100a, 200, and 100b are driven in the independent operation mode, only the pre-filters 188 and 288 included in the air-processing apparatuses 100a, 200, and 100b that have operated may be cleaned when the operation is stopped. Accordingly, it is possible to shorten a cleaning time, improve cleaning efficiency, and minimize consumption of power of the battery of the filter cleaner 300.

Figure 66C:
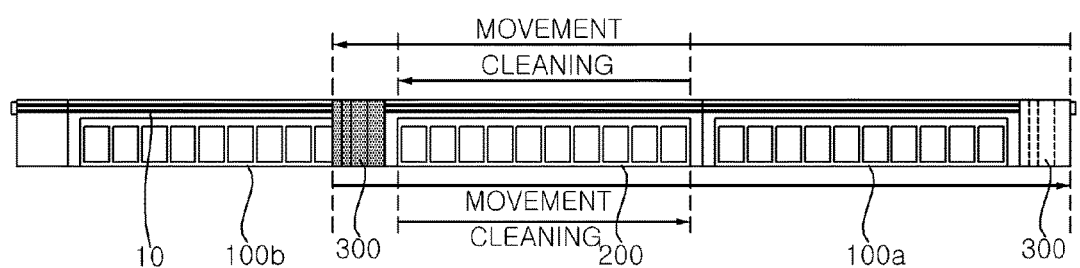

Referring to FIG. 66C, in a case in which only the second air-processing apparatus 200 which is located in the middle among the air-processing apparatuses 100a, 200, and 100b performs an air purification operation, the filter cleaner 300 may clean only the pre-filter 288 included in the second air-processing apparatus 200 while moving when the air purification operation is stopped. In this case, the filter cleaner 300 may pass by the first air-processing apparatus 100a without operating the suction device 376 or the agitator 420. After passing by the first air-processing apparatus 100a, the filter cleaner 300 may operate the suction device 376 and the agitator 420 to clean the pre-filter 288 included in the second air-processing apparatus 200.

Figure 66D:
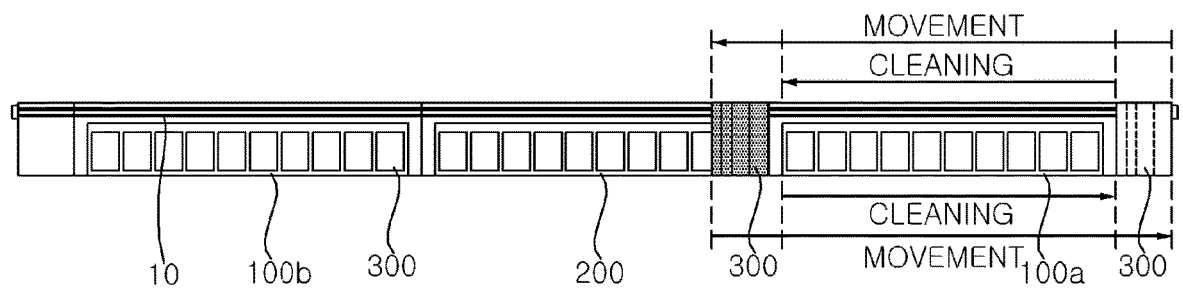

Referring to FIG. 66D, in a case in which only the first air-processing apparatus 100a, which is located close to the start point, among the air-processing apparatuses 100a, 200, and 100b, performs a cooling operation, the filter cleaner 300 may clean only the pre-filter 188 included in the first air-processing apparatus 100a while moving when the cooling operation is stopped. In this case, it is unnecessary for the filter cleaner 300 to move to the other air-processing apparatuses 200 and 100b to clean the pre-filters thereof.

Although FIGS. 66C and 66D illustrate the case in which only one air-processing apparatus 200 or 100a is driven and only the pre-filter 288 or 188 included therein is cleaned, embodiments are not limited thereto. For example, when the first air-processing apparatuses 100a and 100b are driven, the pre-filters 188 of the first air-processing apparatuses 100a and 100b may be cleaned when the operation is stopped.

When it is desired to clean the pre-filter 288 or 188 of the specific air-processing apparatus 200 or 100a, the portion of the guide rail 10 that corresponds to the specific air-processing apparatus 200 or 100a or the pre-filter 288 or 188 may be defined as a cleaning section, and the suction device 376 and the agitator 420 may operate between the start point and the end point of the cleaning section.

Figure 67:
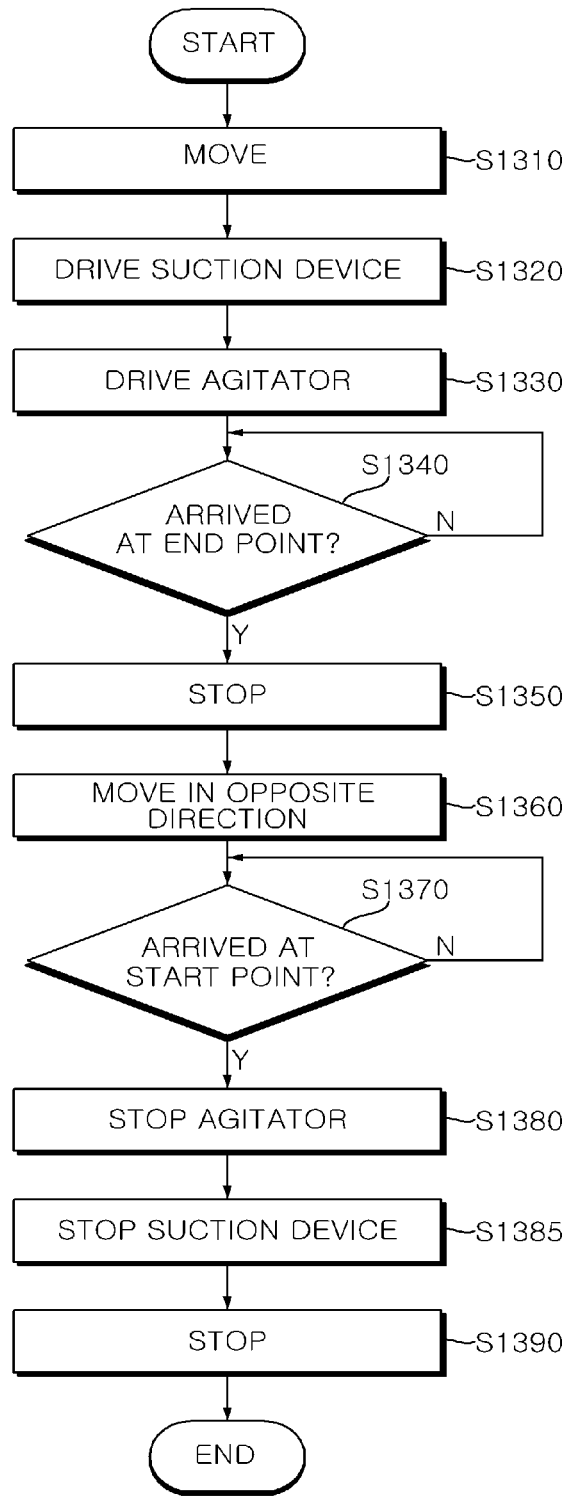
FIG. 67 is a flowchart of a method for operating an air-conditioning system according to an embodiment.

FIG. 67 is a flowchart of a method for operating an air-conditioning system according to an embodiment. FIG. 67 shows an embodiment in which the filter cleaner 300 cleans all of the pre-filters 188 and 288 provided in the air-conditioning system 1. The embodiment shown in FIG. 67 corresponds to the embodiment shown in FIG. 66B.

Referring to FIG. 67, the filter cleaner 300 may stand by at the start point of the movement section, and may start to move toward the end point of the movement section when a predetermined event, such as stoppage of operation, occurs or when a user's cleaning command is received (S1310). The filter cleaner 300 may move (S1310), and may drive the suction device 376 (S1320) and the agitator 420 (S1330) in order to perform a cleaning operation. The suction device 376 may be driven first, or the agitator 420 may be driven first. Alternatively, the suction device 376 and the agitator 420 may be driven simultaneously.

When arriving at the end point (S1340), the filter cleaner 300 may stop moving (S1350). The filter cleaner 300 may change the moving direction thereof so as to move in the opposite direction (S1360). That is, the filter cleaner 300 may move from the end point toward the start point (S1360).

When arriving at the start point (S1370), the filter cleaner 300 may stop driving the agitator 420 and the suction device 376 (S1380 and S1385), and may stop moving (S1390). Accordingly, the filter cleaner 300 may clean the pre-filters 188 and 288 twice while reciprocating.

In some embodiments, operation of the agitator 420 and the suction device 376 may be stopped when the filter cleaner 300 arrives at the end point (S1340), and may resume when the filter cleaner 300 moves in the opposite direction (S1360).

Figure 68:
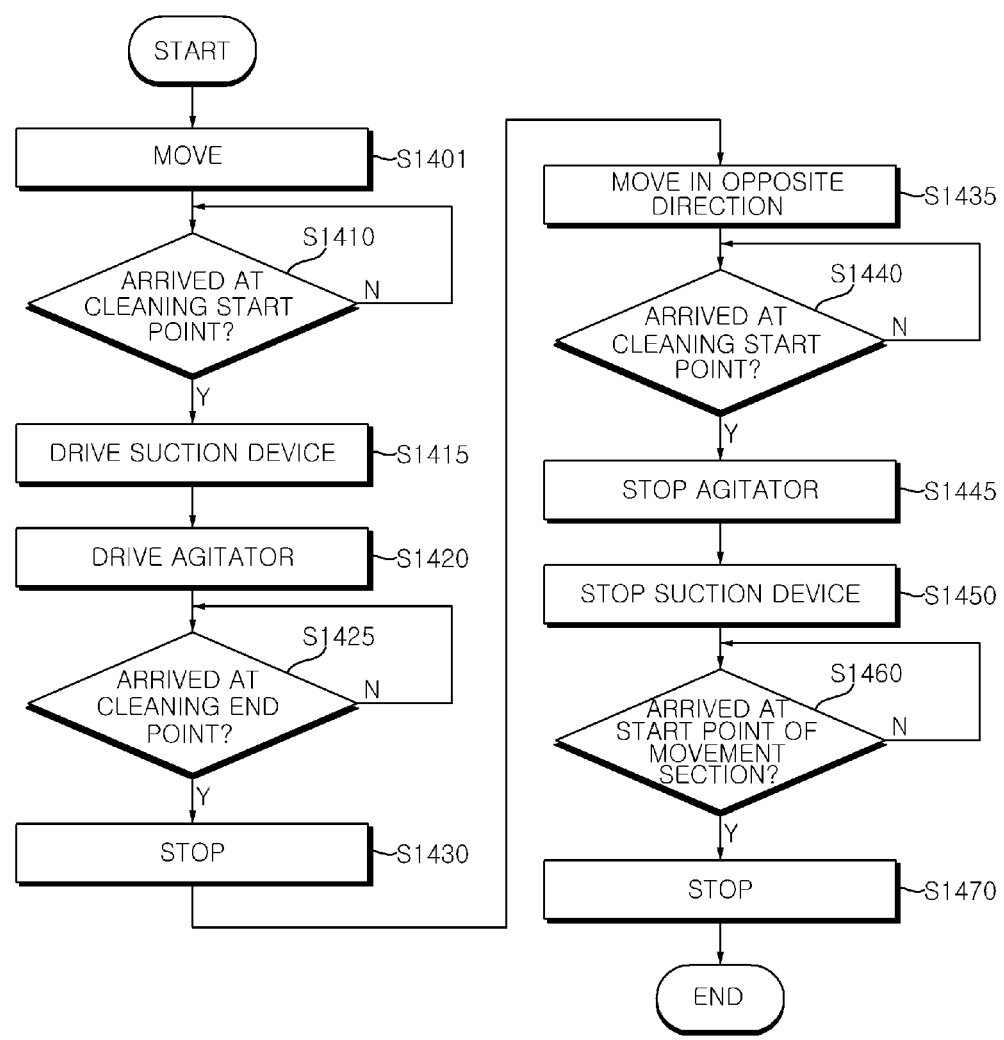
FIG. 68 is a flowchart of a method for operating an air-conditioning system according to an embodiment.

FIG. 68 is a flowchart of a method for operating an air-conditioning system according to an embodiment. FIG. 68 shows the embodiment in which the filter cleaner 300 cleans some of the pre-filters 188 and 288 provided in the air-conditioning system 1. The embodiment shown in FIG. 68 corresponds to the embodiment shown in FIG. 66C.

Referring to FIG. 68, the filter cleaner 300 may stand by at the start point of the movement section, and may start to move toward the end point of the movement section when a predetermined event, such as stoppage of operation, occurs or when a user's cleaning command is received (S1401). When arriving at the start point of the cleaning section (S1410), the filter cleaner 300 may drive the suction device 376 and the agitator 420 (S1415 and S1420).

When arriving at the end point of the cleaning section (S1425), the filter cleaner 300 may stop moving (S1430). The filter cleaner 300 may change the moving direction thereof so as to move in the opposite direction (S1435). That is, the filter cleaner 300 may move from the end point of the cleaning section toward the start point of the movement section (S1435).

When arriving again at the start point of the cleaning section (S1440), the filter cleaner 300 may stop driving the suction device 376 and the agitator 420 (S1445 and S1450).

Accordingly, the filter cleaner 300 may perform a cleaning operation twice while reciprocating the cleaning section.

In some embodiments, the operation of the agitator 420 and the suction device 376 may be stopped when the filter cleaner 300 arrives at the end point of the cleaning section (S1425), and may be resumed when the filter cleaner 300 moves in the opposite direction (S1435). When arriving at the start point of the movement section (S1460), the filter cleaner 300 may stop moving (S1470).

FIGS. 69A-69E are views for explaining cleaning that is performed during operation of the air-conditioning system according to an embodiment. The air-conditioning system 1 according to an embodiment of the present disclosure may include a plurality of air-processing apparatuses 100 and 200, and may clean the pre-filters 188 and 288 when all or some of the plurality of air-processing apparatuses 100 and 200 are operating.

While the first air-processing apparatus 100 or the second air-processing apparatus 200 is operating, when the filter cleaner 300 enters a section corresponding to the air-processing apparatus that is operating, the air-processing apparatus that is operating may temporarily stop operating while the filter cleaner 300 passes through the corresponding section. Accordingly, it is possible to clean the pre-filters 188 and 288 without blocking the inlets 102a and 202a of the air-processing apparatuses 100 and 200 that are operating and without stopping the overall operation of the air-conditioning system 1. FIGS. 69A-69E show a case in which the air-conditioning system 1 includes two first air-processing apparatuses 100a and 100b and two second air-processing apparatuses 200a and 200b and the filter cleaner 300 sequentially moves along all of the air-processing apparatuses 100a, 100b, 200a, and 200b while the air-processing apparatuses 100a, 100b, 200a, and 200b are operating.

Figure 69A:
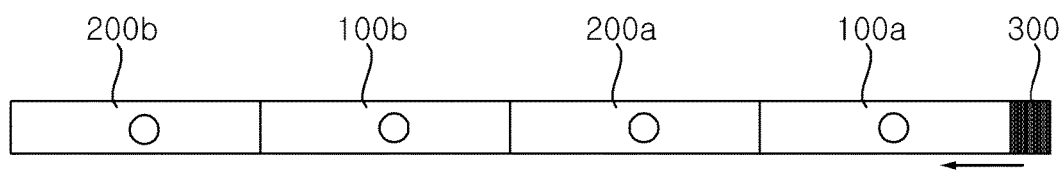
FIGS. 69A-69E are views for explaining cleaning that is performed during operation of the air-conditioning system according to an embodiment.

Referring to FIG. 69A, when the air-processing apparatuses 100a, 100b, 200a, and 200b are operating, the filter cleaner 300 stands by at the start point. If a user's cleaning command is received, operation of the air-processing apparatuses 100a, 100b, 200a, and 200b may be sequentially stopped, and the filter cleaner 300 may perform a cleaning operation (refer to FIGS. 69B to 69E).

Figure 69B:
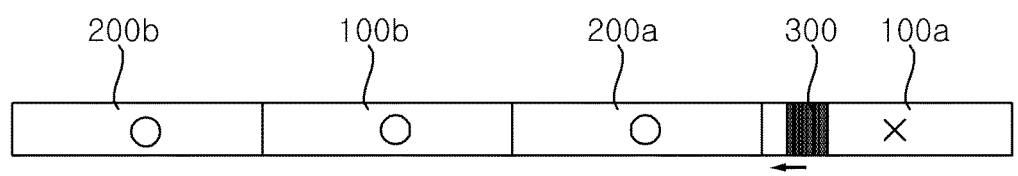
Figure 69C:
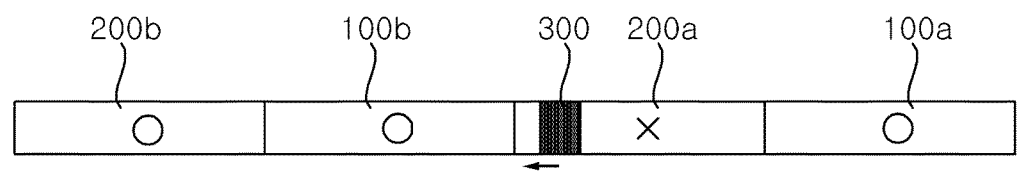
Figure 69D:
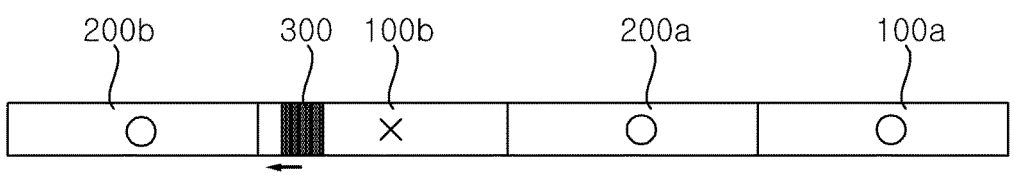
Figure 69E:
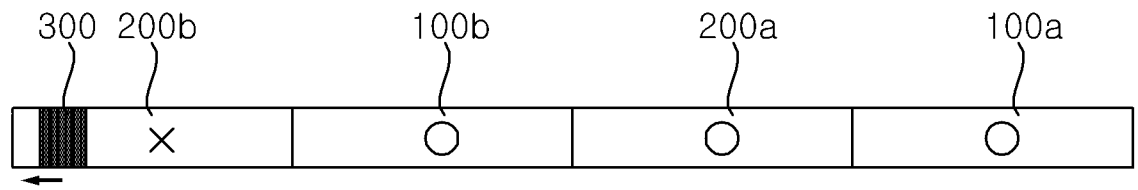

Referring to FIGS. 69B and 69C, when the filter cleaner 300 enters a section corresponding to the air-processing apparatuses 100a and 200a, the air-processing apparatuses 100a and 200a that are operating may temporarily stop operating while the filter cleaner 300 passes through the corresponding section. Referring to FIGS. 69D and 69E, when the filter cleaner 300 enters a section corresponding to the air-processing apparatuses 100b and 200b, the air-processing apparatuses 100b and 200b that are operating may temporarily stop operating while the filter cleaner 300 passes through the corresponding section.

Figure 70:
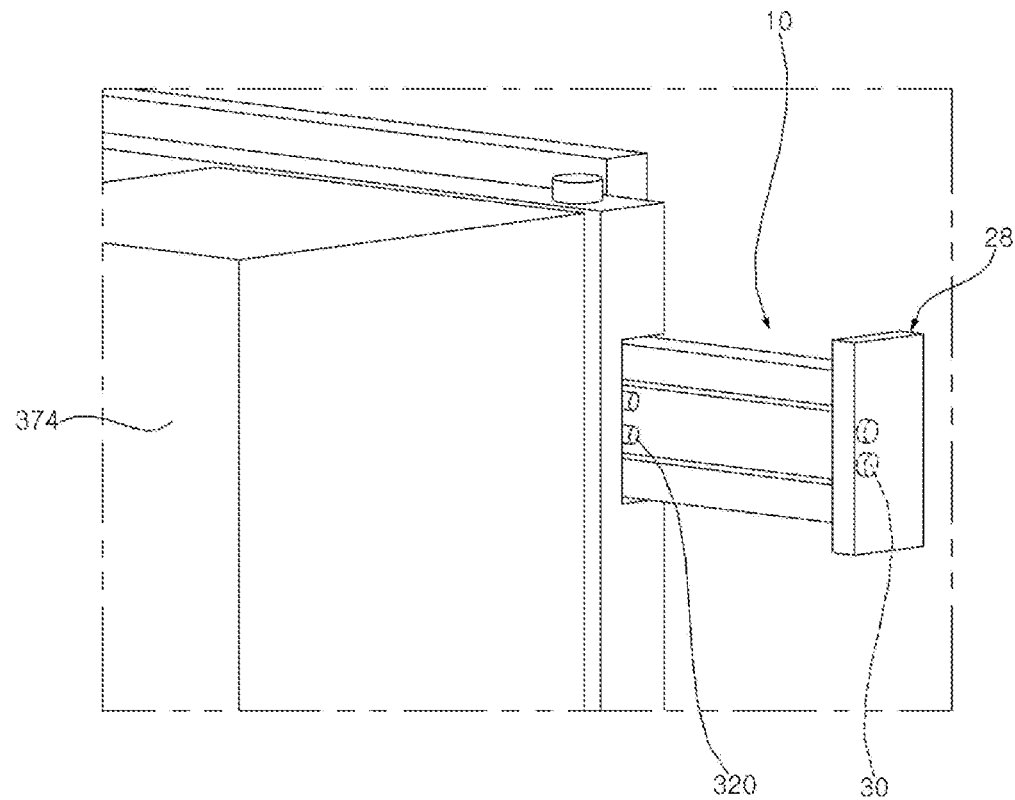
FIGS. 70 to 72 are views for explaining charging of the filter cleaner according to an embodiment.
Figure 71:
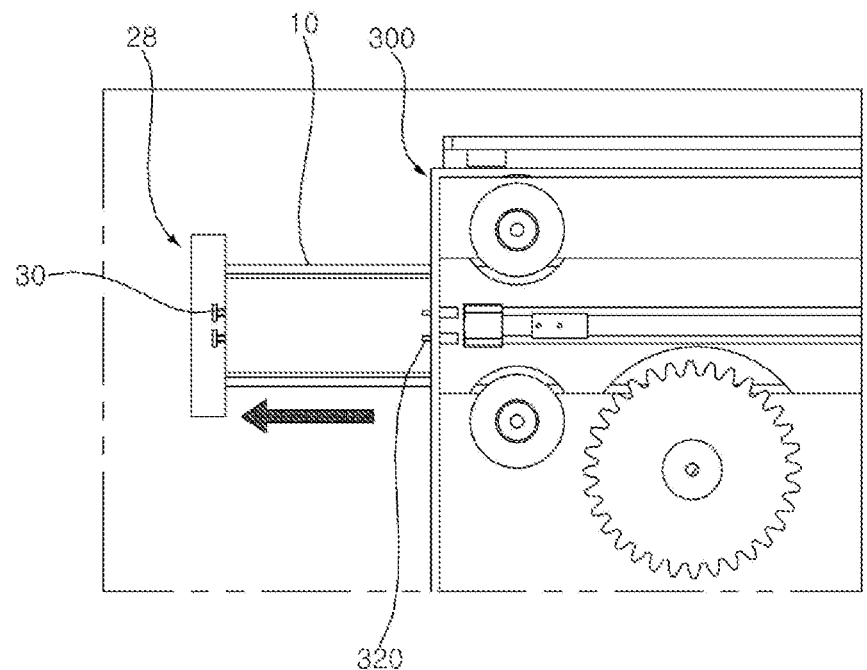
Figure 72:
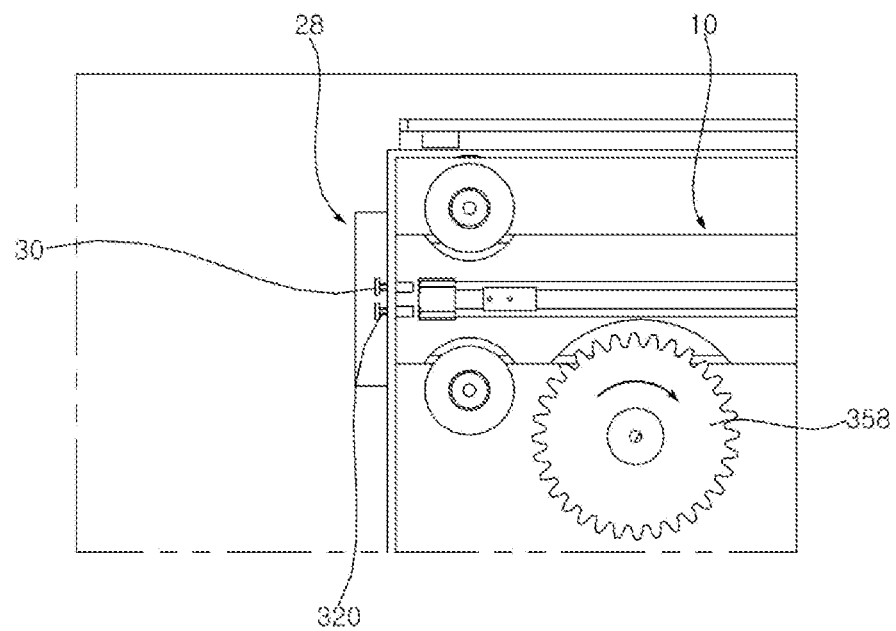

FIGS. 70 to 72 are views for explaining charging of the filter cleaner according to an embodiment. The air-conditioning system 1 according to an embodiment may include air-processing apparatuses 100 and 200, which respectively include inlets 102a and 202a formed in surfaces thereof, which extend perpendicular to a floor or ceiling, and pre-filters 188 and 288 disposed in the inlets 102a and 202a, guide rail 10 disposed on one side of each of the air-processing apparatuses 100 and 200, and filter cleaner 300, which includes battery 374 and connection terminal 320 to which power for charging the battery 374 is supplied and is configured to clean the pre-filters 188 and 288 included in the air-processing apparatuses 100 and 200 while moving along the guide rail 10 based on the power charged in the battery 374.

In addition, the air-conditioning system 1 according to an embodiment may further include a charging system that charges the battery 374. The charging system that charges the battery 374 may be provided inside of end plate 28.

Referring to FIGS. 70 to 72 and 59, the air-conditioning system 1 according to an embodiment may include the end plate 28, which includes the charging terminal 30 configured to be connected to the connection terminal 320 of the filter cleaner 300 and power supply circuit 820 configured to supply power to the charging terminal 30 when the connection terminal 320 is connected to the charging terminal 30. The end plate 28 may be disposed at the left end or the right end of the guide rail 10.

FIGS. 70 and 71 show a state before the connection terminal 320 and the charging terminal 30 are connected to each other. FIG. 72 shows a state in which the connection terminal 320 and the charging terminal 30 are connected to each other.

The filter cleaner 300 may move along the guide rail 10 by rotation of the moving gear 358 in the clockwise or counterclockwise direction. When the moving gear 358 rotates in one direction, the filter cleaner 300 may approach the end plate 28, and may finally come into contact with the end plate 28.

The end plate 28 may be disposed in a direction perpendicular to the direction in which the guide rail 10 extends. The charging terminal 30 may be disposed so as to protrude in the direction in which the guide rail 10 extends. The connection terminal 320 and the charging terminal 30 may be formed in shapes corresponding to each other so as to be interconnected. The connection terminal 320 and the charging terminal 30 may be formed at a same height. Accordingly, the connection terminal 320 and the charging terminal 30 may be connected to each other when the filter cleaner 300 moves in one direction along the guide rail 10 to the end of the guide rail 10.

The start point of the movement section within which the filter cleaner 300 can move may be a position at which the connection terminal 320 and the charging terminal 30 are connected to each other. Accordingly, the filter cleaner 300 may stand by at the start point in a state in which the filter cleaner 300 is being charged or is fully charged, and may move therefrom in order to perform a cleaning operation.

The filter cleaner 300 may automatically clean the pre-filters 188 and 288 while moving, and may then return to the start point. When the connection terminal 320 and the charging terminal 30 are connected to each other, the power supply circuit 820 may supply power to the charging terminal 30 to charge the battery 374.

The filter cleaner 300 may clean the pre-filters 188 and 288 while moving by rotating the moving gear 358 in a first direction, and may then return to the start point by rotating the moving gear 358 in a second direction, which is opposite the first direction. That is, the filter cleaner 300 may change the moving direction thereof by changing the rotating direction of the moving gear 358.

According to an embodiment, an operation of bringing the connection terminal 320 and the charging terminal 30 into close contact with each other may be performed in order to ensure connection therebetween. After returning to the start point, the filter cleaner 300 may rotate the moving gear 358 in the second direction by a predetermined angle, thereby applying tension to the connection terminal 320 and the charging terminal 30. For example, when finishing cleaning, the filter cleaner 300 may return to the start point at which the filter cleaner 300 stands by before moving, and thereafter may rotate the moving gear 358 in the second direction by a minimum controllable unit, thereby bringing the connection terminal 320 and the charging terminal 30 into close contact with each other.

Alternatively, in the case in which a support part or portion or support (not shown) that supports the filter cleaner 300 is further provided, it may be possible to apply pressure to the filter cleaner 300 toward the end plate 28 using the support. Accordingly, the connection terminal 320 and the charging terminal 30 may come into close contact with each other.

Figure 73:
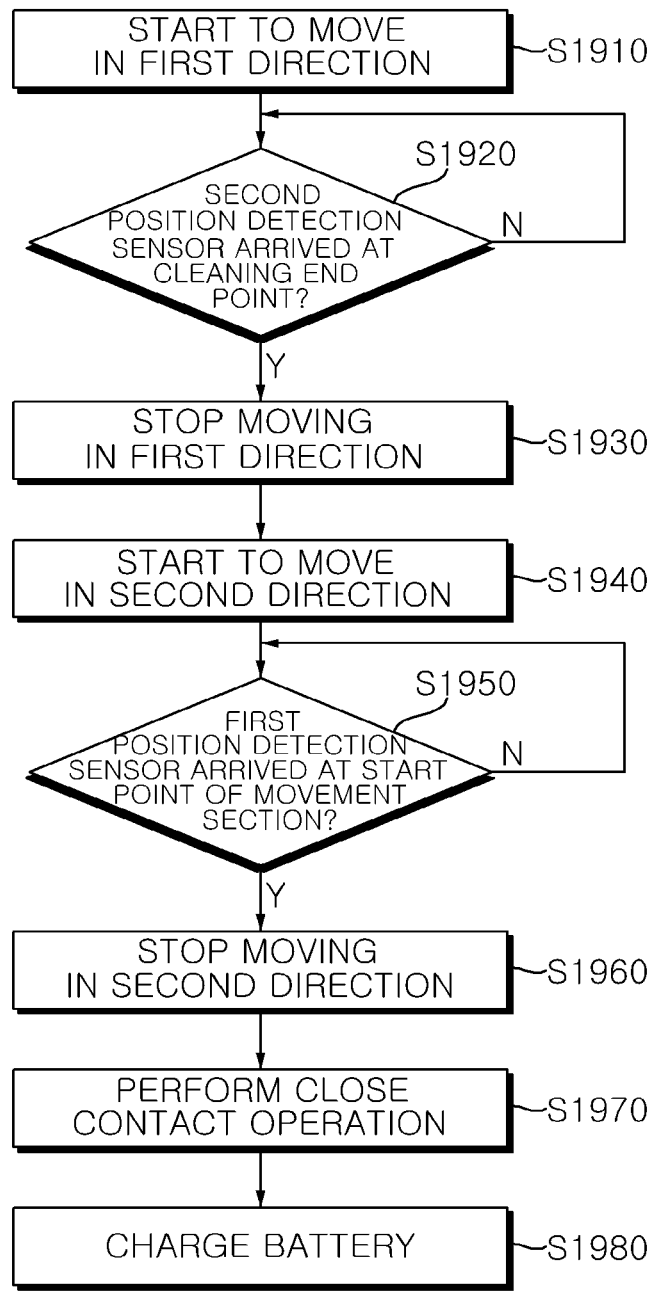
FIG. 73 is a flowchart of a method for operating an air-conditioning system according to an embodiment.

FIG. 73 is a flowchart of a method for operating an air-conditioning system according to an embodiment. FIG. 73 shows an example of movement of, and cleaning performed by, the filter cleaner 300. FIGS. 74A-74E are views for explaining determination of a position and movement of the filter cleaner 300 according to an embodiment.

Referring to FIGS. 73 and 74A-74E, the filter cleaner 300 may stand by at the start point of the movement section, and may start to move in a first direction along the guide rail 10 when a predetermined event, such as stoppage of operation, occurs or when a user's cleaning command is received (S1910). The first direction may be a direction from the start point, at which the filter cleaner 300 stands by, to the end point.

A plurality of objects to be sensed 26a to 26n may be disposed on the guide rail 10 so as to be spaced apart from each other in the lateral direction. The filter cleaner 300 may include a position detection sensor 322, and the position detection sensor 322 may sense the objects to be sensed 26a to 26n. The objects to be sensed 26 may be formed in a structure corresponding to the position detection sensor 322. For example, when the position detection sensor 322 is a switch sensor, the objects to be sensed 26 may have a shape of a protrusion that protrudes rearwards. Alternatively, when the position detection sensor 322 is a Hall sensor, the objects to be sensed 26 may be implemented as magnets.

The filter cleaner 300 may determine the position thereof based on the objects to be sensed 26a to 26n, which are detected by the position detection sensor 322. At least two objects to be sensed 26a and 26n may be disposed on the guide rail 10. At least two objects to be sensed 26a and 26n may be disposed on the guide rail 10 at positions corresponding to the start point and the end point of the movement section within which the filter cleaner 300 moves. The first object to be sensed 26a may be disposed at a position corresponding to the start point of the movement section. The n$^{th}$ object to be sensed 26n may be disposed at a position corresponding to the end point of the movement section.

The position detection sensor 322 may recognize the start point of the movement section by sensing the first object to be sensed 26a, and may recognize the end point of the movement section by sensing the n$^{th}$ object to be sensed 26n. When the filter cleaner 300 moves in the first direction, if the position detection sensor 322 senses the n$^{th}$ object to be sensed 26n, it may be determined that the filter cleaner 300 has arrived at the end point of the movement section. The filter cleaner 300 may change the moving direction thereof, that is, may move in the second direction, which is opposite the first direction. If the position detection sensor 322 senses the first object to be sensed 26a, it is determined that the filter cleaner 300 has returned to the start point of the movement section.

According to an embodiment, three or more objects to be sensed 26a to 26n may be disposed on the guide rail 10. A greater number of objects to be sensed 26a to 26n is advantageous from the aspect of accuracy of determination of the position of the filter cleaner 300 and precision of control of the movement thereof.

The position of the filter cleaner 300 may be determined based on at least one of identification information of the objects to be sensed 26a to 26n that are detected by the position detection sensor 322, the types of objects to be sensed 26a to 26n, the order in which the objects to be sensed 26a to 26n are detected, or a change in a physical parameter, for example, pressure, magnetic field, current, by the objects to be sensed 26a to 26n.

The plurality of objects to be sensed 26a to 26n may be disposed so as to be spaced a regular distance d apart from each other based on the start point of the movement section. Accordingly, it is possible to accurately determine the moving distance of the filter cleaner 300 using only the number of objects to be sensed 26a to 26n that are detected or the order in which the objects to be sensed 26a to 26n are detected during a single movement of the filter cleaner 300.

Alternatively, the plurality of objects to be sensed 26a to 26n may be disposed at feature points, such as the start point and the end point of the movement section, the start point and the end point of each of the air-processing apparatuses 100 and 200, and the start point and the end point of each of the pre-filters 188 and 288. Accordingly, the filter cleaner 300 may conveniently determine the movement section and the cleaning section.

The air-processing apparatuses 100 and 200 according to an embodiment may be modularized so as to have a same external appearance and size. The objects to be sensed 26a to 26n may be disposed in each module so as to be spaced a regular distance apart from each other. The objects to be sensed 26a to 26n may be spaced a regular distance apart from each other based on the start point of each module. The objects to be sensed 26a to 26n may be spaced a regular distance apart from each other based on the end point of each module. Accordingly, it is possible to accurately determine the position of the filter cleaner 300 and to precisely control the movement of the filter cleaner 300.

The filter cleaner 300 may include a plurality of position detection sensors 322. In order to improve the accuracy of position determination. For example, the filter cleaner 300 may include a first position detection sensor 322L and a second position detection sensor 322R, which are spaced apart from each other.

When the filter cleaner 300 moves in the first direction, the first position detection sensor 322L may sense the objects to be sensed 26a to 26n earlier than the second position detection sensor 322R. Also, when the filter cleaner 300 moves in the second direction, the second position detection sensor 322R may sense the objects to be sensed 26a to 26n earlier than the first position detection sensor 322L.

Figure 74A:
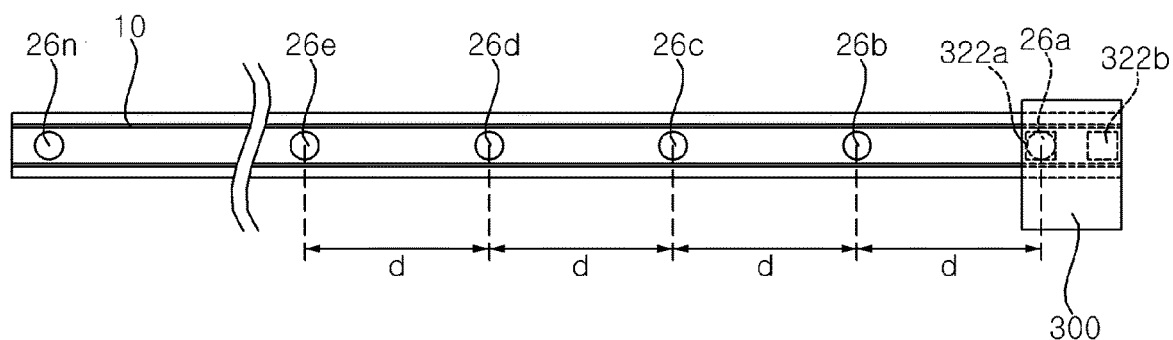
FIGS. 74A-74E are views for explaining determination of a position and movement of the filter cleaner according to an embodiment.

Referring to FIG. 74A, the filter cleaner 300 stands by at the start point in the state of being in contact with the end plate 28. At this time, the first position detection sensor 322L may sense the object to be sensed 26a corresponding to the start point.

Figure 74B:
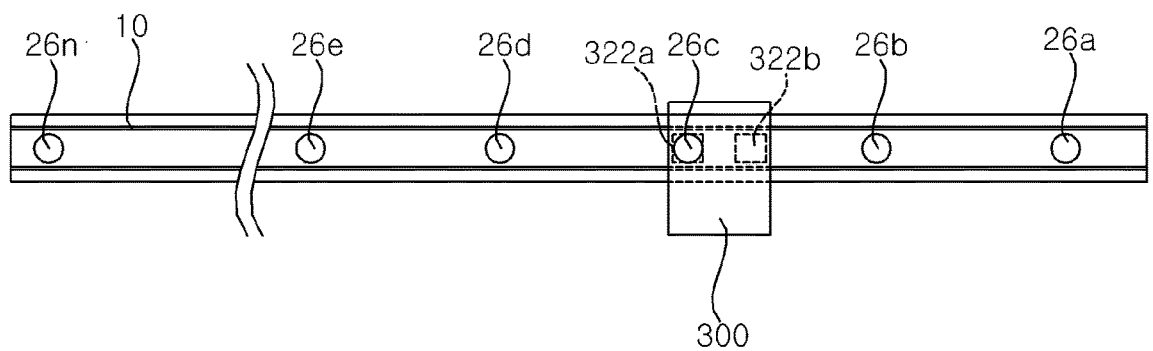

Referring to FIG. 74B, as the filter cleaner 300 moves in the first direction, the first position detection sensor 322L may sense the object to be sensed 26c. Because the filter cleaner 300 continues to move in the first direction, the object to be sensed 26c sensed by the first position detection sensor 322L may also be sensed by the second position detection sensor 322R.

Figure 74C:
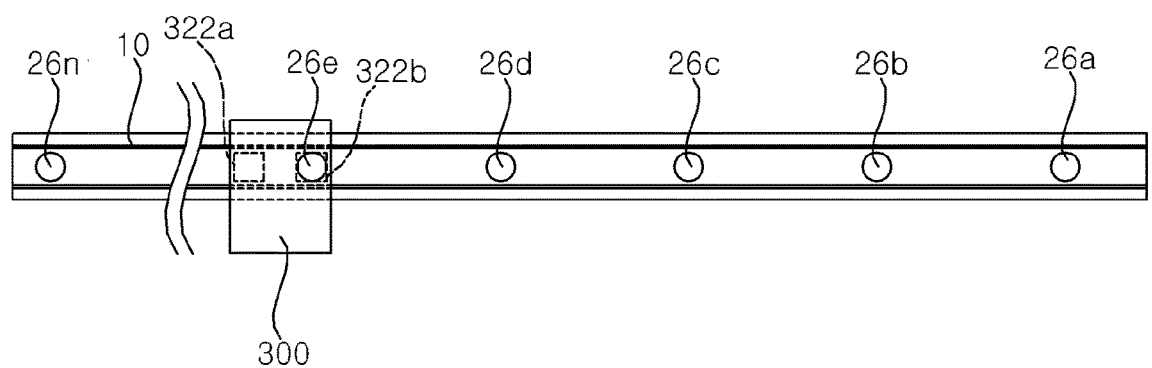
Figure 74D:
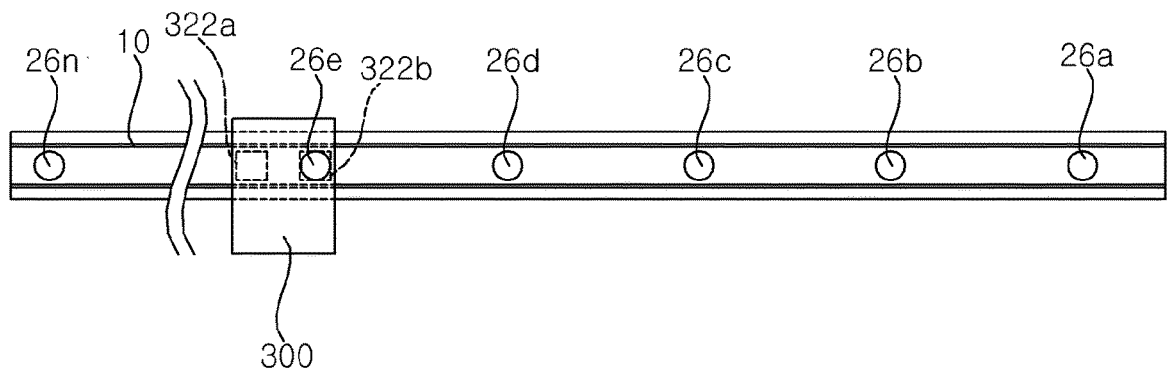

Referring to FIGS. 74C and 74D, the object to be sensed 26e corresponding to the end point of the cleaning section may be first sensed by the first position detection sensor 322L, and may then be sensed by the second position detection sensor 322R. When the filter cleaner 300 moves in the first direction (S1910), if the second position detection sensor 322R detects the end point of the cleaning section (S1920), the filter cleaner 300 may stop moving (S1930). When the second position detection sensor 322R senses the object to be sensed corresponding to the end point of the cleaning section, it may be determined that the second position detection sensor 322R has arrived at the end point of the cleaning section (S1920).

When the filter cleaner 300 moves in the first direction (S1910), the second position detection sensor 322R may sense the objects to be sensed 26a to 26n later than the first position detection sensor 322L. Accordingly, when the second position detection sensor 322R detects the end point of the cleaning section (S1920), there is no object to be cleaned even if the filter cleaner 300 moves further. Accordingly, when the second position detection sensor 322R detects the end point of the cleaning section (S1920), the filter cleaner 300 may stop moving (S1930), and may start to move in the second direction (S1940). In the same manner, when the filter cleaner 300 moves in the second direction (S1940), the first position detection sensor 322L may sense the objects to be sensed 26a to 26n later than the second position detection sensor 322R.

Figure 74E:
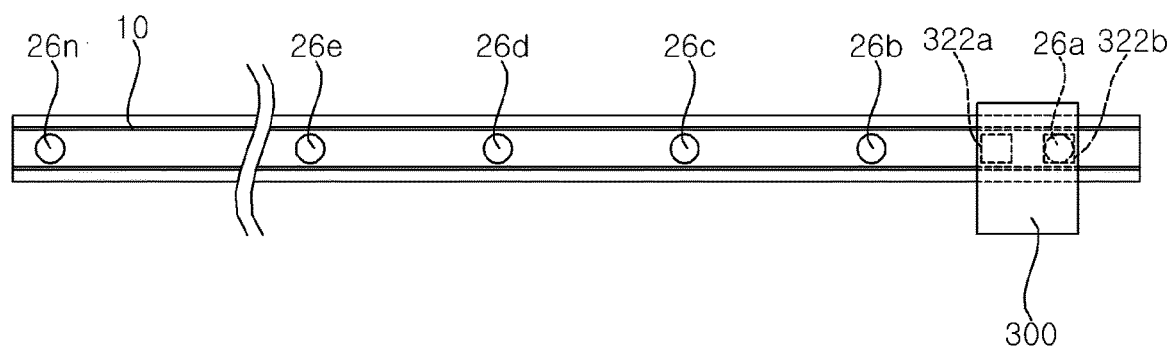

As the filter cleaner 300 moves in the second direction, the objects to be sensed 26d to 26a may be sensed. Referring to FIGS. 74E and 74A, the object to be sensed 26a corresponding to the start point of the movement section may be first sensed by the second position detection sensor 322R, and may then be sensed by the first position detection sensor 322L.

When the filter cleaner 300 moves in the second direction (S1940), if the first position detection sensor 322L detects the start point of the movement section (S1950), the filter cleaner 300 may stop moving in the second direction (S1960). When the first position detection sensor 322L senses the object to be sensed corresponding to the start point of the movement section, it may be determined that the first position detection sensor 322L has arrived at the start point of the movement section (S1950).

The movement in the second direction is movement for returning to the end plate 28. Therefore, when the filter cleaner 300 arrives at the start point of the movement section, the filter cleaner 300 may come into contact with the end plate 28. Also, when the charging terminal 30 and the connection terminal 320 are connected to each other, the power supply circuit 820 may supply power via the connection terminal 320 and the charging terminal 30 to charge the battery 374 (S1980).

According to an embodiment, in order to stably support the filter cleaner 300 and to reliably charge the battery 374, when the filter cleaner 300 arrives at the start point of the movement section, a close-contact operation of pressing the filter cleaner 300 toward the end plate 28 may be performed (S1970).

The filter cleaner 300 may include dust container device 400, which forms a space for accommodating foreign substances, agitator 420, which rotates while contacting the pre-filters 188 and 288, and suction device 376, which delivers foreign substances removed by the agitator 420 to the dust container device 400.

When it is desired to clean all of the pre-filters 188 and 288 provided in the air-conditioning system 1, the filter cleaner 300 may drive the suction device 376 and the agitator 420 while moving toward the end point of the movement section within which the filter cleaner 300 can move. When arriving at the end point of the movement section, the filter cleaner 300 may stop moving, and may move toward the start point of the movement section. When arriving at the start point of the movement section, the filter cleaner 300 may stop driving the suction device 376 and the agitator 420, and may terminate operation. The filter cleaner 300 may stop driving the suction device 376 and the agitator 420 when arriving at the end point, and may resume driving the suction device 376 and the agitator 420 when moving toward the start point.

When it is desired to clean some of the pre-filters 188 and 288 provided in the air-conditioning system 1, the filter cleaner 300 may move toward the cleaning section corresponding to the filter to be cleaned by the filter cleaner 300. When arriving at the start point of the cleaning section, the filter cleaner 300 may drive the suction device 376 and the agitator 420. When arriving at the end point of the cleaning section, the filter cleaner 300 may stop moving, and may move toward the start point of the movement section within which the filter cleaner 300 can move. The filter cleaner 300 may stop driving the suction device 376 and the agitator 420 when arriving at the start point of the cleaning section, and may terminate operation when arriving at the start point of the movement section. The filter cleaner 300 may stop driving the suction device 376 and the agitator 420 when arriving at the end point of the cleaning section, and may resume driving the suction device 376 and the agitator 420 when moving toward the start point of the cleaning section.

Figure 75:
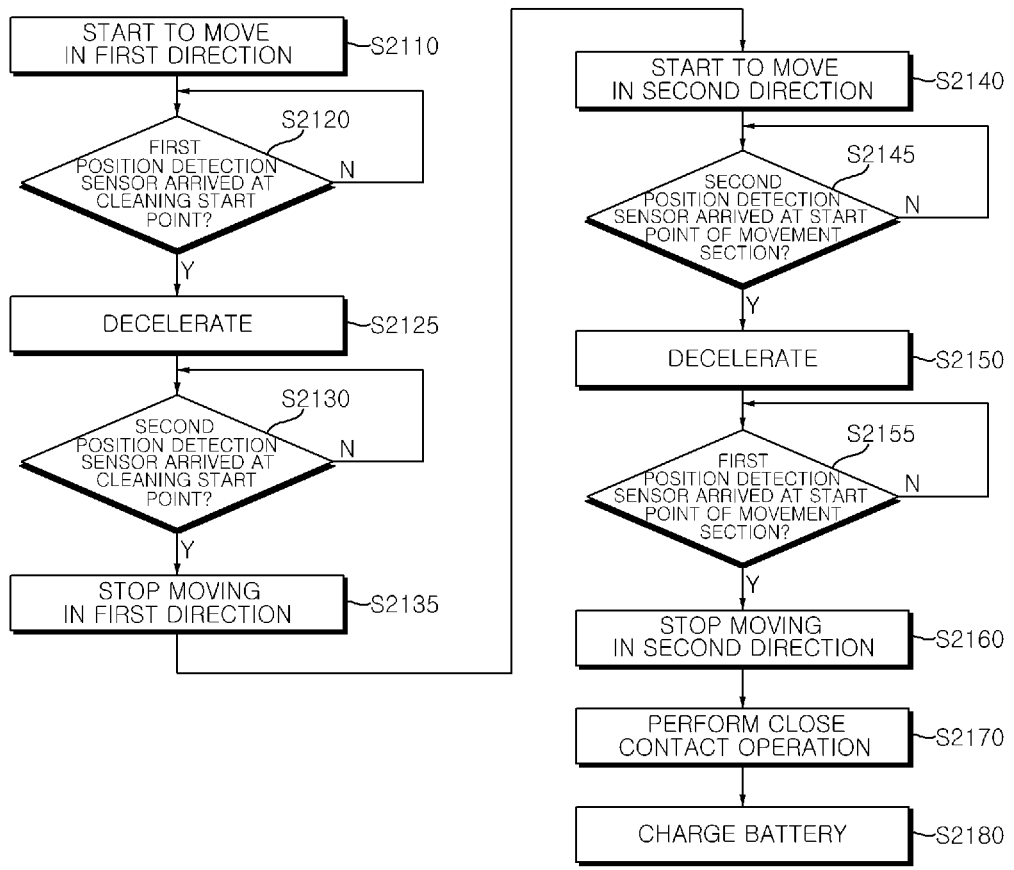
FIG. 75 is a flowchart of a method for operating an air-conditioning system according to an embodiment.

FIG. 75 is a flowchart of a method for operating an air-conditioning system according to an embodiment. Referring to FIG. 75, when the filter cleaner 300 moves in the first direction (S2110), if the first position detection sensor 322L detects the start point of the cleaning section (S2120), the filter cleaner 300 may decelerate (S2125). When the second position detection sensor 322R detects the end point of the cleaning section (S2130), the filter cleaner 300 may stop moving (S2135). That is, the section from the time point at which the start point of the cleaning section is detected by the first position detection sensor 322L (S2120) to the time point at which the end point of the cleaning section is detected by the second position detection sensor 322R (S2130) may be a deceleration section. The filter cleaner 300 may quickly move through a section other than the cleaning section at a first moving speed, and may move through the cleaning section at a second moving speed, which is slower than the first moving speed, thereby more thoroughly cleaning the pre-filters 188 and 288.

The filter cleaner 300, which has performed cleaning while moving through the cleaning section, may move in the second direction (S2140). When the second position detection sensor 322R detects the start point of the movement section (S2145), the filter cleaner 300 may decelerate so as to be stably docked to the end plate 28 (S2150). Thereafter, when the first position detection sensor 322L detects the start point of the movement section (S2155), the filter cleaner 300 may stop moving in the second direction (S2160).

When arriving at the start point of the movement section, the filter cleaner 300 may come into contact with the end plate 28, and may charge the battery 374 (S2180). In addition, in order to stably support the filter cleaner 300 and to reliably charge the battery 374, when the filter cleaner 300 arrives at the start point of the movement section, a close-contact operation of pressing the filter cleaner 300 toward the end plate 28 may be performed (S2170).

Figure 76:
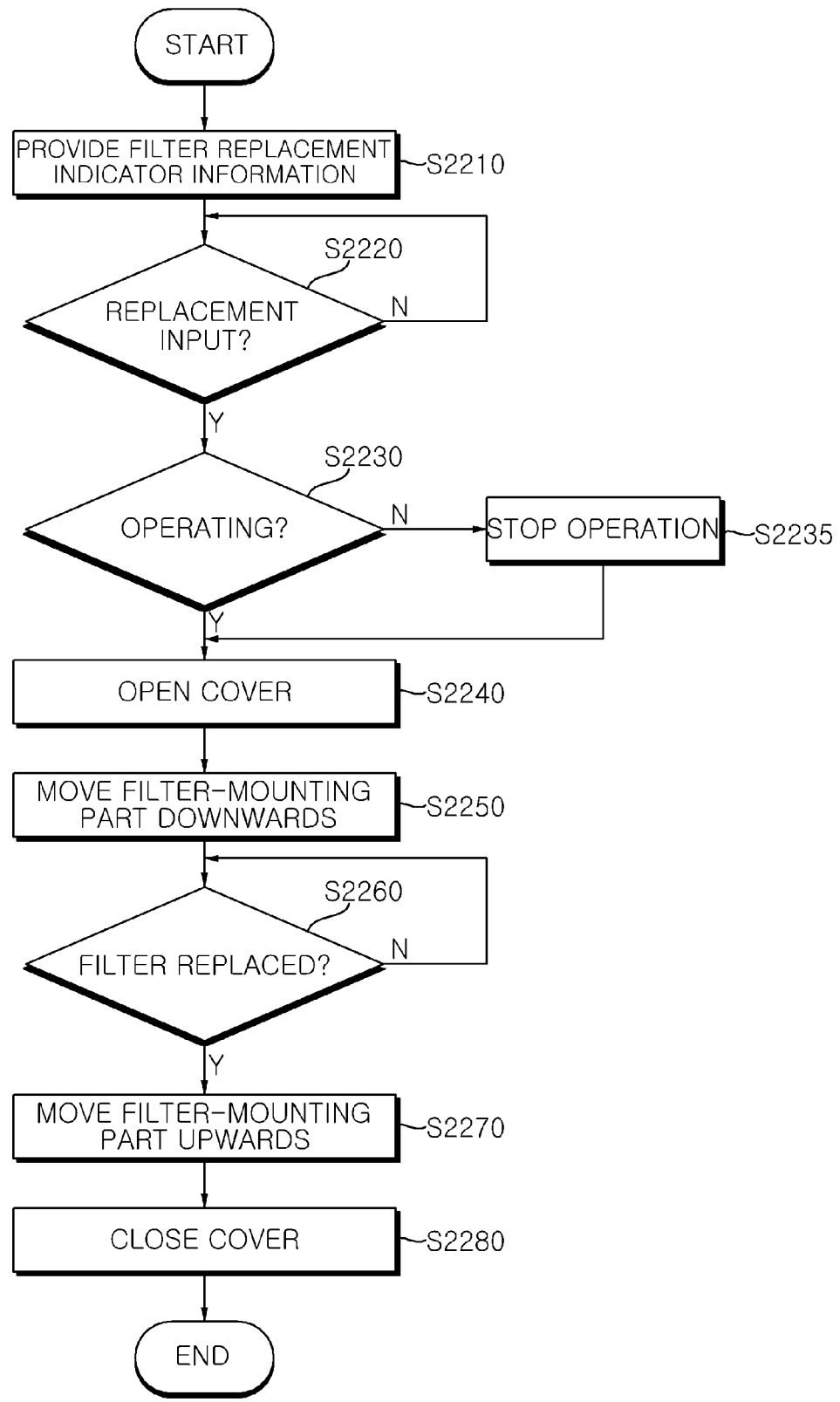
FIG. 76 is a flowchart of a method for operating an air-conditioning system according to an embodiment.
Figure 77:
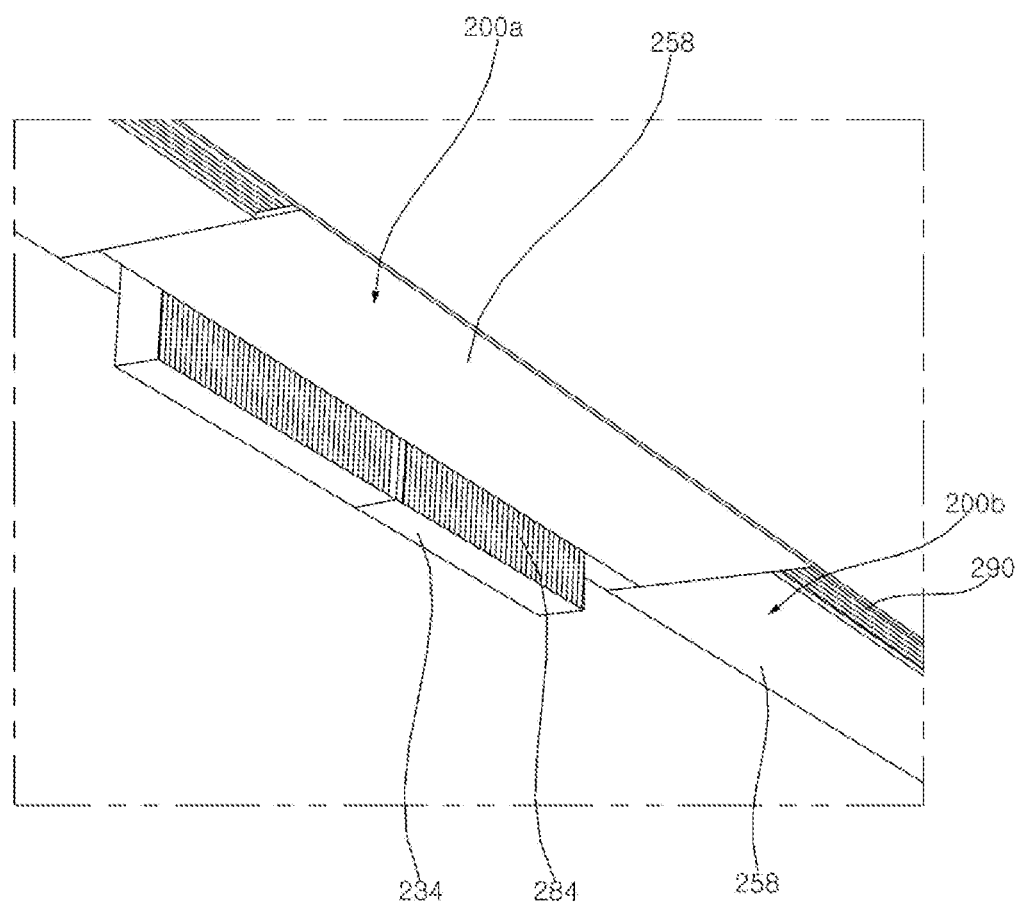
FIG. 77 is a view for explaining replacement of a filter of the second air-processing apparatus according to an embodiment.

FIG. 76 is a flowchart of a method for operating air-conditioning system according to an embodiment. FIG. 76 shows a process of replacing a filter of a second air-processing apparatus. FIG. 77 is a view for explaining replacement of the filter of the second air-processing apparatus according to an embodiment.

The air-conditioning system 1 according to an embodiment may include first air-processing apparatus 100, which includes first inlet 102*a* formed in one surface thereof, which extends perpendicular to a floor or ceiling, and first outlet 102*b* formed in another surface thereof, which extends perpendicular to the first inlet 102*a*, and induces the air introduced into the first inlet 102*a* to exchange heat with refrigerant and to be delivered to the first outlet 102*b*, and second air-processing apparatus 200, which includes second outlet 202*b* formed therein so as to be open in the same direction as the first outlet 102*b* and second inlet 202*a* formed therein so as to be open in the same direction as the first inlet 102*a* and includes filter device 284 that removes foreign substances from the air introduced into the second inlet 202*a*, cover 258 that opens or closes the lower side of the filter device 284, and filter-drive device 228 that moves the filter device 284 downwards when the cover 258 is opened. As the filter device 284 provided in the second air-processing apparatus 200 is moved in the upward-downward direction by the filter-drive device 228, the user is capable of easily reaching the filter device 284. The filter device 284 may include a consumable filter, such as HEPA filter 289, and the second air-processing apparatus 200 may move the filter device 284 downwards, thereby enabling the user to easily replace the filter.

Referring to FIG. 76, the air-conditioning system 1 according to an embodiment may provide guidance information indicating the need to replace the filter 289 of the filter device 284 and/or information about the recommended replacement time through the remote control device 500 or the mobile terminal 700 (S2210). For example, when criterion for replacing the filter device 284 is met, the remote control device 500 may display replacement indicator information on the display 501 (S2210). The replacement criterion may be set based on operating time, or may be set based on a filter contamination level, calculated based on the operating time and the state of the air in the indoor space, for example.

When the user inputs a replacement command by, for example, pressing the HEPA button 541 on the remote control device 500 (S2220), the cover 258 provided below the filter device 284 is opened (S2240). The second air-processing apparatus 200 may include interface 370 that receives input for replacing the filter device 284, and may open the cover 258 in response to the input for replacing the filter device 284 (S2240). According to an embodiment, when receiving the input for replacing the filter device 284 (S2220) during operation thereof (S2230), the second air-processing apparatus 200 may stop operating (S2235), and may open the cover 258 (S2240).

In addition, the second air-processing apparatus 200 may further include filter-mount 234, which is coupled to the filter device 284. The filter device 284 and the filter-mount 234 may be detachably coupled to each other via magnets 287 and 238. More specifically, the filter device 284 and the filter-mount 234 may be coupled to each other via first magnet 287, which is disposed in the filter device 284, and second magnet 238, which is disposed in the filter-mount 234. Accordingly, the filter device 284 may be displaced in the upward-downward direction according to movement of the filter-mount 234. Also, the user may easily separate the filter device 284 from the filter-mount 234. The filter-drive device 228 moves the filter-mount 234 downwards, and accordingly, the filter device 284 also descends (S2250).

FIG. 77 illustrates a state in which the cover 258 of a predetermined second air-processing apparatus 200*a* is opened and in which the filter device 284 and the filter-mount 234 are moved downwards. The cover 258 may move in the forward-rearward direction to be opened and closed. The second louver 290 of another second air-processing apparatus 200*b* may be exposed in a state in which the cover 258 is closed.

When replacement of the filter device 284 is completed (S2260), the filter-drive device 228 may move the filter device 284 and the filter-mount 234 upwards (S2270). The second air-processing apparatus 200 may determine whether the filter device 284 and the filter-mount 234 are coupled to or separated from each other based on a coupled state of the magnets 287 and 238. Alternatively, the second air-processing apparatus 200 may include a sensor to determine whether the filter device 284 and the filter-mount 234 are coupled to or separated from each other.

For example, when the filter device 284 is separated from the filter-mount 234 and is then recoupled thereto (S2260), the filter-drive device 228 may move the filter device 284 and the filter-mount 234 upwards (S2270). Alternatively, when an external force is applied to the filter-mount 234, the second air-processing apparatus 200 may move the filter-mount 234 upwards (S2270). When the filter-mount 234 returns to the position prior to descending, the second air-processing apparatus 200 may close the cover 258 (S2280).

Figure 78:
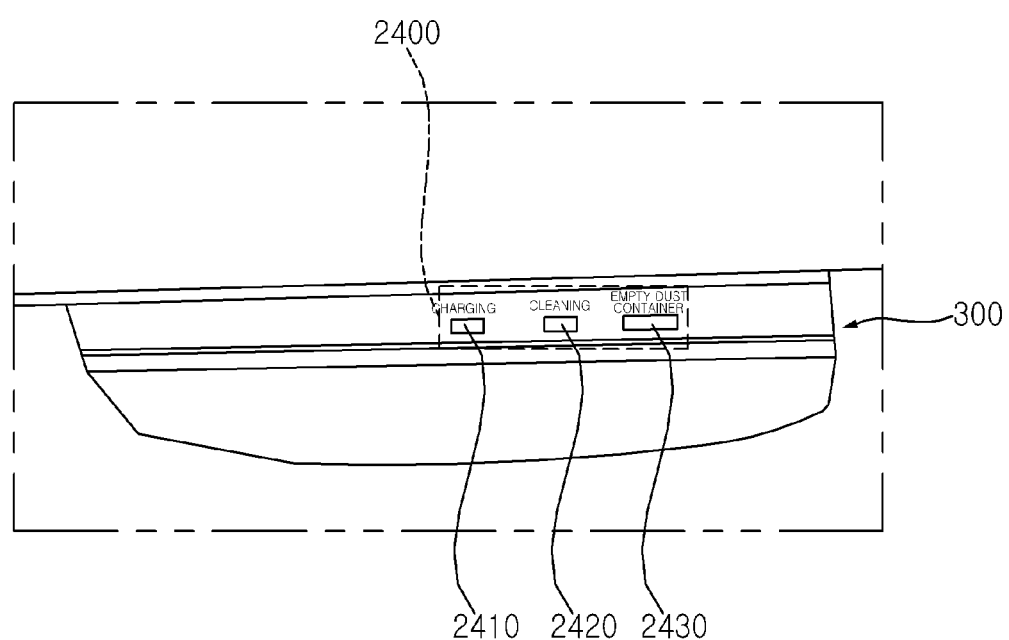
FIG. 78 is a view for explaining an indicator lamp of the filter cleaner according to an embodiment.

FIG. 78 is a view for explaining an indicator lamp of the filter cleaner according to an embodiment. Referring to FIG. 78, the filter cleaner 300 may include indicator lamps 2410, 2420, and 2430, which indicate the operational state of the filter cleaner 300. The indicator lamps 2410, 2420, and 2430 may be disposed on an exposed surface 2400 of the lower end of the filter cleaner 300. The user located below the filter cleaner 300 may view the indicator lamps 2410, 2420, and 2430. The entire lower end of the filter cleaner 300 or the exposed surface 2400 may be disposed so as to be inclined forwards.

The indicator lamps 2410, 2420, and 2430 may indicate the operational state of the filter cleaner 300 by changing between an on state and an off state, changing a color of light emitted therefrom, or operating in a flashing or constant manner, for example. For example, a charging indicator lamp 2410 may be turned on when charging starts, and may cause blue light to flash at an interval of 1 second to indicate that charging is being performed. A cleaning indicator lamp 2420 may be turned on when cleaning starts, and may cause white light to flash at an interval of 1 second to indicate that cleaning is being performed. A dust container emptying indicator lamp 2430 may be turned on when the dust container starts to be emptied, and may cause red light to flash at an interval of 1 second to indicate that the dust container is being emptied.

Figure 79:
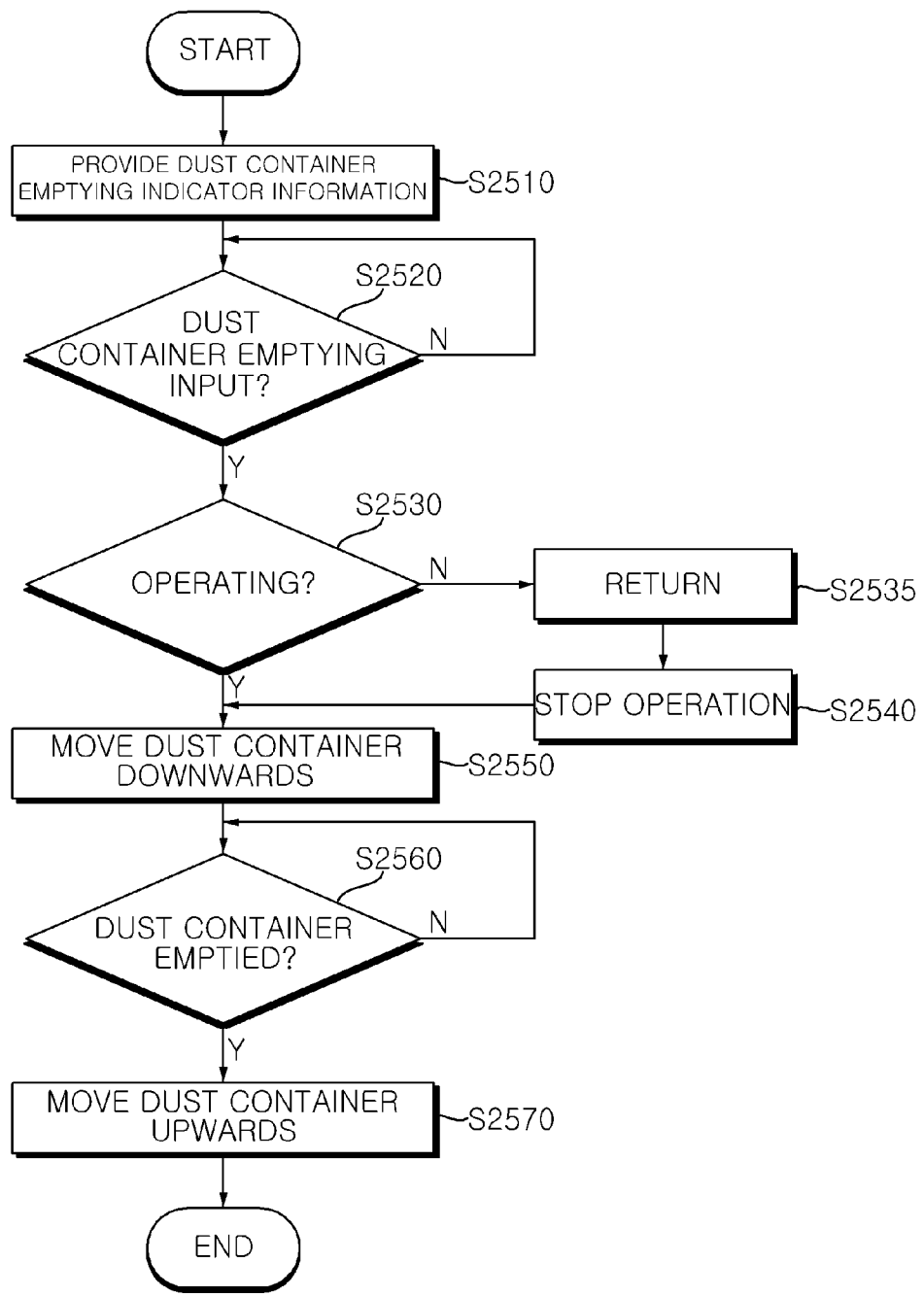
FIG. 79 is a flowchart of a method for operating an air-conditioning system according to an embodiment.

FIG. 79 is a flowchart of a method for operating an air-conditioning system according to an embodiment. FIG. 79 shows a process of emptying the dust container.

Referring to FIG. 79, the air-conditioning system 1 according to an embodiment may provide guidance information indicating the need to empty the dust container 400, which forms a space for accommodating foreign substances, and/or information about the recommended emptying time through the remote control device 500 or the mobile terminal 700 (S2510). For example, the dust container sensor (not shown) may detect the amount of foreign substances collected in the dust container device 400. When the criterion for emptying the dust container device 400 is met, the remote control device 500 may display emptying indicator information on the display 501 (S2510). When the user inputs an emptying command by, for example, pressing the dust container emptying button 543 on the remote control device 500 (S2520), the dust container device 400 may descend (S2550).

In addition, the second air-processing apparatus 200 may further include dust container guide 380, which is coupled to the dust container device 400 and is movable in the upward-downward direction. The dust container device 400 and the dust container guide 380 may be detachably coupled to each other via magnet 388. Accordingly, the user may easily separate the dust container device 400.

According to an embodiment, when receiving the input for emptying the dust container device 400 (S2520) during operation thereof (S2530), the filter cleaner 300 may stop operating (S2540), and may move the dust container device 400 downwards (S2550). Alternatively, when receiving the input for emptying the dust container device 400 (S2520) during operation thereof (S2530), the filter cleaner 300 may move to the end plate 28 (S2535) before stopping operating (S2540), and may move the dust container device 400 downwards (S2550).

When the dust container device 400 is completely emptied (S2560), the filter cleaner 300 may move the dust container device 400 upwards (S2570). The dust container sensor may detect whether the dust container device 400 is empty. Alternatively, when an external force is applied to the dust container device 400, the filter cleaner 300 may move the dust container device 400 upwards (S2570).

Figure 80:
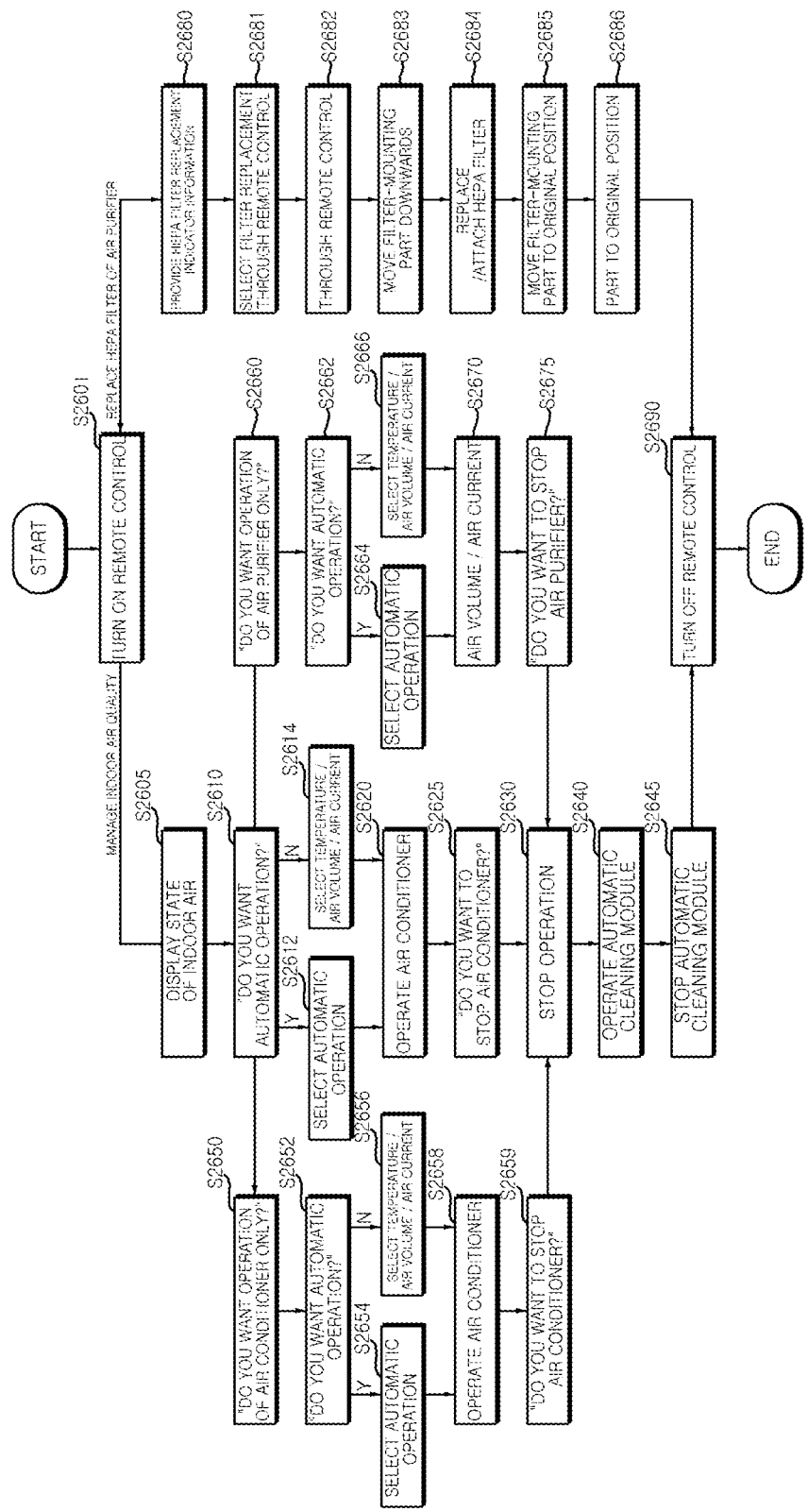
FIG. 80 is a flowchart of a method for operating an air-conditioning system according to an embodiment.

FIG. 80 is a flowchart of a method for operating an air-conditioning system according to an embodiment. FIG. 80 shows an example in which the user receives guidance information on the air-conditioning system 1, which includes the air conditioner 100 (the first air-processing apparatus) and the air purifier 200 (the second air-processing apparatus), sets the function of the air-conditioning system 1, or operates the air-conditioning system 1 using the remote control 500 (the remote control device).

When the use of a predetermined function is not set or when a predetermined operation is being performed, the remote control device 500 may output a guidance message related to the function/operation. The remote control device 500 may visually and/or audibly output a guidance message through the display 501 and/or the speaker 505. Frequent output of the guidance message may inconvenience the user. Therefore, settings may be made such that the guidance message is provided once at an initial stage and is then deleted or such that only higher-priority guidance messages are provided.

When receiving touch input, voice input, or button manipulation input from the user, the remote control device 500 may control the air-conditioning system 1 in response to the user input.

Referring to FIG. 80, when the remote control device 500 is turned on (S2601), the remote control device 500 may display the state of the indoor air on the display 501 in the indoor air quality detection mode (S2605). When it is necessary to replace the HEPA filter 289, the remote control device 500 may display information indicating the need to replace the HEPA filter 289 on the display 501 (S2680).

The remote control device 500 may output a guidance message asking whether to perform automatic operation (S2610). When the user selects automatic operation (S2612), the air-conditioning system 1 may automatically perform a combined operation based on the state of the indoor air (S2620).

When the user directly inputs a temperature, air volume, or air current (S2614), the air-conditioning system 1 may perform combined operation in response to the user input (S2620). When the state of the indoor air, such as the temperature or quality thereof, meets a predetermined criterion, or when operation has been performed for a predetermined time period or more, the remote control device 500 may stop operation (S2630). In addition, the remote control device 500 may output a guidance message asking whether to stop automatic operation (S2625).

According to an embodiment, when operation is stopped (S2630), the filter cleaner 300, which is an automatic cleaning module, automatically operates to clean the pre-filters 188 and 288 included in the air-conditioning system 1 (S2640). When returning to the original position thereof after completion of cleaning, the filter cleaner 300 may stop operating (S2645). According to an embodiment, when the filter cleaner 300 stops operating (S2645), the remote control device 500 may be turned off (S2690).

When the user does not select automatic operation (S2612), the remote control device 500 may output a guidance message asking whether to independently drive the first air-processing apparatus 100 and/or the second air-processing apparatus 200 (S2650 and S2660). When the user selects operation only of the first air-processing apparatus 100 (S2650), the remote control device 500 may output a guidance message asking whether to perform automatic operation (S2652). When the user selects automatic operation (S2654), the first air-processing apparatus 100 may automatically perform independent operation based on the state of the indoor air (particularly, the temperature thereof) (S2658). When the user directly inputs a temperature, air volume, or air current (S2656), the first air-processing apparatus 100 may operate independently in response to the user input (S2658). The remote control device 500 may output a guidance message asking whether to stop operation of the first air-processing apparatus 100 (S2659).

When the user selects operation only of the second air-processing apparatus 200 (S2660), the remote control device 500 may output a guidance message asking whether to perform automatic operation (S2662). When the user selects automatic operation (S2664), the second air-processing apparatus 200 may automatically perform independent operation based on the state of the indoor air (particularly, the air quality) (S2670). When the user directly inputs at least one of a temperature, air volume, or air current (S2666), the second air-processing apparatus 200 may operate independently in response to the user input (S2668). The remote control device 500 may output a guidance message asking whether to stop operation of the second air-processing apparatus 200 (S2675).

When the criterion for replacing the HEPA filter 289 is met, the remote control device 500 may display information indicating the need to replace the HEPA filter 289 on the display 501 (S2680). The replacement criterion may be set based on the operating time of the second air-processing apparatus 200. The HEPA filter 289 provided in the second air-processing apparatus 200 may remove contaminants contained in the air introduced from the outside. Because the removed contaminants are attached to the HEPA filter 289, as the operating time of the second air-processing apparatus 200 increases, the contamination level of the HEPA filter 289 increases, and a filtering function thereof is deteriorated. Alternatively, the replacement criterion may be set based on the filter contamination level, calculated based on the operating time of the second air-processing apparatus 200 and the state of the air in the indoor space.

Figure 81:
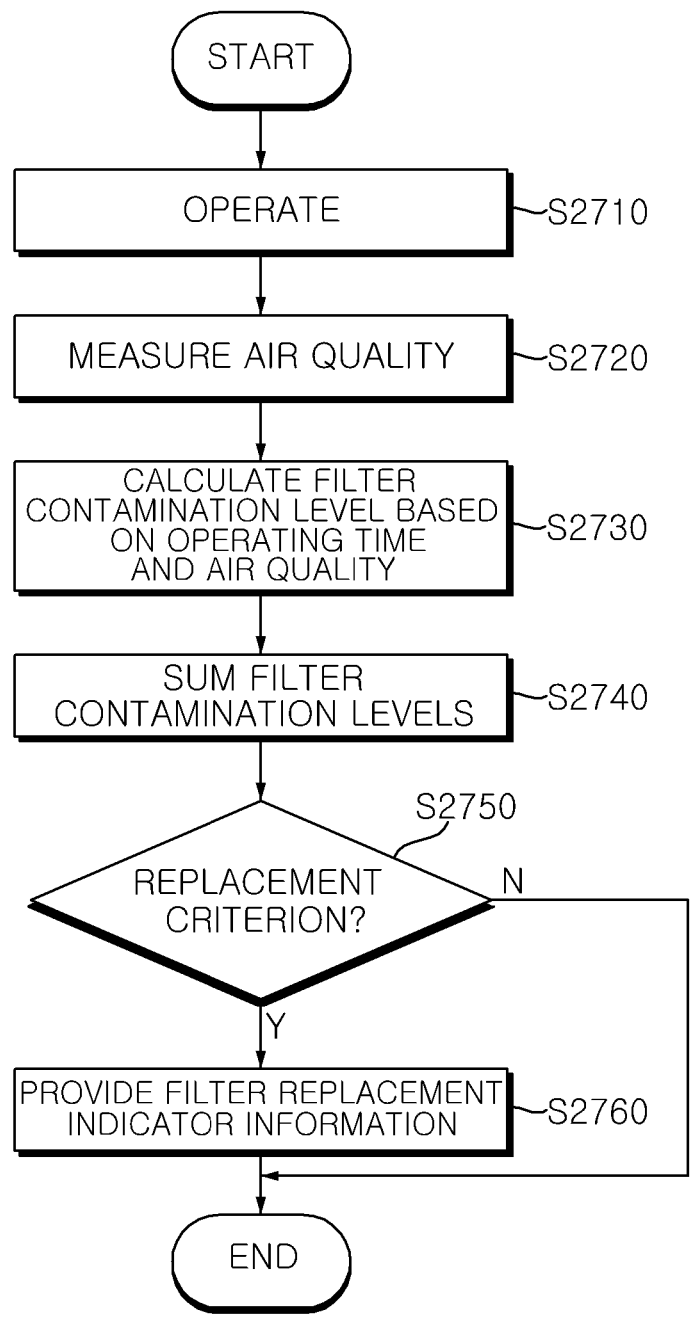
FIG. 81 is a flowchart of a method for operating air-conditioning system according to an embodiment.

FIG. 81 is a flowchart of a method for operating an air-conditioning system according to an embodiment. Referring to FIG. 81, the second air-processing apparatus 200 operates in a predetermined mode according to an operation command or various settings (S2710). In this case, the processor 610 may count the operating time.

The air quality sensor provided inside or outside of the air-conditioning system 1, for example, the second air-processing apparatus 200, may measure the indoor air quality during operation of the second air-processing apparatus 200 (S2720).

The air quality sensor may continuously or periodically measure the indoor air quality during operation of the second air-processing apparatus 200. In addition, the data measured by the air quality sensor may be collected by the second air-processing apparatus 200 or the remote control device 500, and may be stored in the memory 630 of the second air-processing apparatus 200 or the memory 580 of the remote control device 500.

The processor 610 of the second air-processing apparatus 200 or the processor 510 of the remote control device 500 may calculate the filter contamination level based on the data (an accumulated value or an average value) measured by the air quality sensor during operation and the operating time (S2730). For example, the processor 610 or 510 may calculate the filter contamination level by multiplying the accumulated value or the average value of the data measured by the air quality sensor during operation by the operating time.

The processor 610 or 510 may determine the quantity of introduced air based on the volume of air current during the operating time and based on the operating time. For example, the processor 610 or 510 may determine the quantity of introduced air by multiplying the operating time by the volume of air current.

The processor 610 or 510 may determine the air contamination level based on the data measured by the air quality sensor during operation, and may calculate the filter contamination level based on the quantity of introduced air and the air contamination level. For example, the processor 610 or 510 may determine the filter contamination level by multiplying the quantity of introduced air by the air contamination level. According to an embodiment, the processor 610 or 510 may accurately detect a filter in need of replacement by classifying contamination levels of the multiple filters according to a more sophisticated air quality measurement method.

The processor 610 or 510 may sum the calculated filter contamination level and a pre-stored filter contamination level (S2740). When the result of summing the calculated filter contamination level and the pre-stored filter contamination level meets a filter replacement criterion (S2750), the processor 510 may perform control to output filter replacement indicator information (S2760).

When the result of summing the calculated filter contamination level and the pre-stored filter contamination level meets the filter replacement criterion (S2750), the processor 610 may perform control to output filter replacement indicator information to the remote control device 500. Accordingly, the remote control device 500 may output the filter replacement indicator information (S2760).

The processor 510 may perform control to display the filter replacement indicator information on the display 501. In addition, the processor 510 may perform control such that the speaker 505 outputs speech for providing the filter replacement indicator information. Alternatively, the replacement criterion may be set based on the number of times the second pre-filter 288 is cleaned by the filter cleaner 300.

Figure 82:
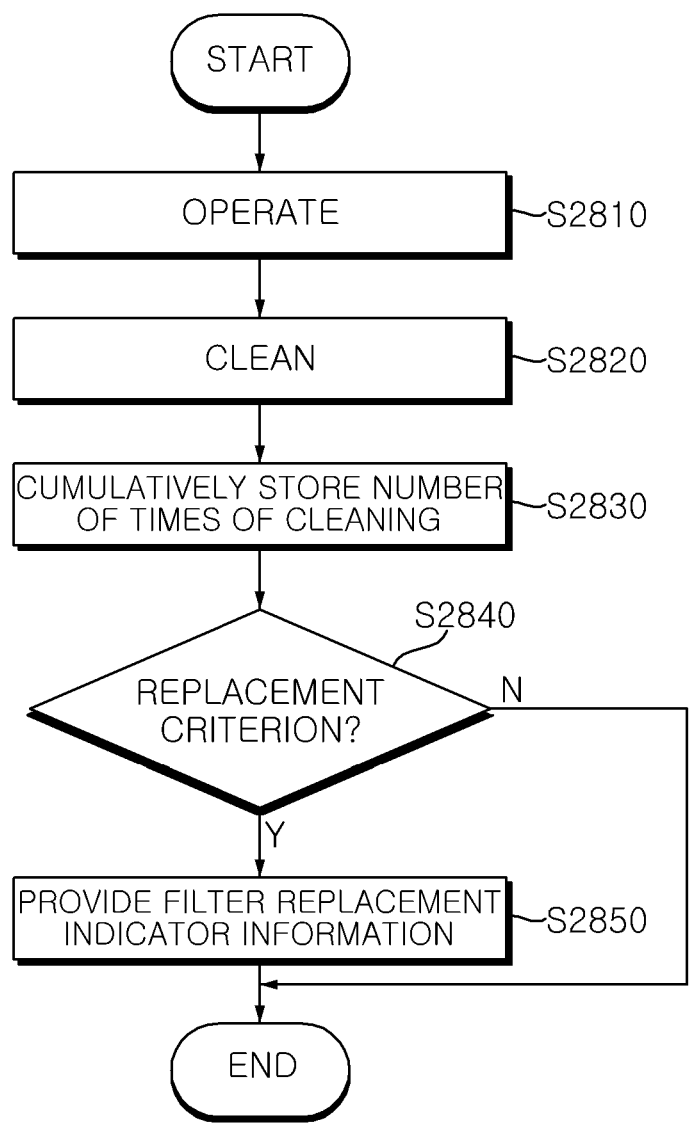
FIG. 82 is a flowchart of a method for operating an air-conditioning system according to an embodiment.

FIG. 82 is a flowchart of a method for operating an air-conditioning system according to an embodiment. Referring to FIG. 82, the second air-processing apparatus 200 operates in a predetermined mode according to an operation command or various settings (S2810). When operation of the second air-processing apparatus 200 is stopped, the filter cleaner 300 may clean the second pre-filter 288 of the second air-processing apparatus 200 (S2820).

The filter cleaner 300 may cumulatively store a number of times the second air-processing apparatus 200 and the second pre-filter 288 are cleaned (S2830). When the number of times the second air-processing apparatus 200 and the second pre-filter 288 are cleaned meets the criterion for replacing the filter device (S2840), the remote control device 500 may display the replacement indicator information on the display 501 (S2850). In addition, when the number of times the second air-processing apparatus 200 and the second pre-filter 288 are cleaned meets the criterion for replacing the filter device (S2840), the filter cleaner 300 may transmit the replacement indicator information to the remote control device 500. Accordingly, the remote control device 500 may display the replacement indicator information on the display 501 (S2850).

When the user inputs a replacement command by, for example, pressing the HEPA button 541 on the remote control device 500 (S2681), the cover 258 provided below the filter device 284 is opened (S2682).

The second air-processing apparatus 200 may further include filter-mount 234, which is coupled to the filter device 284. The filter device 284 and the filter-mount 234 may be detachably coupled to each other via magnets 287 and 238. The filter-drive device 228 moves the filter-mount 234 downwards, and accordingly, the filter device 284 also descends (S2683).

When the filter device 284 is completely replaced and is then attached to the filter-mount 234 (S2684), the filter-drive device 228 may move the filter device 284 and the filter-mount 234 upwards to original positions thereof (S2685). When the filter-mount 234 returns to the original position thereof prior to descending (S2685), the second air-processing apparatus 200 may close the cover 258 (S2686).

FIGS. 83 to 88 are views for explaining air current control of the air-conditioning system according to an embodiment. Air current control serves to manually or automatically adjust characteristics of the air discharged from the air-processing apparatuses 100 and 200, for example, the speed, volume, temperature, humidity, and direction of air current. In a narrow sense, air current control functions to control the direction in which air is discharged from the air-processing apparatuses 100 and 200, that is, the air current direction.

FIGS. 83 to 88 illustrate a case in which the air-conditioning system 1 according to an embodiment includes three air-processing modules 1000a, 1000b, and 1000c. Each of the air-processing modules 1000a, 1000b, and 1000c may be the first air-processing apparatus 100 or the second air-processing apparatus 200.

As described above with reference to FIGS. 1 to 35C, the air-conditioning system 1 according to an embodiment may include first air-processing apparatus 100, which includes first inlet 102a formed in one surface thereof, which extends perpendicular to a floor or ceiling, and first outlet 102b formed in another surface thereof, which extends perpendicular to the first inlet 102a, and includes first louver 150 that adjusts the direction in which air is discharged through the first outlet 102b, and second air-processing apparatus 200, which includes second outlet 202b formed therein so as to be open in the same direction as the first outlet 102b and a second inlet 202a formed therein so as to be open in the same direction as the first inlet 102a and includes second louver 290 that adjusts the direction in which air is discharged through the second outlet 202b.

The first louver 150 may be rotatably disposed in the first outlet 102b of the first air-processing apparatus 100 in order to adjust the direction of air flowing through the first outlet 102b. The first air-processing apparatus 100 may include first louver-drive device 174 that adjusts the orientation of the first louver 150. In addition, the first air-processing apparatus 100 may include heat exchanger, which induces the air introduced into the first inlet 102a to exchange heat with refrigerant.

The second louver 290 may be rotatably disposed in the second outlet 202b of the second air-processing apparatus 200 in order to adjust the direction of air flowing through the second outlet 202b. The second air-processing apparatus 200 may include second louver-drive device 294 that adjusts the orientation of the second louver 290. The second air-processing apparatus 200 may be an air purifier that includes filter device 284 that removes foreign substances from the air introduced into the second inlet 202a.

According to an embodiment, the first louver 150 and the second louver 290 may be disposed in a line. In the combined operation mode, in which the first air-processing apparatus 100 and the second air-processing apparatus 200 are both driven, the orientation of the second louver 290 may be adjusted in consideration of the orientation of the first louver 150.

Referring to FIGS. 18A to 18C, the first louver 150 may be switched to first mode P1 for forming an oblique air current in the forward direction, second mode P2 for forming a horizontal air current in the forward direction, and third mode P3 for forming a vertical air current toward the floor. Referring to FIG. 18A, the first louver 150 may be disposed above the first bottom cover 130 in the first mode P1. In the first mode P1, the lower end of each of the vanes 154, 156, and 158 of the first louver 150 may be disposed above the first bottom cover 130 in the vertical direction.

In the first mode P1, the lower end of the outer vane 154 may be oriented in a direction perpendicular to the floor. In the first mode P1, the lower end of each of the inner vanes 156a, 156b, and 156c may be inclined forwards.

Referring to FIG. 18B, a portion of the first louver 150 may be disposed below the first bottom cover 130 in the second mode P2. In the second mode P2, the lower end of the outer vane 154 and the lower end of each of the inner vanes 156a, 156b, and 156c may be disposed below the first bottom cover 130 in the vertical direction.

In the second mode P2, the inclination angle 82 formed by the lower inner vane portion 157a of each of the inner vanes 156a, 156b, and 156c and the floor may be set to 30 degrees or less. Accordingly, in the second mode P2, the air flowing through the first louver 150 may be discharged in a direction substantially parallel to the floor.

Referring to FIG. 18C, the first louver 150 may be disposed above the first bottom cover 130 in the third mode P3. In the third mode P3, the lower end of the outer vane 154 and the lower end of each of the inner vanes 156a, 156b, and 156c may be disposed above the first bottom cover 130 in the vertical direction.

In the third mode P3, the inclination angle 83 formed by the lower inner vane portion 157a of each of the inner vanes 156a, 156b, and 156c and the floor may be set to a range from 60 degrees to 90 degrees. Accordingly, in the third mode P3, the air flowing through the first louver 150 may be discharged in a direction substantially perpendicular to the floor.

The second louver 290 and the second louver-drive device 294 may have the same configurations and functions as the first louver 150 and the first louver-drive device 174 of the first air-processing apparatus 100. Therefore, with regard to the second louver 290 and the second louver-drive device 294, reference may be made to the above description of the first louver 150 and the first louver-drive device 174.

In the combined operation mode, the orientation of the second louver 290 may be adjusted to the same angle as the first louver 150. According to an embodiment, the first louver 150 and the second louver 290, which are disposed in a line, may be oriented at the same angle, thereby discharging air in the same direction. Accordingly, it is possible to consistently form an air current in a constant direction in the indoor space.

For example, when the first air-processing apparatus 100 performs a heating operation, the first louver 150 and the second louver 290 may rotate in a first direction to form a vertical air current. That is, the first louver 150 and the second louver 290 may be switched to the third mode P3 so as to discharge air in a direction perpendicular to the floor.

As the heating operation generates hot air and the hot air tends to flow upwards, the first air-processing apparatus 100 may discharge air downwards toward the portion of the floor which is close thereto during the heating operation. Also, the second air-processing apparatus 200 may discharge air in the same direction as the first air-processing apparatus 100.

The first louver 150 may include the plurality of inner vanes 156, which is spaced apart from each other in the radial direction between the louver rotational shaft 160 and the outer vane 154. The second louver 290, which has the same configuration as the first louver 150, may also include the plurality of inner vanes 156. When the first air-processing apparatus 100 performs the heating operation, the first louver 150 and the second louver 290 may be oriented such that the inner vanes 156 face the floor.

Figure 83:
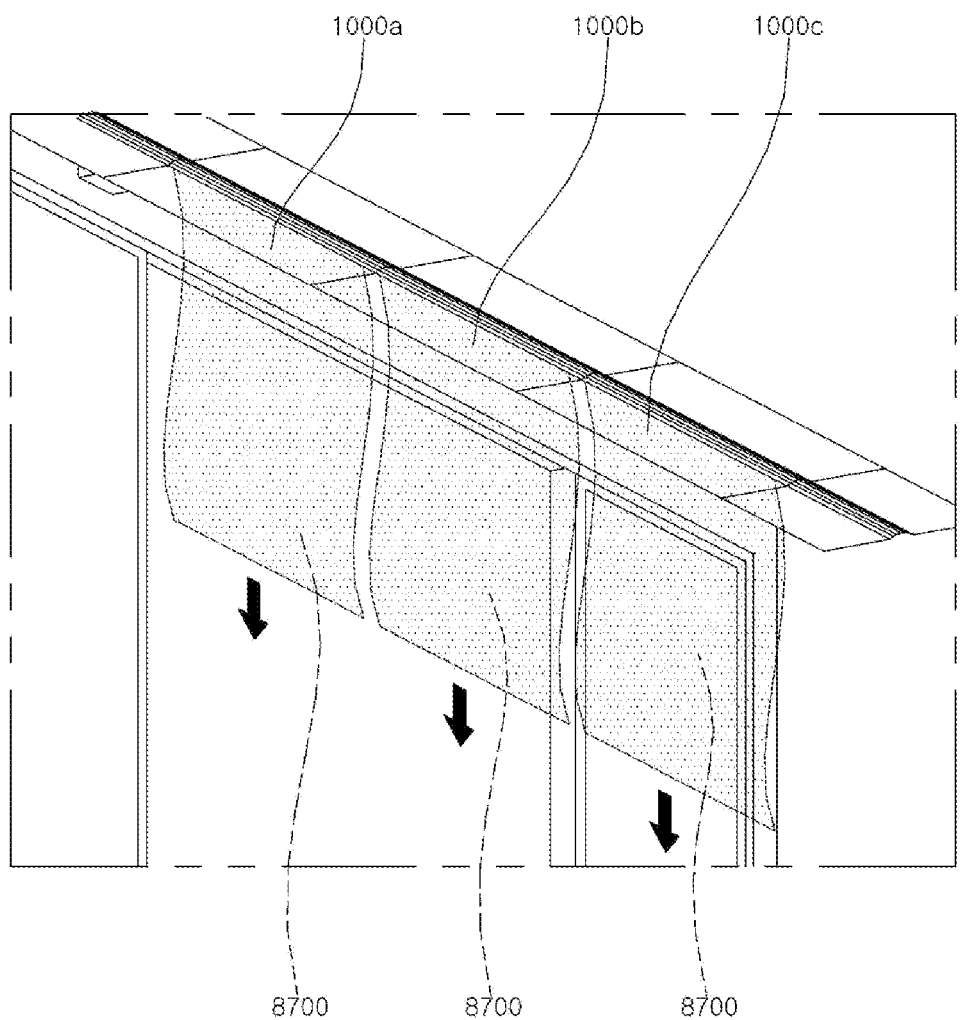
FIGS. 83 to 88 are views for explaining air current control of the air-conditioning system according to an embodiment.

FIG. 83 shows an example in which all of three air-processing modules 1000a, 1000b, and 1000c form a vertical air current 8700. The air-conditioning system 1 according to an embodiment may be mounted such that the lower end thereof is coplanar with the ceiling, so the outlets 102b and 202b may face downwards. Also, the air-conditioning system 1 according to an embodiment may be disposed in a peripheral region in the indoor space in order to condition the air in the indoor space. Therefore, the vertical air current 8700 formed by the air-conditioning system 1 may flow in the peripheral region in the indoor space which is close to the outside, and thus, may function as a kind of air curtain for blocking outdoor air. Accordingly, it is possible to effectively maintain an indoor temperature and to improve energy efficiency by reducing the influence of outdoor air.

When the first air-processing apparatus 100 performs a cooling operation, the first louver 150 and the second louver 290 may rotate in a second direction, which is opposite the first direction. That is, the first louver 150 and the second louver 290 may be switched to the second mode P2 so as to form a horizontal air current.

As the cooling operation generates cold air and the cold air tends to flow downwards, the first air-processing apparatus 100 may discharge air upwards toward a region far away therefrom during the cooling operation. Also, the second air-processing apparatus 200 may discharge air in the same direction as the first air-processing apparatus 100.

Figure 84:
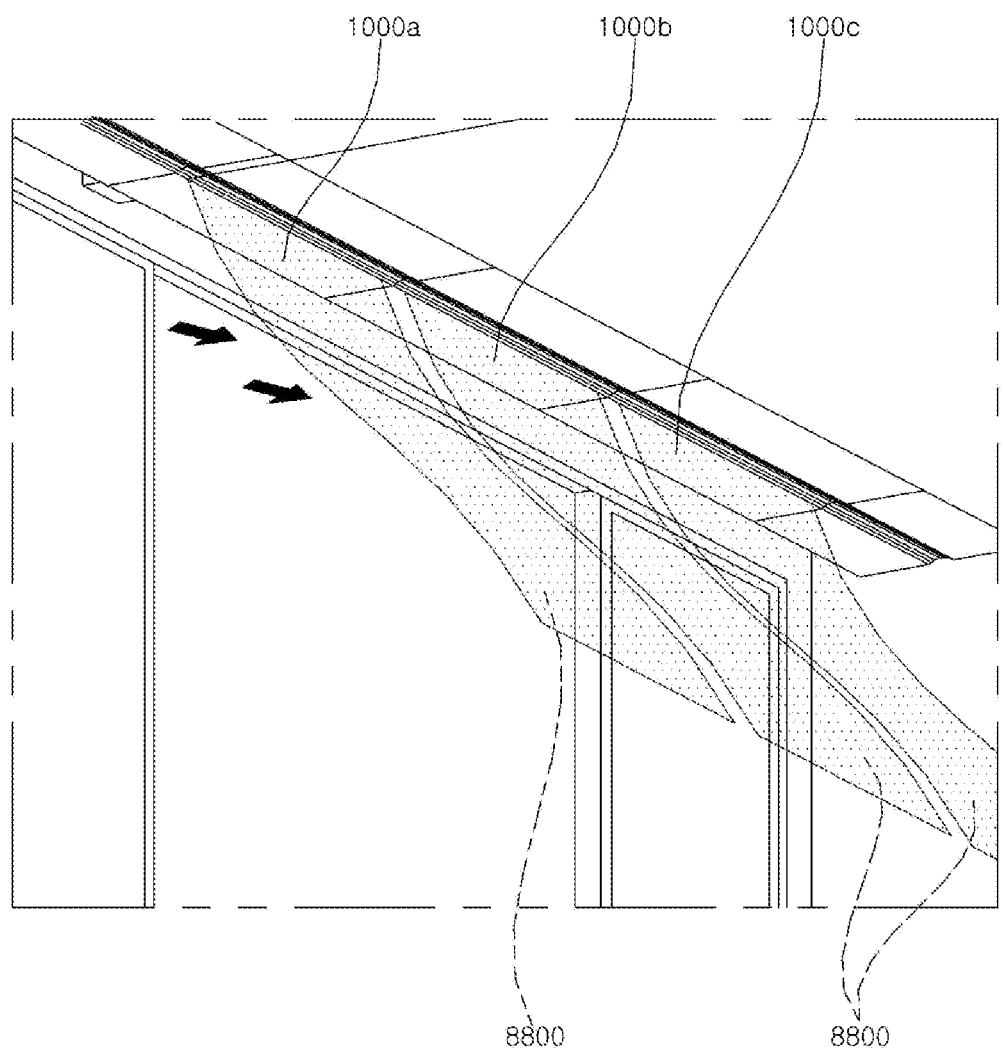

FIG. 84 shows an example in which all of three air-processing modules 1000a, 1000b, and 1000c form a horizontal air current 8800. In the combined operation mode, when the first air-processing apparatus 100 performs a cooling operation, each of the first louver 150 and the second louver 290 may be oriented such that the plurality of vanes 156 faces in a direction perpendicular to the direction facing the floor or forms as small an inclination angle as possible with the floor.

In addition, according to at least one embodiment, as the first air-processing apparatus 100 and the second air-processing apparatus 200 may be arranged in the lateral direction and the louvers 150 and 290, which are respectively disposed in the outlets 102b and 202b, are individually driven, it is possible to individually adjust air discharge directions in consideration of a temperature of discharged air, thereby realizing rapid air circulation in the indoor space. In addition, the angle at which the second louver 290 is oriented may be adjusted to be different from the angle at which the first louver 150 is oriented, thereby creating various air currents.

For example, the first louver 150 may rotate to a maximum extent in the first direction or the second direction so as to be switched to the third mode P3 or the second mode P2. In this case, the second louver 290 may be inclined at a predetermined angle relative to the first louver 150.

The first air-processing apparatus 100 discharges heat-exchanged air in the course of a cooling or heating operation. Accordingly, there is a temperature difference between the air discharged from the first air-processing apparatus 100 and the air discharged from the second air-processing apparatus 200.

For example, when the first air-processing apparatus 100 performs a cooling operation, the temperature of the air discharged from the first air-processing apparatus 100 is lower than the temperature of the air discharged from the second air-processing apparatus 200. Therefore, it may be advantageous from the aspect of air diffusion for the second air-processing apparatus 200 to discharge air toward a region slightly lower than the region toward which the first air-processing apparatus 100 discharges air (by making the inclination angle formed with the floor larger than that of the first air-processing apparatus 100).

Conversely, when the first air-processing apparatus 100 performs a heating operation, the temperature of the air discharged from the first air-processing apparatus 100 is higher than the temperature of the air discharged from the second air-processing apparatus 200. Therefore, it may be advantageous from the aspect of air diffusion for the second air-processing apparatus 200 to discharge air toward a region slightly higher than the region toward which the first air-processing apparatus 100 discharges air (by making the inclination angle formed with the floor smaller than that of the first air-processing apparatus 100).

In the example shown in FIGS. 85 to 89, the air-processing module 1000b that is disposed in the middle may be the second air-processing apparatus 200, and the air-processing modules 1000a and 1000c that are disposed on the left and right may be the first air-processing apparatuses 100.

Figure 85:
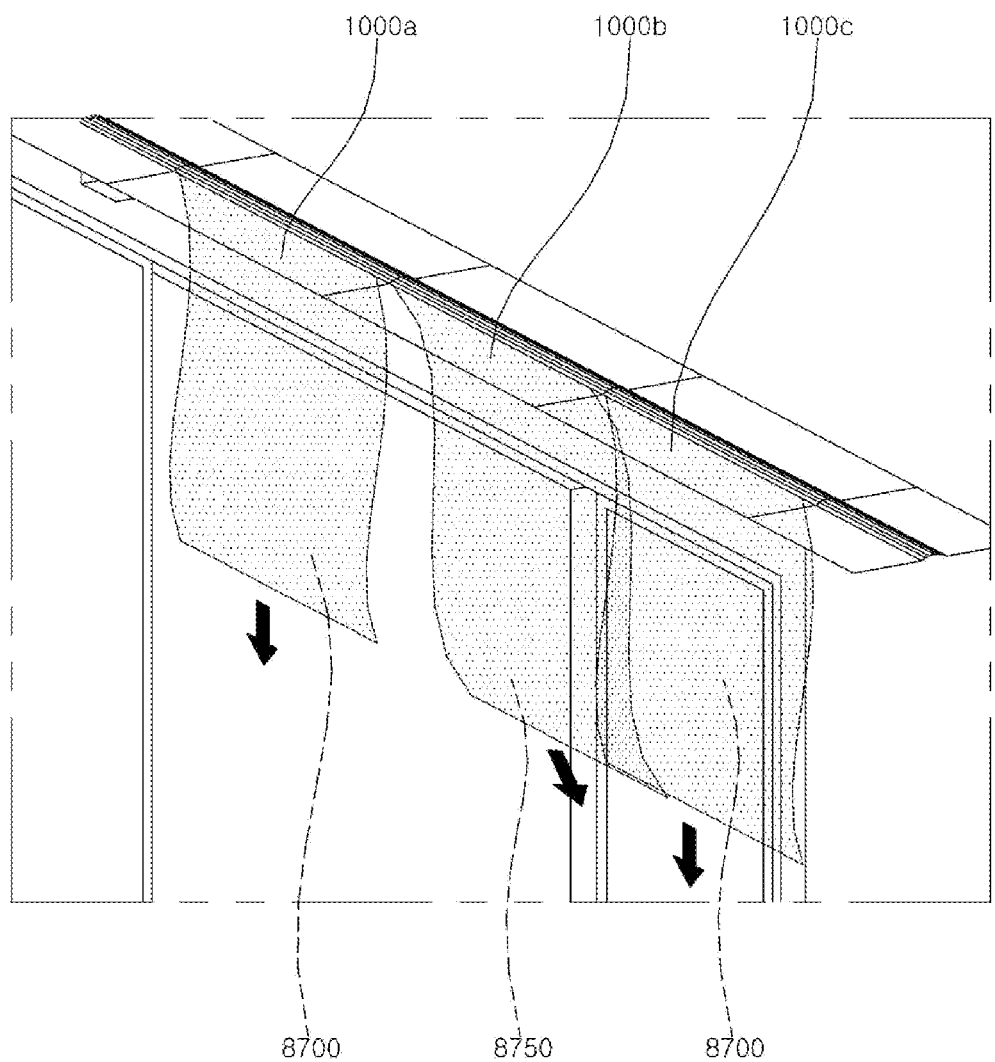

Referring to FIG. 85, during a heating operation, the first louver 150 may rotate to the maximum extent in the first direction so as to be switched to the third mode P3, and the air-processing modules 1000a and 1000c may form a vertical air current 8700. The second louver 290 may rotate to an extent less than the maximum extent in the first direction so as to be inclined at the predetermined angle relative to the first louver 150. Accordingly, the air-processing module 1000b may form an oblique air current 8750, which is inclined to a certain extent relative to the vertical air current 8700.

In the combined operation mode, when the first air-processing apparatus 100 performs a heating operation, the first louver 150 may be oriented such that the plurality of vanes 156 faces the ground, and the second louver 290 may be oriented such that the plurality of vanes 156 forms a predetermined angle with the floor.

Figure 86:
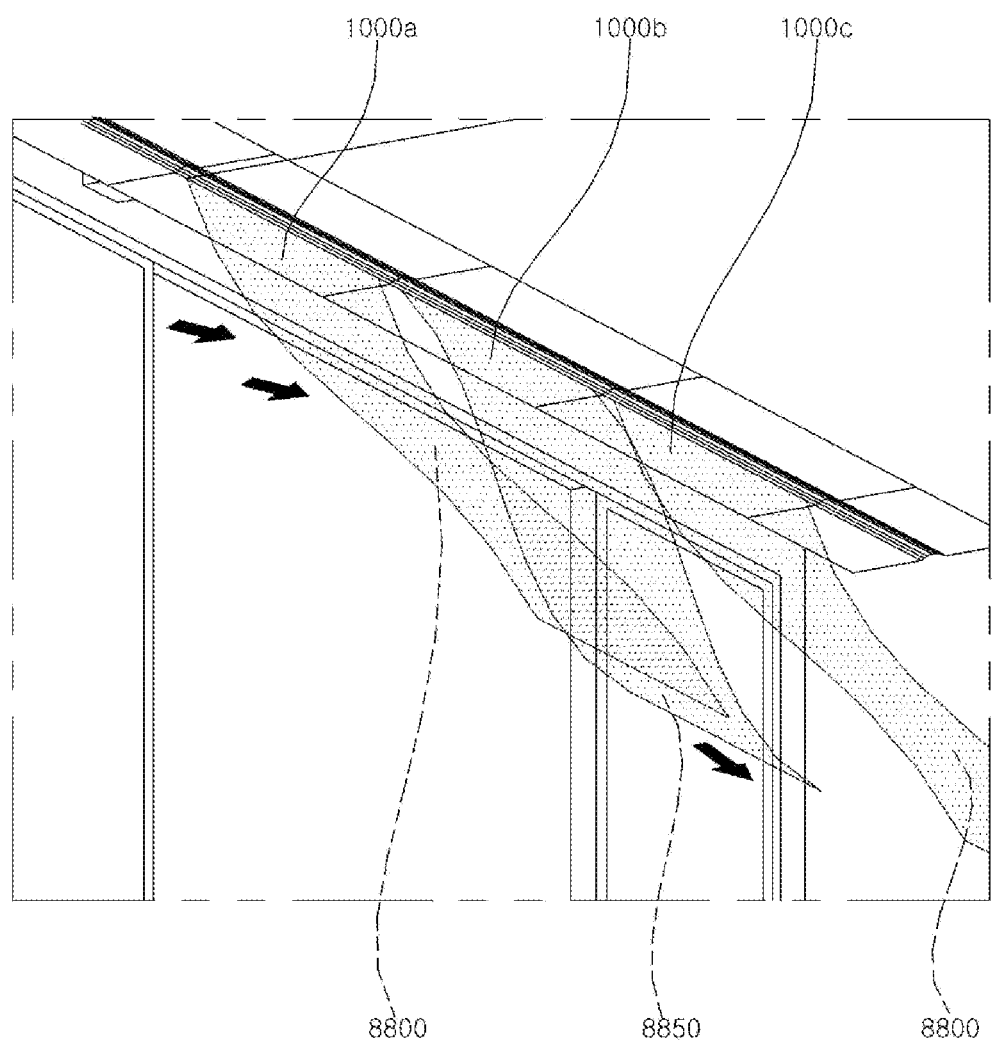

Referring to FIG. 86, during a cooling operation, the first louver 150 may rotate to the maximum extent in the second direction so as to be switched to the second mode P2, and the air-processing modules 1000a and 1000c may form a horizontal air current 8800. The second louver 290 may rotate to an extent less than the maximum extent in the second direction so as to be inclined at the predetermined angle relative to the first louver 150. Accordingly, the air-processing module 1000b may form an oblique air current 8850, which is inclined to a certain extent relative to the horizontal air current 8800.

In the combined operation mode, when the first air-processing apparatus 100 performs a cooling operation, the first louver 150 may be oriented such that the plurality of vanes 156 faces in a direction perpendicular to the direction facing the floor, and the second louver 290 may be oriented such that the plurality of vanes 156 forms a predetermined angle with the direction perpendicular to the direction facing the floor.

It may be possible to form a stronger air current by increasing the angular difference between the first louver 150 and the second louver 290. For example, when the first air-processing apparatus 100 performs a heating operation, the first louver 150 may rotate to the maximum extent in the first direction to form vertical air current 8700, and the second louver 290 may rotate to the maximum extent in the second direction, which is opposite the first direction.

Figure 87:
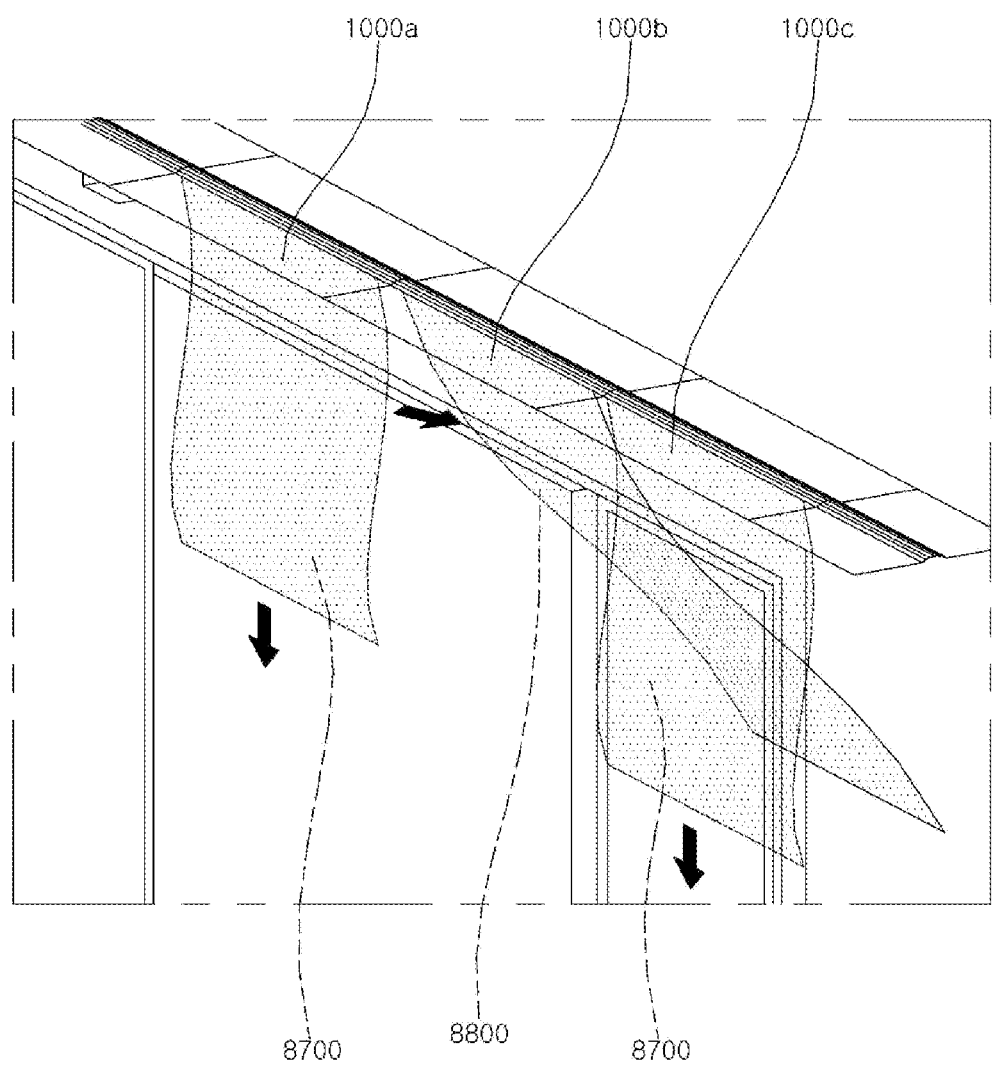

Referring to FIG. 87, the first louver 150 may rotate to the maximum extent in the first direction so as to be switched to the third mode P3, and accordingly, the air-processing modules 1000a and 1000c may form vertical air current 8700. The second louver 290 may rotate to the maximum extent in the second direction so as to be switched to the second mode P2, and accordingly, the air-processing module 1000b may form horizontal air current 8800.

In the combined operation mode, when the first air-processing apparatus 100 performs a heating operation, the first louver 150 may be oriented such that the plurality of vanes 156 faces the floor, and the second louver 290 may be oriented such that the plurality of vanes 156 faces a direction perpendicular to the direction facing the floor or forms as small an inclination angle as possible with the floor.

Figure 88:
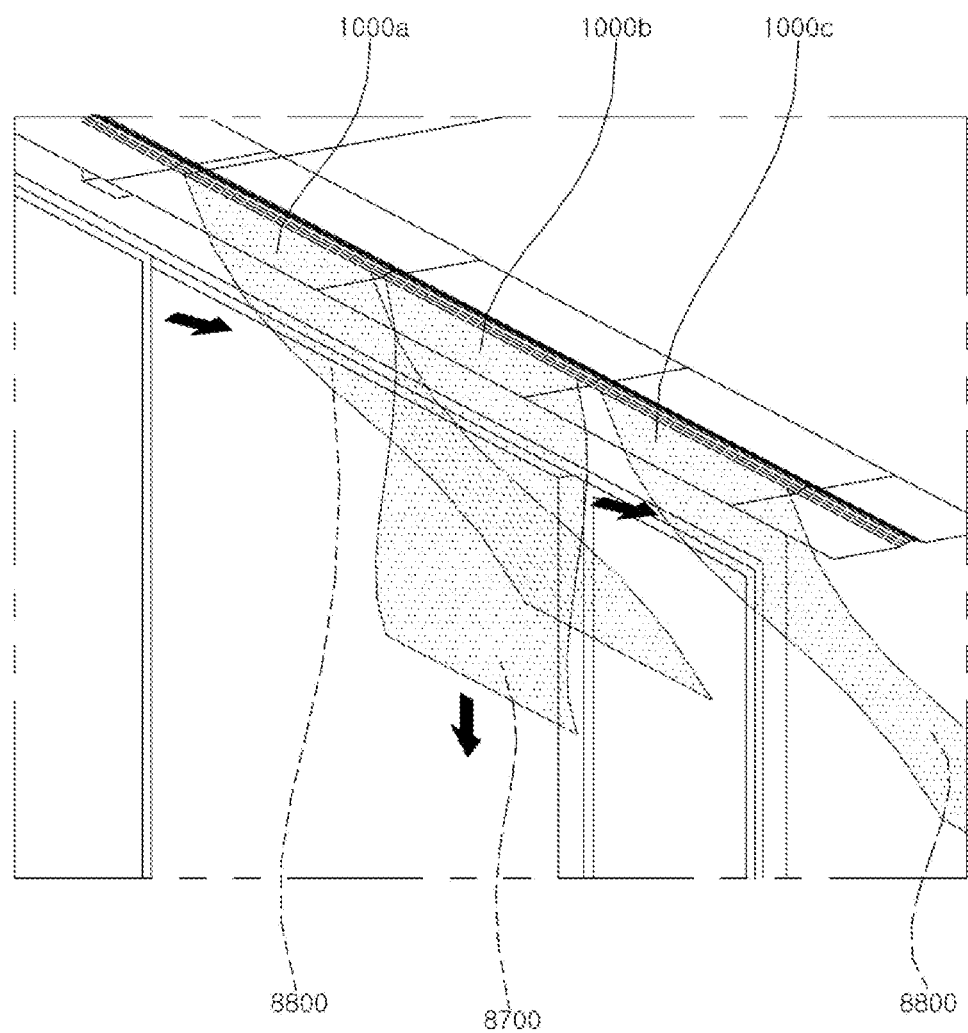

When the first air-processing apparatus 100 performs a cooling operation, the first louver 150 may rotate to the maximum extent in the second direction, and the second louver 290 may rotate to the maximum extent in the first direction. Referring to FIG. 88, the first louver 150 may rotate to the maximum extent in the second direction so as to be switched to the second mode P2, and accordingly, the air-processing modules 1000a and 1000c may form horizontal air current 8800. The second louver 290 may rotate to the maximum extent in the first direction so as to be switched to the third mode P3, and accordingly, the air-processing module 1000b may form vertical air current 8700.

In the combined operation mode, when the first air-processing apparatus 100 performs a cooling operation, the first louver 150 may be oriented such that the plurality of vanes 156 faces a direction perpendicular to the direction facing the floor or forms as small an inclination angle as possible with the floor, and the second louver 290 may be oriented such that the plurality of vanes 156 faces the floor.

In the independent operation mode in which only the first air-processing apparatus 100 is driven, the first louver 150 may rotate to the maximum extent in the first direction to form vertical air current 8700, or may rotate to the maximum extent in the second direction, which is opposite the first direction, so as to be switched to the second mode P2. In the independent operation mode in which only the second air-processing apparatus 200 is driven, the second louver 290 may rotate to the maximum extent in the second direction so as to be switched to the second mode P2.

According to an embodiment, the remote control device 500 may receive air-quality detection input, and may transmit the air-quality detection input to the second air-processing apparatus 200. When the air-quality detection input is received, the second air-processing apparatus 200 may repeatedly rotate the second louver 290 in order to indicate in an intuitively understandable manner that the air-quality detection input is being received and the air quality is being detected. The second louver 290 may rotate repeatedly within the range between the position corresponding to the second mode P2 and the position corresponding to the third mode P3.

In addition, when the air-quality detection input is received, the second air-processing apparatus 200 may acquire information about the state of the air in the indoor space using a sensor provided therein, and may repeatedly rotate the second louver 290 until information about the state of the air meets a predetermined criterion. Accordingly, it is possible to more rapidly diffuse the filtered air.

According to an embodiment, the remote control device 500 may receive air-quality detection input, may acquire information about the state of the air in the indoor space using a sensor or receiver 572 provided therein, and may transmit the information about the state of the air to the second air-processing apparatus 200. In this case, the second air-processing apparatus 200 may repeatedly rotate the second louver 290 until the information about the state of the air meets a predetermined criterion.

Figure 89:
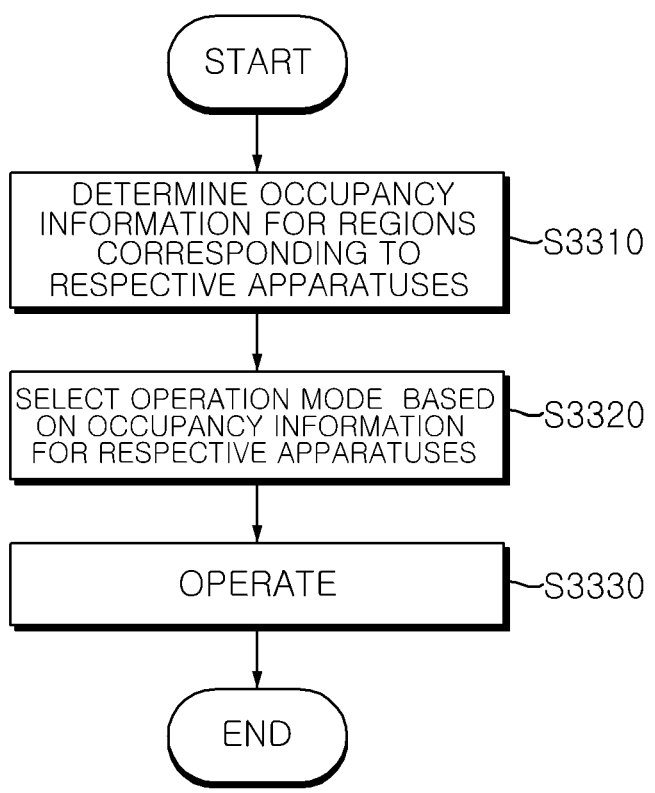
FIG. 89 is a flowchart of a method for operating an air-conditioning system according to an embodiment.
Figure 90:
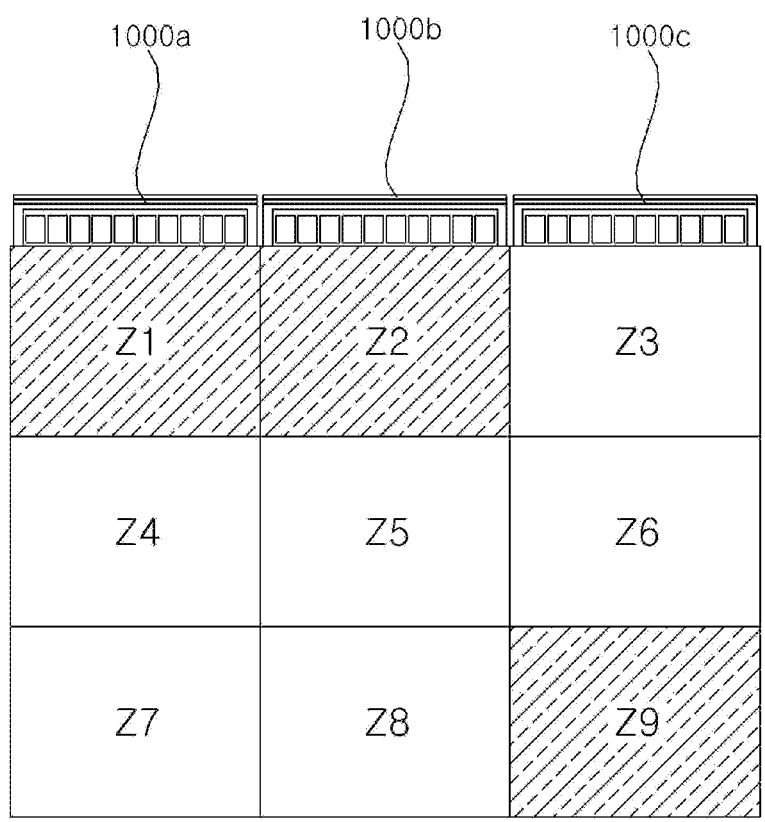
FIGS. 90 to 91B are views for explaining air current control based on occupancy information of the air-conditioning system according to an embodiment.
Figure 91A:
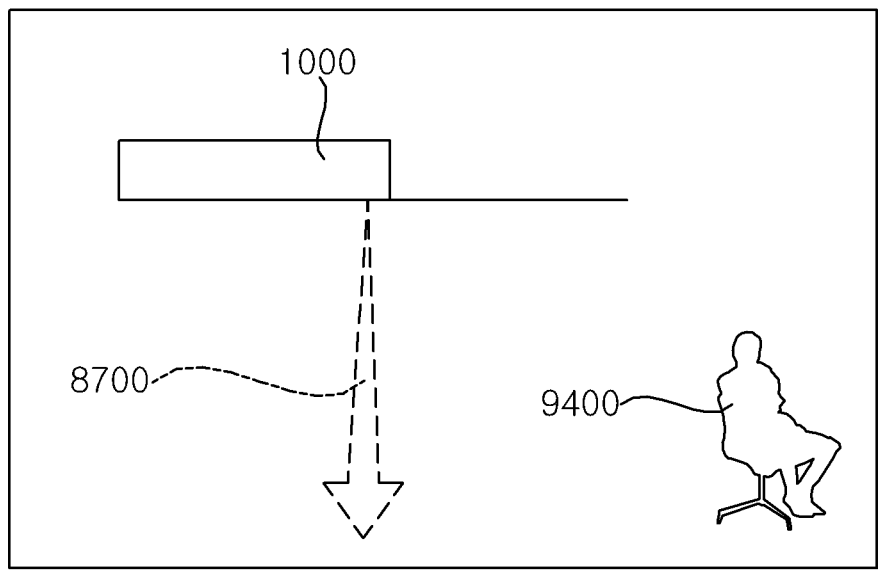
Figure 91B:
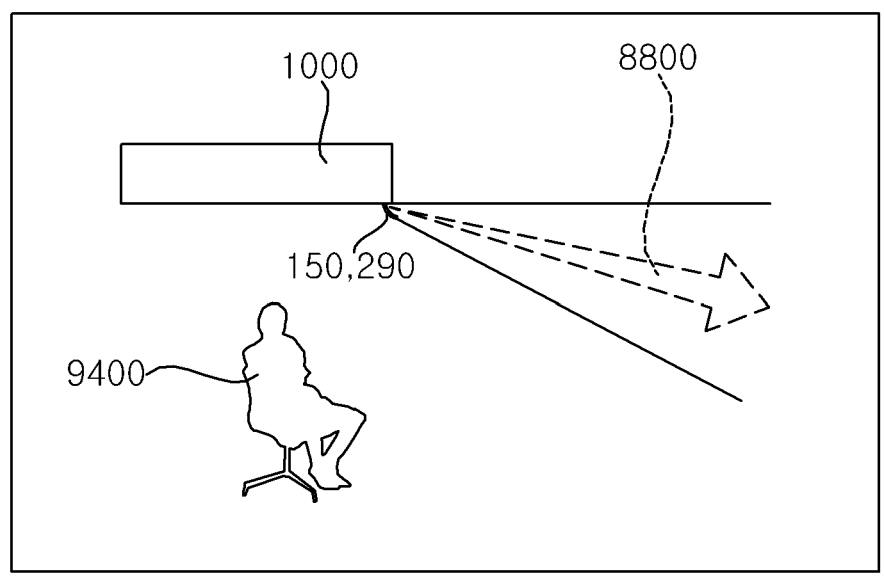

FIG. 89 is a flowchart of a method for operating an air-conditioning system according to an embodiment. FIGS. 90 and 91A-91B are views for explaining air current control based on occupancy information of the air-conditioning system according to an embodiment.

In the air-conditioning system 1 according to an embodiment, the number of air-processing apparatuses to be driven and the air current direction may vary based on indoor space occupancy information. The air-conditioning system 1 may determine occupancy information for regions corresponding to the apparatuses 100 and 200. For example, each of the first air-processing apparatus 100 and the second air-processing apparatus 200 may include a sensor and a camera in order to determine occupancy information for the regions corresponding thereto. The apparatuses 100 and 200, which are disposed in a line, may obtain occupancy information for different regions of the indoor space, thereby more accurately determining occupancy information without blind zones.

FIG. 90 illustrates the case in which the air-conditioning system 1 according to an embodiment includes three air-processing modules 1000a, 1000b, and 1000c. Each of the air-processing modules 1000a, 1000b, and 1000c may be the first air-processing apparatus 100 or the second air-processing apparatus 200.

Referring to FIG. 90, the first air-processing module 1000a takes charge of Z1, Z4, and Z7, and determines occupancy information for Z1, Z4, and Z7. The second air-processing module 1000b takes charge of Z2, Z5, and Z8, and determines occupancy information for Z2, Z5, and Z8. The third air-processing module 1000c takes charge of Z3, Z6, and Z9, and determines occupancy information for Z3, Z6, and Z9.

The first air-processing apparatus 100 and the second air-processing apparatus 200 may determine whether an occupant is present in the regions corresponding thereto and the number of occupants, and may share occupancy information.

The air-conditioning system 1 may select an operation mode based on the occupancy information determined by the apparatuses (S3320), and the apparatuses 100 and 200 may be driven in the selected operation mode (S3330). Also, the air-conditioning system 1 may independently control the apparatuses 100 and 200 based on the occupancy information.

If a setting is made such that air is not directly blown to an occupant 9400, the air-conditioning system 1 may control air current so that air is not directly blown to the occupant 9400. Referring to FIG. 91A, the air-processing module 1000, from which the occupant 9400 is distant, may form a vertical air current 8700. Assuming that occupants are present in Z1, Z2, and Z9 in FIG. 90, the air-processing module 1000c may form vertical air current 8700.

Referring to FIG. 91B, the air-processing module 1000, below which the occupant 9400 is located, may form horizontal air current 8800. Assuming that occupants are present in Z1, Z2, and Z9 in FIG. 90, the air-processing modules 1000a and 1000b may form a horizontal air current 8800.

As is apparent from the above description, according to at least one of the embodiments, it is possible to effectively manage indoor air using a plurality of air-processing apparatuses in which outlets are formed in a line. Further, according to at least one of the embodiments, it is possible to rapidly circulate heat-exchanged air and filtered air in an indoor space.

Furthermore, according to at least one of the embodiments, it is possible to effectively maintain an indoor temperature and improve energy efficiency by reducing the influence of outdoor air.

Also, according to at least one of the embodiments, it is possible to efficiently manage an air-conditioning operation by controlling a plurality of air-processing apparatuses in an automatically interlocking manner. In addition, according to at least one of the embodiments, an air-processing apparatus for discharging heat-exchanged air and an air-processing apparatus for discharging filtered air may be arranged in a line in the lateral direction, thereby simultaneously performing purification of air in an indoor space and control of the temperature in the indoor space.

According to at least one of the embodiments, as a first air-processing apparatus and a second air-processing apparatus may be arranged in the lateral direction and louvers disposed in respective outlets may be individually driven, it is possible to individually adjust air discharge directions in consideration of the temperature of discharged air, thereby realizing rapid air circulation in an indoor space.

Further, according to at least one of the embodiments, as pre-filters respectively disposed in a first air-processing apparatus and a second air-processing apparatus are cleaned by a single filter cleaner, it is possible to efficiently manage pre-filters. Furthermore, according to at least one of the embodiments, as a filter device provided in a second air-processing apparatus is moved in the upward-downward direction by a filter-drive device, a user is capable of easily reaching the filter device. In addition, according to at least one of the embodiments, it is possible to provide an air-conditioning system and a method for operating an air-conditioning system for reliably charging a battery of a filter cleaner.

Embodiments disclosed herein provide an air-conditioning system and a method for operating an air-conditioning system for effectively managing indoor air using a plurality of air-processing apparatuses in which outlets are formed in a line.

Advantages of embodiments are not limited to the described advantages, and other advantages not mentioned herein may be clearly understood by those skilled in the art from the accompanying claims.

Although embodiments has been described with reference to specific embodiments shown in the drawings, it will be apparent to those skilled in the art that the embodiments are not limited to those exemplary embodiments and may be embodied in many forms without departing from the scope, which is set forth in the following claims. These modifications should not be understood separately from the technical spirit or scope of the disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air-conditioning system, comprising:
a first air-processing apparatus having a first inlet, formed in a first surface thereof that extends perpendicular to a floor or a ceiling, and a first outlet, formed in a second surface thereof that extends perpendicular to the first inlet, the first air-processing apparatus being configured to induce air introduced into the first inlet to exchange heat with refrigerant and to be discharged through the first outlet;
a second air-processing apparatus having a second outlet, formed therein so as to be open in a same direction as the first outlet, and a second inlet, formed therein so as to be open in a same direction as the first inlet, wherein the air-conditioning system is operable in a combined operation mode in which the first air-processing apparatus and the second air-processing apparatus operate simultaneously, or is driven in an independent operation mode in which only one of the first air-processing apparatus or the second air-processing apparatus operates, wherein the first air-processing apparatus and the second air-processing apparatus are different types of air-processing modules which are combined with each other so as to extend in a longitudinal direction, wherein the first air-processing apparatus comprises a first pre-filter disposed in the first inlet, wherein the second air-processing apparatus comprises a second pre-filter disposed in the second inlet, and wherein the first air-processing apparatus and the second air-processing apparatus are disposed adjacent to each other;

a guide rail disposed on one side of the first air-processing apparatus and one side of the second air-processing apparatus; and a filter cleaner configured to automatically move along the guide rail when operation is stopped in order to clean at least one of the first pre-filter or the second pre-filter.

2. The air-conditioning system according to claim 1, wherein the air-conditioning system is automatically driven in the combined operation mode or the independent operation mode based on a state of air in an indoor space.

3. The air-conditioning system according to claim 1, wherein, when an indoor temperature is equal to or lower than a heating reference temperature and air quality data is equal to or greater than a reference value, the first air-processing apparatus performs a heating operation, and the second air-processing apparatus performs an air purification operation in which air introduced into the second inlet is filtered and filtered air is discharged through the second outlet, and wherein, when the indoor temperature is equal to or lower than the heating reference temperature and the air quality data is less than the reference value, the first air-processing apparatus performs the heating operation and the second air-processing apparatus is not operated.

4. The air-conditioning system according to claim 1, wherein, when an indoor temperature is equal to or higher than a cooling reference temperature and air quality data is equal to or greater than a reference value, the first air-processing apparatus performs a cooling operation, and the second air-processing apparatus performs an air purification operation in which air introduced into the second inlet is filtered and filtered air is delivered to the second outlet, and wherein, when the indoor temperature is equal to or higher than the cooling reference temperature and the air quality data is less than the reference value, the first air-processing apparatus performs the cooling operation and the second air-processing apparatus is not operated.

5. The air-conditioning system according to claim 1, wherein, when an indoor temperature is higher than a heating reference temperature but lower than a cooling reference temperature and air quality data is equal to or greater than a reference value, the second air-processing apparatus performs an air purification operation in which air introduced into the second inlet is filtered and filtered air is delivered to the second outlet.

6. The air-conditioning system according to claim 1, wherein, when an indoor temperature is lower than a cooling reference temperature and air quality data is equal to or greater than a reference value, the second air-processing apparatus performs an air purification operation in which air introduced into the second inlet is filtered and filtered air is delivered to the second outlet, and wherein, when the indoor temperature is equal to or higher than the cooling reference temperature and the air quality data is less than the reference value, the first air-processing apparatus performs the cooling operation and the second air-processing apparatus is not operated.

7. The air-conditioning system according to claim 1, wherein a plurality of objects to be sensed is disposed on the guide rail so as to be spaced apart from each other in a lateral direction, and wherein the filter cleaner determines a position thereof based on the plurality of objects to be sensed which is detected by a sensor provided therein.

8. The air-conditioning system according to claim 1, wherein, when the first air-processing apparatus or the second air-processing apparatus is operating, if the filter cleaner enters a section corresponding to an air-processing apparatus that is operating, the air-processing apparatus that is operating temporarily stops operating while the filter cleaner passes through the section corresponding thereto.

9. The air-conditioning system according to claim 1, further comprising:

an end plate disposed at a first end or a second end of the guide rail to restrict movement of the filter cleaner in one direction.

10. The air-conditioning system according to claim 9, wherein the filter cleaner comprises a battery and a connection terminal configured to receive power required to charge the battery, and wherein the end plate comprises a charging terminal configured to be connected to the connection terminal of the filter cleaner and a power supply circuit configured to supply power to the charging terminal when the connection terminal and the charging terminal are connected to each other.

11. The air-conditioning system according to claim 1, wherein the filter cleaner comprises:

a dust container device that forms a space to accommodate foreign substances; and a dust container guide coupled to the dust container device and configured to move in an upward-downward direction, and wherein the dust container device and the dust container guide are detachably coupled to each other via a magnet.

12. The air-conditioning system according to claim 1, wherein the second air-processing apparatus comprises:

a filter device configured to remove foreign substances from air introduced into the second inlet;

a cover configured to open or close a lower side of the filter device; and a filter-drive device configured to move the filter device downwards when the cover is opened.

13. The air-conditioning system according to claim 12, wherein the second air-processing apparatus further comprises a filter-mount coupled to the filter device, wherein, when the filter device is separated from the filter-mount and is then recoupled thereto, the filter-drive device moves the filter device and the filter-mount upwards, and wherein, when the filter-mount returns to a position prior to descending, the cover is closed.

14. The air-conditioning system according to claim 12, further comprising:

a remote control device comprising a display configured to display replacement indicator information prompting a user to replace the filter device and a transmitter configured to transmit a filter device replacement input, wherein the second air-processing apparatus further comprises an interface configured to receive the filter device replacement input and open the cover in response to the filter device replacement input.

15. The air-conditioning system according to claim 1, wherein the first air-processing apparatus comprises a first louver configured to adjust a flow direction of air discharged through the first outlet, wherein the second air-processing apparatus comprises a second louver configured to adjust a flow direction of air discharged through the second outlet, wherein the first louver and the second louver are disposed in a line, and wherein, in the combined operation mode, an orientation of the second louver is adjusted in consideration of an orientation of the first louver.

16. The air-conditioning system according to claim 15, wherein, in the combined operation mode, when the first air-processing apparatus performs a heating operation, the first louver and the second louver rotate in a first direction to form a vertical air current, and when the first air-processing apparatus performs a cooling operation, the first louver and the second louver rotate in a second direction, the second direction being a direction opposite the first direction.

* * * * *